(12) United States Patent
Pickard

(10) Patent No.: US 11,585,515 B2
(45) Date of Patent: Feb. 21, 2023

(54) LIGHTING CONTROLLER FOR EMULATING PROGRESSION OF AMBIENT SUNLIGHT

(71) Applicant: EcoSense Lighting Inc., Los Angeles, CA (US)

(72) Inventor: Paul Pickard, Acton, CA (US)

(73) Assignee: KORRUS, INC., Los Angeles, CA (US)

( * ) Notice: Subject to any disclaimer, the term of this patent is extended or adjusted under 35 U.S.C. 154(b) by 191 days.

(21) Appl. No.: 16/393,518

(22) Filed: Apr. 24, 2019

(65) Prior Publication Data

US 2019/0353328 A1 Nov. 21, 2019

Related U.S. Application Data

(63) Continuation-in-part of application No. 16/279,396, filed on Feb. 19, 2019, now abandoned, which is a
(Continued)

(51) Int. Cl.
*F21V 7/00* (2006.01)
*F21V 8/00* (2006.01)
(Continued)

(52) U.S. Cl.
CPC ............ *F21V 7/0091* (2013.01); *F21V 13/02* (2013.01); *G02B 6/003* (2013.01); *G02B 6/0031* (2013.01);
(Continued)

(58) Field of Classification Search
CPC .... G02B 6/003; G02B 6/0031; G02B 6/0068; G02B 6/0036; G02B 6/0045;
(Continued)

(56) References Cited

U.S. PATENT DOCUMENTS

| 4,001,571 A | 1/1977 | Martin |
| 4,698,734 A | 10/1987 | Ngai |

(Continued)

FOREIGN PATENT DOCUMENTS

| WO | 2015089517 | 6/2015 |
| WO | 2016003551 | 1/2016 |

(Continued)

OTHER PUBLICATIONS

Commonly-owned U.S. Appl. No. 62/757,664, filed Nov. 8, 2018, entitled "Two-Channel Tunable Lighting Systems With Controllable Equivalent Melanopic Lux and Correlated Color Temperature Outputs," 103pp.

(Continued)

*Primary Examiner* — Wei (Victor) Y Chan
(74) *Attorney, Agent, or Firm* — Jay M. Brown

(57) ABSTRACT

Lighting controller including control system having first control facility and second control facility. First and second control facilities respectively are for controlling first and second visible-light sources including first and second pluralities of semiconductor light-emitting devices spaced apart from and along longitudinal axis. First and second visible-light sources respectively are positioned for directing first and second beams of first and second visible-light emissions from first and second pluralities of semiconductor light-emitting devices in first and second beam directions. First and second control facilities respectively are programmed for controlling first and second intensities of first and second beams of first and second visible-light emissions. Control system is programmed for modulating first intensity of first beam and second intensity of second beam in manner for causing first and second beams of first and second visible-light emissions to collectively emulate progression of ambient sunlight. Lighting systems and lighting control methods.

56 Claims, 36 Drawing Sheets

Related U.S. Application Data continuation of application No. 15/937,843, filed on Mar. 27, 2018, now Pat. No. 10,253,948, application No. 16/393,518, filed on Apr. 24, 2019, which is a continuation-in-part of application No. 16/049,452, filed on Jul. 30, 2018, now Pat. No. 10,701,775, which is a continuation of application No. PCT/US2016/015435, filed on Jan. 28, 2016, application No. 16/393,518, filed on Apr. 24, 2019, which is a continuation-in-part of application No. PCT/US2018/029380, filed on Apr. 25, 2018.

(60) Provisional application No. 62/477,408, filed on Mar. 27, 2017, provisional application No. 62/757,664, filed on Nov. 8, 2018, provisional application No. 62/491,137, filed on Apr. 27, 2017, provisional application No. 62/562,714, filed on Sep. 25, 2017, provisional application No. 62/665,980, filed on May 2, 2018.

(51) Int. Cl.
*F21V 13/02* (2006.01)
*F21Y 103/10* (2016.01)
*F21Y 115/10* (2016.01)
*F21Y 113/20* (2016.01)

(52) U.S. Cl.
CPC ....... *F21Y 2103/10* (2016.08); *F21Y 2113/20* (2016.08); *F21Y 2115/10* (2016.08)

(58) Field of Classification Search
CPC .... F21V 7/0091; F21V 13/02; F21V 23/0442; F21S 8/04; F21Y 2113/20; F21Y 2103/10; F21Y 2115/10; Y02B 20/40; H05B 47/16; H05B 45/20
See application file for complete search history.

(56) References Cited

U.S. PATENT DOCUMENTS

| | | | |
|---|---|---|---|
| 5,032,960 A | 7/1991 | Katoh | |
| 5,521,801 A | 5/1996 | Pesau | |
| 5,577,492 A | 11/1996 | Parkyn, Jr. | |
| 5,676,453 A | 10/1997 | Parkyn, Jr. | |
| 5,806,955 A | 9/1998 | Parkyn, Jr. | |
| D483,510 S | 12/2003 | Torsten | |
| 7,422,347 B2 | 9/2008 | Miyairi | |
| 7,431,481 B2 | 10/2008 | Stefanov | |
| 7,494,259 B2 | 2/2009 | Hayashi | |
| 7,679,281 B2 | 3/2010 | Kim | |
| 7,690,810 B2 | 4/2010 | Saitoh | |
| 7,717,598 B2 | 5/2010 | Kakizaki | |
| 7,731,395 B2 | 6/2010 | Parkyn | |
| 7,766,508 B2 | 8/2010 | Villard | |
| 7,857,482 B2 | 12/2010 | Reo | |
| 7,918,589 B2 | 4/2011 | Mayfield, III | |
| 7,967,477 B2 | 6/2011 | Bloemen | |
| 8,100,551 B2 | 1/2012 | Mayfield, III | |
| 8,109,647 B2 | 2/2012 | Soo | |
| 8,246,219 B2 | 8/2012 | Teng | |
| 8,328,403 B1 | 12/2012 | Morgan | |
| 8,388,180 B2 | 3/2013 | Chang | |
| 8,403,522 B2 | 3/2013 | Chang | |
| 8,408,739 B2 | 4/2013 | Villard | |
| 8,408,775 B1 | 4/2013 | Coleman | |
| 8,436,556 B2 | 5/2013 | Eisele | |
| 8,506,612 B2 | 8/2013 | Ashdown | |
| 8,540,394 B2 | 9/2013 | Veerasamy | |
| 8,657,467 B2 | 2/2014 | Hsieh | |
| 8,657,479 B2 | 2/2014 | Morgan | |
| 8,690,382 B2 | 4/2014 | Farmer | |
| 8,702,265 B2 | 4/2014 | May | |
| 8,754,589 B2 | 6/2014 | Chemel | |
| 8,757,834 B2 | 6/2014 | Chang | |
| 8,757,835 B2 | 6/2014 | Chang | |
| 8,764,220 B2 | 7/2014 | Chan | |
| 8,764,226 B2 | 7/2014 | Roberts | |
| 8,764,237 B2 | 7/2014 | Wang | |
| 8,789,966 B2 | 7/2014 | Mccanless | |
| 8,805,550 B2 | 8/2014 | Chemel | |
| 8,823,277 B2 | 9/2014 | Chemel | |
| 8,827,487 B2 | 9/2014 | Farmer | |
| 8,841,859 B2 | 9/2014 | Chemel | |
| 8,866,408 B2 | 10/2014 | Chemel | |
| 8,882,298 B2 | 11/2014 | Gershaw | |
| 8,888,316 B2 | 11/2014 | Handsaker | |
| 8,905,575 B2 | 12/2014 | Durkee | |
| 8,954,170 B2 | 2/2015 | Chemel | |
| 8,956,010 B2 | 2/2015 | Huang | |
| 9,006,986 B2 * | 4/2015 | Van de Ven et al. | |
| 9,072,133 B2 | 6/2015 | Chemel | |
| 9,116,274 B2 | 8/2015 | Parker | |
| 9,125,254 B2 | 9/2015 | Chemel | |
| 9,295,144 B2 | 3/2016 | Bora | |
| 9,410,664 B2 | 8/2016 | Krames | |
| 9,459,396 B1 | 10/2016 | Householder | |
| 9,474,119 B1 | 10/2016 | Chen | |
| 9,519,095 B2 | 12/2016 | Wilcox | |
| 9,645,303 B2 | 5/2017 | Tarsa | |
| 9,746,173 B2 | 8/2017 | Dau | |
| 10,022,556 B1 | 7/2018 | Holbert | |
| 10,161,610 B2 | 12/2018 | Quilici | |
| 10,405,406 B2 | 9/2019 | Liszt | |
| 10,823,347 B2 | 11/2020 | Snell | |
| 2005/0135115 A1 | 6/2005 | Lamb | |
| 2005/0281023 A1 | 12/2005 | Gould | |
| 2005/0281024 A1 | 12/2005 | Mayfield, III | |
| 2006/0203494 A1 | 9/2006 | Ohkawa | |
| 2007/0041171 A1 | 2/2007 | Ohkawa | |
| 2007/0047229 A1 | 3/2007 | Lee | |
| 2007/0183148 A1 | 8/2007 | Mayfield, III | |
| 2007/0211457 A1 | 9/2007 | Mayfield, III | |
| 2007/0223219 A1 | 9/2007 | Medendorp, Jr. | |
| 2007/0291481 A1 | 12/2007 | Gould | |
| 2008/0043490 A1 | 2/2008 | Coleman | |
| 2008/0285267 A1 | 11/2008 | Santoro | |
| 2009/0073683 A1 | 3/2009 | Chen | |
| 2009/0129084 A1 | 5/2009 | Tsao | |
| 2009/0244893 A1 | 10/2009 | Villard | |
| 2009/0296388 A1 | 12/2009 | Wu | |
| 2010/0177084 A1 | 7/2010 | Murata | |
| 2010/0220269 A1 | 9/2010 | Takama | |
| 2010/0327768 A1 | 12/2010 | Kong | |
| 2011/0013387 A1 | 1/2011 | Kanade | |
| 2011/0043486 A1 | 2/2011 | Hagiwara | |
| 2011/0141721 A1 | 6/2011 | Kato | |
| 2011/0285314 A1 | 11/2011 | Carney | |
| 2011/0299277 A1 | 12/2011 | Ehara | |
| 2012/0170258 A1 | 7/2012 | Vanduinen | |
| 2013/0003370 A1 | 1/2013 | Watanabe | |
| 2013/0063035 A1 * | 3/2013 | Baddela | H05B 45/3577 315/192 |
| 2013/0208495 A1 | 8/2013 | Dau | |
| 2013/0235580 A1 | 9/2013 | Smith | |
| 2013/0293152 A1 * | 11/2013 | Barroso | H05B 47/16 315/307 |
| 2014/0078728 A1 | 3/2014 | Rodgers | |
| 2014/0119015 A1 | 5/2014 | Morgan | |
| 2014/0168961 A1 | 6/2014 | Dubord | |
| 2014/0177209 A1 | 6/2014 | Carney | |
| 2014/0184088 A1 | 7/2014 | Lu | |
| 2014/0204023 A1 | 7/2014 | Kumar | |
| 2014/0226322 A1 | 8/2014 | Chan | |
| 2014/0228914 A1 | 8/2014 | Van De Ven | |
| 2014/0268728 A1 | 9/2014 | Hussell | |
| 2014/0268752 A1 * | 9/2014 | Werr | F21V 13/04 362/235 |
| 2014/0268869 A1 | 9/2014 | Blessitt | |
| 2015/0055371 A1 | 2/2015 | Van De Ven | |
| 2015/0211710 A1 | 7/2015 | Speier | |
| 2015/0247633 A1 | 9/2015 | Dau | |

(56) References Cited

U.S. PATENT DOCUMENTS

| | | | |
|---|---|---|---|
| 2015/0348468 A1 | 12/2015 | Chen | |
| 2015/0351187 A1 | 12/2015 | McBryde | |
| 2016/0066383 A1 | 3/2016 | Dias | |
| 2016/0195225 A1 | 7/2016 | Carney | |
| 2016/0227618 A1* | 8/2016 | Meerbeek | H05B 47/16 |
| 2016/0363769 A1 | 12/2016 | Masuda | |
| 2017/0038040 A1* | 2/2017 | May | F21V 23/06 |
| 2017/0069290 A1 | 3/2017 | Lee | |
| 2017/0097126 A1* | 4/2017 | Harbers | F21V 9/08 |
| 2017/0140145 A1 | 5/2017 | Shah | |
| 2017/0142809 A1* | 5/2017 | Paolini | H05B 47/19 |
| 2017/0227174 A1* | 8/2017 | May | F21V 7/00 |
| 2017/0257925 A1* | 9/2017 | Forbis | F21V 3/00 |
| 2017/0299146 A1 | 10/2017 | Meerbeek | |
| 2018/0077783 A1* | 3/2018 | Sooch | H05B 47/19 |
| 2018/0113244 A1 | 4/2018 | Vasylyev | |
| 2018/0117193 A1* | 5/2018 | Yadav | F21V 23/02 |
| 2018/0132320 A1* | 5/2018 | Fredricks | H05B 45/10 |
| 2018/0216791 A1* | 8/2018 | Leung | H05B 45/20 |
| 2018/0317296 A1 | 11/2018 | Chen | |
| 2018/0338355 A1 | 11/2018 | Petluri | |
| 2018/0368218 A1 | 12/2018 | Petluri | |
| 2018/0368219 A1 | 12/2018 | Petluri | |
| 2019/0013960 A1 | 1/2019 | Sadwick | |
| 2019/0029092 A1 | 1/2019 | Petluri | |
| 2019/0069355 A1 | 2/2019 | Petluri | |
| 2019/0098720 A1 | 3/2019 | Petluri | |
| 2019/0132928 A1* | 5/2019 | Rodinger | H05B 47/18 |
| 2019/0174587 A1 | 6/2019 | Petluri | |
| 2019/0253670 A1* | 8/2019 | Chien | F21S 4/28 |
| 2019/0254142 A1 | 8/2019 | Petluri | |
| 2020/0103591 A1 | 4/2020 | Tarsa | |
| 2020/0370719 A1 | 11/2020 | Keller | |
| 2021/0095835 A1 | 4/2021 | Gladden | |
| 2021/0112647 A1 | 4/2021 | Coleman | |
| 2021/0127475 A1 | 4/2021 | Bessems | |
| 2021/0195706 A1* | 6/2021 | Vissenberg | F21S 8/04 |

FOREIGN PATENT DOCUMENTS

| | | |
|---|---|---|
| WO | 2017106759 A1 | 6/2017 |
| WO | 2017131713 A1 | 8/2017 |
| WO | 2017131714 A1 | 8/2017 |
| WO | 2017131715 A1 | 8/2017 |
| WO | 2018200685 A2 | 11/2018 |
| WO | 2018200685 A3 | 12/2018 |
| WO | 2019139636 A1 | 7/2019 |
| WO | 2019139637 A1 | 7/2019 |
| WO | 2019140306 A1 | 7/2019 |
| WO | 2019140309 A1 | 7/2019 |
| WO | 2019140326 A1 | 7/2019 |
| WO | 2019140327 A2 | 7/2019 |

OTHER PUBLICATIONS

Commonly-owned U.S. Appl. No. 62/758,411, filed Nov. 9, 2018, entitled "Display Lighting Systems with Crircadian Effects," 76pp.
Commonly-owned U.S. Appl. No. 62/758,447, filed Nov. 9, 2018, entitled "Display Systems with Circadian Lighting," 64pp.
Hye Oh et al., "Healthy, natural, efficient and tunable lighting: four-package white LEDs for optimizing the circadian effect, color quality and vision performance," Light: Science & Applications 3.2 (2014); 23pp.
Zagury, Frederic, "The Color of the Sky," Atmospheric and Climate Sciences, (2012),2, 510-517; 8pp.
Smith, Glenn, "Human color vision and the unsaturated blue color of the daytime sky," Am. J. Phys. 73 (7) 590-597, Jul. 2005, 8pp.
"Diffuse sky radiation," downloaded on Jun. 18, 2019 from https://en.wikipedia.org/wiki/Diffuse_sky_radiation; 7pp.
Commonly-owned U.S. Appl. No. 62/757,672, filed Nov. 8, 2018, entitled "Switchable Systems for White Light With High Color Rendering and Biological Effects", 150pp.
Commonly-owned U.S. Appl. No. 62/712,191, filed Jul. 30, 2018, entitled "Switchable Systems for White Light with High Color Rendering and Biological Effects," 94pp.
"Circadian lighting design," downloaded on Sep. 16, 2019 from https://standard.wellcertified.com/lightycircadian-lighting-design, 3pp.
Figueiro et al.; "Designing with Circadian Stimulus"; Illuminating Engineering Society; Oct. 2016; p. 31-34.
Gall et al.; "Definition and Measurement of Circadian Radiometric Quantities"; CIE Symposium on Light and Health: Non-Visual Effects; 2004; 5 pages.
Pickard, Paul, EcoSense Lighting Inc., Presentation at Illuminating Engineering Society (IES) Annual Conference Aug. 8-10, 2019, 37pp.
Brown et al, "The Melanopic Sensitivity Function Accounts for Melanopsin-Driven Responses in Mice under Diverse Lighting Conditions," published Jan. 3, 2013, at http://dx.doi org/10.1371/journal.pone.0053583,11pp.
Lucas et al, "Measuring and using light in the melanopsin age," Trends in Neurosciences, Jan. 2014, vol. 37, No. 1, 9pp.
Rea et al.; "Modelling the spectral sensitivity of the human circadian system"; Light Research & Technology; Dec. 2011; 12 pages.
Brennan et al, "Outcome-Based Design for Circadian Lighting: An Integrated Approach to Simulation & Metrics," IBPSA-USA, 2018 Building Performance Analysis Conference and SimBuild, Sep. 26-28, 2018, pp. 141-148, 8pp.
Seitinger, "Polychromatic light for circadian support and visual comfort," Artificial Light at Night 2015, published by Philips Lighting, 25pp.
Ewing et al, "Simulating Circadian Light: Multi-Dimensional Illuminance Analysts," Proceedings of the 15th IBPSA Conference, Aug. 7-9, 2017, pp. 2363-2371, 9pp.
"Acuity Brands introduces Luminaire with Tunable White Technology," Acuity Brands, Apr. 24, 2013, 2pp.
Freyssinier et al, "The Class A Color Designation for Light Sources," 2013 DOE Solid-State Lighting R&D Workshop, Jan. 29-31, 2013, 26pp.
Rea et al, "White Lighting: A Provisional Model for Predicting Perceived Tint in 'White' Illumination," COLOR Research and Application, vol. 39, No. 5, Oct. 2014, pp. 466-479, 14pp.
"Customized Optics Product Information—Edgelit technology," Karl Jungbecker GmbH, downloaded on Feb. 3, 2017 from www.jungbecker.de, 2pp.
"Fusion Optix MicroTEK tm Platform," Fusion Optix, dated 2016, downloaded on Feb. 3, 2017 from www.fusionoptix.com, 4pp.
"GLT Technology," GLT, downloaded on Feb. 3, 2017 from www.glthome.com, 6pp.
"Lucent Optics—Planar Optical Light Guides for Light Collection and Collimation," Lucent Optics, Inc., downloaded on Feb. 3, 2017 from www.lucentoptics.com, 3pp.
"Sylvania—OSRAM OmniPoint Wins Two Innovation Awards at LIGHTFAIR International 2015," dated May 5, 2015, downloaded on Feb. 3, 2017 from www.sylvania.com, 3pp.
PCT International Patent Application No. PCT/US18/16662, filed on Feb. 2, 2018, titled "Lighting Systems Generating Partially-Collimated Light Emissions," 90pp.
"Choosing lenses for Power LED based luminaire," Infra-Lighting, downloaded on Mar. 19, 2018 from www.intra-lighting.com; 8pp.
"How to choose TIR lenses for high power LEDs," 612 Photonics, downloaded on Mar. 19, 2018 from www.612photonics.com; 7pp.
Alice Liao, "LEDs: Understanding Optical Performance," dated Oct. 13, 2014, downloaded on Mar. 19, 2018 from www.archlighting.com; 12pp.
Brett Shriver, "Current and future projection of edge-lit LED panel adoption in lighting," Global Lighting Technologies Inc., dated 2014, downloaded on Mar. 19, 2018 from www.glthome.com, 4pp.
"Mellow Light—Recessed and surface-mounted luminaire," dated Jan. 2017; Zumtobel Lighting Inc.; downloaded on May 17, 2017 from www.zumtobel.us; 5pp.
International Search Report and written opinion of the ISR dated Jan. 11, 2022 in PCT/US2021/072512 filed Nov. 19, 2021 entitled

(56) References Cited

OTHER PUBLICATIONS

"Lighting Systems Generating Visible-Light Emissions for Dynamically Emulating Sky Colors," 8pp.

* cited by examiner

LIGHTING CONTROLLER FOR EMULATING PROGRESSION OF AMBIENT SUNLIGHT

CROSS-REFERENCE TO RELATED APPLICATIONS

This application is a continuation-in-part of commonly-owned U.S. utility patent application Ser. No. 16/279,396 filed on Feb. 19, 2019, the entirety of which hereby is incorporated herein by reference. This application also is a continuation-in-part of commonly-owned U.S. utility patent application Ser. No. 15/937,843 filed on Mar. 27, 2018, the entirety of which hereby is incorporated herein by reference. This application claims the benefit of commonly-owned U.S. provisional patent application Ser. No. 62/477,408 filed on Mar. 27, 2017, the entirety of which hereby is incorporated herein by reference. This application further claims the benefit of commonly-owned U.S. provisional patent application Ser. No. 62/757,664 filed on Nov. 8, 2018, the entirety of which hereby is incorporated herein by reference. This application also is a continuation-in-part of commonly-owned U.S. patent application Ser. No. 16/049,452 filed on Jul. 30, 2018, the entirety of which hereby is incorporated herein by reference. This application additionally is a continuation-in-part of commonly-owned Patent Cooperation Treaty (PCT) international patent application serial number PCT/US2016/015435 filed on Jan. 28, 2016, the entirety of which hereby is incorporated herein by reference. This application further is a continuation-in-part of commonly-owned PCT international patent application serial number PCT/US2018/029380 filed on Apr. 25, 2018, the entirety of which hereby is incorporated herein by reference. This application claims the benefit of commonly-owned U.S. provisional patent application Ser. No. 62/491,137 filed on Apr. 27, 2017, the entirety of which hereby is incorporated herein by reference. This application also claims the benefit of commonly-owned U.S. provisional patent application Ser. No. 62/562,714 filed on Sep. 25, 2017, the entirety of which hereby is incorporated herein by reference. This application further claims the benefit of commonly-owned U.S. provisional patent application Ser. No. 62/665,980 filed on May 2, 2018, the entirety of which hereby is incorporated herein by reference.

BACKGROUND OF THE INVENTION

1. Field of the Invention

The present invention relates to the field of lighting controllers for visible-light sources that include semiconductor light-emitting devices, and to lighting systems and lighting control methods related to such lighting controllers.

2. Background of the Invention

Numerous lighting controllers for visible-light sources that include semiconductor light-emitting devices have been developed. As examples, some of such lighting controllers may control the propagation of light emitted by the semiconductor light-emitting devices. Despite the existence of these lighting controllers, further improvements are still needed in lighting controllers for visible-light sources that include semiconductor light-emitting devices, and in lighting systems and lighting control methods related to such lighting controllers.

SUMMARY

In an example of an implementation, a lighting controller is provided that includes a control system having a first control facility and having a second control facility. In the example of the lighting controller, the first control facility is for controlling a first visible-light source including a first plurality of semiconductor light-emitting devices being spaced apart from and along a longitudinal axis, the first visible-light source being positioned for directing a first beam of first visible-light emissions from the first plurality of semiconductor light-emitting devices in a first beam direction. Further in the example of the lighting controller, the second control facility is for controlling a second visible-light source including a second plurality of semiconductor light-emitting devices being spaced apart from and along the longitudinal axis, the second visible-light source being positioned for directing a second beam of second visible-light emissions from the second plurality of semiconductor light-emitting devices in a second beam direction. In the example of the lighting controller, the first control facility is programmed for controlling a first intensity of the first beam of the first visible-light emissions. Further in the example of the lighting controller, the second control facility is programmed for controlling a second intensity of the second beam of the second visible light emissions.

Additionally in the example of the lighting controller, the control system is programmed for modulating the first intensity of the first beam and the second intensity of the second beam in a manner for causing the first and second beams of the first and second visible-light emissions to collectively emulate a progression of ambient sunlight.

In some examples of the lighting controller, the control system may be programmed for causing the first and second beams to collectively emulate the progression of ambient sunlight by initially modulating the first intensity of the first beam to relatively be substantially greater than the second intensity of the second beam, and by then gradually modulating the second intensity of the second beam to relatively become substantially greater than the first intensity of the first beam.

In further examples of the lighting controller, the control system may be programmed for facilitating an alignment of the first beam towards a first boundary of an ambient space and for facilitating another alignment of the second beam towards a second boundary of the ambient space being opposite to the first boundary.

In additional examples of the lighting controller, the control system may include an indicator for facilitating an alignment of the first beam towards a first boundary of an ambient space and for facilitating another alignment of the second beam towards a second boundary of the ambient space being opposite to the first boundary.

In other examples of the lighting controller, the control system may be programmed for facilitating an alignment of the first beam towards an Eastward direction and for facilitating another alignment of the second beam towards a Westward direction.

In some examples of the lighting controller, the control system may include an indicator for facilitating an alignment of the first beam towards an Eastward direction and for facilitating another alignment of the second beam towards a Westward direction.

In further examples of the lighting controller, the control system may be programmed for modulating the first intensity of the first beam and the second intensity of the second beam in a manner for causing the first and second beams of the first and second visible-light emissions to collectively emulate the progression of ambient sunlight through a portion of a cycle extending from sunrise to sunset.

In additional examples of the lighting controller, the control system may be programmed for modulating the first intensity of the first beam and the second intensity of the second beam in a manner for causing the first and second beams of the first and second visible-light emissions to collectively emulate the progression of ambient sunlight throughout a cycle extending from sunrise to sunset.

In other examples of the lighting controller, the control system may be programmed for modulating the first intensity of the first beam and the second intensity of the second beam in a manner for causing the first and second beams of the first and second visible-light emissions to collectively initiate an emulation of the progression of ambient sunlight when a local sunrise occurs and to collectively conclude the emulation when a corresponding local sunset occurs.

In some examples of the lighting controller, the control system may include an ambient light sensor being programmed for sensing an occurrence of the local sunrise or the local sunset.

In further examples of the lighting controller, the control system may include a programmable user interface enabling an arbitrary selection of a simulated sunrise time and a simulated sunset time.

In additional examples of the lighting controller, the control system may be programmed for modulating the first intensity of the first beam and the second intensity of the second beam with a maximum ratio of the first intensity divided by the second intensity or of the second intensity divided by the first intensity being at least about 10:1.

In other examples of the lighting controller, the control system may be programmed for modulating the first intensity of the first beam and the second intensity of the second beam with a maximum ratio of the first intensity divided by the second intensity or of the second intensity divided by the first intensity being at least about 100:1.

In some examples of the lighting controller, the control system may be programmed for modulating the first intensity of the first beam in a first range and for modulating the second intensity of the second beam in a second range, in the manner for causing the first and second beams of the first and second visible-light emissions to collectively emulate the progression of ambient sunlight.

In further examples of the lighting controller, the control system may be programmed for controlling the first beam of the first visible-light emissions as having a first baseline intensity and for controlling the second beam of the second visible-light emissions as having a second baseline intensity, and the control system may be programmed for modulating the first intensity of the first beam in a first range being additive to the first baseline intensity and for modulating the second intensity of the second beam in a second range being additive to the second baseline intensity, in the manner for causing the first and second beams of the first and second visible-light emissions to collectively emulate the progression of ambient sunlight.

In additional examples of the lighting controller, the first control facility may be coupled with the first visible-light source for controlling the first intensity of the first beam of the first visible-light emissions; and the second control facility may be coupled with the second visible-light source for controlling the second intensity of the second beam of the second visible-light emissions.

In other examples of the lighting controller, the first control facility may be for controlling the first visible-light source with the first plurality of semiconductor light-emitting devices being collectively configured for generating the first visible-light emissions as having a selectable first perceived color point; and the second control facility may be for controlling the second visible-light source with the second plurality of semiconductor light-emitting devices being collectively configured for generating the second visible-light emissions as having a selectable second perceived color point.

In another example of an implementation, a lighting system is provided, including: the example of the implementation of the lighting controller; the first visible-light source; and the second visible-light source. Further in the example of the lighting system, the first control facility may be coupled with the first visible-light source for controlling the first intensity of the first beam of the first visible-light emissions; and the second control facility may be coupled with the second visible-light source for controlling the second intensity of the second beam of the second visible-light emissions.

In an example of another implementation, another lighting controller is provided that includes a control system having a first control facility and having a second control facility and having a third control facility. Further in the example of the another lighting controller, the first control facility is for controlling a first visible-light source including a first plurality of semiconductor light-emitting devices being spaced apart from and along a longitudinal axis, the first visible-light source being positioned for directing a first beam of first visible-light emissions from the first plurality of semiconductor light-emitting devices in a first beam direction. Also in the example of the another lighting controller, the second control facility is for controlling a second visible-light source including a second plurality of semiconductor light-emitting devices being spaced apart from and along the longitudinal axis, the second visible-light source being positioned for directing a second beam of second visible-light emissions from the second plurality of semiconductor light-emitting devices in a second beam direction. Additionally in the example of the another lighting controller, the third control facility is for controlling a third visible-light source including a third plurality of semiconductor light-emitting devices being spaced apart from and along the longitudinal axis, the third visible-light source being positioned for directing a third beam of third visible-light emissions from the third plurality of semiconductor light-emitting devices in a third beam direction. In the example of the another lighting controller, the first control facility is programmed for controlling a first intensity of the first beam of the first visible-light emissions, and the second control facility is programmed for controlling a second intensity of the second beam of the second visible light emissions, and the third control facility is programmed for controlling a third intensity of the third beam of the third visible light emissions. Additionally in the example of the another lighting controller, the control system is programmed for modulating the first intensity of the first beam and the second intensity of the second beam and the third intensity of the third beam in a manner for causing the first and second and third beams of the first and second and third visible-light emissions to collectively emulate a progression of ambient sunlight.

In some examples of the another lighting controller, the control system may be programmed for causing the first and second and third beams to collectively emulate the progression of ambient sunlight by initially modulating the first intensity of the first beam to relatively be substantially greater than the third intensity of the third beam while modulating the third intensity of the third beam to relatively be substantially greater than the second intensity of the second beam, and by then gradually modulating the second intensity of the second beam to relatively become substantially greater than the third intensity of the third beam while gradually modulating the third intensity of the third beam to relatively become substantially greater than the first intensity of the first beam.

In further examples of the another lighting controller, the control system may be programmed for facilitating an alignment of the first beam towards a first boundary of an ambient space and for facilitating another alignment of the second beam towards a second boundary of the ambient space being opposite to the first boundary.

In additional examples of the another lighting controller, the control system may include an indicator for facilitating an alignment of the first beam towards a first boundary of an ambient space and for facilitating another alignment of the second beam towards a second boundary of the ambient space being opposite to the first boundary.

In other examples of the another lighting controller, the control system may be programmed for facilitating an alignment of the first beam towards an Eastward direction and for facilitating another alignment of the second beam towards a Westward direction.

In some examples of the another lighting controller, the control system may include an indicator for facilitating an alignment of the first beam towards an Eastward direction and for facilitating another alignment of the second beam towards a Westward direction.

In further examples of the another lighting controller, the control system may be programmed for modulating the first intensity of the first beam and the second intensity of the second beam and the third intensity of the third beam in a manner for causing the first and second and third beams of the first and second and third visible-light emissions to collectively emulate the progression of ambient sunlight through a portion of a cycle extending from sunrise to sunset.

In additional examples of the another lighting controller, the control system may be programmed for modulating the first intensity of the first beam and the second intensity of the second beam and the third intensity of the third beam in a manner for causing the first and second and third beams of the first and second and third visible-light emissions to collectively emulate the progression of ambient sunlight throughout a cycle extending from sunrise to sunset.

In other examples of the another lighting controller, the control system may be programmed for modulating the first intensity of the first beam and the second intensity of the second beam and the third intensity of the third beam in a manner for causing the first and second and third beams of the first and second and third visible-light emissions to collectively initiate an emulation of the progression of ambient sunlight when a local sunrise occurs and to collectively conclude the emulation when a corresponding local sunset occurs.

In some examples of the another lighting controller, the control system may include an ambient light sensor being programmed for sensing an occurrence of the local sunrise or the local sunset.

In further examples of the another lighting controller, the control system may include a programmable user interface enabling an arbitrary selection of a simulated sunrise time and a simulated sunset time.

In additional examples of the another lighting controller, the control system may be programmed for modulating the first intensity of the first beam and the second intensity of the second beam with a maximum ratio of the first intensity divided by the second intensity or of the second intensity divided by the first intensity being at least about 10:1.

In other examples of the another lighting controller, the control system may be programmed for modulating the first intensity of the first beam and the second intensity of the second beam with a maximum ratio of the first intensity divided by the second intensity or of the second intensity divided by the first intensity being at least about 100:1.

In some examples of the another lighting controller, the control system may be programmed for modulating the first intensity of the first beam in a first range and for modulating the second intensity of the second beam in a second range and for modulating the third intensity of the third beam in a third range, in the manner for causing the first and second and third beams of the first and second and third visible-light emissions to collectively emulate the progression of ambient sunlight.

In further examples of the another lighting controller, the control system may be programmed for controlling the first beam of the first visible-light emissions as having a first baseline intensity and for controlling the second beam of the second visible-light emissions as having a second baseline intensity and for controlling the third beam of the third visible-light emissions as having a third baseline intensity, and the control system may be programmed for modulating the first intensity of the first beam in a first range being additive to the first baseline intensity and for modulating the second intensity of the second beam in a second range being additive to the second baseline intensity and for modulating the third intensity of the third beam in a third range being additive to the third baseline intensity, in the manner for causing the first and second and third beams of the first and second and third visible-light emissions to collectively emulate the progression of ambient sunlight.

In additional examples of the another lighting controller, the control system may be programmed for controlling the first baseline intensity and the second baseline intensity and the third baseline intensity for causing the first beam and the second beam and the third beam to collectively form a pre-set baseline pattern of the first and second and third visible-light emissions.

In other examples of the another lighting controller, the control system may be programmed for selection among a plurality of different pre-programmed combinations of the baseline intensities for the first visible-light emissions, the second visible-light emissions, and the third visible-light emissions.

In some examples of the another lighting controller, the control system may be programmed for controlling the first baseline intensity and the second baseline intensity and the third baseline intensity for causing the first beam and the second beam and the third beam to collectively form a pre-set baseline pattern of the first and second and third visible-light emissions being: center wall graze; table with wall-fill; wall wash right; wall wash left; double wall wash; wall wash right plus floor; wall wash left plus floor; room; or batwing.

In further examples of the another lighting controller, the control system may be programmed for transitioning, over a selectable time period, the baseline intensities for the first visible-light emissions, the second visible-light emissions, and the third visible-light emissions from a one of the plurality of pre-programmed combinations to another one of the plurality of pre-programmed combinations.

In other examples of the another lighting controller, the first control facility may be coupled with the first visible-light source for controlling the first intensity of the first beam of the first visible-light emissions; and the second control facility may be coupled with the second visible-light source for controlling the second intensity of the second beam of the second visible-light emissions; and the third control facility may be coupled with the third visible-light source for controlling the third intensity of the third beam of the third visible-light emissions.

In some examples of the another lighting controller, the first beam direction and the second beam direction and the third beam directions may be down-light beam directions.

In further examples of the another lighting controller, the control system may further include a fourth control facility being coupled with a fourth visible-light source including a fourth plurality of semiconductor light-emitting devices being spaced apart from and along the longitudinal axis, the fourth visible-light source being positioned for directing a fourth beam of fourth visible-light emissions from the fourth plurality of semiconductor light-emitting devices in a fourth beam direction being an up-light beam direction.

In additional examples of the another lighting controller, the control system may further include a fifth control facility being coupled with a fifth visible-light source including a fifth plurality of semiconductor light-emitting devices being spaced apart from and along the longitudinal axis, the fifth visible-light source being positioned for directing a fifth beam of fifth visible-light emissions from the fifth plurality of semiconductor light-emitting devices in a fifth beam direction being an up-light beam direction.

In other examples of the another lighting controller, the control system may be programmed for causing the fourth and fifth beams to be collectively synchronized with the progression of ambient sunlight by initially modulating a fourth intensity of the fourth beam to relatively be substantially greater than a fifth intensity of the fifth beam, and by then gradually modulating the fifth intensity of the fifth beam to relatively become substantially greater than the fourth intensity of the fourth beam.

In some examples of the another lighting controller, the control system may further include a sixth control facility being coupled with a sixth visible-light source including a sixth plurality of semiconductor light-emitting devices being spaced apart from and along the longitudinal axis, the sixth visible-light source being positioned for directing a sixth beam of sixth visible-light emissions from the sixth plurality of semiconductor light-emitting devices in a sixth beam direction being an up-light beam direction.

In further examples of the another lighting controller, the control system may be programmed for causing the fourth and fifth and sixth beams to be collectively synchronized with the progression of ambient sunlight by initially modulating the fourth intensity of the fourth beam to relatively be substantially greater than a sixth intensity of the sixth beam while modulating the sixth intensity of the sixth beam to relatively be substantially greater than the fifth intensity of the fifth beam, and by then gradually modulating the fifth intensity of the fifth beam to relatively become substantially greater than the sixth intensity of the sixth beam while gradually modulating the sixth intensity of the sixth beam to relatively become substantially greater than the fourth intensity of the fourth beam.

In additional examples of the another lighting controller, the first control facility may be for controlling the first visible-light source with the first plurality of semiconductor light-emitting devices being collectively configured for generating the first visible-light emissions as having a selectable first perceived color point; and the second control facility may be for controlling the second visible-light source with the second plurality of semiconductor light-emitting devices being collectively configured for generating the second visible-light emissions as having a selectable second perceived color point; and the third control facility may be for controlling the third visible-light source with the third plurality of semiconductor light-emitting devices being collectively configured for generating the third visible-light emissions as having a selectable third perceived color point.

In another example of an implementation, another lighting system is provided, including: the example of the implementation of the lighting controller; the first visible-light source; the second visible-light source; and a third visible-light source. Also in the example of the another lighting system, the first control facility is coupled with the first visible-light source for controlling the first intensity of the first beam of the first visible-light emissions; and the second control facility is coupled with the second visible-light source for controlling the second intensity of the second beam of the second visible-light emissions; and the third control facility is coupled with the third visible-light source for controlling the third intensity of the third beam of the third visible-light emissions.

In some examples, the another lighting system may include a fourth visible-light source including a fourth plurality of semiconductor light-emitting devices being spaced apart from and along the longitudinal axis, the fourth visible-light source being positioned for directing a fourth beam of fourth visible-light emissions from the fourth plurality of semiconductor light-emitting devices in a fourth beam direction being an up-light beam direction; and the control system may include a fourth control facility, wherein the fourth control facility is coupled with the fourth visible-light source for controlling a fourth intensity of the fourth beam of the fourth visible-light emissions.

In further examples, the another lighting system may include a fifth visible-light source including a fifth plurality of semiconductor light-emitting devices being spaced apart from and along the longitudinal axis, the fifth visible-light source being positioned for directing a fifth beam of fifth visible-light emissions from the fifth plurality of semiconductor light-emitting devices in a fifth beam direction being an up-light beam direction; and the control system may include a fifth control facility, wherein the fifth control facility is coupled with the fifth visible-light source for controlling a fifth intensity of the fifth beam of the fifth visible-light emissions.

In additional examples, the another lighting system may include a sixth visible-light source including a sixth plurality of semiconductor light-emitting devices being spaced apart from and along the longitudinal axis, the sixth visible-light source being positioned for directing a sixth beam of sixth visible-light emissions from the sixth plurality of semiconductor light-emitting devices in a sixth beam direction being an up-light beam direction; and the control system may include a sixth control facility, wherein the sixth control facility is coupled with the sixth visible-light source for controlling a sixth intensity of the sixth beam of the sixth visible-light emissions.

In an example of another implementation, a further lighting system is provided, that includes the another lighting controller having a control system having a first control facility and having a second control facility and having a third control facility. Further in the example of the further lighting system, the first control facility is for controlling a first visible-light source including a first plurality of semiconductor light-emitting devices being spaced apart from and along a longitudinal axis, the first visible-light source being positioned for directing a first beam of first visible-light emissions from the first plurality of semiconductor light-emitting devices in a first beam direction. Also in the example of the further lighting system, the second control facility is for controlling a second visible-light source including a second plurality of semiconductor light-emitting devices being spaced apart from and along the longitudinal axis, the second visible-light source being positioned for directing a second beam of second visible-light emissions from the second plurality of semiconductor light-emitting devices in a second beam direction. Additionally in the example of the further lighting system, the third control facility is for controlling a third visible-light source including a third plurality of semiconductor light-emitting devices being spaced apart from and along the longitudinal axis, the third visible-light source being positioned for directing a third beam of third visible-light emissions from the third plurality of semiconductor light-emitting devices in a third beam direction. In the example of the further lighting system, the first control facility is programmed for controlling a first intensity of the first beam of the first visible-light emissions, and the second control facility is programmed for controlling a second intensity of the second beam of the second visible light emissions, and the third control facility is programmed for controlling a third intensity of the third beam of the third visible light emissions. Additionally in the example of the further lighting system, the control system is programmed for modulating the first intensity of the first beam and the second intensity of the second beam and the third intensity of the third beam in a manner for causing the first and second and third beams of the first and second and third visible-light emissions to collectively emulate a progression of ambient sunlight. In some examples, the further lighting system may include: an edge-lit lightguide panel; a first visible-light source; another edge-lit lightguide panel; a third visible-light source; and a total internal reflection lens including a second visible-light source. In those examples of the further lighting system, the edge-lit lightguide panel may be extended along the longitudinal axis, the edge-lit lightguide panel having a pair of mutually-opposing panel surfaces and having a peripheral edge being extended along and spaced transversely away from the longitudinal axis, wherein one of the pair of panel surfaces includes a first light output interface. Also in those examples of the further lighting system, the first visible-light source may include a first plurality of semiconductor light-emitting devices, the first visible-light source being configured for generating first visible-light emissions from the first plurality of semiconductor light-emitting devices and being located along the peripheral edge for directing the first visible-light emissions into the edge-lit lightguide panel. Further in those examples of the further lighting system, the another edge-lit lightguide panel may be extended along the longitudinal axis, the another edge-lit lightguide panel having another pair of mutually-opposing panel surfaces and having another peripheral edge being extended along and spaced transversely away from the longitudinal axis, and one of the another pair of panel surfaces may include a second light output interface. Additionally in those examples of the further lighting system, the third visible-light source may include a third plurality of semiconductor light-emitting devices, the third visible-light source being configured for generating third visible-light emissions from the third plurality of semiconductor light-emitting devices and being located along the another peripheral edge for directing the third visible-light emissions into the another edge-lit lightguide panel. Also in those examples of the further lighting system, the total internal reflection lens may have a central light-emission axis being transverse to the longitudinal axis, the total internal reflection lens including a third light output interface being located between the first and second light output interfaces, the third light output interface being spaced apart from a central light input interface by a total internal reflection side surface, the total internal reflection side surface being extended along the central light-emission axis, the total internal reflection lens having the second visible-light source as including a second plurality of semiconductor light-emitting devices, the second visible-light source being configured for generating second visible-light emissions from the second plurality of semiconductor light-emitting devices and being located at the central light input interface for directing the second visible-light emissions through the total internal reflection lens to the third light output interface. In those examples of the further lighting system, the first, second and third light output interfaces may cooperatively define an emission aperture for forming combined visible-light emissions including the first visible-light emissions, the second visible-light emissions, and the third visible-light emissions. Also in those examples of the further lighting system, the emission aperture may form a shielding zone for redirecting some of the combined visible-light emissions.

In an example of a further implementation, an additional lighting system is provided, that includes the another lighting controller having a control system having a first control facility and having a second control facility and having a third control facility. Further in the example of the additional lighting system, the first control facility is for controlling a first visible-light source including a first plurality of semiconductor light-emitting devices being spaced apart from and along a longitudinal axis, the first visible-light source being positioned for directing a first beam of first visible-light emissions from the first plurality of semiconductor light-emitting devices in a first beam direction. Also in the example of the additional lighting system, the second control facility is for controlling a second visible-light source including a second plurality of semiconductor light-emitting devices being spaced apart from and along the longitudinal axis, the second visible-light source being positioned for directing a second beam of second visible-light emissions from the second plurality of semiconductor light-emitting devices in a second beam direction. Additionally in the example of the additional lighting system, the third control facility is for controlling a third visible-light source including a third plurality of semiconductor light-emitting devices being spaced apart from and along the longitudinal axis, the third visible-light source being positioned for directing a third beam of third visible-light emissions from the third plurality of semiconductor light-emitting devices in a third beam direction. In the example of the additional lighting system, the first control facility is programmed for controlling a first intensity of the first beam of the first visible-light emissions, and the second control facility is programmed for controlling a second intensity of the second beam of the second visible light emissions, and the third control facility is programmed for controlling a third intensity of the third beam of the third visible light emissions. Additionally in the example of the additional lighting system, the control system is programmed for modulating the first intensity of the first beam and the second intensity of the second beam and the third intensity of the third beam in a manner for causing the first and second and third beams of the first and second and third visible-light emissions to collectively emulate a progression of ambient sunlight. In some examples, the additional lighting system may include: an edge-lit lightguide panel; a first visible-light source; another edge-lit lightguide panel; a third visible-light source; and a bowl reflector including a second visible-light source. In those examples of the additional lighting system, the edge-lit lightguide panel may be extended along the longitudinal axis, the edge-lit lightguide panel having a pair of mutually-opposing panel surfaces and having a peripheral edge being extended along and spaced transversely away from the longitudinal axis, wherein one of the pair of panel surfaces includes a first light output interface. Also in those examples of the additional lighting system, the first visible-light source may include a first plurality of semiconductor light-emitting devices, the first visible-light source being configured for generating first visible-light emissions from the first plurality of semiconductor light-emitting devices and being located along the peripheral edge for directing the first visible-light emissions into the edge-lit lightguide panel. Further in those examples of the additional lighting system, the another edge-lit lightguide panel may be extended along the longitudinal axis, the another edge-lit lightguide panel having another pair of mutually-opposing panel surfaces and having another peripheral edge being extended along and spaced transversely away from the longitudinal axis, and one of the another pair of panel surfaces may include a second light output interface. Additionally in those examples of the additional lighting system, the third visible-light source may include a third plurality of semiconductor light-emitting devices, the third visible-light source being configured for generating third visible-light emissions from the third plurality of semiconductor light-emitting devices and being located along the another peripheral edge for directing the third visible-light emissions into the another edge-lit lightguide panel. Also in those examples of the additional lighting system, the bowl reflector may have a central light-emission axis being transverse to the longitudinal axis, the bowl reflector including a third light output interface being located between the first and second light output interfaces, the third light output interface being spaced apart from a central light input interface by a visible-light-reflective side surface, the visible-light-reflective side surface being extended along the central light-emission axis and defining a portion of a cavity, the bowl reflector having a second visible-light source including a second plurality of semiconductor light-emitting devices, the second visible-light source being configured for generating second visible-light emissions from the second plurality of semiconductor light-emitting devices and being located at the central light input interface for directing the second visible-light emissions through the cavity to the third light output interface. In those examples of the additional lighting system, the first, second and third light output interfaces may cooperatively define an emission aperture for forming combined visible-light emissions including the first visible-light emissions, the second visible-light emissions, and the third visible-light emissions. Also in those examples of the additional lighting system, the emission aperture may form a shielding zone for redirecting some of the combined visible-light emissions.

In an additional example of an implementation, a lighting control method is provided, that includes: providing a first visible-light source; providing a second visible-light source; controlling a first intensity of a first beam of first visible-light emissions; and controlling a second intensity of a second beam of second visible-light emissions. In the example of the lighting control method, providing the first visible-light source includes providing a first plurality of semiconductor light-emitting devices being spaced apart from and along a longitudinal axis, the first visible-light source being positioned for directing the first beam of the first visible-light emissions from the first plurality of semiconductor light-emitting devices in a first beam direction. In the example of the lighting control method, providing the second visible-light source includes providing a second plurality of semiconductor light-emitting devices being spaced apart from and along the longitudinal axis, the second visible-light source being positioned for directing the second beam of the second visible-light emissions from the second plurality of semiconductor light-emitting devices in a second beam direction. Also in the example of the lighting control method, controlling the first intensity of the first beam of the first visible-light emissions and controlling the second intensity of the second beam of the second visible light emissions includes: modulating the first intensity of the first beam and the second intensity of the second beam in a manner causing the first and second beams of the first and second visible-light emissions to collectively emulate a progression of ambient sunlight.

In some examples of the lighting control method, causing the first and second beams to collectively emulate the progression of ambient sunlight may include initially modulating the first intensity of the first beam to relatively be substantially greater than the second intensity of the second beam, and may include then gradually modulating the second intensity of the second beam to relatively become substantially greater than the first intensity of the first beam.

In further examples of the lighting control method, causing the first and second beams to collectively emulate the progression of ambient sunlight may include modulating the first intensity of the first beam and the second intensity of the second beam in a manner for causing the first and second beams of the first and second visible-light emissions to collectively emulate the progression of ambient sunlight through a portion of a cycle extending from sunrise to sunset.

In additional examples of the lighting control method, causing the first and second beams to collectively emulate the progression of ambient sunlight may include modulating the first intensity of the first beam and the second intensity of the second beam in a manner for causing the first and second beams of the first and second visible-light emissions to collectively emulate the progression of ambient sunlight throughout a cycle extending from sunrise to sunset.

In other examples of the lighting control method, causing the first and second beams to collectively emulate the progression of ambient sunlight may include modulating the first intensity of the first beam and the second intensity of the second beam in a manner causing the first and second beams of the first and second visible-light emissions to collectively initiate an emulation of the progression of ambient sunlight when a local sunrise occurs and to collectively conclude the emulation when a corresponding local sunset occurs.

In some examples of the lighting control method, causing the first and second beams to collectively emulate the progression of ambient sunlight may include initiating an emulation of the progression of ambient sunlight at an arbitrary user-selected time of a simulated sunrise and concluding the emulation at an arbitrary user-selected time of a simulated sunset.

In further examples of the lighting control method, causing the first and second beams to collectively emulate the progression of ambient sunlight may include modulating the first intensity of the first beam in a first range and modulating the second intensity of the second beam in a second range, in the manner for causing the first and second beams of the first and second visible-light emissions to collectively emulate the progression of ambient sunlight.

In additional examples of the lighting control method, causing the first and second beams to collectively emulate the progression of ambient sunlight may include controlling the first beam of the first visible-light emissions as having a first baseline intensity and controlling the second beam of the second visible-light emissions as having a second baseline intensity; and causing the first and second beams to collectively emulate the progression of ambient sunlight may include modulating the first intensity of the first beam in a first range being additive to the first baseline intensity and modulating the second intensity of the second beam in a second range being additive to the second baseline intensity, in the manner for causing the first and second beams of the first and second visible-light emissions to collectively emulate the progression of ambient sunlight.

In other examples of the lighting control method, controlling the first visible-light source with the first plurality of semiconductor light-emitting devices may include generating the first visible-light emissions as having a selectable first perceived color point; and controlling the second visible-light source with the second plurality of semiconductor light-emitting devices may include generating the second visible-light emissions as having a selectable second perceived color point.

In a further example of an implementation, another lighting control method is provided, that includes: providing a first visible-light source; providing a second visible-light source; providing a third visible-light source; controlling a first intensity of a first beam of first visible-light emissions; controlling a second intensity of a second beam of second visible-light emissions; and controlling a third intensity of a third beam of third visible-light emissions. In the example of the another lighting control method, providing the first visible-light source includes providing a first plurality of semiconductor light-emitting devices being spaced apart from and along a longitudinal axis, the first visible-light source being positioned for directing the first beam of the first visible-light emissions from the first plurality of semiconductor light-emitting devices in a first beam direction. In the example of the another lighting control method, providing the second visible-light source includes providing a second plurality of semiconductor light-emitting devices being spaced apart from and along the longitudinal axis, the second visible-light source being positioned for directing the second beam of the second visible-light emissions from the second plurality of semiconductor light-emitting devices in a second beam direction. In the example of the another lighting control method, providing the third visible-light source includes providing a third plurality of semiconductor light-emitting devices being spaced apart from and along the longitudinal axis, the third visible-light source being positioned for directing the third beam of the third visible-light emissions from the third plurality of semiconductor light-emitting devices in a third beam direction. Additionally, the another lighting control method includes controlling a first intensity of the first beam of the first visible-light emissions, and controlling a second intensity of the second beam of the second visible light emissions, and controlling a third intensity of the third beam of the third visible light emissions, by modulating the first intensity of the first beam and the second intensity of the second beam and the third intensity of the third beam in a manner causing the first and second and third beams of the first and second and third visible-light emissions to collectively emulate a progression of ambient sunlight.

In some examples of the another lighting control method, causing the first and second and third beams to collectively emulate the progression of ambient sunlight may include initially modulating the first intensity of the first beam to relatively be substantially greater than the third intensity of the third beam while modulating the third intensity of the third beam to relatively be substantially greater than the second intensity of the second beam, and may include then gradually modulating the second intensity of the second beam to relatively become substantially greater than the third intensity of the third beam while gradually modulating the third intensity of the third beam to relatively become substantially greater than the first intensity of the first beam.

In further examples of the another lighting control method, causing the first and second and third beams to collectively emulate the progression of ambient sunlight may include modulating the first intensity of the first beam and the second intensity of the second beam and the third intensity of the third beam in a manner for causing the first and second and third beams of the first and second and third visible-light emissions to collectively emulate the progression of ambient sunlight through a portion of a cycle extending from sunrise to sunset.

In additional examples of the another lighting control method, causing the first and second and third beams to collectively emulate the progression of ambient sunlight may include modulating the first intensity of the first beam and the second intensity of the second beam and the third intensity of the third beam in a manner for causing the first and second and third beams of the first and second and third visible-light emissions to collectively emulate the progression of ambient sunlight throughout a cycle extending from sunrise to sunset.

In other examples of the another lighting control method, causing the first and second and third beams to collectively emulate the progression of ambient sunlight may include modulating the first intensity of the first beam and the second intensity of the second beam and the third intensity of the third beam in a manner causing the first and second and third beams of the first and second and third visible-light emissions to collectively initiate an emulation of the progression of ambient sunlight when a local sunrise occurs and to collectively conclude the emulation when a corresponding local sunset occurs.

In some examples of the another lighting control method, causing the first and second beams to collectively emulate the progression of ambient sunlight may include initiating an emulation of the progression of ambient sunlight at an arbitrary user-selected time of a simulated sunrise and concluding the emulation at an arbitrary user-selected time of a simulated sunset.

In further examples of the another lighting control method, causing the first and second and third beams to collectively emulate the progression of ambient sunlight may include modulating the first intensity of the first beam in a first range and modulating the second intensity of the second beam in a second range and modulating the third intensity of the third beam in a third range, in the manner for causing the first and second and third beams of the first and second and third visible-light emissions to collectively emulate the progression of ambient sunlight.

In additional examples of the another lighting control method, causing the first and second and third beams to collectively emulate the progression of ambient sunlight may include controlling the first beam of the first visible-light emissions as having a first baseline intensity and controlling the second beam of the second visible-light emissions as having a second baseline intensity and controlling the third beam of the third visible-light emissions as having a third baseline intensity; and causing the first and second and third beams to collectively emulate the progression of ambient sunlight may include modulating the first intensity of the first beam in a first range being additive to the first baseline intensity and modulating the second intensity of the second beam in a second range being additive to the second baseline intensity and modulating the third intensity of the third beam in a third range being additive to the third baseline intensity, in the manner for causing the first and second and third beams of the first and second and third visible-light emissions to collectively emulate the progression of ambient sunlight.

In other examples of the another lighting control method, causing the first and second and third beams to collectively emulate the progression of ambient sunlight may include controlling the first baseline intensity and the second baseline intensity and the third baseline intensity for causing the first beam and the second beam and the third beam to collectively form a pre-set baseline pattern of the first and second and third visible-light emissions.

In some examples of the another lighting control method, causing the first and second and third beams to collectively emulate the progression of ambient sunlight may include controlling the first baseline intensity and the second baseline intensity and the third baseline intensity for causing the first beam and the second beam and the third beam to collectively form a pre-set baseline pattern of the first and second and third visible-light emissions being: center wall graze; table with wall-fill; wall wash right; wall wash left; double wall wash; wall wash right plus floor; wall wash left plus floor; room; or batwing.

In further examples of the another lighting control method, causing the first and second and third beams to collectively emulate the progression of ambient sunlight may include transitioning, over a selectable time period, the baseline intensities for the first visible-light emissions, the second visible-light emissions, and the third visible-light emissions from a one of the plurality of pre-programmed combinations to another one of the plurality of pre-programmed combinations.

In additional examples of the another lighting control method, causing the first and second and third beams to collectively emulate the progression of ambient sunlight may include the first beam direction and the second beam direction and the third beam directions as being down-light beam directions.

In other examples, the another lighting control method may include providing a fourth control facility being coupled with a fourth visible-light source including a fourth plurality of semiconductor light-emitting devices being spaced apart from and along the longitudinal axis, the fourth visible-light source being positioned for directing a fourth beam of fourth visible-light emissions from the fourth plurality of semiconductor light-emitting devices in a fourth beam direction being an up-light beam direction.

In some examples, the another lighting control method may include providing a fifth control facility being coupled with a fifth visible-light source including a fifth plurality of semiconductor light-emitting devices being spaced apart from and along the longitudinal axis, the fifth visible-light source being positioned for directing a fifth beam of fifth visible-light emissions from the fifth plurality of semiconductor light-emitting devices in a fifth beam direction being an up-light beam direction.

In further examples, the another lighting control method may include causing the fourth and fifth beams to be collectively synchronized with the progression of ambient sunlight by initially modulating a fourth intensity of the fourth beam to relatively be substantially greater than a fifth intensity of the fifth beam, and then gradually modulating the fifth intensity of the fifth beam to relatively become substantially greater than the fourth intensity of the fourth beam.

In additional examples, the another lighting control method may include providing a sixth control facility being coupled with a sixth visible-light source including a sixth plurality of semiconductor light-emitting devices being spaced apart from and along the longitudinal axis, the sixth visible-light source being positioned for directing a sixth beam of sixth visible-light emissions from the sixth plurality of semiconductor light-emitting devices in a sixth beam direction being an up-light beam direction.

In other examples, the another lighting control method may include causing the fourth and fifth and sixth beams to be collectively synchronized with the progression of ambient sunlight by initially modulating the fourth intensity of the fourth beam to relatively be substantially greater than a sixth intensity of the sixth beam while modulating the sixth intensity of the sixth beam to relatively be substantially greater than the fifth intensity of the fifth beam, and then gradually modulating the fifth intensity of the fifth beam to relatively become substantially greater than the sixth intensity of the sixth beam while gradually modulating the sixth intensity of the sixth beam to relatively become substantially greater than the fourth intensity of the fourth beam.

In some examples, the another lighting control method may include controlling the first visible-light source with the first plurality of semiconductor light-emitting devices being collectively configured for generating the first visible-light emissions as having a selectable first perceived color point; and controlling the second visible-light source with the second plurality of semiconductor light-emitting devices being collectively configured for generating the second visible-light emissions as having a selectable second perceived color point; and controlling the third visible-light source with the third plurality of semiconductor light-emitting devices being collectively configured for generating the third visible-light emissions as having a selectable third perceived color point.

In an additional example of an implementation, a lighting controller is provided that includes a control system having a first control facility and having a second control facility. In the example of the lighting controller, the first control facility may be for controlling a first visible-light source including a first plurality of semiconductor light-emitting devices and a second plurality of semiconductor light-emitting devices, the first and second pluralities of semiconductor light-emitting devices being spaced apart from and along a longitudinal axis, the first visible-light source being positioned for directing a first beam of first visible-light emissions from the first and second pluralities of semiconductor light-emitting devices in a down-light beam direction. Further in the example of the lighting controller, the second control facility may be for controlling a second visible-light source including a third plurality of semiconductor light-emitting devices and a fourth plurality of semiconductor light-emitting devices, the third and fourth pluralities of semiconductor light-emitting devices being spaced apart from and along the longitudinal axis, the second visible-light source being positioned for directing a second beam of second visible-light emissions from the third and fourth pluralities of semiconductor light-emitting devices in an up-light beam direction. In the example of the lighting controller, the first plurality of semiconductor light-emitting devices may have a first spectral power distribution (SPD) and a corresponding first perceived color point being white and a corresponding correlated color temperature (CCT) being warm or very warm, and the second plurality of semiconductor light-emitting devices may have a second SPD and a corresponding second perceived color point being white and a corresponding CCT being cool or very cool. In the example of the lighting controller, the third plurality of semiconductor light-emitting devices may have a third SPD and a corresponding third perceived color point being yellowish-orange, orange or reddish-orange, and the fourth plurality of semiconductor light-emitting devices may have a fourth SPD and a corresponding fourth perceived color point being greenish-blue, blue, cyan, or purplish-blue. In the example of the lighting controller, the first control facility may be programmed for modulating an intensity of the first plurality of semiconductor light-emitting devices and another intensity of the second plurality of semiconductor light-emitting devices, causing the first beam of the first visible-light emissions to have a first CCT at about sunrise being warm or very warm, and to transition to a second CCT at midday being cool or very cool, and to transition to a third CCT at about sunset being warm or very warm. In the example of the lighting controller, the second control facility may be programmed for modulating a further intensity of the third plurality of semiconductor light-emitting devices and an additional intensity of the fourth plurality of semiconductor light-emitting devices, causing the second beam of the second visible light emissions to have an initial perceived color point at about sunrise being yellowish-orange, orange or reddish-orange, and to transition to a further perceived color point at midday being greenish-blue, blue, cyan, or purplish-blue, and to transition to an additional perceived color point at about sunset being yellowish-orange, orange or reddish-orange.

In some examples of the lighting controller, the first control facility may be programmed for modulating the intensity of the first plurality of semiconductor light-emitting devices and the another intensity of the second plurality of semiconductor light-emitting devices for causing the first beam of the first visible-light emissions to transition among: the first CCT at about sunrise; and the second CCT at midday; and the third CCT at about sunset.

In further examples of the lighting controller, the second control facility may be programmed for modulating the further intensity of the third plurality of semiconductor light-emitting devices and the additional intensity of the fourth plurality of semiconductor light-emitting devices as causing the second beam of the second visible-light emissions to transition among: the initial perceived color point at about sunrise; and the further perceived color point at midday; and the additional perceived color point at about sunset.

In additional examples of the lighting controller, the first control facility may be for controlling the first plurality of semiconductor light-emitting devices with the corresponding CCT as being within a range of between about 1800K and about 2500K.

In other examples of the lighting controller, the first control facility may be for controlling the second plurality of semiconductor light-emitting devices with the corresponding CCT as being within a range of between about 5000K and about 10000K.

In some examples of the lighting controller, the second control facility may be for controlling the third plurality of semiconductor light-emitting devices with the corresponding third perceived color point as being within a range of between about 581 nanometers and about 620 nanometers.

In further examples of the lighting controller, the second control facility may be for controlling the third plurality of semiconductor light-emitting devices with the corresponding fourth perceived color point as being orange.

In additional examples of the lighting controller, the second control facility may be for controlling the third plurality of semiconductor light-emitting devices with the corresponding orange third perceived color point as being within a range of between about 586 nanometers and about 599 nanometers.

In other examples of the lighting controller, the second control facility may be for controlling the fourth plurality of semiconductor light-emitting devices with the corresponding fourth perceived color point as being within a range of between about 380 nanometers and about 520 nanometers.

In some examples of the lighting controller, the second control facility may be for controlling the fourth plurality of semiconductor light-emitting devices with the corresponding fourth perceived color point as being cyan.

In further examples of the lighting controller, the second control facility may be for controlling the fourth plurality of semiconductor light-emitting devices with the corresponding cyan fourth perceived color point as being within a range of between about 485 nanometers and about 520 nanometers.

In additional examples of the lighting controller, the first control facility may be programmed for causing the first beam of the first visible-light emissions to have the first CCT at about a local sunrise and to transition to the second CCT at a local midday and to transition to the third CCT at about a local sunset.

In other examples of the lighting controller, the second control facility may be programmed for causing the second beam of the second visible light emissions to have the initial perceived color point at about the local sunrise and to transition to the further perceived color point at the local midday and to transition to the additional perceived color point at about the local sunset.

In some examples, the lighting controller may further include an ambient light sensor being programmed for sensing an occurrence of the local sunrise or the local sunset.

In further examples, the lighting controller may further include a programmable user interface enabling an arbitrary selection of a simulated sunrise time and a simulated sunset time.

In additional examples of the lighting controller, the first SPD may have a first circadian-stimulating energy characteristic (CSEC), and the second SPD may have a second CSEC.

In other examples of the lighting controller, the third SPD may have a third CSEC, and the fourth SPD may have a fourth CSEC.

In some examples of the lighting controller, the first CSEC may include a first Equivalent Melanopic LUX (EML) value, and the second CSEC may include a second EML value.

In further examples of the lighting controller, the first CSEC may include a first Equivalent Melanopic LUX (EML) value, and the second CSEC may include a second EML value, and the third CSEC may include a third EML value, and the fourth CSEC may include a fourth EML value.

In additional examples of the lighting controller, a ratio the first EML value to the second EML value may be greater than about 5.

In other examples of the lighting controller, a ratio the first EML value to the second EML value may be greater than about 5; and a ratio of the sum of the first and second EML values to the sum of the third and fourth EML values may be greater than about 5.

Other systems, processes, features and advantages of the invention will be or will become apparent to one with skill in the art upon examination of the following figures and detailed description. It is intended that all such additional systems, processes, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
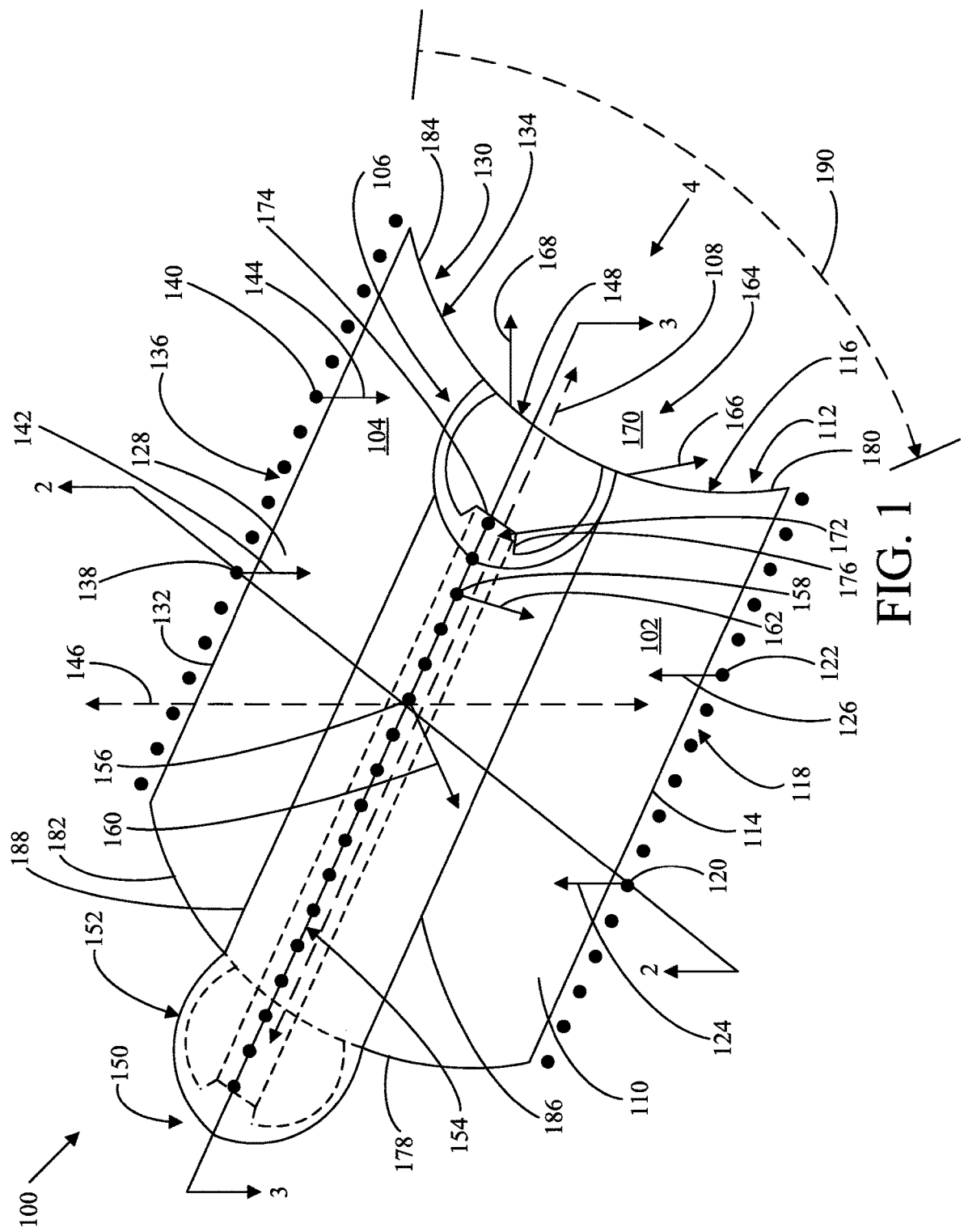
FIG. 1 is a schematic top perspective view showing an example [100] of an implementation of a lighting system.

Various lighting controllers for visible-light sources that include semiconductor light-emitting devices have been designed. Many such lighting controllers exist that are capable of controlling light emissions for illumination of a defined area, such as a room or hallway. However, existing lighting controllers often have demonstrably failed to effectively emulate a progression of ambient sunlight, or to provide appropriate illumination for defined areas, or to take into account the purpose for the illumination, or to be adaptable for a wide variety of area types and purposes, or to provide light emissions having an appropriate and controllable brightness and color(s) and propagating with a controllable beam angle range and a controllable field angle range; and often have generated light emissions being perceived as having aesthetically-unpleasing glare. Existing lighting controllers often have also demonstrably failed to emulate the progression of ambient sunlight through a cycle, or a portion of a cycle, extending from sunrise to sunset. Such existing lighting controllers also often have failed to facilitate the initiation of an emulation of the progression of ambient sunlight when a local sunrise occurs and to collectively conclude the emulation when a corresponding local sunset occurs; or to enable an arbitrary selection of a simulated sunrise time and a simulated sunset time. Existing lighting controllers further have often demonstrably failed to permit a lighting system to illuminate an ambient space with a pre-programmed or pre-set baseline pattern, such as center wall graze, table with wall-fill, wall wash right, wall wash left, double wall wash, wall wash right plus floor, wall wash left plus floor, room, or batwing, while also emulating a progression of ambient sunlight.

Lighting controllers accordingly are provided herein, that include a control system having a first control facility and a second control facility. In the lighting controllers, the first control facility is for controlling a first visible-light source including a first plurality of semiconductor light-emitting devices being spaced apart from and along a longitudinal axis, the first visible-light source being positioned for directing a first beam of first visible-light emissions from the first plurality of semiconductor light-emitting devices in a first beam direction. Further in the lighting controllers, the second control facility is for controlling a second visible-light source including a second plurality of semiconductor light-emitting devices being spaced apart from and along the longitudinal axis, the second visible-light source being positioned for directing a second beam of second visible-light emissions from the second plurality of semiconductor light-emitting devices in a second beam direction. In the lighting controllers, the first control facility is programmed for controlling a first intensity of the first beam of the first visible-light emissions. Further in the lighting controllers, the second control facility is programmed for controlling a second intensity of the second beam of the second visible-light emissions. Additionally in the lighting controllers, the control system is programmed for modulating the first intensity of the first beam and the second intensity of the second beam in a manner for causing the first and second beams of the first and second visible-light emissions to collectively emulate a progression of ambient sunlight.

Lighting systems also are accordingly provided herein, including: a control system having a first control facility and a second control facility; a first visible-light source; and a second visible-light source. Further in the lighting systems, the first control facility is coupled with the first visible-light source for controlling a first intensity of a first beam of the first visible-light emissions; and the second control facility is coupled with the second visible-light source for controlling a second intensity of a second beam of the second visible-light emissions.

Lighting control methods further are accordingly provided herein, that include: providing a first visible-light source; providing a second visible-light source; controlling a first intensity of a first beam of first visible-light emissions; and controlling a second intensity of a second beam of second visible-light emissions. In the lighting control methods, providing the first visible-light source includes providing a first plurality of semiconductor light-emitting devices being spaced apart from and along a longitudinal axis, the first visible-light source being positioned for directing the first beam of the first visible-light emissions from the first plurality of semiconductor light-emitting devices in a first beam direction. In the lighting control methods, providing the second visible-light source includes providing a second plurality of semiconductor light-emitting devices being spaced apart from and along the longitudinal axis, the second visible-light source being positioned for directing the second beam of the second visible-light emissions from the second plurality of semiconductor light-emitting devices in a second beam direction. Also in the lighting control methods, controlling the first intensity of the first beam of the first visible-light emissions and controlling the second intensity of the second beam of the second visible light emissions includes modulating the first intensity of the first beam and the second intensity of the second beam in a manner causing the first and second beams of the first and second visible-light emissions to collectively emulate a progression of ambient sunlight.

The following definitions of terms, being stated as applying "throughout this specification", are hereby deemed to be incorporated throughout this specification, including but not limited to the Summary, Brief Description of the Figures, Detailed Description, and Claims.

Throughout this specification, the term "semiconductor" means: a substance, examples including a solid chemical element or compound, that can conduct electricity under some conditions but not others, making the substance a good medium for the control of electrical current.

Throughout this specification, the term "semiconductor light-emitting device" (also being abbreviated as "SLED") means: a light-emitting diode; an organic light-emitting diode; a laser diode; or any other light-emitting device having one or more layers containing inorganic and/or organic semiconductor(s). Throughout this specification, the term "light-emitting diode" (herein also referred to as an "LED") means: a two-lead semiconductor light source having an active pn-junction. As examples, an LED may include a series of semiconductor layers that may be epitaxially grown on a substrate such as, for example, a substrate that includes sapphire, silicon, silicon carbide, gallium nitride or gallium arsenide. Further, for example, one or more semiconductor p-n junctions may be formed in these epitaxial layers. When a sufficient voltage is applied across the p-n junction, for example, electrons in the n-type semiconductor layers and holes in the p-type semiconductor layers may flow toward the p-n junction. As the electrons and holes flow toward each other, some of the electrons may recombine with corresponding holes, and emit photons. The energy release is called electroluminescence, and the color of the light, which corresponds to the energy of the photons, is determined by the energy band gap of the semiconductor. As examples, a spectral power distribution of the light generated by an LED may generally depend on the particular semiconductor materials used and on the structure of the thin epitaxial layers that make up the "active region" of the device, being the area where the light is generated. As examples, an LED may have a light-emissive electroluminescent layer including an inorganic semiconductor, such as a Group III-V semiconductor, examples including: gallium nitride; silicon; silicon carbide; and zinc oxide. Throughout this specification, the term "organic light-emitting diode" (herein also referred to as an "OLED") means: an LED having a light-emissive electroluminescent layer including an organic semiconductor, such as small organic molecules or an organic polymer. It is understood throughout this specification that a semiconductor light-emitting device may include: a non-semiconductor-substrate or a semiconductor-substrate; and may include one or more electrically-conductive contact layers. Further, it is understood throughout this specification that an LED may include a substrate formed of materials such as, for example: silicon carbide; sapphire; gallium nitride; or silicon. It is additionally understood throughout this specification that a semiconductor light-emitting device may have a cathode contact on one side and an anode contact on an opposite side, or may alternatively have both contacts on the same side of the device.

Further background information regarding semiconductor light-emitting devices is provided in the following documents, the entireties of all of which hereby are incorporated by reference herein: U.S. Pat. Nos. 7,564,180; 7,456,499; 7,213,940; 7,095,056; 6,958,497; 6,853,010; 6,791,119; 6,600,175; 6,201,262; 6,187,606; 6,120,600; 5,912,477; 5,739,554; 5,631,190; 5,604,135; 5,523,589; 5,416,342; 5,393,993; 5,359,345; 5,338,944; 5,210,051; 5,027,168; 5,027,168; 4,966,862; and 4,918,497; and U.S. Patent Application Publication Nos. 2014/0225511; 2014/0078715; 2013/0241392; 2009/0184616; 2009/0080185; 2009/0050908; 2009/0050907; 2008/0308825; 2008/0198112; 2008/0179611; 2008/0173884; 2008/0121921; 2008/0012036; 2007/0253209; 2007/0223219; 2007/0170447; 2007/0158668; 2007/0139923; and 2006/0221272.

Throughout this specification, the term "spectral power distribution" means: the emission spectrum of the one or more wavelengths of light emitted by a semiconductor light-emitting device. Throughout this specification, the term "peak wavelength" means: the wavelength where the spectral power distribution of a semiconductor light-emitting device reaches its maximum value as detected by a photo-detector. As an example, an LED may be a source of nearly monochromatic light and may appear to emit light having a single color. Thus, the spectral power distribution of the light emitted by such an LED may be centered about its peak wavelength. As examples, the "width" of the spectral power distribution of an LED may be within a range of between about 10 nanometers and about 30 nanometers, where the width is measured at half the maximum illumination on each side of the emission spectrum.

Throughout this specification, both of the terms "beam width" and "full-width-half-maximum" ("FWHM") mean: the measured angle, being collectively defined by two mutually-opposed angular directions away from a center emission direction of a visible-light beam, at which an intensity of the visible-light emissions is half of a maximum intensity measured at the center emission direction. Throughout this specification, in the case of a visible-light beam having a non-circular shape, e.g. a visible-light beam having an elliptical shape, then the terms "beam width" and "full-width-half-maximum" ("FWHM") mean: the measured maximum and minimum angles, being respectively defined in two mutually-orthogonal pairs of mutually-opposed angular directions away from a center emission direction of a visible-light beam, at which a respective intensity of the visible-light emissions is half of a corresponding maximum intensity measured at the center emission direction. Throughout this specification, the term "field angle" means: the measured angle, being collectively defined by two opposing angular directions away from a center emission direction of a visible-light beam, at which an intensity of the visible-light emissions is one-tenth of a maximum intensity measured at the center emission direction. Throughout this specification, in the case of a visible-light beam having a non-circular shape, e.g. a visible-light beam having an elliptical shape, then the term "field angle" means: the measured maximum and minimum angles, being respectively defined in two mutually-orthogonal pairs of mutually-opposed angular directions away from a center emission direction of a visible-light beam, at which a respective intensity of the visible-light emissions is one-tenth of a corresponding maximum intensity measured at the center emission direction.

Throughout this specification, the term "dominant wavelength" means: the wavelength of monochromatic light that has the same apparent color as the light emitted by a semiconductor light-emitting device, as perceived by the human eye. As an example, since the human eye perceives yellow and green light better than red and blue light, and because the light emitted by a semiconductor light-emitting device may extend across a range of wavelengths, the color perceived (i.e., the dominant wavelength) may differ from the peak wavelength.

Throughout this specification, the term "luminous flux", also referred to as "luminous power", means: the measure in lumens of the perceived power of light, being adjusted to reflect the varying sensitivity of the human eye to different wavelengths of light. Throughout this specification, the term "radiant flux" means: the measure of the total power of electromagnetic radiation without being so adjusted. Throughout this specification, the term "intensity" denotes "luminous intensity", being a measure of the wavelength-weighted power (luminous flux) emitted by a visible-light source in a particular direction per unit solid angle based on the standardized luminosity function of the sensitivity of human eyesight to various wavelengths of light. Throughout this specification, the term "central light-emission axis" means a direction along which the light emissions of a semiconductor light-emitting device have a greatest radiant flux. It is understood throughout this specification that light emissions "along a central light-emission axis" means light emissions that: include light emissions in the direction of the central light-emission axis; and may further include light emissions in a plurality of other generally similar directions.

It is understood throughout this specification that light emissions "along the longitudinal axis" means light emissions that: include light emissions in the directions of the longitudinal axis; and may further include light emissions in a plurality of other generally similar directions. It is understood throughout this specification that light emissions "in directions transverse to the longitudinal axis" means light emissions that: include light emissions in the directions being orthogonal to the longitudinal axis; and may further include light emissions in a plurality of other generally similar directions. It is understood throughout this specification that light emissions "in directions spaced apart from directions along the longitudinal axis" means light emissions in directions being similar to and spaced apart from the directions along the longitudinal axis. It is understood throughout this specification that light emissions "in directions spaced apart from directions transverse to the longitudinal axis" means light emissions in directions being similar to and spaced apart from the directions being transverse to the longitudinal axis.

Throughout this specification, the term "color bin" means: the designated empirical spectral power distribution and related characteristics of a particular semiconductor light-emitting device. For example, individual light-emitting diodes (LEDs) are typically tested and assigned to a designated color bin (i.e., "binned") based on a variety of characteristics derived from their spectral power distribution. As an example, a particular LED may be binned based on the value of its peak wavelength, being a common metric to characterize the color aspect of the spectral power distribution of LEDs. Examples of other metrics that may be utilized to bin LEDs include: dominant wavelength; and color point.

Throughout this specification, the term "luminescent" means: characterized by absorption of electromagnetic radiation (e.g., visible-light, UV light or infrared light) causing the emission of light by, as examples: fluorescence; and phosphorescence.

Throughout this specification, the term "object" means a material article or device. Throughout this specification, the term "surface" means an exterior boundary of an object. Throughout this specification, the term "incident visible-light" means visible-light that propagates in one or more directions towards a surface. Throughout this specification, the term "any incident angle" means any one or more directions from which visible-light may propagate towards a surface.

Throughout this specification, the term "reflective surface" means a surface of an object that causes incident visible-light, upon reaching the surface, to then propagate in one or more different directions away from the surface without passing through the object. Throughout this specification, the term "planar reflective surface" means a generally flat reflective surface.

Throughout this specification, the term "reflection value" means a percentage of a radiant flux of incident visible-light having a specified wavelength that is caused by a reflective surface of an object to propagate in one or more different directions away from the surface without passing through the object. Throughout this specification, the term "reflected light" means the incident visible-light that is caused by a reflective surface to propagate in one or more different directions away from the surface without passing through the object. Throughout this specification, the term "Lambertian reflection" means diffuse reflection of visible-light from a surface, in which the reflected light has uniform radiant flux in all of the propagation directions. Throughout this specification, the term "specular reflection" means mirror-like reflection of visible-light from a surface, in which light from a single incident direction is reflected into a single propagation direction. Throughout this specification, the term "spectrum of reflection values" means a spectrum of values of percentages of radiant flux of incident visible-light, the values corresponding to a spectrum of wavelength values of visible-light, that are caused by a reflective surface to propagate in one or more different directions away from the surface without passing through the object. Throughout this specification, the term "transmission value" means a percentage of a radiant flux of incident visible-light having a specified wavelength that is permitted by a reflective surface to pass through the object having the reflective surface. Throughout this specification, the term "transmitted light" means the incident visible-light that is permitted by a reflective surface to pass through the object having the reflective surface. Throughout this specification, the term "spectrum of transmission values" means a spectrum of values of percentages of radiant flux of incident visible-light, the values corresponding to a spectrum of wavelength values of visible-light, that are permitted by a reflective surface to pass through the object having the reflective surface. Throughout this specification, the term "absorption value" means a percentage of a radiant flux of incident visible-light having a specified wavelength that is permitted by a reflective surface to pass through the reflective surface and is absorbed by the object having the reflective surface. Throughout this specification, the term "spectrum of absorption values" means a spectrum of values of percentages of radiant flux of incident visible-light, the values corresponding to a spectrum of wavelength values of visible-light, that are permitted by a reflective surface to pass through the reflective surface and are absorbed by the object having the reflective surface. Throughout this specification, it is understood that a reflective surface, or an object, may have a spectrum of reflection values, and a spectrum of transmission values, and a spectrum of absorption values. The spectra of reflection values, absorption values, and transmission values of a reflective surface or of an object may be measured, for example, utilizing an ultraviolet-visible-near infrared (UV-VIS-NIR) spectrophotometer. Throughout this specification, the term "visible-light reflector" means an object having a reflective surface. In examples, a visible-light reflector may be selected as having a reflective surface characterized by light reflections that are more Lambertian than specular.

Throughout this specification, the term "lightguide" means a visible-light—transmissive body having a boundary being subject to the condition that visible-light rays traveling within the body to reach the boundary at an angle of incidence a that is larger than the critical angle will be reflected by the boundary and remain within the body. In a lightguide, visible-light rays will be subject to total internal reflection ("TIR") and so remain within the body if their angle of incidence a at the boundary satisfies the following condition derived from Snell's Law: $\alpha > \sin^{-1}(n_2/n_1)$ where $n_1$ is the refractive index of the body of the lightguide and $n_2$ is the refractive index of a medium outside the lightguide. In an example, the medium outside a lightguide may be air, having a refractive index $n_2$ being about 1. As another example, the medium outside of a lightguide may be another material having a lower refractive index than that of the body of the lightguide.

Throughout this specification, the term "lumiphor" means: a medium that includes one or more luminescent materials being positioned to absorb light that is emitted at a first spectral power distribution by a semiconductor light-emitting device, and to re-emit light at a second spectral power distribution in the visible or ultra violet spectrum being different than the first spectral power distribution, regardless of the delay between absorption and re-emission. Lumiphors may be categorized as being down-converting, i.e., a material that converts photons to a lower energy level (longer wavelength); or up-converting, i.e., a material that converts photons to a higher energy level (shorter wavelength). As examples, a luminescent material may include: a phosphor; a quantum dot; a quantum wire; a quantum well; a photonic nanocrystal; a semiconducting nanoparticle; a scintillator;

a lumiphoric ink; a lumiphoric organic dye; a day glow tape; a phosphorescent material; or a fluorescent material. Throughout this specification, the term "quantum material" means any luminescent material that includes: a quantum dot; a quantum wire; or a quantum well. Some quantum materials may absorb and emit light at spectral power distributions having narrow wavelength ranges, for example, wavelength ranges having spectral widths being within ranges of between about 25 nanometers and about 50 nanometers. In examples, two or more different quantum materials may be included in a lumiphor, such that each of the quantum materials may have a spectral power distribution for light emissions that may not overlap with a spectral power distribution for light absorption of any of the one or more other quantum materials. In these examples, cross-absorption of light emissions among the quantum materials of the lumiphor may be minimized. As examples, a lumiphor may include one or more layers or bodies that may contain one or more luminescent materials that each may be: (1) coated or sprayed directly onto an semiconductor light-emitting device; (2) coated or sprayed onto surfaces of a lens or other elements of packaging for an semiconductor light-emitting device; (3) dispersed in a matrix medium; or (4) included within a clear encapsulant (e.g., an epoxy-based or silicone-based curable resin or glass or ceramic) that may be positioned on or over an semiconductor light-emitting device. A lumiphor may include one or multiple types of luminescent materials. Other materials may also be included with a lumiphor such as, for example, fillers, diffusants, colorants, or other materials that may as examples improve the performance of or reduce the overall cost of the lumiphor. In examples where multiple types of luminescent materials may be included in a lumiphor, such materials may, as examples, be mixed together in a single layer or deposited sequentially in successive layers.

Throughout this specification, the term "volumetric lumiphor" means a lumiphor being distributed in an object having a shape including defined exterior surfaces. In some examples, a volumetric lumiphor may be formed by dispersing a lumiphor in a volume of a matrix medium having suitable spectra of visible-light transmission values and visible-light absorption values. As examples, such spectra may be affected by a thickness of the volume of the matrix medium, and by a concentration of the lumiphor being distributed in the volume of the matrix medium. In examples, the matrix medium may have a composition that includes polymers or oligomers of: a polycarbonate; a silicone; an acrylic; a glass; a polystyrene; or a polyester such as polyethylene terephthalate. Throughout this specification, the term "remotely-located lumiphor" means a lumiphor being spaced apart at a distance from and positioned to receive light that is emitted by a semiconductor light-emitting device.

Throughout this specification, the term "light-scattering particles" means small particles formed of a non-luminescent, non-wavelength-converting material. In some examples, a volumetric lumiphor may include light-scattering particles being dispersed in the volume of the matrix medium for causing some of the light emissions having the first spectral power distribution to be scattered within the volumetric lumiphor. As an example, causing some of the light emissions to be so scattered within the matrix medium may cause the luminescent materials in the volumetric lumiphor to absorb more of the light emissions having the first spectral power distribution. In examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In examples, light-scattering particles may have particle sizes being within a range of about 0.01 micron (10 nanometers) and about 2.0 microns (2,000 nanometers).

In some examples, a visible-light reflector may be formed by dispersing light-scattering particles having a first index of refraction in a volume of a matrix medium having a second index of refraction being suitably different from the first index of refraction for causing the volume of the matrix medium with the dispersed light-scattering particles to have suitable spectra of reflection values, transmission values, and absorption values for functioning as a visible-light reflector. As examples, such spectra may be affected by a thickness of the volume of the matrix medium, and by a concentration of the light-scattering particles being distributed in the volume of the matrix medium, and by physical characteristics of the light-scattering particles such as the particle sizes and shapes, and smoothness or roughness of exterior surfaces of the particles. In an example, the smaller the difference between the first and second indices of refraction, the more light-scattering particles may need to be dispersed in the volume of the matrix medium to achieve a given amount of light-scattering. As examples, the matrix medium for forming a visible-light reflector may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate. In other examples, a visible-light reflector may include a reflective polymeric or metallized surface formed on a visible-light-transmissive polymeric or metallic object such as, for example, a volume of a matrix medium. Additional examples of visible-light reflectors may include microcellular foamed polyethylene terephthalate sheets ("MCPET"). Suitable visible-light reflectors may be commercially available under the trade names White Optics® and MIRO® from WhiteOptics LLC, 243-G Quigley Blvd., New Castle, Del. 19720 USA. Suitable MCPET visible-light reflectors may be commercially available from the Furukawa Electric Co., Ltd., Foamed Products Division, Tokyo, Japan. Additional suitable visible-light reflectors may be commercially available from CVI Laser Optics, 200 Dorado Place SE, Albuquerque, N. Mex. 87123 USA.

In some examples, a converging or diverging lens may be formed as a volume of a matrix medium having a suitable shape for functioning as a lens. In further examples, forming a diverging lens may include dispersing light-scattering particles having a first index of refraction in a volume of a matrix medium having a second index of refraction being suitably different from the first index of refraction for causing the volume of the matrix medium with the dispersed light-scattering particles to have suitable light-scattering value for functioning as a diverging lens. As examples, the matrix medium for forming a lens may have a composition that includes polymers or oligomers of: a polycarbonate; a silicone; an acrylic; a glass; a polystyrene; or a polyester such as polyethylene terephthalate. In further examples, the light-scattering particles may include: rutile titanium dioxide; anatase titanium dioxide; barium sulfate; diamond; alumina; magnesium oxide; calcium titanate; barium titanate; strontium titanate; or barium strontium titanate.

In further examples, a volumetric lumiphor and a visible-light reflector may be integrally formed. As examples, a volumetric lumiphor and a visible-light reflector may be integrally formed in respective layers of a volume of a matrix medium, including a layer of the matrix medium having a dispersed lumiphor, and including another layer of the same or a different matrix medium having light-scattering particles being suitably dispersed for causing the another layer to have suitable spectra of reflection values, transmission values, and absorption values for functioning as the visible-light reflector. In other examples, an integrally-formed volumetric lumiphor and visible-light reflector may incorporate any of the further examples of variations discussed above as to separately-formed volumetric lumiphors and visible-light reflectors.

Throughout this specification, the term "phosphor" means: a material that exhibits luminescence when struck by photons. Examples of phosphors that may utilized include: $CaAlSiN_3$:Eu, $SrAlSiN_3$:Eu, $CaAlSiN_3$:Eu, $Ba_3Si_6O_{12}N_2$:Eu, $Ba_2SiO_4$:Eu, $Sr_2SiO_4$:Eu, $Ca_2SiO_4$:Eu, $Ca_3Sc_2Si_3O_{12}$:Ce, $Ca_3Mg_2Si_3O_{12}$:Ce, $CaSc_2O_4$:Ce, $CaSi_2O_2N_2$:Eu, $SrSi_2O_2N_2$:Eu, $BaSi_2O_2N_2$:Eu, $Ca_5(PO_4)_3C_1$:Eu, $Ba_5(PO_4)_3C_1$:Eu, $Cs_2CaP_2O_7$, $Cs_2SrP_2O_7$, $SrGa_2S_4$:Eu, $Lu_3Al_5O_{12}$:Ce, $Ca_8Mg(SiO_4)_4Cl_2$:Eu, $Sr_8Mg(SiO_4)_4Cl_2$:Eu, $La_3Si_6N_{11}$:Ce, $Y_3Al_5O_{12}$:Ce, $Y_3Ga_5O_{12}$:Ce, $Gd_3Al_5O_{12}$:Ce, $Gd_3Ga_5O_{12}$:Ce, $Tb_3Al_5O_{12}$:Ce, $Tb_3Ga_5O_{12}$:Ce, $Lu_3Ga_5O_{12}$:Ce, (SrCa)$AlSiN_3$:Eu, LuAG:Ce, $(Y,Gd)_2Al_5)_{12}$:Ce, CaS:Eu, SrS:Eu, $SrGa_2S_4$:$E_4$, $Ca_2(Sc,Mg)_2SiO_{12}$:Ce, $Ca_2Sc_2Si_2)_{12}$:$C_2$, $Ca_2Sc_2O_4$:Ce, $Ba_2Si_6O_{12}N_2$:Eu, (Sr,Ca)$AlSiN_2$:Eu, and CaAl $SiN_2$:Eu. Throughout this specification, the term "quantum dot" means: a nanocrystal made of semiconductor materials that are small enough to exhibit quantum mechanical properties, such that its excitons are confined in all three spatial dimensions.

Throughout this specification, the term "quantum wire" means: an electrically conducting wire in which quantum effects influence the transport properties.

Throughout this specification, the term "quantum well" means: a thin layer that can confine (quasi-)particles (typically electrons or holes) in the dimension perpendicular to the layer surface, whereas the movement in the other dimensions is not restricted.

Throughout this specification, the term "photonic nanocrystal" means: a periodic optical nanostructure that affects the motion of photons, for one, two, or three dimensions, in much the same way that ionic lattices affect electrons in solids.

Throughout this specification, the term "semiconducting nanoparticle" means: a particle having a dimension within a range of between about 1 nanometer and about 100 nanometers, being formed of a semiconductor.

Throughout this specification, the term "scintillator" means: a material that fluoresces when struck by photons.

Throughout this specification, the term "lumiphoric ink" means: a liquid composition containing a luminescent material. For example, a lumiphoric ink composition may contain semiconductor nanoparticles. Examples of lumiphoric ink compositions that may be utilized are disclosed in Cao et al., U.S. Patent Application Publication No. 20130221489 published on Aug. 29, 2013, the entirety of which hereby is incorporated herein by reference.

Throughout this specification, the term "lumiphoric organic dye" means an organic dye having luminescent up-converting or down-converting activity. As an example, some perylene-based dyes may be suitable.

Throughout this specification, the term "day glow tape" means: a tape material containing a luminescent material.

Throughout this specification, the term "CIE 1931 XY chromaticity diagram" means: the 1931 International Commission on Illumination two-dimensional chromaticity diagram, which defines the spectrum of perceived color points of visible-light by (x, y) pairs of chromaticity coordinates that fall within a generally U-shaped area that includes all of the hues perceived by the human eye. Each of the x and y axes of the CIE 1931 XY chromaticity diagram has a scale of between 0.0 and 0.8. The spectral colors are distributed around the perimeter boundary of the chromaticity diagram, the boundary encompassing all of the hues perceived by the human eye. The perimeter boundary itself represents maximum saturation for the spectral colors. The CIE 1931 XY chromaticity diagram is based on the three-dimensional CIE 1931 XYZ color space. The CIE 1931 XYZ color space utilizes three color matching functions to determine three corresponding tristimulus values which together express a given color point within the CIE 1931 XYZ three-dimensional color space. The CIE 1931 XY chromaticity diagram is a projection of the three-dimensional CIE 1931 XYZ color space onto a two-dimensional (x, y) space such that brightness is ignored. A technical description of the CIE 1931 XY chromaticity diagram is provided in, for example, the "Encyclopedia of Physical Science and Technology", vol. 7, pp. 230-231 (Robert A Meyers ed., 1987); the entirety of which hereby is incorporated herein by reference. Further background information regarding the CIE 1931 XY chromaticity diagram is provided in Harbers et al., U.S. Patent Application Publication No. 2012/0224177A1 published on Sep. 6, 2012, the entirety of which hereby is incorporated herein by reference.

Throughout this specification, the term "color point" means: an (x, y) pair of chromaticity coordinates falling within the CIE 1931 XY chromaticity diagram. Color points located at or near the perimeter boundary of the CIE 1931 XY chromaticity diagram are saturated colors composed of light having a single wavelength, or having a very small spectral power distribution. Color points away from the perimeter boundary within the interior of the CIE 1931 XY chromaticity diagram are unsaturated colors that are composed of a mixture of different wavelengths.

Throughout this specification, the term "combined light emissions" means: a plurality of different light emissions that are mixed together. Throughout this specification, the term "combined color point" means: the color point, as perceived by human eyesight, of combined light emissions. Throughout this specification, "substantially constant" combined color points are: color points of combined light emissions that are perceived by human eyesight as being uniform, i.e., as being of the same color. Throughout this specification, the phrase "substantially greater" as describing an intensity of a first visible-light source in comparison with that of a second visible-light source means that the intensity of the first visible-light source is noticeably greater to a casual observer than the intensity of the second visible-light source.

Throughout this specification, it is understood that a plurality of semiconductor light-emitting devices may be collectively configured for generating visible-light emissions having a perceived color point, wherein a plurality of individual ones among the plurality of semiconductor light-emitting devices may each emit visible-light having a different color point. Devices and methods for suitably generating visible-light emissions having such a perceived color point from a plurality of semiconductor light-emitting devices that may have different color points are disclosed in commonly-owned U.S. patent application Ser. No. 16/049,452 filed on Jul. 30, 2018 and entitled "Methods for Generating Melatonin-Response-Tuned White Light with High Color Rendering," the entirety of which hereby is incorporated herein by reference. Further devices and methods for suitably generating visible-light emissions having such a perceived color point from a plurality of semiconductor light-emitting devices that may have different color points are disclosed in commonly-owned U.S. patent application Ser. No. 62/757,664 filed on Nov. 8, 2018 and entitled "Two-Channel Tunable Lighting Systems With Controllable Equivalent Melanopic Lux and Correlated Color Temperature Outputs," the entirety of which hereby is incorporated herein by reference.

Throughout this specification, the term "Planckian-black-body locus" means the curve within the CIE 1931 XY chromaticity diagram that plots the chromaticity coordinates (i.e., color points) that obey Planck's equation: $E(\lambda)=A\lambda-5/(eB/T-1)$, where E is the emission intensity, X is the emission wavelength, T is the color temperature in degrees Kelvin of a black-body radiator, and A and B are constants. The Planckian-black-body locus corresponds to the locations of color points of light emitted by a black-body radiator that is heated to various temperatures. As a black-body radiator is gradually heated, it becomes an incandescent light emitter (being referred to throughout this specification as an "incandescent light emitter") and first emits reddish light, then yellowish light, and finally bluish light with increasing temperatures. This incandescent glowing occurs because the wavelength associated with the peak radiation of the black-body radiator becomes progressively shorter with gradually increasing temperatures, consistent with the Wien Displacement Law. The CIE 1931 XY chromaticity diagram further includes a series of lines each having a designated corresponding temperature listing in units of degrees Kelvin spaced apart along the Planckian-black-body locus and corresponding to the color points of the incandescent light emitted by a black-body radiator having the designated temperatures. Throughout this specification, such a temperature listing is referred to as a "correlated color temperature" (herein also referred to as the "CCT") of the corresponding color point. Correlated color temperatures are expressed herein in units of degrees Kelvin (K). Throughout this specification, each of the lines having a designated temperature listing is referred to as an "isotherm" of the corresponding correlated color temperature.

Throughout this specification, the term "chromaticity bin" means: a bounded region within the CIE 1931 XY chromaticity diagram. As an example, a chromaticity bin may be defined by a series of chromaticity (x,y) coordinates, being connected in series by lines that together form the bounded region. As another example, a chromaticity bin may be defined by several lines or other boundaries that together form the bounded region, such as: one or more isotherms of CCT's; and one or more portions of the perimeter boundary of the CIE 1931 chromaticity diagram.

Throughout this specification, the term "delta(uv)" means: the shortest distance of a given color point away from (i.e., above or below) the Planckian-black-body locus. In general, color points located at a delta(uv) of about equal to or less than 0.015 may be assigned a correlated color temperature (CCT).

Throughout this specification, the term "greenish-blue light" means: light having a perceived color point being within a range of between about 490 nanometers and about 482 nanometers (herein referred to as a "greenish-blue color point.").

Throughout this specification, the term "blue light" means: light having a perceived color point being within a range of between about 482 nanometers and about 470 nanometers (herein referred to as a "blue color point.").

Throughout this specification, the term "purplish-blue light" means: light having a perceived color point being within a range of between about 470 nanometers and about 380 nanometers (herein referred to as a "purplish-blue color point.").

Throughout this specification, the term "reddish-orange light" means: light having a perceived color point being within a range of between about 610 nanometers and about 620 nanometers (herein referred to as a "reddish-orange color point.").

Throughout this specification, the term "red light" means: light having a perceived color point being within a range of between about 620 nanometers and about 640 nanometers (herein referred to as a "red color point.").

Throughout this specification, the term "deep red light" means: light having a perceived color point being within a range of between about 640 nanometers and about 670 nanometers (herein referred to as a "deep red color point.").

Throughout this specification, the term "visible-light" means light having one or more wavelengths being within a range of between about 380 nanometers and about 670 nanometers; and "visible-light spectrum" means the range of wavelengths of between about 380 nanometers and about 670 nanometers.

Throughout this specification, the term "white light" means: light having a color point located at a delta(uv) of about equal to or less than 0.006 and having a CCT being within a range of between about 10000K and about 1800K (herein referred to as a "white color point."). Many different hues of light may be perceived as being "white." For example, some "white" light, such as light generated by a tungsten filament incandescent lighting device, may appear yellowish in color, while other "white" light, such as light generated by some fluorescent lighting devices, may appear more bluish in color. As examples, white light having a CCT of about 3000K may appear yellowish in color, while white light having a CCT of about equal to or greater than 8000K may appear more bluish in color and may be referred to as "cool" white light. Further, white light having a CCT of between about 2500K and about 4500K may appear reddish or yellowish in color and may be referred to as "warm" white light. "White light" includes light having a spectral power distribution of wavelengths including red, green and blue color points. In an example, a CCT of a lumiphor may be tuned by selecting one or more particular luminescent materials to be included in the lumiphor. For example, light emissions from a semiconductor light-emitting device that includes three separate emitters respectively having red, green and blue color points with an appropriate spectral power distribution may have a white color point. As another example, light perceived as being "white" may be produced by mixing light emissions from a semiconductor light-emitting device having a blue, greenish-blue or purplish-blue color point together with light emissions having a yellow color point being produced by passing some of the light emissions having the blue, greenish-blue or purplish-blue color point through a lumiphor to down-convert them into light emissions having the yellow color point. General background information on systems and processes for generating light perceived as being "white" is provided in "Class A Color Designation for Light Sources Used in General Illumination", Freyssinier and Rea, *J. Light & Vis. Env.*, Vol. 37, No. 2 & 3 (Nov. 7, 2013, Illuminating Engineering Institute of Japan), pp. 10-14; the entirety of which hereby is incorporated herein by reference.

Throughout this specification, the term "color rendition index" (herein also referred to as "CRT-Ra") means: the quantitative measure on a scale of 1-100 of the capability of a given light source to accurately reveal the colors of one or more objects having designated reference colors, in comparison with the capability of a black-body radiator to accurately reveal such colors. The CRI-Ra of a given light source is a modified average of the relative measurements of color renditions by that light source, as compared with color renditions by a reference black-body radiator, when illuminating objects having the designated reference color(s). The CRT is a relative measure of the shift in perceived surface color of an object when illuminated by a particular light source versus a reference black-body radiator. The CRI-Ra will equal 100 if the color coordinates of a set of test colors being illuminated by the given light source are the same as the color coordinates of the same set of test colors being irradiated by the black-body radiator. The CRI system is administered by the International Commission on Illumination (CIE). The CIE selected fifteen test color samples (respectively designated as $R_{1-15}$) to grade the color properties of a white light source. The first eight test color samples (respectively designated as $R_{1-8}$) are relatively low saturated colors and are evenly distributed over the complete range of hues. These eight samples are employed to calculate the general color rendering index Ra. The general color rendering index Ra is simply calculated as the average of the first eight color rendering index values, $R_{1-8}$. An additional seven samples (respectively designated as $R_{9-15}$) provide supplementary information about the color rendering properties of a light source; the first four of them focus on high saturation, and the last three of them are representative of well-known objects. A set of color rendering index values, $R_{1-15}$, can be calculated for a particular correlated color temperature (CCT) by comparing the spectral response of a light source against that of each test color sample, respectively. As another example, the CRI-Ra may consist of one test color, such as the designated red color of $R_9$.

As examples, sunlight generally has a CRI-Ra of about 100; incandescent light bulbs generally have a CRI-Ra of about 95; fluorescent lights generally have a CRI-Ra of about 70 to 85; and monochromatic light sources generally have a CRI-Ra of about zero. As an example, a light source for general illumination applications where accurate rendition of object colors may not be considered important may generally need to have a CRI-Ra value being within a range of between about 70 and about 80. Further, for example, a light source for general interior illumination applications may generally need to have a CRI-Ra value being at least about 80. As an additional example, a light source for general illumination applications where objects illuminated by the lighting device may be considered to need to appear to have natural coloring to the human eye may generally need to have a CRI-Ra value being at least about 85. Further, for example, a light source for general illumination applications where good rendition of perceived object colors may be considered important may generally need to have a CRI-Ra value being at least about 90.

Throughout this specification, the term "in contact with" means: that a first object, being "in contact with" a second object, is in either direct or indirect contact with the second object. Throughout this specification, the term "in indirect contact with" means: that the first object is not in direct contact with the second object, but instead that there are a plurality of objects (including the first and second objects), and each of the plurality of objects is in direct contact with at least one other of the plurality of objects (e.g., the first and second objects are in a stack and are separated by one or more intervening layers). Throughout this specification, the term "in direct contact with" means: that the first object, which is "in direct contact" with a second object, is touching the second object and there are no intervening objects between at least portions of both the first and second objects.

Throughout this specification, the term "spectrophotometer" means: an apparatus that can measure a light beam's intensity as a function of its wavelength and calculate its total luminous flux.

Throughout this specification, the term "integrating sphere-spectrophotometer" means: a spectrophotometer operationally connected with an integrating sphere. An integrating sphere (also known as an Ulbricht sphere) is an optical component having a hollow spherical cavity with its interior covered with a diffuse white reflective coating, with small holes for entrance and exit ports. Its relevant property is a uniform scattering or diffusing effect. Light rays incident on any point on the inner surface are, by multiple scattering reflections, distributed equally to all other points. The effects of the original direction of light are minimized. An integrating sphere may be thought of as a diffuser which preserves power but destroys spatial information. Another type of integrating sphere that can be utilized is referred to as a focusing or Coblentz sphere. A Coblentz sphere has a mirror-like (specular) inner surface rather than a diffuse inner surface. Light scattered by the interior of an integrating sphere is evenly distributed over all angles. The total power (radiant flux) of a light source can then be measured without inaccuracy caused by the directional characteristics of the source.

Background information on integrating sphere-spectrophotometer apparatus is provided in Liu et al., U.S. Pat. No. 7,532,324 issued on May 12, 2009, the entirety of which hereby is incorporated herein by reference. It is understood throughout this specification that color points may be measured, for example, by utilizing a spectrophotometer, such as an integrating sphere-spectrophotometer. The spectra of reflection values, absorption values, and transmission values of a reflective surface or of an object may be measured, for example, utilizing an ultraviolet-visible-near infrared (UV-VIS-NIR) spectrophotometer.

Throughout this specification, the term "diffuse refraction" means refraction from an object's surface that scatters the visible-light emissions, casting multiple jittered light rays forming combined light emissions having a combined color point.

Throughout this specification, the term "control facility" means: a device being suited for controlling the transmission of a variable power input to one or more semiconductor light-emitting devices being included in a visible-light source. As an example, a control facility may include a microprocessor, and may provide the variable power input by, as examples: constant current reduction (CCR); constant voltage (CV); or pulse-width-modulation (PWM). Throughout this specification, it is understood that the term "microprocessor" means a multipurpose, programmable device that accepts digital data as input, and processes the digital data according to instructions stored in the programmable device's memory, and provides results as output. As further examples, a control facility may have conductors for transmitting the variable power input, being electrically connected with the semiconductor light-emitting devices. As further examples, a control facility may include: (1) one or more electrical components employed in converting electrical power (e.g., from AC to DC and/or from one voltage to another voltage); (2) one or more electronic components employed in driving one or more semiconductor light-emitting devices, e.g., running one or more semiconductor light-emitting devices intermittently and/or adjusting the power input as supplied to one or more of the semiconductor light-emitting devices in response to a user command such as a dimmer command, or a command received from the control facility; (3) one or more circuit boards (e.g., a metal core circuit board) for supporting and/or providing a variable power input to semiconductor light-emitting devices or any other electrical components, and/or (4) one or more wires connecting any auxiliary electrical components, such as bridge rectifiers, transformers, or power factor controllers. In examples, a control facility may include wired or wireless user command input devices, examples of which may include wired dual in-line packaged (DIP) switches, other wired switches, or wireless mobile communicator applications. Throughout this specification, the term "coupled" means positioned for transmission of a power input to one or more semiconductor light-emitting devices of a visible-light source.

Throughout this specification, the term "ambient space" means any interior or exterior location where a lighting controller or a lighting system may be utilized. As examples, an "ambient space" may be a room inside a building or may be an exterior location. Throughout this specification, the term "boundary" means a portion of a perimeter of an ambient space. As examples, a "boundary" may be a wall, floor or ceiling of a room; or may be a portion of a perimeter of an exterior location. Throughout this specification, the term "down-light" means visible-light emissions being directed in a generally downward direction within an ambient space. Throughout this specification, the term "up-light" means visible-light emissions being directed in a generally upward direction within an ambient space.

Throughout this specification, each of the words "include", "contain", and "have" is interpreted broadly as being open to the addition of further like elements as well as to the addition of unlike elements.

It is understood throughout this specification that numbering of the names of elements as being "first", "second" etcetera, is solely for purposes of clarity in referring to such elements in connection with various examples of lighting systems.

Figure 2:
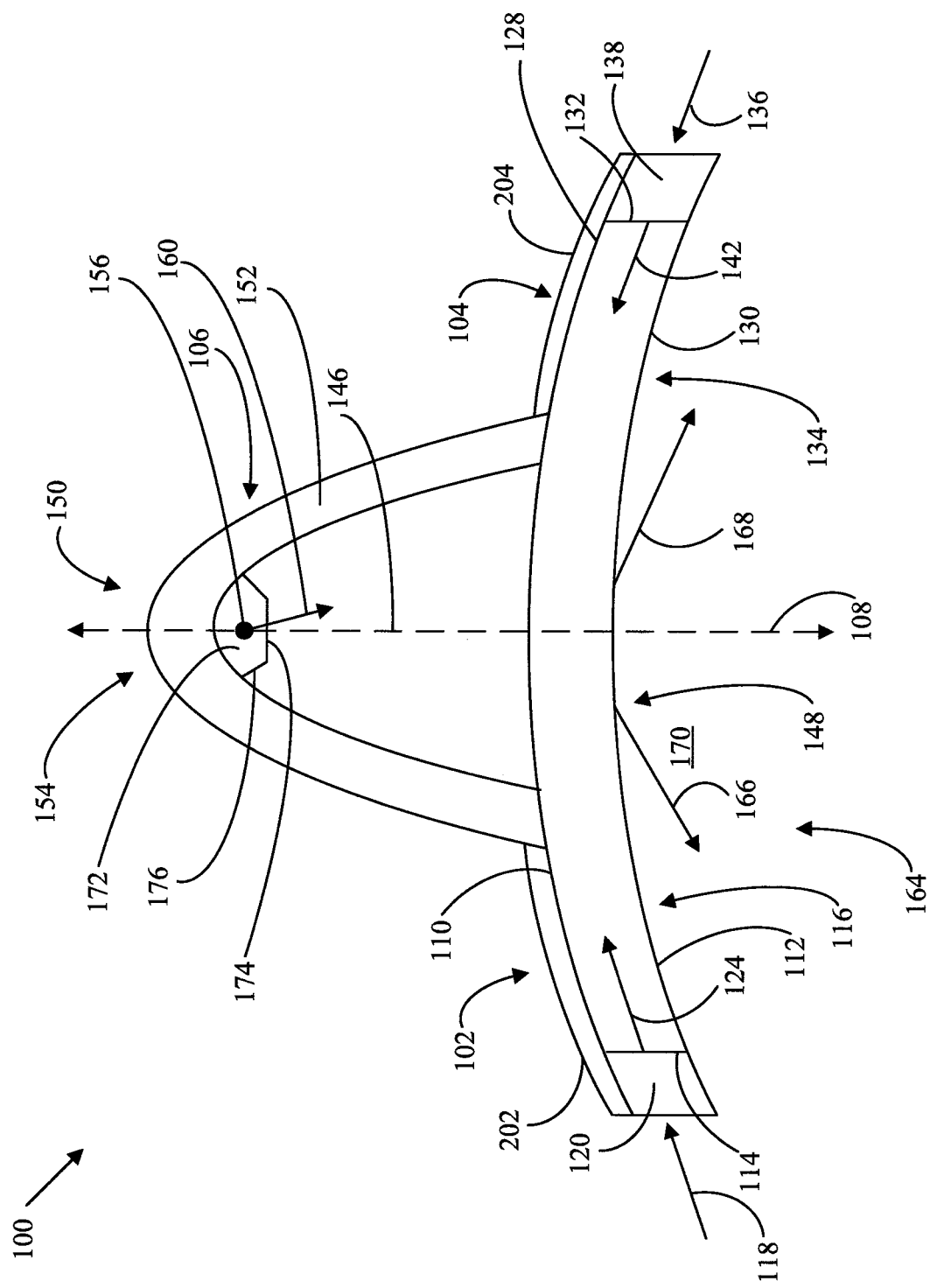
FIG. 2 is a schematic cross-sectional view taken along the line 2-2 showing the example [100] of the lighting system.
Figure 3:
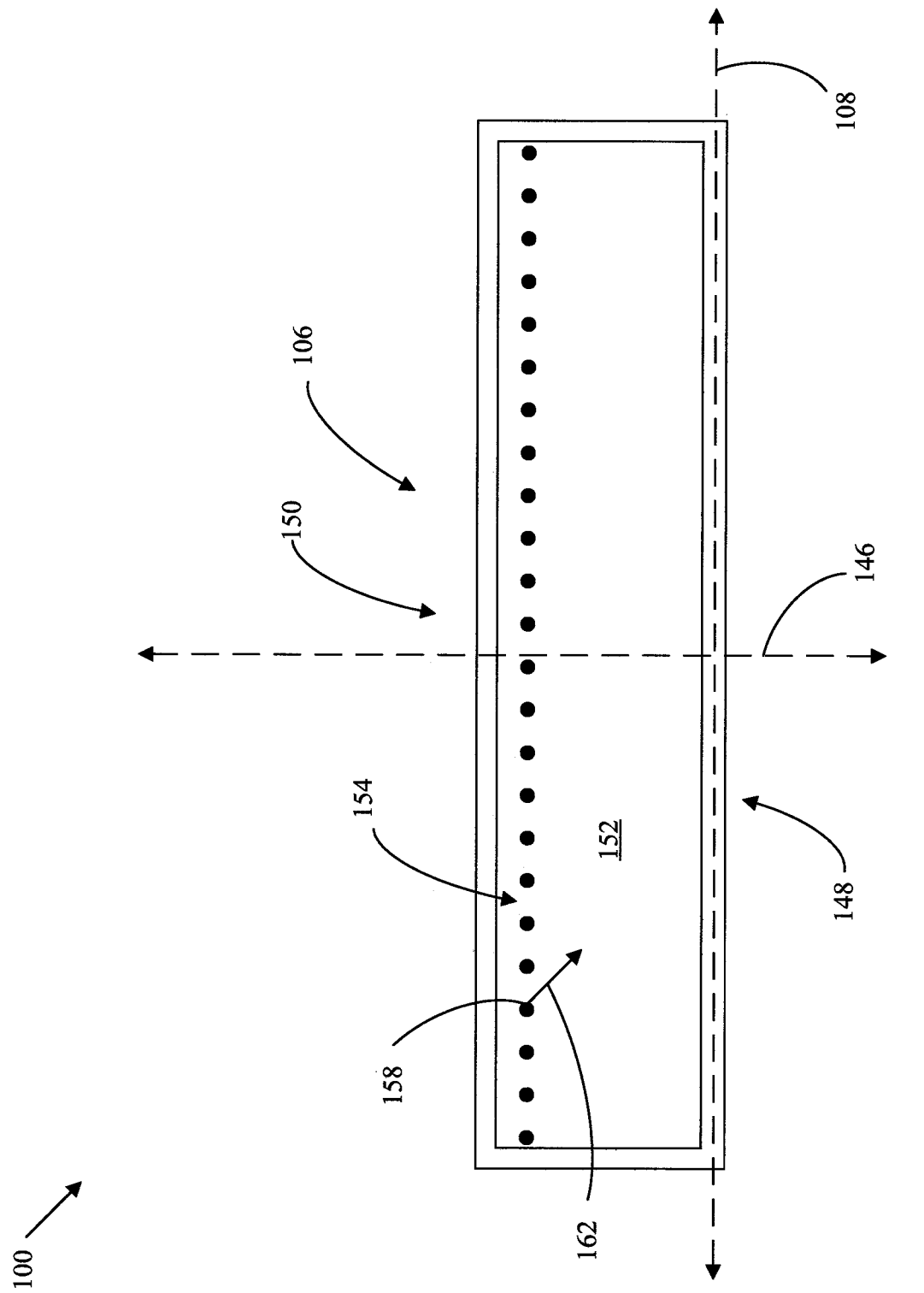
FIG. 3 is a schematic cross-sectional view taken along the line 3-3 showing the example [100] of the lighting system.
Figure 4:
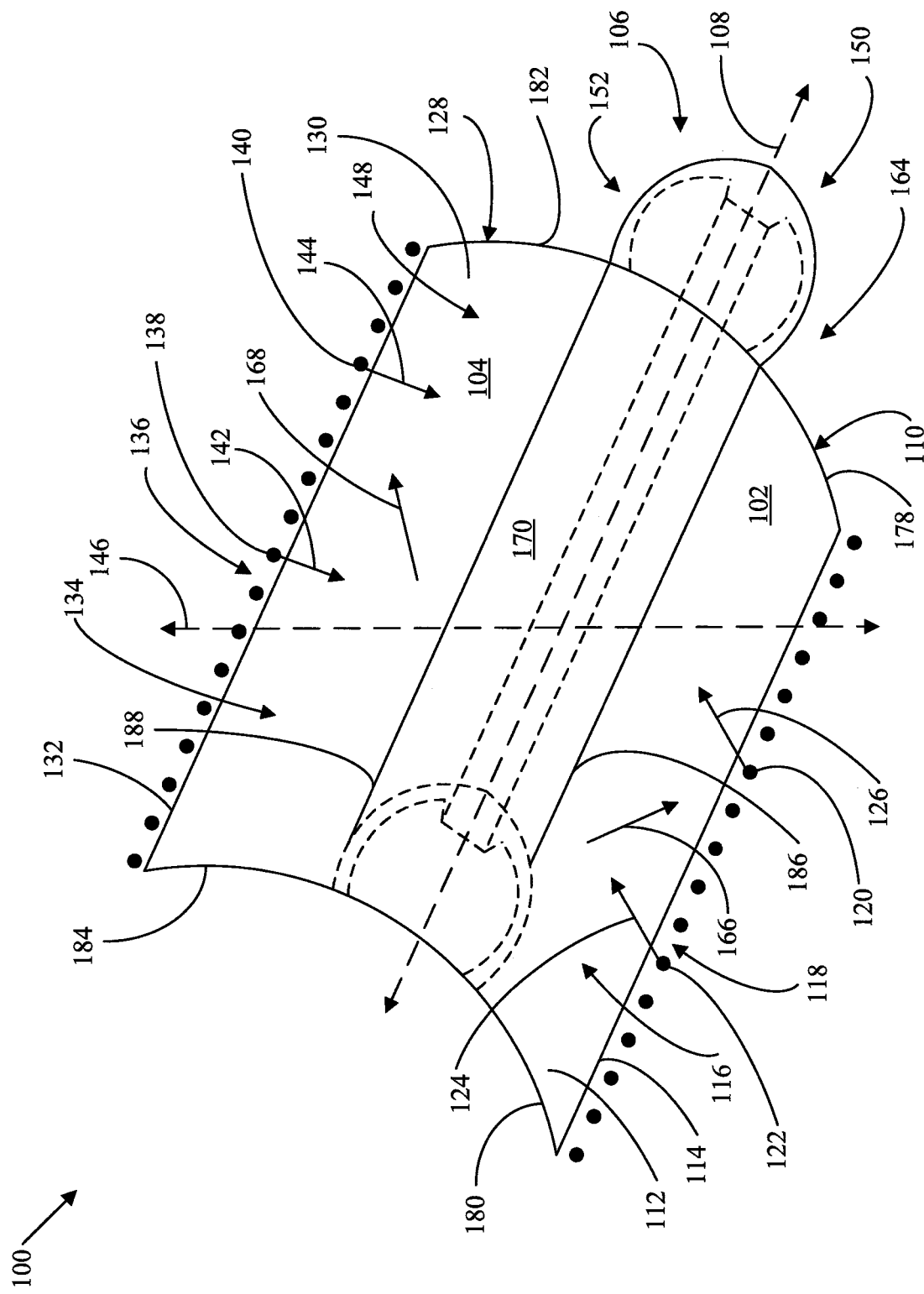
FIG. 4 is a schematic bottom perspective view taken along the line 4 showing the example [100] of an implementation of a lighting system.

FIG. 1 is a schematic top perspective view showing an example [100] of an implementation of a lighting system. FIG. 2 is a schematic cross-sectional view taken along the line 2-2 showing the example [100] of the lighting system. FIG. 3 is a schematic cross-sectional view taken along the line 3-3 showing the example [100] of the lighting system. FIG. 4 is a schematic bottom perspective view taken along the line 4 showing the example [100] of an implementation of a lighting system.

Examples [100], [500], [900], [1300], [1800], [2300], and [2800] of lighting systems are discussed herein, respectively, in connection with FIGS. 1-4; 5-8; 9-12; 13-16; 18-21; 22-26; and 27-31. Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. It is understood throughout this specification that a lighting system [100], [500], [900], [1300], [1800], [2300], [2800] may include any of the features or combinations of features that are disclosed in connection with any one or more of such lighting systems. It is further understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is additionally understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussion of the example [100] of an implementation of the lighting system.

As shown in FIGS. 1-4, the example [100] of the implementation of the lighting system includes: an edge-lit lightguide panel [102]; another edge-lit lightguide panel [104]; and a total internal reflection lens [106]. In the example [100], the edge-lit lightguide panel [102] is extended along a longitudinal axis [108] of the lighting system. The edge-lit lightguide panel [102] in the example [100] of the lighting system further has a pair of mutually-opposing panel surfaces [110], [112]. The edge-lit lightguide panel [102] in the example [100] of the lighting system also has a peripheral edge [114] being extended along and spaced transversely away from the longitudinal axis [108]. In the example [100] of the lighting system, a one [112] of the pair of panel surfaces includes a first light output interface [116].

The example [100] of the lighting system also includes a visible-light source [118] including a plurality of semiconductor light-emitting devices [120], [122]. In the example [100] of the lighting system, the visible-light source [118] is configured for generating visible-light emissions [124], [126] from the plurality of semiconductor light-emitting devices [120], [122]. Further in the example [100] of the lighting system, the visible-light source [118] is located along the peripheral edge [114] for directing the visible-light emissions [124], [126] into the edge-lit lightguide panel [102].

In the example [100] of the lighting system, the another edge-lit lightguide panel [104] is extended along the longitudinal axis [108]. Additionally in the example [100] of the lighting system, the another edge-lit lightguide panel [104] has another pair of mutually-opposing panel surfaces [128], [130]. In the example [100] of the lighting system, the another edge-lit lightguide panel [104] has another peripheral edge [132] being extended along and spaced transversely away from the longitudinal axis [108]. Further, a one

[130] of the another pair of panel surfaces in the example [100] of the lighting system includes a second light output interface [134].

The example [100] of the lighting system additionally includes another visible-light source [136] including another plurality of semiconductor light-emitting devices [138], [140]. In the example [100] of the lighting system, the another visible-light source [136] is configured for generating additional visible-light emissions [142], [144] from the another plurality of semiconductor light-emitting devices [138], [140]. Further in the example [100] of the lighting system, the another visible-light source [136] is located along the another peripheral edge [132] for directing the additional visible-light emissions [142], [144] into the another edge-lit lightguide panel [104].

In the example [100] of the lighting system, the total internal reflection lens [106] has a central light-emission axis [146] being transverse to the longitudinal axis [108]. The total internal reflection lens [106] in the example [100] of the lighting system includes a third light output interface [148] being located between the first and second light output interfaces [116], [134]. In the example [100] of the lighting system, the third light output interface [148] is spaced apart from a central light input interface [150] by a total internal reflection side surface [152]. The total internal reflection side surface [152] in the example [100] of the lighting system is extended along the central light-emission axis [146]. In the example [100] of the lighting system, the total internal reflection lens [106] has a further visible-light source [154] including a further plurality of semiconductor light-emitting devices [156], [158]. The further visible-light source [154] in the example [100] of the lighting system is configured for generating further visible-light emissions [160], [162] from the further plurality of semiconductor light-emitting devices [156], [158]. In the example [100] of the lighting system, the further visible-light source [154] is located at the central light input interface [150] for directing the further visible-light emissions [160], [162] through the total internal reflection lens [106] to the third light output interface [148].

As examples, the edge-lit lightguide panel [102] may direct the visible-light emissions [124], [126] for emission from the first light output interface [116]; and the another edge-lit lightguide panel [104] may direct the additional visible-light emissions [142], [144] for emission from the second light output interface [134]; and the total internal reflection lens [106] may direct the further visible-light emissions [160], [162] for emission from the third light output interface [148].

In the example [100] of the lighting system, the first, second and third light output interfaces [116], [134], [148] cooperatively define an emission aperture [164] for forming combined visible-light emissions [166], [168] including the visible-light emissions [124], [126], the additional visible-light emissions [142], [144], and the further visible-light emissions [160], [162]. Further in the example [100] of the lighting system, the emission aperture [164] forms a shielding zone [170] for redirecting some of the combined visible-light emissions [166], [168].

In some examples [100] of the lighting system: the total internal reflection side surface [152] may be extended along the longitudinal axis [108] in addition to being extended along the central light-emission axis [146]; and the central light input interface [150] may be extended along the longitudinal axis [108]; and the further visible-light source [154] may be extended along the longitudinal axis [108]. Further in those examples [100] of the lighting system, the total internal reflection side surface [152] may have a frusto-conical cross-sectional profile in the direction of the line 2-2 being perpendicular to the longitudinal axis [108].

In some examples [100] of the lighting system, the central light input interface [150] of the total internal reflection lens [106] may include a lens cavity [172] formed by a lens face [174] being spaced apart along the central light-emission axis [146] from the further plurality of semiconductor light-emitting devices [156], [158] by a central side wall [176]. As examples [100] of the lighting system, portions of the further visible-light emissions [160], [162] entering into the total internal reflection lens [106] through the central side wall [176] may be refracted towards a normalized direction being orthogonal to a surface of the central side wall [176] and away from the central light-emission axis [146] because the refractive index of the total internal reflection lens [106] may be greater than the refractive index of an ambient atmosphere, e.g. air, filling the lens cavity [172]. Further in those examples [100] of the lighting system, the portions of the further visible-light emissions [160], [162] so entering into the total internal reflection lens [106] through the central side wall [176] may then undergo total internal reflection at the total internal reflection side surface [152], thereby being redirected toward the third light output interface [148].

In further examples [100] of the lighting system, the central light input interface [150] of the total internal reflection lens [106] may include a lens cavity [172] having a different shape (not shown). Further in those examples [100] of the lighting system, the total internal reflection lens [106] may include a lens cavity [172] having an otherwise angled or compound central side wall (not shown). In other examples [100] of the lighting system, the total internal reflection lens [106] may be a fresnel lens (not shown). Suitable fresnel lens structures that may be utilized as being the total internal reflection lens [106] are disclosed, for example, in Parkyn et al., U.S. Pat. No. 5,577,492 issued on Nov. 26, 1996, the entirety of which hereby is incorporated herein by reference.

In some examples [100] of the lighting system, the total internal reflection lens [106] may be a converging total internal reflection lens [106] being configured for causing convergence of the further visible-light emissions [160], [162] in their travel along the central light-emission axis [146] toward the third light output interface [148]. Further in those examples [100] of the lighting system, the total internal reflection lens [106] may be a converging total internal reflection lens [106] being configured for causing convergence of the further visible-light emissions [160], [162] along the central light-emission axis [146] as having a beam angle being within a range of between about thirty degrees (30°) and about ten degrees (10°).

In further examples [100] of the lighting system, the total internal reflection lens [106] may have a spectrum of transmission values of the further visible-light emissions [160], [162] having an average value being at least about ninety percent (90%). In additional examples [100] of the lighting system, the total internal reflection lens [106] may have a spectrum of transmission values of the further visible-light emissions [160], [162] having an average value being at least about ninety-five percent (95%). As some examples [100] of the lighting system, the total internal reflection lens [106] may have a spectrum of absorption values of the further visible-light emissions [160], [162] having an average value being no greater than about ten percent (10%). As further examples [100] of the lighting system, the total internal reflection lens [106] may have a spectrum of absorption values of the further visible-light emissions [160], [162] having an average value being no greater than about five percent (5%).

As additional examples [100] of the lighting system, the total internal reflection lens [106] may have a refractive index of at least about 1.41. In further examples [100] of the lighting system, the total internal reflection lens [106] may be formed of: a silicone composition having a refractive index of about 1.42; or a polymethyl-methacrylate composition having a refractive index of about 1.49; or a polycarbonate composition having a refractive index of about 1.58; or a silicate glass composition having a refractive index of about 1.67.

In some examples [100] of the lighting system, the edge-lit lightguide panel [102] may have a first pair of lateral edges [178], [180] being mutually spaced apart along the longitudinal axis [108]; and the another edge-lit lightguide panel [104] may have a second pair of lateral edges [182], [184] being mutually spaced apart along the longitudinal axis [108]. Further in those examples [100] of the lighting system, each one of the lateral edges [178], [180], [182], [184] may be curvilinear; and the one [112] of the pair of panel surfaces may be concave; and the one [130] of the another pair of panel surfaces may be concave.

In additional examples [100] of the lighting system, the edge-lit lightguide panel [102] may be configured for directing the visible-light emissions [124], [126] in first directions towards the longitudinal axis [108]; and the another edge-lit lightguide panel [104] may be configured for directing the additional visible-light emissions [142], [144] in second directions, being symmetrically opposed to the first directions, towards the longitudinal axis [108]. In those additional examples, the edge-lit lightguide panel [102] may further direct the visible-light emissions [124], [126] for emission from the first light output interface [116]; and the another edge-lit lightguide panel [104] may further direct the additional visible-light emissions [142], [144] for emission from the second light output interface [134]; and the total internal reflection lens [106] may direct the further visible-light emissions [160], [162] for emission from the third light output interface [148].

In some examples [100] of the lighting system, the edge-lit lightguide panel [102] and the another edge-lit lightguide panel [104] may be integrally formed together with the total internal reflection lens [106]. In other examples [100] of the lighting system, the edge-lit lightguide panel [102] may have a central edge represented by a dashed line [186] being extended along the longitudinal axis [108] and being spaced transversely away from the peripheral edge [114]; and the another edge-lit lightguide panel [104] may have another central edge represented by a dashed line [188] being extended along the longitudinal axis [108] and being spaced transversely away from the another peripheral edge [132]; and the total internal reflection lens [106] may be located between and attached to the central edge [186] and the another central edge [188].

In examples [100] of the lighting system, the edge-lit lightguide panel [102] may include internal light-dispersing features; and the another edge-lit lightguide panel [104] may include additional internal light-dispersing features. Further in those examples [100] of the lighting system, the internal light-dispersing features may include positive elements such as: particles having various shapes being e.g. spheroidal or polygonal; particles having various material compositions including, e.g., phosphors, quantum dots, and pigmented dots; micro-optical features such as spherical or elliptical lenses, and reflective micro-scale particles. Additionally in those examples [100] of the lighting system, the internal light-dispersing features may include negative elements such as hot-pressed micro-patterns e.g. micro-grooves, lenticular patterns, prisms, fresnels, conical arrays, pyramids, or domes. Also in those examples [100] of the lighting system, the internal light-dispersing features may have a gradually-increasing density in a direction from the peripheral edge [114] towards the longitudinal axis [108]; and the additional internal light-dispersing features may have a gradually-increasing density in another direction from the another peripheral edge [132] towards the longitudinal axis [108].

In examples [100] of the lighting system, the edge-lit lightguide panel [102] may include external light-dispersing features on the one [112] or the another one [110] of the pair of panel surfaces; and the another edge-lit lightguide panel [104] may include additional external light-dispersing features on the one [130] or the another one [128] of the another pair of panel surfaces. Further in those examples [100] of the lighting system, the external light-dispersing features may include positive elements such as: pigmented dots; or micro-optical features such as spherical or elliptical lenses. Also in those examples [100] of the lighting system, the external light-dispersing features may include negative elements such as hot-pressed textured surfaces such as micro-patterns e.g. micro-grooves, lenticular patterns, prisms, fresnels, conical arrays, pyramids, domes, or laser-ablated regions. In addition in those examples [100] of the lighting system, the external light-dispersing features may have a gradually-increasing density in a direction from the peripheral edge [114] towards the longitudinal axis [108]; and the additional external light-dispersing features may have a gradually-increasing density in another direction from the another peripheral edge [132] towards the longitudinal axis [108].

In examples [100] of the lighting system, the another one [110] of the pair of panel surfaces may have a light-reflective layer [202]; and the another one [128] of the another pair of panel surfaces may have another light-reflective layer [204]. Further in those examples [100] of the lighting system, the another one [110] of the pair of panel surfaces may have a specular light-reflective layer [202]; and the another one [128] of the another pair of panel surfaces may have another specular light-reflective layer [204]. Additionally in those examples [100] of the lighting system, the another one [110] of the pair of panel surfaces may have a metallic light-reflective layer [202]; and the another one [128] of the another pair of panel surfaces may have another metallic light-reflective layer [204]. In some of those examples [100] of the lighting system, the metallic light-reflective layers [202], [204] may have a composition that includes: silver, platinum, palladium, aluminum, zinc, gold, iron, copper, tin, antimony, titanium, chromium, nickel, or molybdenum. In additional examples [100] of the lighting system, the another one [110] of the pair of panel surfaces may have a light-reflective layer [202]; and the another one [128] of the another pair of panel surfaces may have another light-reflective layer [204]; and each of the light-reflective layers [202], [204] may have a minimum visible-light reflection value from any incident angle being at least about ninety percent (90%) or being at least about ninety-five percent (95%).

In examples [100] of the lighting system, the plurality of the semiconductor light-emitting devices [120], [122] may include an array of the semiconductor light-emitting devices [120], [122] being mutually spaced apart along the longitudinal axis [108]; and the another plurality of the semiconductor light-emitting devices [138], [140] may include another array of the semiconductor light-emitting devices [138], [140] being mutually spaced apart along the longitudinal axis [108]. Additionally in those examples [100] of the lighting system, the further plurality of the semiconductor light-emitting devices [156], [158] may include a further array of the semiconductor light-emitting devices [156], [158] being mutually spaced apart along the longitudinal axis [108].

In examples [100] of the lighting system, the plurality of the semiconductor light-emitting devices [120], [122] may be collectively configured for generating the visible-light emissions [124], [126] as having a selectable perceived color point; and the another plurality of the semiconductor light-emitting devices [138], [140] may be collectively configured for generating the additional visible-light emissions [142], [144] as having another selectable perceived color point. Additionally in those examples [100] of the lighting system, the further plurality of the semiconductor light-emitting devices [156], [158] may be collectively configured for generating the further visible-light emissions [160], [162] as having a further selectable perceived color point.

In some examples [100] of the lighting system, the plurality of the semiconductor light-emitting devices [120], [122] may include a plurality of clusters of the semiconductor light-emitting devices [120], [122] being co-located together, each one of the plurality of clusters being collectively configured for generating the visible-light emissions [124], [126] as having a selectable perceived color point; and the another plurality of the semiconductor light-emitting devices [138], [140] may include another plurality of clusters of the semiconductor light-emitting devices [138], [140] being co-located together, each one of the another plurality of clusters being collectively configured for generating the additional visible-light emissions [142], [144] as having another selectable perceived color point. Also in that example [100] of the lighting system, the further plurality of the semiconductor light-emitting devices [156], [158] may include a further plurality of clusters of the semiconductor light-emitting devices [156], [158] being co-located together, each one of the further plurality of clusters being collectively configured for generating the further visible-light emissions [160], [162] as having a further selectable perceived color point. As an example [100] of the lighting system, each of the pluralities of clusters of the semiconductor light-emitting devices [120], [122], [138], [140], [156], [158] may include two or three or more co-located semiconductor light-emitting devices being configured for collectively generating the visible-light emissions [124], [126] and the additional visible-light emissions [142], [144] and the further visible-light emissions [160], [162] as having the respective selectable perceived color points.

In examples [100] of the lighting system, a plurality of semiconductor light-emitting devices [120], [122], or a plurality of semiconductor light-emitting devices [138], [140], or a plurality of semiconductor light-emitting devices [156], [158] may be arranged in a chip-on-board (not shown) array, or in a discrete (not shown) array on a printed circuit board (not shown). Semiconductor light-emitting device arrays including chip-on-board arrays and discrete arrays may be conventionally fabricated by persons of ordinary skill in the art. Further, the semiconductor light-emitting devices [120], [122], [138], [140], [156], [158] of the example [100] of the lighting system may be provided with drivers (not shown) and power supplies (not shown) being conventionally fabricated and configured by persons of ordinary skill in the art.

In examples [100], the lighting system may be configured for causing emission of a portion of the further visible-light emissions [160], [162] as being within a field angle of the total internal reflection lens [106] and for causing emission of another portion of the further visible-light emissions [160], [162] as being outside the field angle of the total internal reflection lens [106]; and the emission aperture [164] may be configured for redirecting some of the another portion of the further visible-light emissions [160], [162]. Further in those examples [100] of the lighting system, the total internal reflection lens [106] may, as examples, have a beam angle being within a range of between about thirty degrees (30°) and about ten degrees (10°). Additionally in those examples [100] of the lighting system, the total internal reflection lens [106] may, as examples have a field angle being within a range of between about sixty degrees (60°) and about twenty degrees (20°).

In examples [100] of the lighting system, the emission aperture [164] may be positioned for redirecting a part of the another portion of the further visible-light emissions [160], [162] being emitted at the third light output interface [148] in directions deviating from the central light-emission axis [146] by greater than about seventy degrees (70°). In further examples [100] of the lighting system, the emission aperture [164] may be positioned for redirecting a part of the another portion of the further visible-light emissions [160], [162] being emitted at the third light output interface [148] in directions deviating from the central light-emission axis [146] by greater than about sixty degrees (60°).

As an example [100] of the lighting system, the lateral edges [178], [180], [182], [184] of the edge-lit lightguide panels [102], [104] may be curvilinear; and the one [112] of the pair of panel surfaces may be concave; and the one [130] of the another pair of panel surfaces may be concave. Further in that example [100] of the lighting system, as can be seen in FIG. 2, the concave panel surfaces [112], [130] of the emission aperture [164] may be positioned for mechanically shielding and thus redirecting some of the further visible-light emissions [160], [162] being emitted at the third light output interface [148] in directions deviating from the central light-emission axis [146] by greater than about sixty degrees (60°). Additionally in that example [100] of the lighting system, redirection of some of the further visible-light emissions [160], [162] being emitted at the third light output interface [148] in high-angle directions being greater than about sixty degrees (60°) or seventy degrees (70°) may substantially reduce objectionable glare.

In examples [100] of the lighting system, the total internal reflection lens [106] may have a beam angle being within a range of between about thirty degrees (30°) and about twenty degrees (20°). Further in those examples [100] of the lighting system, the total internal reflection lens [106] may have a field angle being within a range of between about sixty degrees (60°) and about forty degrees (40°). Additionally in those examples [100], the lighting system may be configured for causing emission of a portion of the further visible-light emissions [160], [162] as being within the field angle of the total internal reflection lens [106] and for causing emission of another portion of the further visible-light emissions [160], [162] as being outside the field angle of the total internal reflection lens [106]; and the emission aperture [164] may be configured for redirecting some of the another portion of the further visible-light emissions [160], [162]. Further in those examples [100], the emission aperture [164] may be positioned for redirecting a part of the another portion of the further visible-light emissions [160], [162] being emitted at the third light output interface [148]

in directions deviating from the central light-emission axis [146] by greater than about sixty degrees (60°), or deviating from the central light-emission axis by greater than about seventy degrees (70°).

In other examples [100] of the lighting system, the total internal reflection lens [106] may have a beam angle being within a range of between about twenty degrees (20°) and about ten degrees (10°); or within a range of between about fifteen degrees (15°) and about ten degrees (10°). Further in those examples [100] of the lighting system, the total internal reflection lens [106] may have a field angle being respectively within a range of between about forty degrees (40°) and about twenty degrees (20°), or within a range of between about thirty degrees (30°) and about twenty degrees (20°). Further in those examples [100] of the lighting system, the third light output interface [148] may include internal or external light-dispersing features; and the third light output interface [148] may cause the total internal reflection lens [106] to have an effective field angle being within a range of between about sixty degrees (60°) and about forty degrees (40°). Additionally in those examples [100], the lighting system may be configured for causing emission of a portion of the further visible-light emissions [160], [162] as being within the effective field angle of the total internal reflection lens [106] and for causing emission of another portion of the further visible-light emissions [160], [162] as being outside the effective field angle of the total internal reflection lens [106]; and the emission aperture [164] may be configured for redirecting some of the another portion of the further visible-light emissions [160], [162]. Further in those examples [100], the emission aperture [164] may be positioned for redirecting a part of the another portion of the further visible-light emissions [160], [162] being emitted at the third light output interface [148] in directions deviating from the central light-emission axis [146] by greater than about sixty degrees (60°), or deviating from the central light-emission axis by greater than about seventy degrees (70°).

In examples [100], the lighting system may include a controller (not shown) for the visible-light source [118] and for the another visible-light source [136] and for the further visible-light source [154], the controller being configured for causing the visible-light emissions [124], [126] to have a selectable perceived color point and for causing the additional visible-light emissions [142], [144] to have another selectable perceived color point and for causing the further visible-light emissions [160], [154] to have a further selectable perceived color point. Further in those examples [100] of the lighting system, the controller may be configured for causing the visible-light emissions [124], [126] to have a selectable and adjustable intensity and for causing the additional visible-light emissions [142], [144] to have another selectable and adjustable intensity and for causing the further visible-light emissions [160], [162] to have a further selectable and adjustable intensity. Additionally in those examples [100] of the lighting system, the controller may be configured for causing the combined visible-light emissions [166], [168] to generate a down-lighting pattern being: wall graze, table with wall fill, wall wash left, wall wash right, double wall wash, wall wash left plus floor, wall wash right plus floor, room, or batwing. Also in those examples [100] of the lighting system, the controller may be configured for selection among a plurality of different pre-programmed combinations of the intensities for the visible-light emissions [124], [126], the additional visible-light emissions [142], [144], and the further visible-light emissions [160], [162]. Further in those examples [100] of the lighting system, the controller may be configured for adjusting, over a selectable time period, the intensities for the visible-light emissions [124], [126], the additional visible-light emissions [142], [144], and the further visible-light emissions [160], [162] from a one of the plurality of pre-programmed combinations to another one of the plurality of pre-programmed combinations. Additionally in those examples [100], the lighting system may further include an ambient light sensor (not shown); and the controller may be configured, in response to the ambient light sensor, for adjusting the intensities for the visible-light emissions [124], [126], the additional visible-light emissions [142], [144], and the further visible-light emissions [160], [162].

In other examples [100], the lighting system may include a controller (not shown) for the visible-light source [118] being configured for causing the visible-light emissions [124], [126] to have a selectable perceived color point; and may include another controller (not shown) for the another visible-light source [136] being configured for causing the additional visible-light emissions [142], [144] to have another selectable perceived color point; and may include a further controller (not shown) for the further visible-light source [154] being configured for causing the further visible-light emissions [160], [162] to have a further selectable perceived color point. Further in those examples [100] of the lighting system, the controller may be configured for causing the visible-light emissions [124], [126] to have a selectable and adjustable intensity; and the another controller may be configured for causing the additional visible-light emissions [142], [144] to have another selectable and adjustable intensity; and the further controller may be configured for causing the further visible-light emissions [160], [162] to have a further selectable and adjustable intensity. In those examples [100] of the lighting system, the controller and the another controller and the further controller may be collectively configured for causing the combined visible-light emissions [166], [168] to generate a down-lighting pattern being: wall graze, table with wall fill, wall wash left, wall wash right, double wall wash, wall wash left plus floor, wall wash right plus floor, room, or batwing. Additionally in those examples [100] of the lighting system, the controller and the another controller and the further controller may be collectively configured for selection among a plurality of different pre-programmed combinations of the intensities for the visible-light emissions [124], [126], the additional visible-light emissions [142], [144], and the further visible-light emissions [160], [162]. Further in those examples [100] of the lighting system, the controller and the another controller and the further controller may be collectively configured for adjusting, over a selectable time period, the intensities for the visible-light emissions [124], [126], the additional visible-light emissions [142], [144], and the further visible-light emissions [160], [162] from a one of the plurality of pre-programmed combinations to another one of the plurality of pre-programmed combinations. In those examples [100], the lighting system may also include an ambient light sensor; and the controller and the another controller and the further controller may be collectively configured, in response to the ambient light sensor, for adjusting the intensities for the visible-light emissions [124], [126], the additional visible-light emissions [142], [144], and the further visible-light emissions [160], [162].

Figure 5:
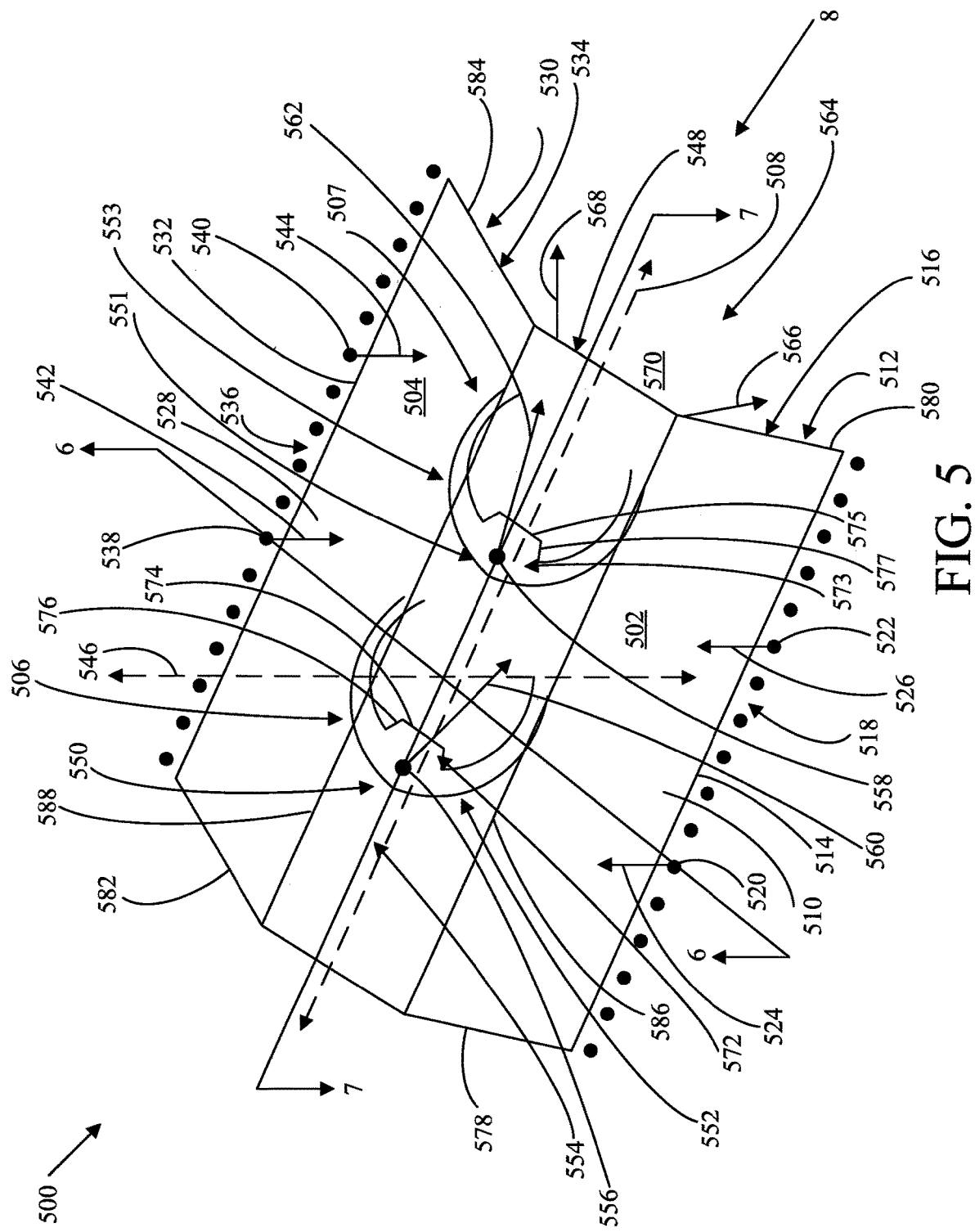
FIG. 5 is a schematic top perspective view showing an example [500] of an implementation of a lighting system.
Figure 6:
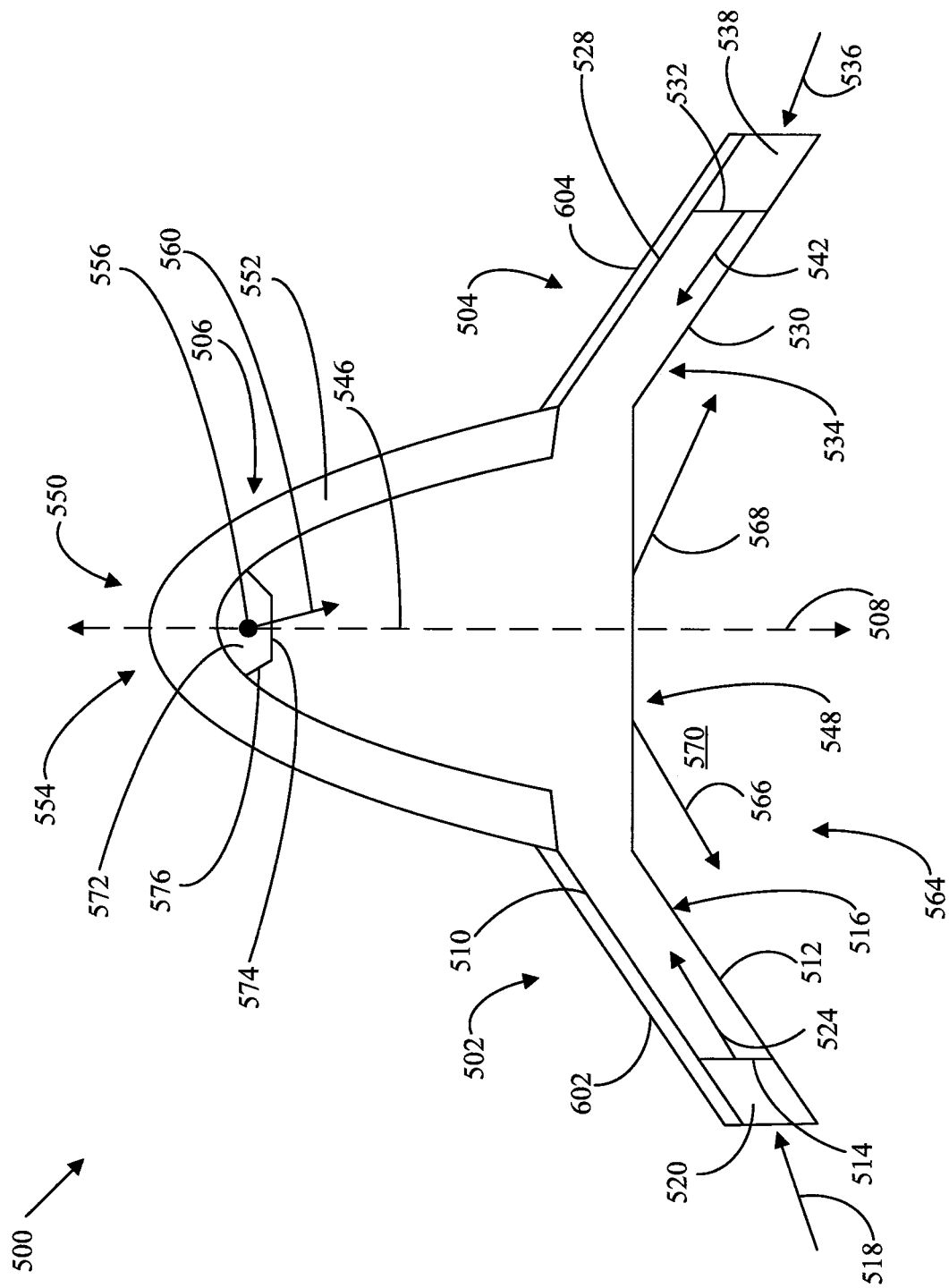
FIG. 6 is a schematic cross-sectional view taken along the line 6-6 showing the example [500] of the lighting system.
Figure 7:
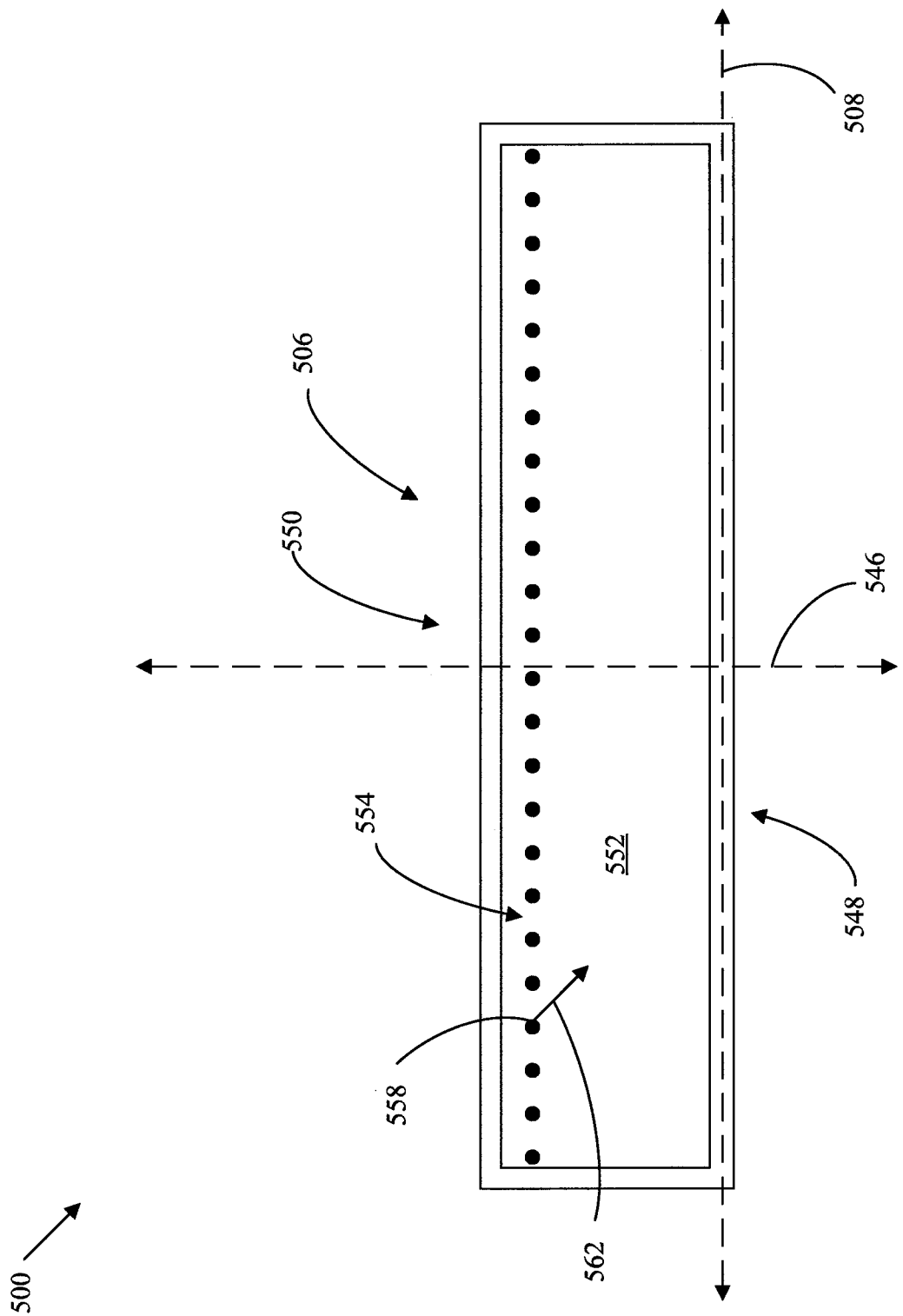
FIG. 7 is a schematic cross-sectional view taken along the line 7-7 showing the example [500] of the lighting system.
Figure 8:
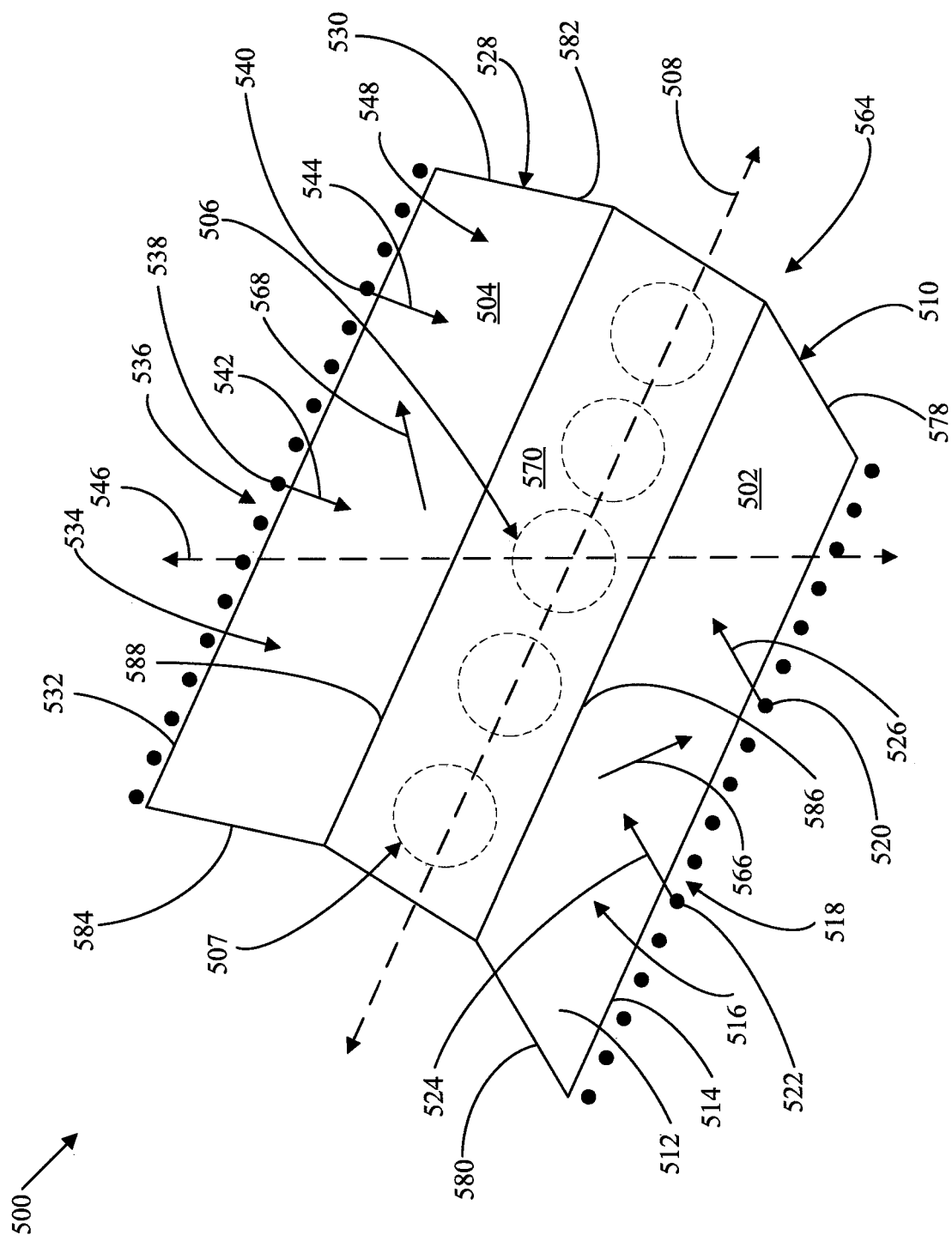
FIG. 8 is a schematic bottom perspective view taken along the line 8 showing the example [500] of an implementation of a lighting system.

FIG. 5 is a schematic top perspective view showing an example [500] of an implementation of a lighting system. FIG. 6 is a schematic cross-sectional view taken along the line 6-6 showing the example [500] of the lighting system. FIG. 7 is a schematic cross-sectional view taken along the line 7-7 showing the example [500] of the lighting system. FIG. 8 is a schematic bottom perspective view taken along the line 8 showing the example [500] of an implementation of a lighting system.

Examples [100], [500], [900], [1300], [1800], [2300], and [2800] of lighting systems are discussed herein, respectively, in connection with FIGS. 1-4; 5-8; 9-12; 13-16; 18-21; 22-26; and 27-31. Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. It is understood throughout this specification that a lighting system [100], [500], [900], [1300], [1800], [2300], [2800] may include any of the features or combinations of features that are disclosed in connection with any one or more of such lighting systems. It is further understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is additionally understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussion of the example [500] of an implementation of the lighting system.

As shown in FIGS. 5-8, the example [500] of the implementation of the lighting system includes: an edge-lit lightguide panel [502]; another edge-lit lightguide panel [504]; a total internal reflection lens [506]; and an additional total internal reflection lens [507]. In the example [500], the edge-lit lightguide panel [502] is extended along a longitudinal axis [508] of the lighting system. The edge-lit lightguide panel [502] in the example [500] of the lighting system further has a pair of mutually-opposing panel surfaces [510], [512]. The edge-lit lightguide panel [502] in the example [500] of the lighting system also has a peripheral edge [514] being extended along and spaced transversely away from the longitudinal axis [508]. In the example [500] of the lighting system, a one [512] of the pair of panel surfaces includes a first light output interface [516].

The example [500] of the lighting system also includes a visible-light source [518] including a plurality of semiconductor light-emitting devices [520], [522]. In the example [500] of the lighting system, the visible-light source [518] is configured for generating visible-light emissions [524], [526] from the plurality of semiconductor light-emitting devices [520], [522]. Further in the example [500] of the lighting system, the visible-light source [518] is located along the peripheral edge [514] for directing the visible-light emissions [524], [526] into the edge-lit lightguide panel [502].

In the example [500] of the lighting system, the another edge-lit lightguide panel [504] is extended along the longitudinal axis [508]. Additionally in the example [500] of the lighting system, the another edge-lit lightguide panel [504] has another pair of mutually-opposing panel surfaces [528], [530]. In the example [500] of the lighting system, the another edge-lit lightguide panel [504] has another peripheral edge [532] being extended along and spaced transversely away from the longitudinal axis [508]. Further, a one [530] of the another pair of panel surfaces in the example [500] of the lighting system includes a second light output interface [534].

The example [500] of the lighting system additionally includes another visible-light source [536] including another plurality of semiconductor light-emitting devices [538], [540]. In the example [500] of the lighting system, the another visible-light source [536] is configured for generating additional visible-light emissions [542], [544] from the another plurality of semiconductor light-emitting devices [538], [540]. Further in the example [500] of the lighting system, the another visible-light source [536] is located along the another peripheral edge [532] for directing the additional visible-light emissions [542], [544] into the another edge-lit lightguide panel [504].

In the example [500] of the lighting system, the total internal reflection lens [506] has a central light-emission axis [546] being transverse to the longitudinal axis [508]. The total internal reflection lens [506] in the example [500] of the lighting system includes a third light output interface [548] being located between the first and second light output interfaces [516], [534]. In the example [500] of the lighting system, the third light output interface [548] is spaced apart from a central light input interface [550] by a total internal reflection side surface [552]. The total internal reflection side surface [552] in the example [500] of the lighting system is extended along the central light-emission axis [546]. In the example [500] of the lighting system, the total internal reflection lens [506] has a further visible-light source [554] including a further plurality of semiconductor light-emitting devices [556], [558]. The further visible-light source [554] in the example [500] of the lighting system is configured for generating further visible-light emissions [560], [562] from the further plurality of semiconductor light-emitting devices [556], [558]. In the example [500] of the lighting system, the further visible-light source [554] is located at the central light input interface [550] for directing the further visible-light emissions [560], [562] through the total internal reflection lens [506] to the third light output interface [548].

In the example [500] of the lighting system, the additional total internal reflection lens [507] has an additional central light-emission axis [547] being transverse to the longitudinal axis [508]. The additional total internal reflection lens [507] in the example [500] of the lighting system includes a fourth light output interface [549] being spaced apart along the longitudinal axis [508] away from the third light output interface [548] and being located between the first and second light output interfaces [516], [534]. In the example [500] of the lighting system, the fourth light output interface [549] is spaced apart from an additional central light input interface [551] by an additional total internal reflection side surface [553]. The additional total internal reflection side surface [553] in the example [500] of the lighting system is extended along the additional central light-emission axis [547]. In the example [500] of the lighting system, the additional total internal reflection lens [507] has an additional visible-light source [555] including an additional plurality of semiconductor light-emitting devices [557], [559]. The additional visible-light source [555] in the example [500] of the lighting system is configured for generating other visible-light emissions [561], [563] from the additional plurality of semiconductor light-emitting devices [557], [559]. In the example [500] of the lighting system, the additional visible-light source [555] is located at the additional central light input interface [551] for directing the other visible-light emissions [561], [563] through the additional total internal reflection lens [507] to the fourth light output interface [549].

As examples, the edge-lit lightguide panel [502] may direct the visible-light emissions [524], [526] for emission from the first light output interface [516]; and the another edge-lit lightguide panel [504] may direct the additional visible-light emissions [542], [544] for emission from the second light output interface [534]; and the total internal reflection lens [506] may direct the further visible-light emissions [560], [562] for emission from the third light output interface [548]; and the another total internal reflection lens [507] may direct the other visible-light emissions [561], [563] for emission from the fourth light output interface [549].

In the example [500] of the lighting system, the first, second, third and fourth light output interfaces [516], [534], [548], [549] cooperatively define an emission aperture [564] for forming combined visible-light emissions [566], [568] including the visible-light emissions [524], [526], the additional visible-light emissions [542], [544], the further visible-light emissions [560], [562], and the other visible-light emissions [561], [563]. Further in the example [500] of the lighting system, the emission aperture [564] forms a shielding zone [570] for redirecting some of the combined visible-light emissions [566], [568].

In examples [500] of the lighting system, the total internal reflection side surface [552] and the additional total internal reflection side surface [553] each may have a frusto-conical cross-sectional profile in both of the directions of the lines 6-6 and 7-7 being perpendicular to the longitudinal axis [508]. In further examples [500] of the lighting system, the additional total internal reflection lens [507] may have any combination of the further structural and performance features discussed herein with regard to the total internal reflection lens [506]. As additional examples [500], the lighting system may include (not shown) further total internal reflection lenses in addition to the total internal reflection lenses [506], [507]. In examples [500] of the lighting system, such further total internal reflection lenses may have any combination of the further structural and performance features discussed herein with regard to the total internal reflection lenses [506] and [507], and may be mutually spaced apart in the same manner by which the total internal reflection lenses [506], [507] are spaced apart along the longitudinal axis [508].

In some examples [500] of the lighting system, the central light input interface [550] of the total internal reflection lens [506] (and likewise the additional total internal lens [507]) may include a lens cavity [572] formed by a lens face [574] being spaced apart along the central light-emission axis [546] from the further plurality of semiconductor light-emitting devices [556], [558] by a central side wall [576]. As examples [500] of the lighting system, portions of the further visible-light emissions [560], [562] entering into the total internal reflection lens [506] through the central side wall [576] may be refracted towards a normalized direction being orthogonal to a surface of the central side wall [576] and away from the central light-emission axis [546] because the refractive index of the total internal reflection lens [506] may be greater than the refractive index of an ambient atmosphere, e.g. air, filling the lens cavity [572]. Further in those examples [500] of the lighting system, the portions of the further visible-light emissions [560], [562] so entering into the total internal reflection lens [506] through the central side wall [576] may then undergo total internal reflection at the total internal reflection side surface [552], thereby being redirected toward the third light output interface [548].

In further examples [500] of the lighting system, the central light input interface [550] of the total internal reflection lens [506] (and likewise the additional total internal lens [507]) may include a lens cavity [572] having a different shape (not shown). Further in those examples [500] of the lighting system, the total internal reflection lens [506] may include a lens cavity [572] having an otherwise angled or compound central side wall (not shown). In other examples [500] of the lighting system, the total internal reflection lens [506] may be a fresnel lens (not shown). Suitable fresnel lens structures that may be utilized as being the total internal reflection lens [506] are disclosed, for example, in Parkyn et al., U.S. Pat. No. 5,577,492 issued on Nov. 26, 1996, the entirety of which hereby is incorporated herein by reference.

In some examples [500] of the lighting system, the total internal reflection lens [506] (and likewise the additional total internal lens [507]) may be a converging total internal reflection lens [506] being configured for causing convergence of the further visible-light emissions [560], [562] in their travel along the central light-emission axis [546] toward the third light output interface [548]. Further in those examples [500] of the lighting system, the total internal reflection lens [506] may be a converging total internal reflection lens [506] being configured for causing convergence of the further visible-light emissions [560], [562] along the central light-emission axis [546] as having a beam angle being within a range of between about thirty degrees (30°) and about ten degrees (10°).

In further examples [500] of the lighting system, the total internal reflection lens [506] (and likewise the additional total internal lens [507]) may have a spectrum of transmission values of the further visible-light emissions [560], [562] having an average value being at least about ninety percent (90%). In additional examples [500] of the lighting system, the total internal reflection lens [506] may have a spectrum of transmission values of the further visible-light emissions [560], [562] having an average value being at least about ninety-five percent (95%). As some examples [500] of the lighting system, the total internal reflection lens [506] may have a spectrum of absorption values of the further visible-light emissions [560], [562] having an average value being no greater than about ten percent (10%). As further examples [500] of the lighting system, the total internal reflection lens [506] may have a spectrum of absorption values of the further visible-light emissions [560], [562] having an average value being no greater than about five percent (5%).

As additional examples [500] of the lighting system, the total internal reflection lens [506] (and likewise the additional total internal lens [507]) may have a refractive index of at least about 1.41. In further examples [500] of the lighting system, the total internal reflection lens [506] may be formed of: a silicone composition having a refractive index of about 1.42; or a polymethyl-methacrylate composition having a refractive index of about 1.49; or a polycarbonate composition having a refractive index of about 1.58; or a silicate glass composition having a refractive index of about 1.67.

In some examples [500] of the lighting system, the edge-lit lightguide panel [502] may have a first pair of lateral edges [578], [580] being mutually spaced apart along the longitudinal axis [508]; and the another edge-lit lightguide panel [504] may have a second pair of lateral edges [582], [584] being mutually spaced apart along the longitudinal axis [508]. Further in those examples [500] of the lighting system, each one of the lateral edges [578], [580], [582], [584] may be linear; and the one [512] of the pair of panel surfaces may be generally flat; and the one [530] of the another pair of panel surfaces may be generally flat.

In additional examples [500] of the lighting system, the edge-lit lightguide panel [502] may be configured for directing the visible-light emissions [524], [526] in first directions towards the longitudinal axis [508]; and the another edge-lit lightguide panel [504] may be configured for directing the additional visible-light emissions [542], [544] in second directions, being symmetrically opposed to the first directions, towards the longitudinal axis [508]. In those additional examples, the edge-lit lightguide panel [502] may further direct the visible-light emissions [524], [526] for emission from the first light output interface [516]; and the another edge-lit lightguide panel [504] may further direct the additional visible-light emissions [542], [544] for emission from the second light output interface [534]; and the total internal reflection lens [506] may direct the further visible-light emissions [560], [562] for emission from the third light output interface [548]; and the additional total internal reflection lens [507] may direct the other visible-light emissions [561], [563] for emission from the fourth light output interface [549].

In some examples [500] of the lighting system, the edge-lit lightguide panel [502] and the another edge-lit lightguide panel [504] may be integrally formed together with the total internal reflection lenses [506], [507]. In other examples [500] of the lighting system, the edge-lit lightguide panel [502] may have a central edge represented by a dashed line [586] being extended along the longitudinal axis [508] and being spaced transversely away from the peripheral edge [514]; and the another edge-lit lightguide panel [504] may have another central edge represented by a dashed line [588] being extended along the longitudinal axis [508] and being spaced transversely away from the another peripheral edge [532]; and the total internal reflection lenses [506], [507] may be located between and attached to the central edge [586] and the another central edge [588].

In examples [500] of the lighting system, the edge-lit lightguide panel [502] may include internal light-dispersing features; and the another edge-lit lightguide panel [504] may include additional internal light-dispersing features. Further in those examples [500] of the lighting system, the internal light-dispersing features may include positive elements such as: particles having various shapes being e.g. spheroidal or polygonal; particles having various material compositions including, e.g., phosphors, quantum dots, and pigmented dots; micro-optical features such as spherical or elliptical lenses, and reflective micro-scale particles. Additionally in those examples [500] of the lighting system, the internal light-dispersing features may include negative elements such as: hot-pressed micro-patterns e.g. micro-grooves, lenticular patterns, prisms, fresnels, conical arrays, pyramids, or domes. Also in those examples [500] of the lighting system, the internal light-dispersing features may have a gradually-increasing density in a direction from the peripheral edge [514] towards the longitudinal axis [508]; and the additional internal light-dispersing features may have a gradually-increasing density in another direction from the another peripheral edge [532] towards the longitudinal axis [508].

In examples [500] of the lighting system, the edge-lit lightguide panel [502] may include external light-dispersing features on the one [512] or the another one [510] of the pair of panel surfaces; and the another edge-lit lightguide panel [504] may include additional external light-dispersing features on the one [530] or the another one [528] of the another pair of panel surfaces. Further in those examples [500] of the lighting system, the external light-dispersing features may include positive elements such as: pigmented dots; or micro-optical features such as spherical or elliptical lenses. Also in those examples [500] of the lighting system, the external light-dispersing features may include negative elements such as hot-pressed textured surfaces such as micro-patterns e.g. micro-grooves, lenticular patterns, prisms, fresnels, conical arrays, pyramids, domes, or laser-ablated regions. In addition in those examples [500] of the lighting system, the external light-dispersing features may have a gradually-increasing density in a direction from the peripheral edge [514] towards the longitudinal axis [508]; and the additional external light-dispersing features may have a gradually-increasing density in another direction from the another peripheral edge [532] towards the longitudinal axis [508].

In examples [500] of the lighting system, the another one [510] of the pair of panel surfaces may have a light-reflective layer [602]; and the another one [528] of the another pair of panel surfaces may have another light-reflective layer [604]. Further in those examples [500] of the lighting system, the another one [510] of the pair of panel surfaces may have a specular light-reflective layer [602]; and the another one [528] of the another pair of panel surfaces may have another specular light-reflective layer [604]. Additionally in those examples [500] of the lighting system, the another one [510] of the pair of panel surfaces may have a metallic light-reflective layer [602]; and the another one [528] of the another pair of panel surfaces may have another metallic light-reflective layer [604]. In some of those examples [500] of the lighting system, the metallic light-reflective layers [602], [604] may have a composition that includes: silver, platinum, palladium, aluminum, zinc, gold, iron, copper, tin, antimony, titanium, chromium, nickel, or molybdenum. In additional examples [500] of the lighting system, the another one [510] of the pair of panel surfaces may have a light-reflective layer [602]; and the another one [528] of the another pair of panel surfaces may have another light-reflective layer [604]; and each of the light-reflective layers [602], [604] may have a minimum visible-light reflection value from any incident angle being at least about ninety percent (90%) or being at least about ninety-five percent (95%).

In examples [500] of the lighting system, the plurality of the semiconductor light-emitting devices [520], [522] may include an array of the semiconductor light-emitting devices [520], [522] being mutually spaced apart along the longitudinal axis [508]; and the another plurality of the semiconductor light-emitting devices [538], [540] may include another array of the semiconductor light-emitting devices [538], [540] being mutually spaced apart along the longitudinal axis [508]. Additionally in those examples [500] of the lighting system, the further plurality of the semiconductor light-emitting devices [556], [558] may include a further array of the semiconductor light-emitting devices [556], [558] being mutually spaced apart along the longitudinal axis [508].

In examples [500] of the lighting system, the plurality of the semiconductor light-emitting devices [520], [522] may be collectively configured for generating the visible-light emissions [524], [526] as having a selectable perceived color point; and the another plurality of the semiconductor light-emitting devices [538], [540] may be collectively configured for generating the additional visible-light emissions [542], [544] as having another selectable perceived color point. Additionally in those examples [500] of the lighting system, the further plurality of the semiconductor light-emitting devices [556], [558] may be collectively configured for generating the further visible-light emissions [560], [562] and the other visible-light emissions [561], [563] as respectively having a further selectable perceived color point and another selectable perceived color point.

In some examples [500] of the lighting system, the plurality of the semiconductor light-emitting devices [520], [522] may include a plurality of clusters of the semiconductor light-emitting devices [520], [522] being co-located together, each one of the plurality of clusters being collectively configured for generating the visible-light emissions [524], [526] as having a selectable perceived color point; and the another plurality of the semiconductor light-emitting devices [538], [540] may include another plurality of clusters of the semiconductor light-emitting devices [538], [540] being co-located together, each one of the another plurality of clusters being collectively configured for generating the additional visible-light emissions [542], [544] as having another selectable perceived color point. Also in that example [500] of the lighting system, the further plurality of the semiconductor light-emitting devices [556], [558] may include a further plurality of clusters of the semiconductor light-emitting devices [556], [558] being co-located together, each one of the further plurality of clusters being collectively configured for generating the further visible-light emissions [560], [562] as having a further selectable perceived color point. Further in that example [500] of the lighting system, the additional plurality of the semiconductor light-emitting devices [557], [559] may include an additional plurality of clusters of the semiconductor light-emitting devices [557], [559] being co-located together, each one of the additional plurality of clusters being collectively configured for generating the other visible-light emissions [561], [563] as having another selectable perceived color point.

As an example [500] of the lighting system, each of the pluralities of clusters of the semiconductor light-emitting devices [520], [522], [538], [540], [556], [558], [557], [559] may include two or three or more co-located semiconductor light-emitting devices being configured for collectively generating the visible-light emissions [524], [526] and the additional visible-light emissions [542], [544] and the further visible-light emissions [560], [562] and the other visible-light emissions [561], [563] as having the respective selectable perceived color points.

In examples [500] of the lighting system, a plurality of semiconductor light-emitting devices [520], [522], or a plurality of semiconductor light-emitting devices [538], [540], or a plurality of semiconductor light-emitting devices [556], [558], or a plurality of semiconductor light-emitting devices [557], [559] may be arranged in a chip-on-board (not shown) array, or in a discrete (not shown) array on a printed circuit board (not shown). Semiconductor light-emitting device arrays including chip-on-board arrays and discrete arrays may be conventionally fabricated by persons of ordinary skill in the art. Further, the semiconductor light-emitting devices [520], [522], [538], [540], [556], [558], [557], [559] of the example [500] of the lighting system may be provided with drivers (not shown) and power supplies (not shown) being conventionally fabricated and configured by persons of ordinary skill in the art.

In examples [500], the lighting system may be configured for causing emission of a portion of the further visible-light emissions [560], [562], (or in an analogous manner, a portion of the other visible-light emissions of the additional total internal reflection lens [507]), as being within a field angle of the total internal reflection lens [506] and for causing emission of another portion of the further visible-light emissions [560], [562] as being outside the field angle of the total internal reflection lens [506]; and the emission aperture [564] may be configured for redirecting some of the another portion of the further visible-light emissions [560], [562]. Further in those examples [500] of the lighting system, the total internal reflection lens [506] may, as examples, have a beam angle being within a range of between about thirty degrees (30°) and about ten degrees (10°). Additionally in those examples [500] of the lighting system, the total internal reflection lens [506] may, as examples have a field angle being within a range of between about sixty degrees (60°) and about twenty degrees (20°).

In examples [500] of the lighting system, the emission aperture [564] may be positioned for redirecting a part of the another portion of the further visible-light emissions [560], [562] (or likewise of the other visible-light emissions [561], [563]) being emitted at the third light output interface [548] in directions deviating from the central light-emission axis [546] by greater than about seventy degrees (70°). In further examples [500] of the lighting system, the emission aperture [564] may be positioned for redirecting a part of the another portion of the further visible-light emissions [560], [562] being emitted at the third light output interface [548] in directions deviating from the central light-emission axis [546] by greater than about sixty degrees (60°).

As an example [500] of the lighting system, the lateral edges [578], [580], [582], [584] of the edge-lit lightguide panels [502], [504] may be linear; and the one [512] of the pair of panel surfaces may be generally flat; and the one [530] of the another pair of panel surfaces may be generally flat. Further in that example [500] of the lighting system, as can be seen in FIG. 6, the flat panel surfaces [512], [530] of the emission aperture [564] may be cooperatively positioned for mechanically shielding and thus redirecting some of the further visible-light emissions [560], [562] and some of the other visible-light emissions [561], [563] being respectively emitted at the third light output interface [548] and at the fourth light output interface [549] in directions deviating from the central light-emission axis [546] by greater than about sixty degrees (60°). Additionally in that example [500] of the lighting system, redirection of the further visible-light emissions [560], [562] being emitted at the third light output interface [548] and of the other visible-light emissions [561], [563] being emitted at the fourth light output interface [549] in high-angle directions being greater than about sixty degrees (60°) or seventy degrees (70°) may substantially reduce objectionable glare.

In examples [500] of the lighting system, the total internal reflection lens [506] (and likewise the additional total internal lens [507]) may have a beam angle being within a range of between about thirty degrees (30°) and about twenty degrees (20°). Further in those examples [500] of the lighting system, the total internal reflection lens [506] may have a field angle being within a range of between about sixty degrees (60°) and about forty degrees (40°). Additionally in those examples [500], the lighting system may be configured for causing emission of a portion of the further visible-light emissions [560], [562] as being within the field angle of the total internal reflection lens [506] and for causing emission of another portion of the further visible-light emissions [560], [562] as being outside the field angle of the total internal reflection lens [506]; and the emission aperture [564] may be configured for redirecting some of the another portion of the further visible-light emissions [560], [562]. Further in those examples [500], the emission aperture [564] may be positioned for redirecting a part of the another portion of the further visible-light emissions [560], [562] being emitted at the third light output interface [548] in directions deviating from the central light-emission axis [546] by greater than about sixty degrees (60°), or deviating from the central light-emission axis by greater than about seventy degrees (70°).

In other examples [500] of the lighting system, the total internal reflection lens [506] (and likewise the additional total internal lens [507]) may have a beam angle being within a range of between about twenty degrees (20°) and about ten degrees (10°); or within a range of between about fifteen degrees (15°) and about ten degrees (10°). Further in those examples [500] of the lighting system, the total internal reflection lens [506] may have a field angle being respectively within a range of between about forty degrees (40°) and about twenty degrees (20°), or within a range of between about thirty degrees (30°) and about twenty degrees (20°). Further in those examples [500] of the lighting system, the third light output interface [548] may include internal or external light-dispersing features; and the third light output interface [548] may cause the total internal reflection lens [506] to have an effective field angle being within a range of between about sixty degrees (60°) and about forty degrees (40°). Additionally in those examples [500], the lighting system may be configured for causing emission of a portion of the further visible-light emissions [560], [562] as being within the effective field angle of the total internal reflection lens [506] and for causing emission of another portion of the further visible-light emissions [560], [562] as being outside the effective field angle of the total internal reflection lens [506]; and the emission aperture [564] may be configured for redirecting some of the another portion of the further visible-light emissions [560], [562]. Further in those examples [500], the emission aperture [564] may be positioned for redirecting a part of the another portion of the further visible-light emissions [560], [562] (or likewise the other visible-light emissions [561], [563]) being emitted at the third light output interface [548] in directions deviating from the central light-emission axis [546] by greater than about sixty degrees (60°), or deviating from the central light-emission axis by greater than about seventy degrees (70°).

In examples [500], the lighting system may include a controller (not shown) for the visible-light source [518] and for the another visible-light source [536] and for the further visible-light source [554] and for the additional visible-light source [555], the controller being configured for causing the visible-light emissions [524], [526] to have a selectable perceived color point and for causing the additional visible-light emissions [542], [544] to have another selectable perceived color point and for causing the further visible-light emissions [560], [562] to have a further selectable perceived color point and for causing the other visible-light emissions [561], [563] to have an additional selectable perceived color point. Further in those examples [500] of the lighting system, the controller may be configured for causing the visible-light emissions [524], [526] to have a selectable and adjustable intensity and for causing the additional visible-light emissions [542], [544] to have another selectable and adjustable intensity and for causing the further visible-light emissions [560], [562] to have a further selectable and adjustable intensity and for causing the other visible-light emissions [561], [563] to have an additional selectable and adjustable intensity. Additionally in those examples [500] of the lighting system, the controller may be configured for causing the combined visible-light emissions [566], [568] to generate a down-lighting pattern being: wall graze, table with wall fill, wall wash left, wall wash right, double wall wash, wall wash left plus floor, wall wash right plus floor, room, or batwing. Also in those examples [500] of the lighting system, the controller may be configured for selection among a plurality of different pre-programmed combinations of the intensities for the visible-light emissions [524], [526], the additional visible-light emissions [542], [544], the further visible-light emissions [560], [562] and the other visible-light emissions [561], [563]. Further in those examples [500] of the lighting system, the controller may be configured for adjusting, over a selectable time period, the intensities for the visible-light emissions [524], [526], the additional visible-light emissions [542], [544], the further visible-light emissions [560], [562] and the other visible-light emissions [561], [563] from a one of the plurality of pre-programmed combinations to another one of the plurality of pre-programmed combinations. Additionally in those examples [500], the lighting system may further include an ambient light sensor (not shown); and the controller may be configured, in response to the ambient light sensor, for adjusting the intensities for the visible-light emissions [524], [526], the additional visible-light emissions [542], [544], the further visible-light emissions [560], [562], and the other visible-light emissions [561], [563].

In other examples [500], the lighting system may include a controller (not shown) for the visible-light source [518] being configured for causing the visible-light emissions [524], [526] to have a selectable perceived color point; and may include another controller (not shown) for the another visible-light source [536] being configured for causing the additional visible-light emissions [542], [544] to have another selectable perceived color point; and may include a further controller (not shown) for the further visible-light source [554] being configured for causing the further visible-light emissions [560], [562] to have a further selectable perceived color point; and may include an additional controller (not shown) for the additional visible-light source [555] being configured for causing the other visible-light emissions [561], [563] to have an additional selectable perceived color point. Further in those examples [500] of the lighting system, the controller may be configured for causing the visible-light emissions [524], [526] to have a selectable and adjustable intensity; and the another controller may be configured for causing the additional visible-light emissions [542], [544] to have another selectable and adjustable intensity; and the further controller may be configured for causing the further visible-light emissions [560], [562] to have a further selectable and adjustable intensity; and the additional controller may be configured for causing the other visible-light emissions [561], [563] to have an additional selectable and adjustable intensity. In those examples [500] of the lighting system, the controller and the another controller and the further controller and the additional controller may be collectively configured for causing the combined visible-light emissions [566], [568] to generate a down-lighting pattern being: wall graze, table with wall fill, wall wash left, wall wash right, double wall wash, wall wash left plus floor, wall wash right plus floor, room, or batwing. Additionally in those examples [500] of the lighting system, the controller and the another controller and the further controller and the additional controller may be collectively configured for selection among a plurality of different pre-programmed combinations of the intensities for the visible-light emissions [524], [526], the additional visible-light emissions [542], [544], the further visible-light emissions [560], [562]; and the other visible-light emissions [561], [563]. Further in those examples [500] of the lighting system, the controller and the another controller and the further controller and the additional controller may be collectively configured for adjusting, over a selectable time period, the intensities for the visible-light emissions [524], [526], the additional visible-light emissions [542], [544], the further visible-light emissions [560], [562], and the other visible-light emissions [561], [563], from a one of the plurality of pre-programmed combinations to another one of the plurality of pre-programmed combinations. In those examples [500], the lighting system may also include an ambient light sensor; and the controller and the another controller and the further controller and the additional controller may be collectively configured, in response to the ambient light sensor, for adjusting the intensities for the visible-light emissions [524], [526], the additional visible-light emissions [542], [544], and the further visible-light emissions [560], [562], and the other visible-light emissions [561], [563].

Figure 9:
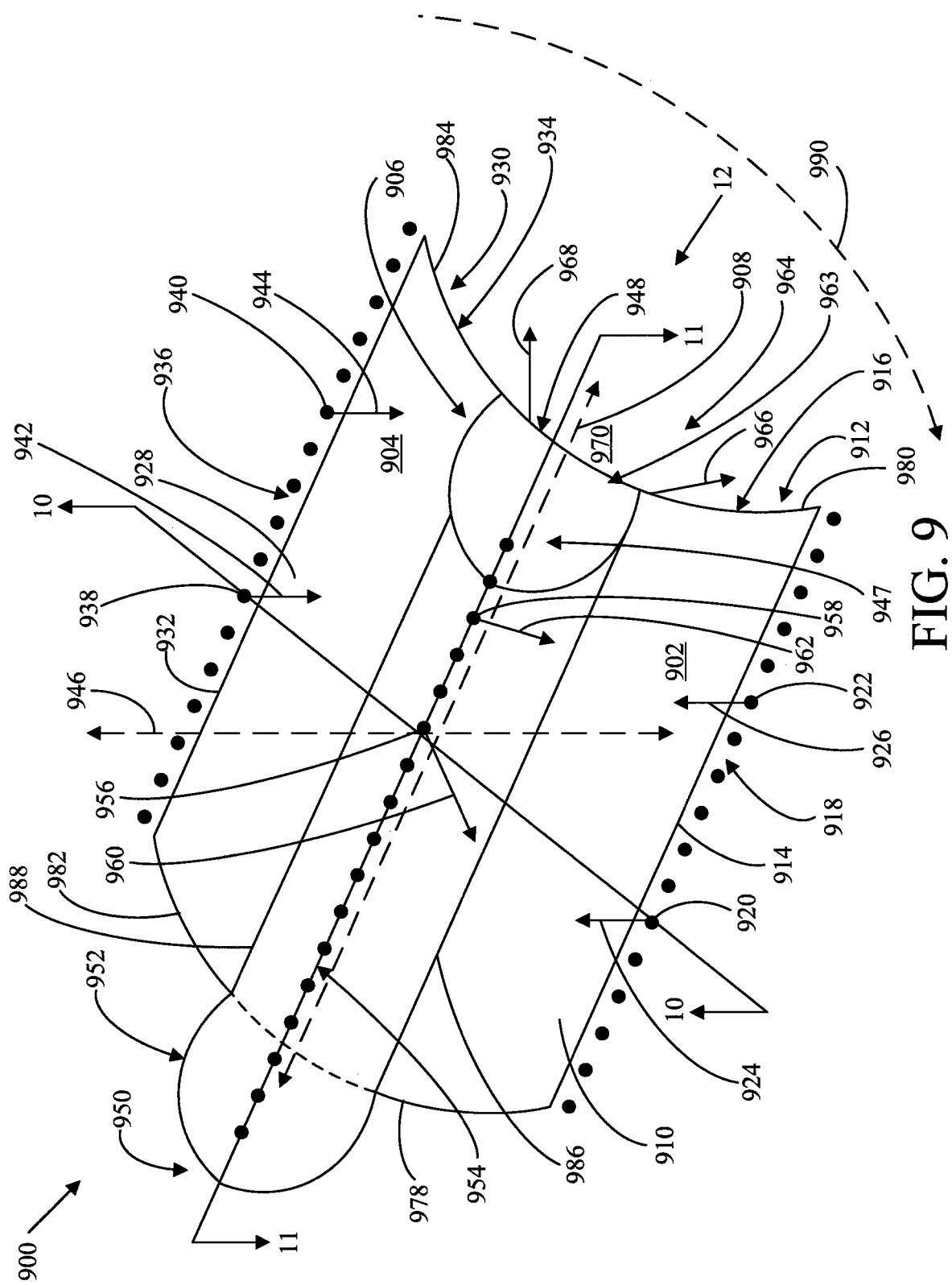
FIG. 9 is a schematic top perspective view showing an example [900] of an implementation of a lighting system.
Figure 10:
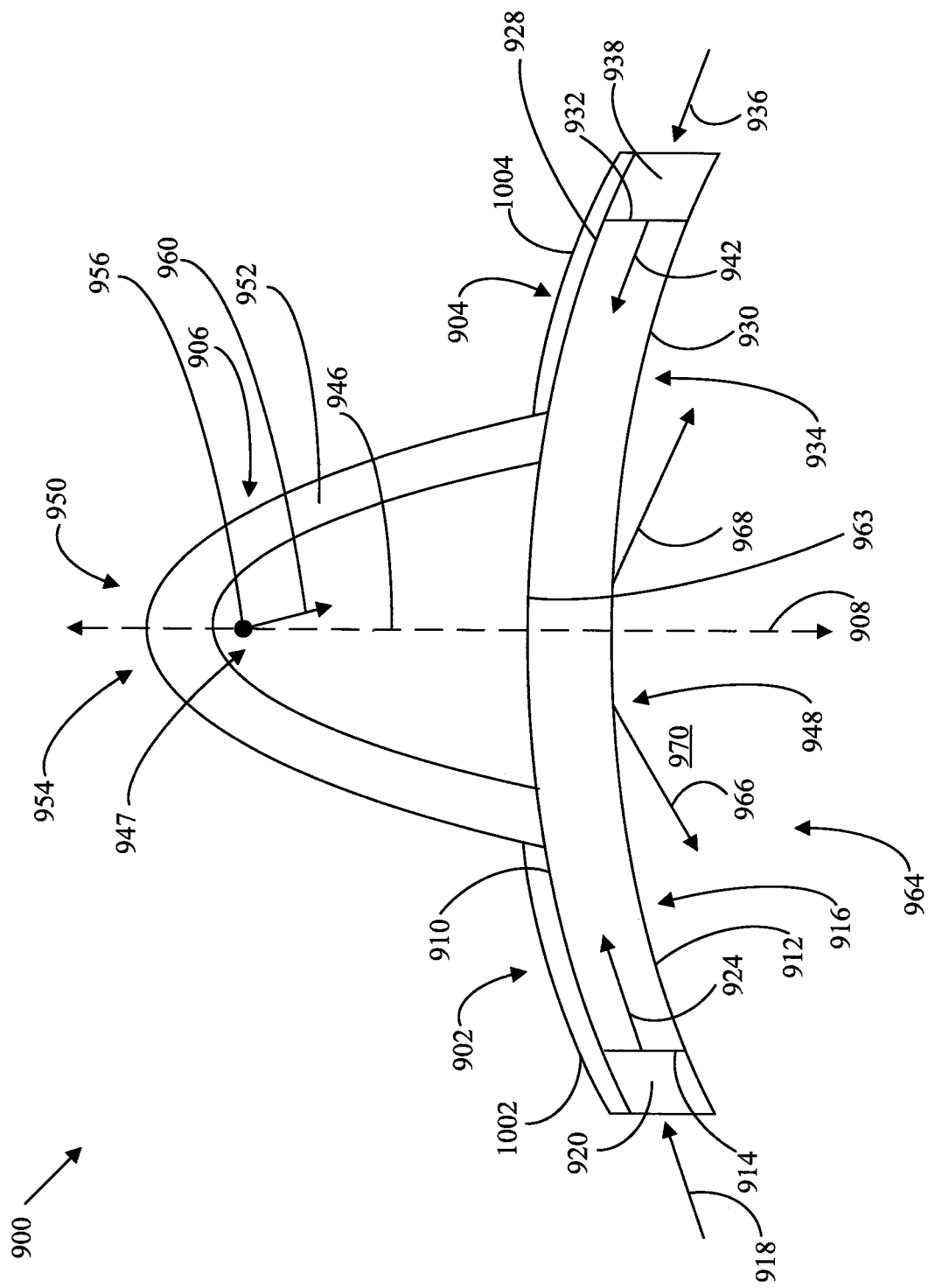
FIG. 10 is a schematic cross-sectional view taken along the line 10-10 showing the example [900] of the lighting system.
Figure 11:
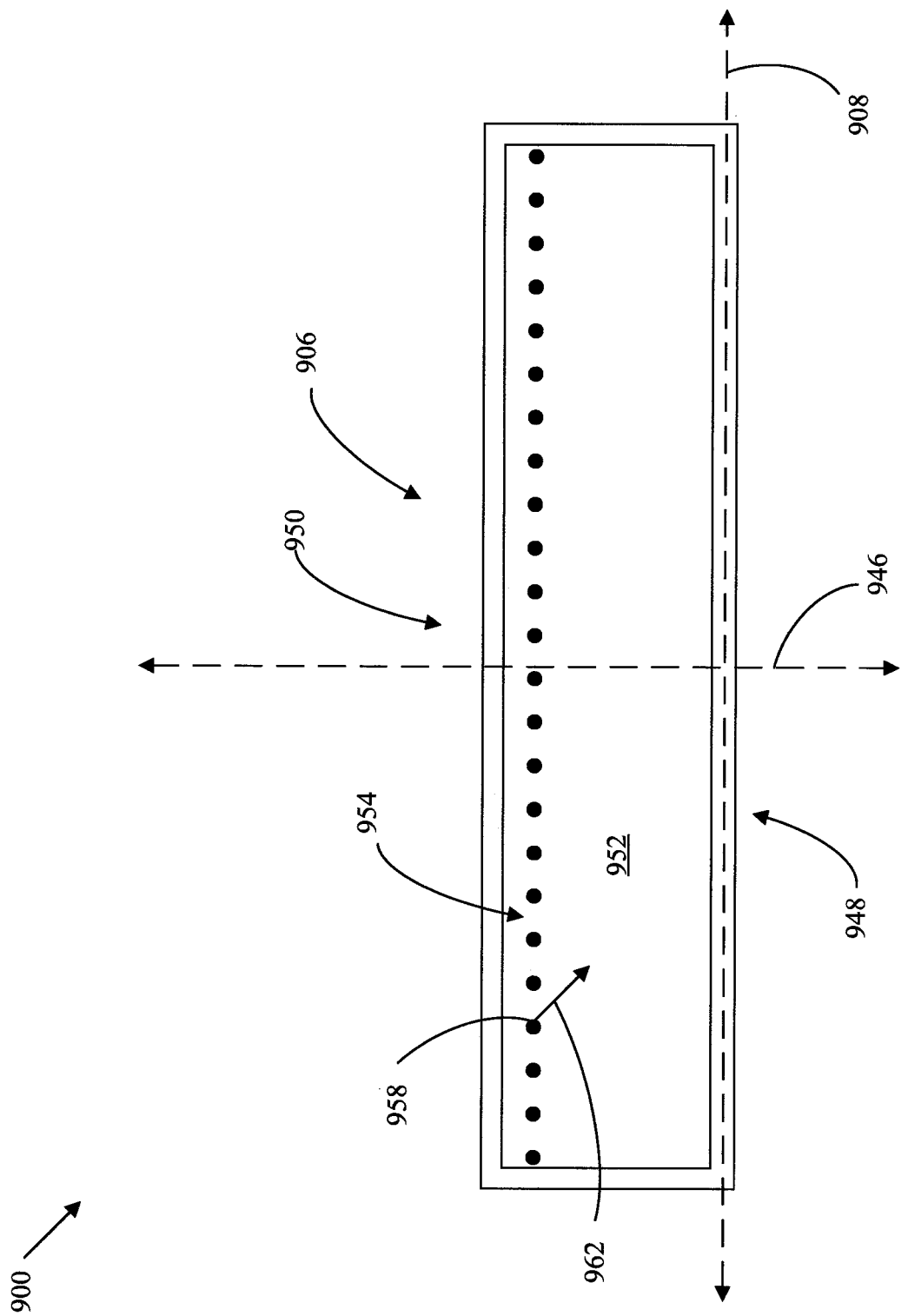
FIG. 11 is a schematic cross-sectional view taken along the line 11-11 showing the example [900] of the lighting system.
Figure 12:
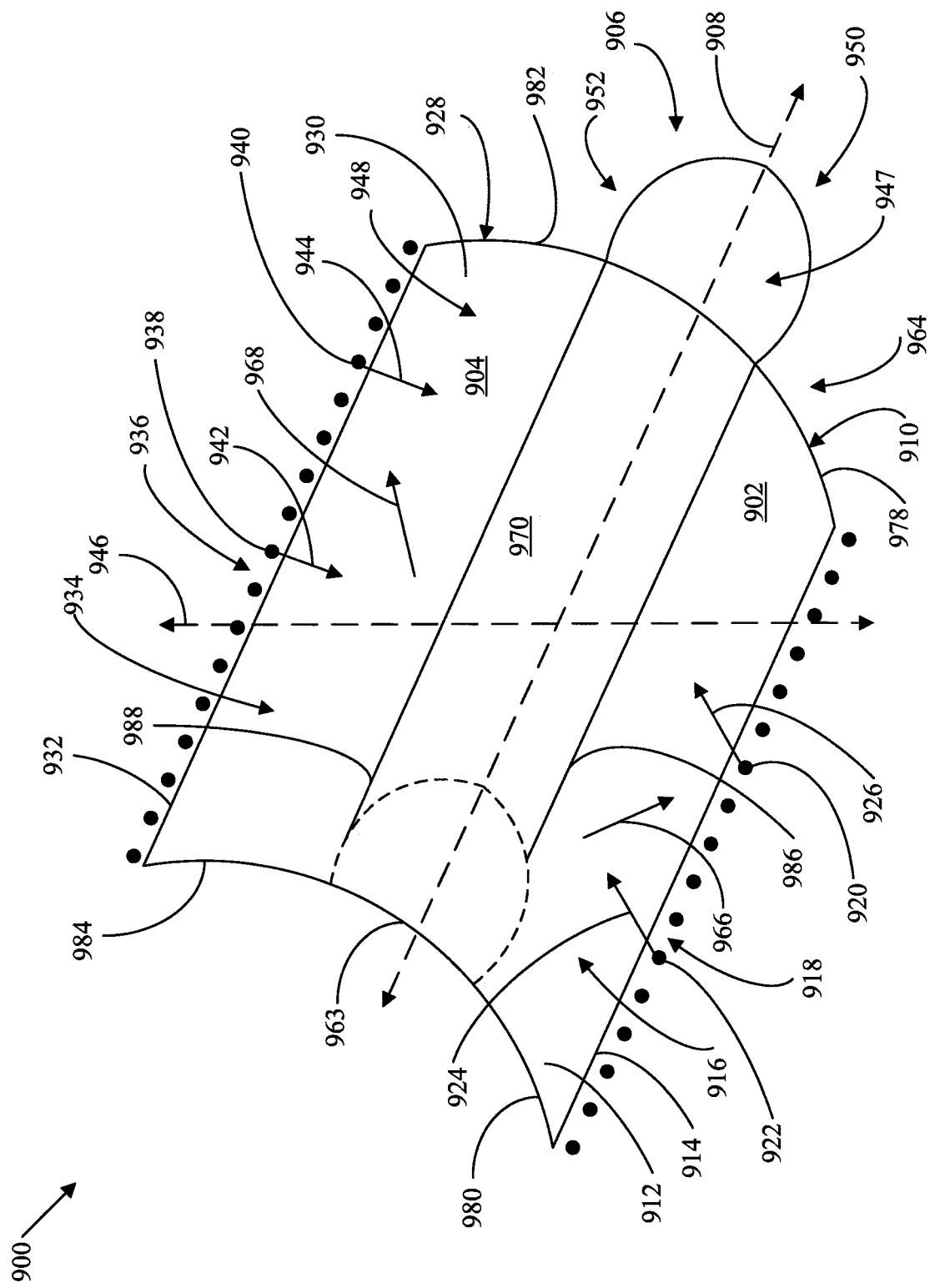
FIG. 12 is a schematic bottom perspective view taken along the line 12 showing the example [900] of an implementation of a lighting system.

FIG. 9 is a schematic top perspective view showing an example [900] of an implementation of a lighting system. FIG. 10 is a schematic cross-sectional view taken along the line 10-10 showing the example [900] of the lighting system. FIG. 11 is a schematic cross-sectional view taken along the line 11-11 showing the example [900] of the lighting system. FIG. 12 is a schematic bottom perspective view taken along the line 12 showing the example [900] of an implementation of a lighting system.

Examples [100], [500], [900], [1300], [1800], [2300], and [2800] of lighting systems are discussed herein, respectively, in connection with FIGS. 1-4; 5-8; 9-12; 13-16; 18-21; 22-26; and 27-31. Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. It is understood throughout this specification that a lighting system [100], [500], [900], [1300], [1800], [2300], [2800] may include any of the features or combinations of features that are disclosed in connection with any one or more of such lighting systems. It is further understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is additionally understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussion of the example [900] of an implementation of the lighting system.

As shown in FIGS. 9-12, the example [900] of the implementation of the lighting system includes: an edge-lit lightguide panel [902]; another edge-lit lightguide panel [904]; and a bowl reflector [906]. In the example [900], the edge-lit lightguide panel [902] is extended along a longitudinal axis [908] of the lighting system. The edge-lit lightguide panel [902] in the example [900] of the lighting system further has a pair of mutually-opposing panel surfaces [910], [912]. The edge-lit lightguide panel [902] in the example [900] of the lighting system also has a peripheral edge [914] being extended along and spaced transversely away from the longitudinal axis [908]. In the example [900] of the lighting system, a one [912] of the pair of panel surfaces includes a first light output interface [916].

The example [900] of the lighting system also includes a visible-light source [918] including a plurality of semiconductor light-emitting devices [920], [922]. In the example [900] of the lighting system, the visible-light source [918] is configured for generating visible-light emissions [924], [926] from the plurality of semiconductor light-emitting devices [920], [922]. Further in the example [900] of the lighting system, the visible-light source [918] is located along the peripheral edge [914] for directing the visible-light emissions [924], [926] into the edge-lit lightguide panel [902].

In the example [900] of the lighting system, the another edge-lit lightguide panel [904] is extended along the longitudinal axis [908]. Additionally in the example [900] of the lighting system, the another edge-lit lightguide panel [904] has another pair of mutually-opposing panel surfaces [928], [930]. In the example [900] of the lighting system, the another edge-lit lightguide panel [904] has another peripheral edge [932] being extended along and spaced transversely away from the longitudinal axis [908]. Further, a one [930] of the another pair of panel surfaces in the example [900] of the lighting system includes a second light output interface [934].

The example [900] of the lighting system additionally includes another visible-light source [936] including another plurality of semiconductor light-emitting devices [938], [940]. In the example [900] of the lighting system, the another visible-light source [936] is configured for generating additional visible-light emissions [942], [944] from the another plurality of semiconductor light-emitting devices [938], [940]. Further in the example [900] of the lighting system, the another visible-light source [936] is located along the another peripheral edge [932] for directing the additional visible-light emissions [942], [944] into the another edge-lit lightguide panel [904].

In the example [900] of the lighting system, the bowl reflector [906] has a central light-emission axis [946] being transverse to the longitudinal axis [908]. The bowl reflector [906] in the example [900] of the lighting system includes a third light output interface [948] being located between the first and second light output interfaces [916], [934]. In the example [900] of the lighting system, the third light output interface [948] is spaced apart from a central light input interface [950] by a visible-light-reflective side surface [952]. The visible-light-reflective side surface [952] in the example [900] of the lighting system is extended along the central light-emission axis [946] and defines a portion of a cavity [947]. In the example [900] of the lighting system, the bowl reflector [906] has a further visible-light source [954] including a further plurality of semiconductor light-emitting devices [956], [958]. The further visible-light source [954] in the example [900] of the lighting system is configured for generating further visible-light emissions [960], [962] from the further plurality of semiconductor light-emitting devices [956], [958]. In the example [900] of the lighting system, the further visible-light source [954] is located at the central light input interface [950] for directing the further visible-light emissions [960], [962] through the cavity [947] of the bowl reflector [906] to the third light output interface [948].

As examples, the edge-lit lightguide panel [902] may direct the visible-light emissions [924], [926] for emission from the first light output interface [916]; and the another edge-lit lightguide panel [904] may direct the additional visible-light emissions [942], [944] for emission from the second light output interface [934]; and the bowl reflector [906] may direct the further visible-light emissions [960], [962] for emission from the third light output interface [948].

In the example [900] of the lighting system, the first, second and third light output interfaces [916], [934], [948] cooperatively define an emission aperture [964] for forming combined visible-light emissions [966], [968] including the visible-light emissions [924], [926], the additional visible-light emissions [942], [944], and the further visible-light emissions [960], [962]. Further in the example [900] of the lighting system, the emission aperture [964] forms a shielding zone [970] for redirecting some of the combined visible-light emissions [966], [968].

In some examples [900] of the lighting system: the visible-light-reflective side surface [952] may be extended along the longitudinal axis [908] in addition to being extended along the central light-emission axis [946]; and the central light input interface [950] may be extended along the longitudinal axis [908]; and the further visible-light source [954] may be extended along the longitudinal axis [908]. Further in those examples [900] of the lighting system, the visible-light-reflective side surface [952] may have a frusto-conical cross-sectional profile in the direction of the line 10-10 being perpendicular to the longitudinal axis [908].

In some examples [900] of the lighting system, the bowl reflector [906] may be a converging bowl reflector [906] being configured for causing convergence of the further visible-light emissions [960], [962] in their travel along the central light-emission axis [946] toward the third light output interface [948]. Further in those examples [900] of the lighting system, the bowl reflector [906] may be a converging bowl reflector [906] being configured for causing convergence of the further visible-light emissions [960], [962] along the central light-emission axis [946] as having a beam angle being within a range of between about thirty degrees (30°) and about ten degrees (10°).

As additional examples [900] of the lighting system, the visible-light-reflective side surface [952] of the bowl reflector [906] may be a specular light-reflective surface. In further examples [900] of the lighting system, the visible-light-reflective side surface [952] of the bowl reflector [906] may be a metallic light-reflective surface. In some of those examples [900] of the lighting system, the metallic layer of the visible-light-reflective side surface [952] may have a composition that includes: silver, platinum, palladium, aluminum, zinc, gold, iron, copper, tin, antimony, titanium, chromium, nickel, or molybdenum.

In examples [900] of the lighting system, the visible-light-reflective side surface [952] of the bowl reflector [906] may have a minimum visible-light reflection value from any incident angle being: at least about ninety percent (90%); or at least about ninety-five percent (95%). As further examples [900] of the lighting system, the visible-light-reflective side surface [952] of the bowl reflector [906] may have a maximum visible-light transmission value from any incident angle being: no greater than about ten percent (10%); or no greater than about five percent (5%).

In examples [900] of the lighting system, the visible-light-reflective side surface [952] of the bowl reflector [906] may be configured for reflecting the further visible-light emissions [960], [962] toward a horizon [963] of the bowl reflector [906] as having a beam angle being within a range of between about ten degrees (10°) and about thirty degrees (30°).

As further examples [900] of the lighting system, the visible-light-reflective side surface [952] of the bowl reflector [906] may be configured for reflecting the further visible-light emissions [960], [962] toward the horizon [963] of the bowl reflector [906] as having a field angle being within a range of between about twenty degrees (20°) and about sixty degrees (60°).

In examples [900] of the lighting system, a portion of the visible-light-reflective side surface [952] of the bowl reflector [906] may be a parabolic surface. In further examples [900] of the lighting system, a portion of the visible-light-reflective side surface [952] of the bowl reflector [906] may be a part of an elliptic paraboloid or a part of a paraboloid of revolution. As further examples [900] of the lighting system, a portion of the visible-light-reflective side surface [952] of the bowl reflector [906] may be a multi-segmented parabolic surface.

In some examples [900] of the lighting system, the edge-lit lightguide panel [902] may have a first pair of lateral edges [978], [980] being mutually spaced apart along the longitudinal axis [908]; and the another edge-lit lightguide panel [904] may have a second pair of lateral edges [982], [984] being mutually spaced apart along the longitudinal axis [908]. Further in those examples [900] of the lighting system, each one of the lateral edges [978], [980], [982], [984] may be curvilinear; and the one [912] of the pair of panel surfaces may be concave; and the one [930] of the another pair of panel surfaces may be concave.

In additional examples [900] of the lighting system, the edge-lit lightguide panel [902] may be configured for directing the visible-light emissions [924], [926] in first directions towards the longitudinal axis [908]; and the another edge-lit lightguide panel [904] may be configured for directing the additional visible-light emissions [942], [944] in second directions, being symmetrically opposed to the first directions, towards the longitudinal axis [908]. In those additional examples, the edge-lit lightguide panel [902] may further direct the visible-light emissions [924], [926] for emission from the first light output interface [916]; and the another edge-lit lightguide panel [904] may further direct the additional visible-light emissions [942], [944] for emission from the second light output interface [934]; and the bowl reflector [906] may direct the further visible-light emissions [960], [962] for emission from the third light output interface [948].

In some examples [900] of the lighting system, the edge-lit lightguide panel [902] and the another edge-lit lightguide panel [904] may be integrally formed together with the bowl reflector [906]. In other examples [900] of the lighting system, the edge-lit lightguide panel [902] may have a central edge represented by a dashed line [986] being extended along the longitudinal axis [908] and being spaced transversely away from the peripheral edge [914]; and the another edge-lit lightguide panel [904] may have another central edge represented by a dashed line [988] being extended along the longitudinal axis [908] and being spaced transversely away from the another peripheral edge [932]; and the bowl reflector [906] may be located between and attached to the central edge [986] and the another central edge [988].

In examples [900] of the lighting system, the edge-lit lightguide panel [902] may include internal light-dispersing features; and the another edge-lit lightguide panel [904] may include additional internal light-dispersing features. Further in those examples [900] of the lighting system, the internal light-dispersing features may include positive elements such as: particles having various shapes being e.g. spheroidal or polygonal; particles having various material compositions including, e.g., phosphors, quantum dots, and pigmented dots; micro-optical features such as spherical or elliptical lenses, and reflective micro-scale particles. Additionally in those examples [900] of the lighting system, the internal light-dispersing features may include negative elements such as: hot-pressed micro-patterns e.g. micro-grooves, lenticular patterns, prisms, fresnels, conical arrays, pyramids, or domes. Also in those examples [900] of the lighting system, the internal light-dispersing features may have a gradually-increasing density in a direction from the peripheral edge [914] towards the longitudinal axis [908]; and the additional internal light-dispersing features may have a gradually-increasing density in another direction from the another peripheral edge [932] towards the longitudinal axis [908].

In examples [900] of the lighting system, the edge-lit lightguide panel [902] may include external light-dispersing features on the one [912] or the another one [910] of the pair of panel surfaces; and the another edge-lit lightguide panel [904] may include additional external light-dispersing features on the one [930] or the another one [928] of the another pair of panel surfaces. Further in those examples [900] of the lighting system, the external light-dispersing features may include positive elements such as: pigmented dots; or micro-optical features such as spherical or elliptical lenses. Also in those examples [900] of the lighting system, the external light-dispersing features may include negative elements such as: hot-pressed textured surfaces such as micro-patterns e.g. micro-grooves, lenticular patterns, prisms, fresnels, conical arrays, pyramids, domes, or laser-ablated regions. In addition in those examples [900] of the lighting system, the external light-dispersing features may have a gradually-increasing density in a direction from the peripheral edge [914] towards the longitudinal axis [908]; and the additional external light-dispersing features may have a gradually-increasing density in another direction from the another peripheral edge [932] towards the longitudinal axis [908].

In examples [900] of the lighting system, the another one [910] of the pair of panel surfaces may have a light-reflective layer [1002]; and the another one [928] of the another pair of panel surfaces may have another light-reflective layer [1004]. Further in those examples [900] of the lighting system, the another one [910] of the pair of panel surfaces may have a specular light-reflective layer [1002]; and the another one [928] of the another pair of panel surfaces may have another specular light-reflective layer [1004]. Additionally in those examples [900] of the lighting system, the another one [910] of the pair of panel surfaces may have a metallic light-reflective layer [1002]; and the another one [928] of the another pair of panel surfaces may have another metallic light-reflective layer [1004]. In some of those examples [900] of the lighting system, the metallic light-reflective layers [1002], [1004] may have a composition that includes: silver, platinum, palladium, aluminum, zinc, gold, iron, copper, tin, antimony, titanium, chromium, nickel, or molybdenum. In additional examples [900] of the lighting system, the another one [910] of the pair of panel surfaces may have a light-reflective layer [1002]; and the another one [928] of the another pair of panel surfaces may have another light-reflective layer [1004]; and each of the light-reflective layers [1002], [1004] may have a minimum visible-light reflection value from any incident angle being at least about ninety percent (90%) or being at least about ninety-five percent (95%).

In examples [900] of the lighting system, the plurality of the semiconductor light-emitting devices [920], [922] may include an array of the semiconductor light-emitting devices [920], [922] being mutually spaced apart along the longitudinal axis [908]; and the another plurality of the semiconductor light-emitting devices [938], [940] may include another array of the semiconductor light-emitting devices [938], [940] being mutually spaced apart along the longitudinal axis [908]. Additionally in those examples [900] of the lighting system, the further plurality of the semiconductor light-emitting devices [956], [958] may include a further array of the semiconductor light-emitting devices [956], [958] being mutually spaced apart along the longitudinal axis [908].

In examples [900] of the lighting system, the plurality of the semiconductor light-emitting devices [920], [922] may be collectively configured for generating the visible-light emissions [924], [926] as having a selectable perceived color point; and the another plurality of the semiconductor light-emitting devices [938], [940] may be collectively configured for generating the additional visible-light emissions [942], [944] as having another selectable perceived color point. Additionally in those examples [900] of the lighting system, the further plurality of the semiconductor light-emitting devices [956], [958] may be collectively configured for generating the further visible-light emissions [960], [962] as having a further selectable perceived color point.

In some examples [900] of the lighting system, the plurality of the semiconductor light-emitting devices [920], [922] may include a plurality of clusters of the semiconductor light-emitting devices [920], [922] being co-located together, each one of the plurality of clusters being collectively configured for generating the visible-light emissions [924], [926] as having a selectable perceived color point; and the another plurality of the semiconductor light-emitting devices [938], [940] may include another plurality of clusters of the semiconductor light-emitting devices [938], [940] being co-located together, each one of the another plurality of clusters being collectively configured for generating the additional visible-light emissions [942], [944] as having another selectable perceived color point. Also in that example [900] of the lighting system, the further plurality of the semiconductor light-emitting devices [956], [958] may include a further plurality of clusters of the semiconductor light-emitting devices [956], [958] being co-located together, each one of the further plurality of clusters being collectively configured for generating the further visible-light emissions [960], [962] as having a further selectable perceived color point. As an example [900] of the lighting system, each of the pluralities of clusters of the semiconductor light-emitting devices [920], [922], [938], [940], [956], [958] may include two or three or more co-located semiconductor light-emitting devices being configured for collectively generating the visible-light emissions [924], [926] and the additional visible-light emissions [942], [944] and the further visible-light emissions [960], [962] as having the respective selectable perceived color points.

In examples [900] of the lighting system, a plurality of semiconductor light-emitting devices [920], [922], or a plurality of semiconductor light-emitting devices [938], [940], or a plurality of semiconductor light-emitting devices [956], [958] may be arranged in a chip-on-board (not shown) array, or in a discrete (not shown) array on a printed circuit board (not shown). Semiconductor light-emitting device arrays including chip-on-board arrays and discrete arrays may be conventionally fabricated by persons of ordinary skill in the art. Further, the semiconductor light-emitting devices [920], [922], [938], [940], [956], [958] of the example [900] of the lighting system may be provided with drivers (not shown) and power supplies (not shown) being conventionally fabricated and configured by persons of ordinary skill in the art.

In examples [900], the lighting system may be configured for causing emission of a portion of the further visible-light emissions [960], [962] as being within a field angle of the bowl reflector [906] and for causing emission of another portion of the further visible-light emissions [960], [962] as being outside the field angle of the bowl reflector [906]; and the emission aperture [964] may be configured for redirecting some of the another portion of the further visible-light emissions [960], [962]. Further in those examples [900] of the lighting system, the bowl reflector [906] may, as examples, have a beam angle being within a range of between about thirty degrees (30°) and about ten degrees (10°). Additionally in those examples [900] of the lighting system, the bowl reflector [906] may, as examples have a field angle being within a range of between about sixty degrees (60°) and about twenty degrees (20°).

In examples [900] of the lighting system, the emission aperture [964] may be positioned for redirecting a part of the another portion of the further visible-light emissions [960], [962] being emitted at the third light output interface [948] in directions deviating from the central light-emission axis [946] by greater than about seventy degrees (70°). In further examples [900] of the lighting system, the emission aperture [964] may be positioned for redirecting a part of the another portion of the further visible-light emissions [960], [962] being emitted at the third light output interface [948] in directions deviating from the central light-emission axis [946] by greater than about sixty degrees (60°).

As an example [900] of the lighting system, the lateral edges [978], [980], [982], [984] of the edge-lit lightguide panels [902], [904] may be curvilinear; and the one [912] of the pair of panel surfaces may be concave; and the one [930] of the another pair of panel surfaces may be concave. Further in that example [900] of the lighting system, as can be seen in FIG. 10, the concave panel surfaces [912], [930] of the emission aperture [964] may be cooperatively positioned for mechanically shielding and thus redirecting some of the further visible-light emissions [960], [962] being emitted at the third light output interface [948] in directions deviating from the central light-emission axis [946] by greater than about sixty degrees (60°). Additionally in that example [900] of the lighting system, redirection of the visible-light emissions [960], [962] being emitted at the third light output interface [948] in high-angle directions being greater than about sixty degrees (60°) or seventy degrees (70°) may substantially reduce objectionable glare.

In examples [900] of the lighting system, the bowl reflector [906] may have a beam angle being within a range of between about thirty degrees (30°) and about twenty degrees (20°). Further in those examples [900] of the lighting system, the bowl reflector [906] may have a field angle being within a range of between about sixty degrees (60°) and about forty degrees (40°). Additionally in those examples [900], the lighting system may be configured for causing emission of a portion of the further visible-light emissions [960], [962] as being within the field angle of the bowl reflector [906] and for causing emission of another portion of the further visible-light emissions [960], [962] as being outside the field angle of the bowl reflector [906]; and the emission aperture [964] may be configured for redirecting some of the another portion of the further visible-light emissions [960], [962]. Further in those examples [900], the emission aperture [964] may be positioned for redirecting a part of the another portion of the further visible-light emissions [960], [962] being emitted at the third light output interface [948] in directions deviating from the central light-emission axis [946] by greater than about sixty degrees (60°), or deviating from the central light-emission axis by greater than about seventy degrees (70°).

In other examples [900] of the lighting system, the bowl reflector [906] may have a beam angle being within a range of between about twenty degrees (20°) and about ten degrees (10°); or within a range of between about fifteen degrees (15°) and about ten degrees (10°). Further in those examples [900] of the lighting system, the bowl reflector [906] may have a field angle being respectively within a range of between about forty degrees (40°) and about twenty degrees (20°), or within a range of between about thirty degrees (30°) and about twenty degrees (20°). Further in those examples [900] of the lighting system, the third light output interface [948] may include internal or external light-dispersing features; and the third light output interface [948] may cause the bowl reflector [906] to have an effective field angle being within a range of between about sixty degrees (60°) and about forty degrees (40°). Additionally in those examples [900], the lighting system may be configured for causing emission of a portion of the further visible-light emissions [960], [962] as being within the effective field angle of the bowl reflector [906] and for causing emission of another portion of the further visible-light emissions [960], [962] as being outside the effective field angle of the bowl reflector [906]; and the emission aperture [964] may be configured for redirecting some of the another portion of the further visible-light emissions [960], [962]. Further in those examples [900], the emission aperture [964] may be positioned for redirecting a part of the another portion of the further visible-light emissions [960], [962] being emitted at the third light output interface [948] in directions deviating from the central light-emission axis [946] by greater than about sixty degrees (60°), or deviating from the central light-emission axis by greater than about seventy degrees (70°).

In examples [900], the lighting system may include a controller (not shown) for the visible-light source [918] and for the another visible-light source [936] and for the further visible-light source [954], the controller being configured for causing the visible-light emissions [924], [926] to have a selectable perceived color point and for causing the additional visible-light emissions [942], [944] to have another selectable perceived color point and for causing the further visible-light emissions [960], [962] to have a further selectable perceived color point. Further in those examples [900] of the lighting system, the controller may be configured for causing the visible-light emissions [924], [926] to have a selectable and adjustable intensity and for causing the additional visible-light emissions [942], [944] to have another selectable and adjustable intensity and for causing the further visible-light emissions [960], [962] to have a further selectable and adjustable intensity. Additionally in those examples [900] of the lighting system, the controller may be configured for causing the combined visible-light emissions [966], [968] to generate a down-lighting pattern being: wall graze, table with wall fill, wall wash left, wall wash right, double wall wash, wall wash left plus floor, wall wash right plus floor, room, or batwing. Also in those examples [900] of the lighting system, the controller may be configured for selection among a plurality of different pre-programmed combinations of the intensities for the visible-light emissions [924], [926], the additional visible-light emissions [942], [944], and the further visible-light emissions [960], [962]. Further in those examples [900] of the lighting system, the controller may be configured for adjusting, over a selectable time period, the intensities for the visible-light emissions [924], [926], the additional visible-light emissions [942], [944], and the further visible-light emissions [960], [962] from a one of the plurality of pre-programmed combinations to another one of the plurality of pre-programmed combinations. Additionally in those examples [900], the lighting system may further include an ambient light sensor (not shown); and the controller may be configured, in response to the ambient light sensor, for adjusting the intensities for the visible-light emissions [924], [926], the additional visible-light emissions [942], [944], and the further visible-light emissions [960], [962].

In other examples [900], the lighting system may include a controller (not shown) for the visible-light source [918] being configured for causing the visible-light emissions [924], [926] to have a selectable perceived color point; and may include another controller (not shown) for the another visible-light source [936] being configured for causing the additional visible-light emissions [942], [944] to have another selectable perceived color point; and may include a further controller (not shown) for the further visible-light source [954] being configured for causing the further visible-light emissions [960], [962] to have a further selectable perceived color point. Further in those examples [900] of the lighting system, the controller may be configured for causing the visible-light emissions [924], [926] to have a selectable and adjustable intensity; and the another controller may be configured for causing the additional visible-light emissions [942], [944] to have another selectable and adjustable intensity; and the further controller may be configured for causing the further visible-light emissions [960], [962] to have a further selectable and adjustable intensity. In those examples [900] of the lighting system, the controller and the another controller and the further controller may be collectively configured for causing the combined visible-light emissions [966], [968] to generate a down-lighting pattern being: wall graze, table with wall fill, wall wash left, wall wash right, double wall wash, wall wash left plus floor, wall wash right plus floor, room, or batwing. Additionally in those examples [900] of the lighting system, the controller and the another controller and the further controller may be collectively configured for selection among a plurality of different pre-programmed combinations of the intensities for the visible-light emissions [924], [926], the additional visible-light emissions [942], [944], and the further visible-light emissions [960], [962]. Further in those examples [900] of the lighting system, the controller and the another controller and the further controller may be collectively configured for adjusting, over a selectable time period, the intensities for the visible-light emissions [924], [926], the additional visible-light emissions [942], [944], and the further visible-light emissions [960], [962] from a one of the plurality of pre-programmed combinations to another one of the plurality of pre-programmed combinations. In those examples [900], the lighting system may also include an ambient light sensor; and the controller and the another controller and the further controller may be collectively configured, in response to the ambient light sensor, for adjusting the intensities for the visible-light emissions [924], [926], the additional visible-light emissions [942], [944], and the further visible-light emissions [960], [962].

Figure 13:
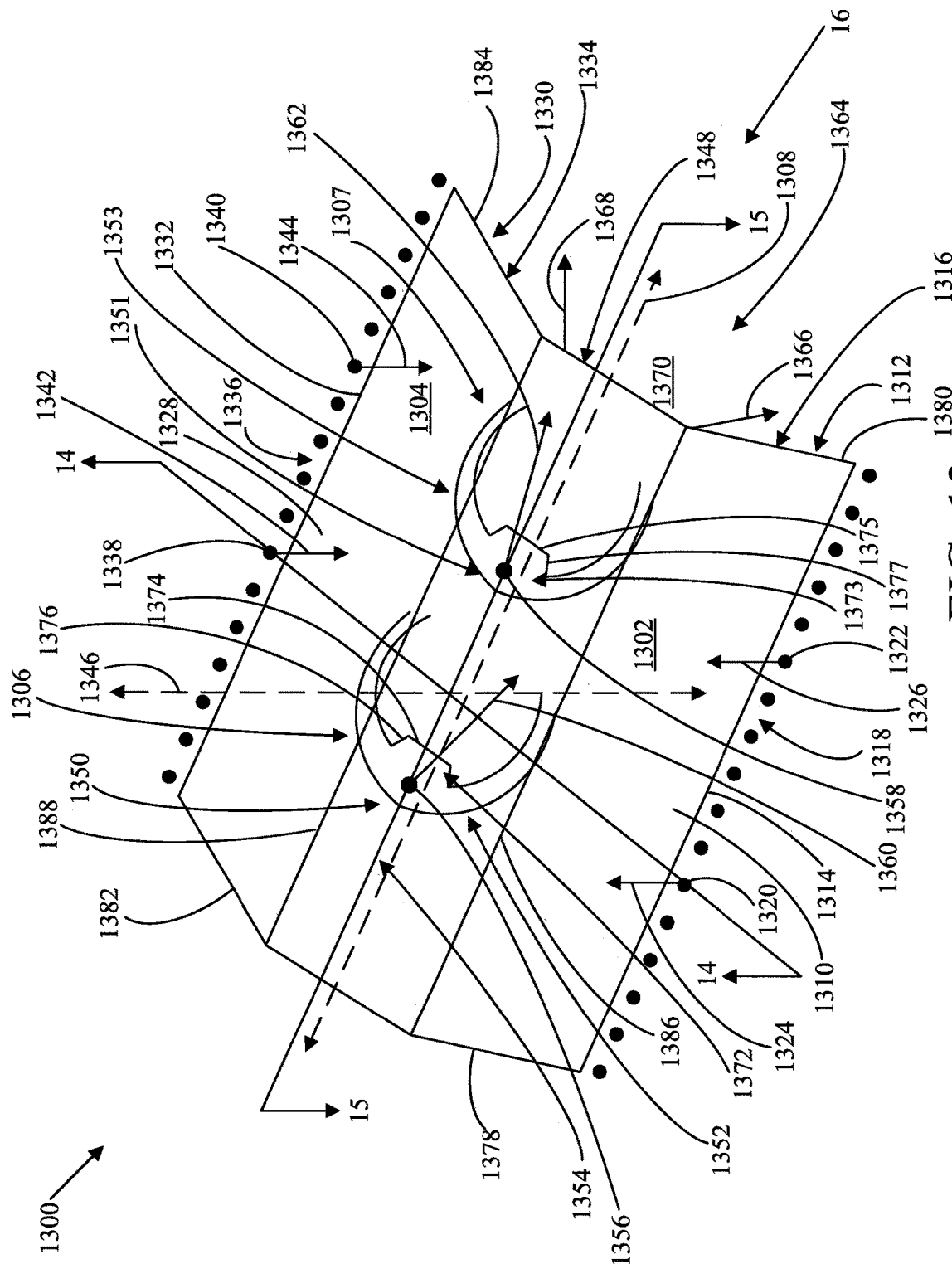
FIG. 13 is a schematic top perspective view showing an example [1300] of an implementation of a lighting system.
Figure 14:
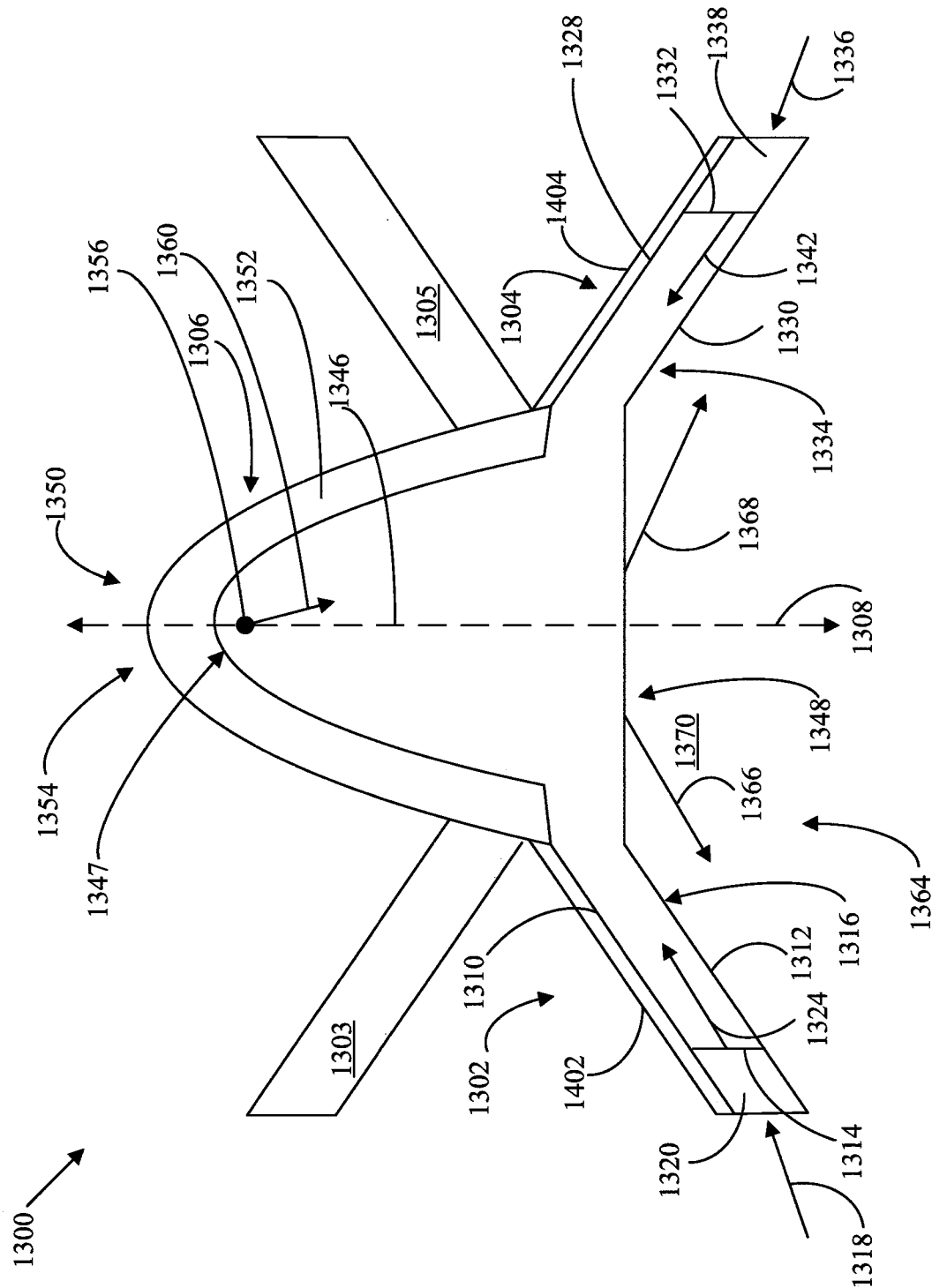
FIG. 14 is a schematic cross-sectional view taken along the line 14-14 showing the example [1300] of the lighting system.
Figure 15:
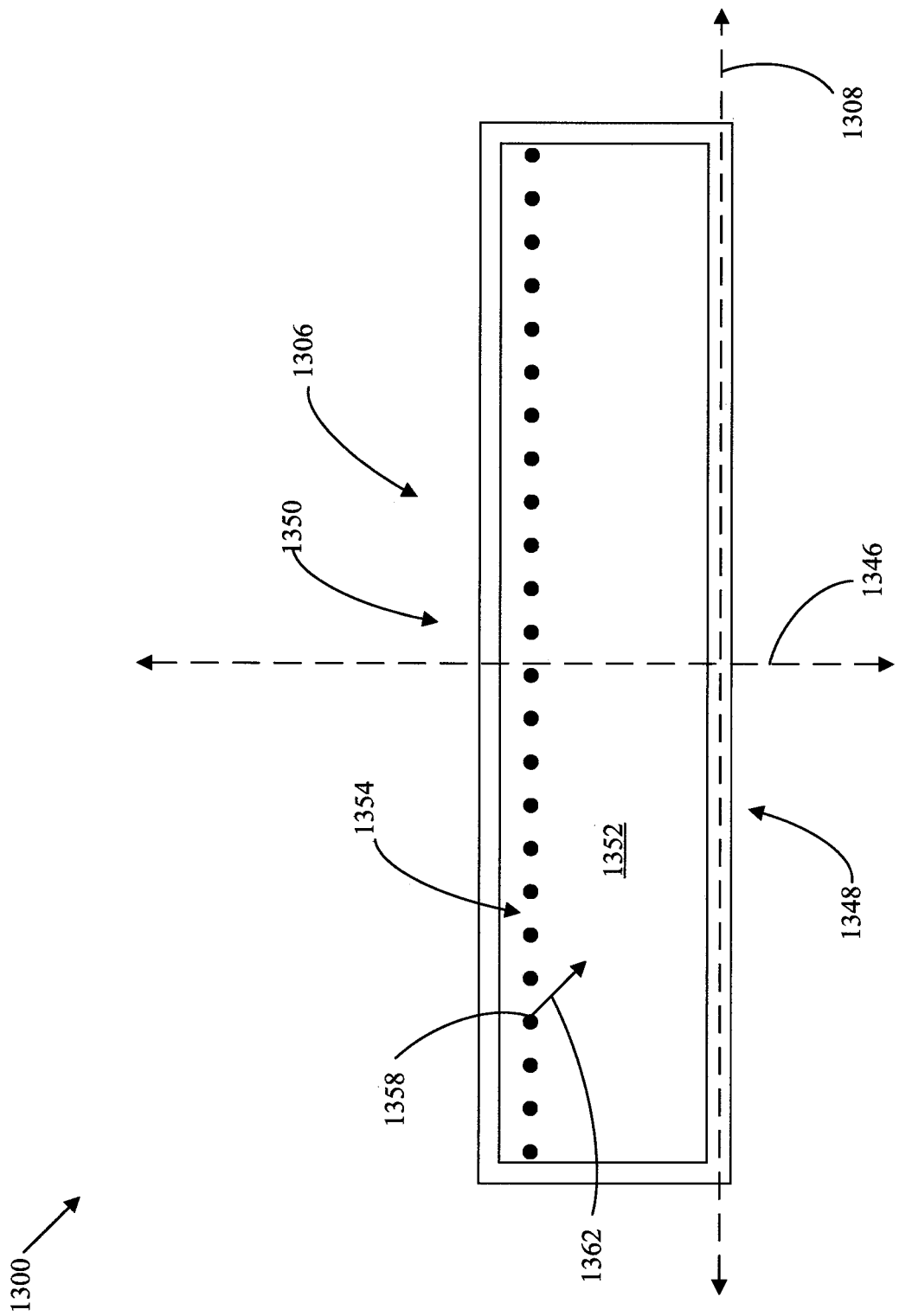
FIG. 15 is a schematic cross-sectional view taken along the line 15-15 showing the example [1300] of the lighting system.
Figure 16:
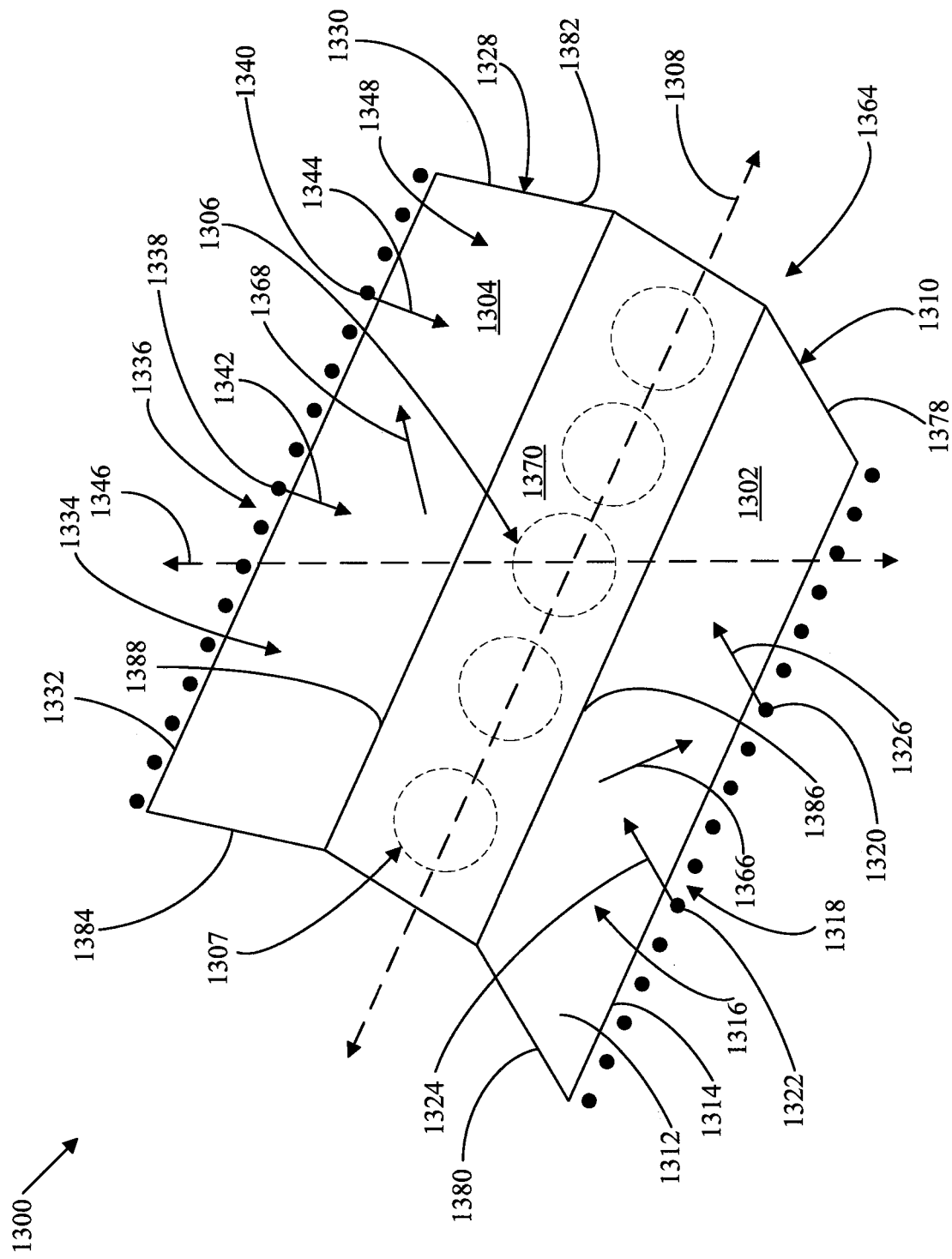
FIG. 16 is a schematic bottom perspective view taken along the line 16 showing the example [1300] of an implementation of a lighting system.

FIG. 13 is a schematic top perspective view showing an example [1300] of an implementation of a lighting system. FIG. 14 is a schematic cross-sectional view taken along the line 14-14 showing the example [1300] of the lighting system. FIG. 15 is a schematic cross-sectional view taken along the line 15-15 showing the example [1300] of the lighting system. FIG. 16 is a schematic bottom perspective view taken along the line 16 showing the example [1300] of an implementation of a lighting system.

Examples [100], [500], [900], [1300], [1800], [2300], and [2800] of lighting systems are discussed herein, respectively, in connection with FIGS. 1-4; 5-8; 9-12; 13-16; 18-21; 22-26; and 27-31. Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. It is understood throughout this specification that a lighting system [100], [500], [900], [1300], [1800], [2300], [2800] may include any of the features or combinations of features that are disclosed in connection with any one or more of such lighting systems. It is further understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is additionally understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussion of the example [1300] of an implementation of the lighting system.

As shown in FIGS. 13-16, the example [1300] of the implementation of the lighting system includes: an edge-lit lightguide panel [1302]; another edge-lit lightguide panel [1304]; a bowl reflector [1306]; and an additional bowl reflector [1307]. In the example [1300], the edge-lit lightguide panel [1302] is extended along a longitudinal axis [1308] of the lighting system. The edge-lit lightguide panel [1302] in the example [1300] of the lighting system further has a pair of mutually-opposing panel surfaces [1310], [1312]. The edge-lit lightguide panel [1302] in the example [1300] of the lighting system also has a peripheral edge [1314] being extended along and spaced transversely away from the longitudinal axis [1308]. In the example [1300] of the lighting system, a one [1312] of the pair of panel surfaces includes a first light output interface [1316].

The example [1300] of the lighting system also includes a visible-light source [1318] including a plurality of semiconductor light-emitting devices [1320], [1322]. In the example [1300] of the lighting system, the visible-light source [1318] is configured for generating visible-light emissions [1324], [1326] from the plurality of semiconductor light-emitting devices [1320], [1322]. Further in the example [1300] of the lighting system, the visible-light source [1318] is located along the peripheral edge [1314] for directing the visible-light emissions [1324], [1326] into the edge-lit lightguide panel [1302].

In the example [1300] of the lighting system, the another edge-lit lightguide panel [1304] is extended along the longitudinal axis [1308]. Additionally in the example [1300] of the lighting system, the another edge-lit lightguide panel [1304] has another pair of mutually-opposing panel surfaces [1328], [1330]. In the example [1300] of the lighting system, the another edge-lit lightguide panel [1304] has another peripheral edge [1332] being extended along and spaced transversely away from the longitudinal axis [1308]. Further, a one [1330] of the another pair of panel surfaces in the example [1300] of the lighting system includes a second light output interface [1334].

The example [1300] of the lighting system additionally includes another visible-light source [1336] including another plurality of semiconductor light-emitting devices [1338], [1340]. In the example [1300] of the lighting system, the another visible-light source [1336] is configured for generating additional visible-light emissions [1342], [1344] from the another plurality of semiconductor light-emitting devices [1338], [1340]. Further in the example [1300] of the lighting system, the another visible-light source [1336] is located along the another peripheral edge [1332] for directing the additional visible-light emissions [1342], [1344] into the another edge-lit lightguide panel [1304].

In the example [1300] of the lighting system, the bowl reflector [1306] has a central light-emission axis [1346] being transverse to the longitudinal axis [1308]. The bowl reflector [1306] in the example [1300] of the lighting system includes a third light output interface [1348] being located between the first and second light output interfaces [1316], [1334]. In the example [1300] of the lighting system, the third light output interface [1348] is spaced apart from a central light input interface [1350] by a visible-light-reflective side surface [1352]. The visible-light-reflective side surface [1352] in the example [1300] of the lighting system is extended along the central light-emission axis [1346] and defines a portion of a cavity [1347]. In the example [1300] of the lighting system, the bowl reflector [1306] has a further visible-light source [1354] including a further plurality of semiconductor light-emitting devices [1356], [1358]. The further visible-light source [1354] in the example [1300] of the lighting system is configured for generating further visible-light emissions [1360], [1362] from the further plurality of semiconductor light-emitting devices [1356], [1358]. In the example [1300] of the lighting system, the further visible-light source [1354] is located at the central light input interface [1350] for directing the further visible-light emissions [1360], [1362] through the cavity [1347] of the bowl reflector [1306] to the third light output interface [1348].

In the example [1300] of the lighting system, the additional bowl reflector [1307] has an additional central light-emission axis [1347] being transverse to the longitudinal axis [1308]. The additional bowl reflector [1307] in the example [1300] of the lighting system includes a fourth light output interface [1349] being spaced apart along the longitudinal axis [1308] away from the third light output interface [1348] and being located between the first and second light output interfaces [1316], [1334]. In the example [1300] of the lighting system, the fourth light output interface [1349] is spaced apart from an additional central light input interface [1351] by an additional visible-light-reflective side surface [1353]. The additional visible-light-reflective side surface [1353] in the example [1300] of the lighting system is extended along the additional central light-emission axis [1347] and defines a portion of an additional cavity [1347]. In the example [1300] of the lighting system, the additional bowl reflector [1307] has an additional visible-light source [1355] including an additional plurality of semiconductor light-emitting devices [1357], [1359]. The additional visible-light source [1355] in the example [1300] of the lighting system is configured for generating other visible-light emissions [1361], [1363] from the additional plurality of semiconductor light-emitting devices [1357], [1359]. In the example [1300] of the lighting system, the additional visible-light source [1355] is located at the additional central light input interface [1351] for directing the other visible-light emissions [1361], [1363] through the additional cavity [1347] of the additional bowl reflector [1307] to the fourth light output interface [1349].

As examples, the edge-lit lightguide panel [1302] may direct the visible-light emissions [1324], [1326] for emission from the first light output interface [1316]; and the another edge-lit lightguide panel [1304] may direct the additional visible-light emissions [1342], [1344] for emission from the second light output interface [1334]; and the bowl reflector [1306] may direct the further visible-light emissions [1360], [1362] for emission from the third light output interface [1348]; and the additional bowl reflector [1307] may direct the other visible-light emissions [1361], [1363] for emission from the fourth light output interface [1349].

In the example [1300] of the lighting system, the first, second, third and fourth light output interfaces [1316], [1334], [1348], [1349] cooperatively define an emission aperture [1364] for forming combined visible-light emissions [1366], [1368] including the visible-light emissions [1324], [1326], the additional visible-light emissions [1342], [1344], the further visible-light emissions [1360], [1362], and the other visible-light emissions [1361], [1363]. Further in the example [1300] of the lighting system, the emission aperture [1364] forms a shielding zone [1370] for redirecting some of the combined visible-light emissions [1366], [1368].

In examples [1300] of the lighting system, the visible-light-reflective side surface [1352] and the additional visible-light-reflective side surface [1353] each may have a frusto-conical cross-sectional profile in both of the directions of the lines 14-14 and 15-15 being perpendicular to the longitudinal axis [1308]. In further examples [1300] of the lighting system, the additional bowl reflector [1307] may have any combination of the further structural and performance features discussed herein with regard to the bowl reflector [1306]. As additional examples [1300], the lighting system may include (not shown) further bowl reflectors in addition to the bowl reflectors [1306], [1307]. In examples [1300] of the lighting system, such further bowl reflectors may have any combination of the further structural and performance features discussed herein with regard to the bowl reflectors [1306] and [1307], and may be mutually spaced apart in the same manner by which the bowl reflectors [1306], [1307] are spaced apart along the longitudinal axis [1308].

In some examples [1300] of the lighting system, the bowl reflector [1306] (and likewise the additional bowl reflector [1307]) may be a converging bowl reflector [1306] being configured for causing convergence of the further visible-light emissions [1360], [1362] in their travel along the central light-emission axis [1346] toward the third light output interface [1348]. In examples [1300] of the lighting system, the visible-light-reflective side surface [1352] of the bowl reflector [1306] may be configured for reflecting the further visible-light emissions [1360], [1362] toward a horizon [1363] of the bowl reflector [1306] as having a beam angle being within a range of between about ten degrees (10°) and about thirty degrees (30°). As further examples [1300] of the lighting system, the visible-light-reflective side surface [1352] of the bowl reflector [1306] may be configured for reflecting the further visible-light emissions [1360], [1362] toward a horizon [1363] of the bowl reflector [1306] as having a field angle being within a range of between about twenty degrees (20°) and about sixty degrees (60°).

As additional examples [1300] of the lighting system, the visible-light-reflective side surface [1352] of the bowl reflector [1306] (and likewise of the additional bowl reflector [1307]) may be a specular light-reflective surface. In further examples [1300] of the lighting system, the visible-light-reflective side surface [1352] of the bowl reflector [1306] (and likewise the additional bowl reflector [1307]) may be a metallic light-reflective surface. In some of those examples [1300] of the lighting system, the metallic layer of the visible-light-reflective side surface [1352] may have a composition that includes: silver, platinum, palladium, aluminum, zinc, gold, iron, copper, tin, antimony, titanium, chromium, nickel, or molybdenum.

In examples [1300] of the lighting system, the visible-light-reflective side surface [1352] of the bowl reflector [1306] (and likewise of the additional bowl reflector [1307]) may have a minimum visible-light reflection value from any incident angle being: at least about ninety percent (90%); or at least about ninety-five percent (95%). As further examples [1300] of the lighting system, the visible-light-reflective side surface [1352] of the bowl reflector [1306] may have a maximum visible-light transmission value from any incident angle being: no greater than about ten percent (10%); or no greater than about five percent (5%).

In examples [1300] of the lighting system, a portion of the visible-light-reflective side surface [1352] of the bowl reflector [1306] (and likewise of the additional bowl reflector [1307]) may be a parabolic surface. In further examples [1300] of the lighting system, a portion of the visible-light-reflective side surface [1352] of the bowl reflector [1306] (and likewise of the additional bowl reflector [1307]) may be a part of an elliptic paraboloid or a part of a paraboloid of revolution.

As further examples [1300] of the lighting system, a portion of the visible-light-reflective side surface [1352] of the bowl reflector [1306] (and likewise of the additional bowl reflector [1307]) may be a multi-segmented parabolic surface. In additional examples [1300] of the lighting system, the visible-light-reflective side surface [1352] may include a plurality of vertically-faceted sections being mutually spaced apart around and joined together around the central light-emission axis [1346]. Also in those additional examples [1300] of the lighting system, each one of the vertically-faceted sections may have a generally pie-wedge-shaped perimeter. Further in those additional examples [1300] of the lighting system, each one of the vertically-faceted sections may form a one of a plurality of facets of the visible-light-reflective side surface [1352]; and each one of the facets may have a concave visible-light reflective surface [1352]. Also in those additional examples [1300] of the lighting system, each one of the vertically-faceted sections may form a one of a plurality of facets of the visible-light-reflective side surface [1352]; and each one of the facets may have a convex visible-light reflective surface [1352]. Further in those additional examples [1300] of the lighting system, each one of the vertically-faceted sections may form a one of a plurality of facets of the visible-light-reflective side surface [1352]; and each one of the facets may have a generally flat visible-light reflective surface. As further examples [1300] of the lighting system, either or both of the bowl reflectors [1306], [1307], and any further such bowl reflectors included in the example [1300] of the lighting system, may be substituted by a lighting system as is disclosed in commonly-owned Xin Zhang et al., Patent Cooperation Treaty International patent application serial No. PCT/US2018/016662 filed on Feb. 2, 2018 and entitled "Lighting Systems Generating Partially-Collimated Light Emissions," the entirety of which hereby is incorporated herein by reference.

In some examples [1300] of the lighting system, the edge-lit lightguide panel [1302] may have a first pair of lateral edges [1378], [1380] being mutually spaced apart along the longitudinal axis [1308]; and the another edge-lit lightguide panel [1304] may have a second pair of lateral edges [1382], [1384] being mutually spaced apart along the longitudinal axis [1308]. Further in those examples [1300] of the lighting system, each one of the lateral edges [1378], [1380], [1382], [1384] may be linear; and the one [1312] of the pair of panel surfaces may be generally flat; and the one [1330] of the another pair of panel surfaces may be generally flat.

In additional examples [1300] of the lighting system, the edge-lit lightguide panel [1302] may be configured for directing the visible-light emissions [1324], [1326] in first directions towards the longitudinal axis [1308]; and the another edge-lit lightguide panel [1304] may be configured for directing the additional visible-light emissions [1342], [1344] in second directions, being symmetrically opposed to the first directions, towards the longitudinal axis [1308]. In those additional examples, the edge-lit lightguide panel [1302] may further direct the visible-light emissions [1324], [1326] for emission from the first light output interface [1316]; and the another edge-lit lightguide panel [1304] may further direct the additional visible-light emissions [1342], [1344] for emission from the second light output interface [1334]; and the bowl reflector [1306] may direct the further visible-light emissions [1360], [1362] for emission from the third light output interface [1348]; and the another bowl reflector [1307] may direct the other visible-light emissions [1361], [1363] for emission from the fourth light output interface [1349].

In some examples [1300] of the lighting system, the edge-lit lightguide panel [1302] and the another edge-lit lightguide panel [1304] may be integrally formed together with the bowl reflectors [1306], [1307]. In other examples [1300] of the lighting system, the edge-lit lightguide panel [1302] may have a central edge represented by a dashed line

[1386] being extended along the longitudinal axis [1308] and being spaced transversely away from the peripheral edge [1314]; and the another edge-lit lightguide panel [1304] may have another central edge represented by a dashed line [1388] being extended along the longitudinal axis [1308] and being spaced transversely away from the another peripheral edge [1332]; and the bowl reflectors [1306], [1307] may be located between and attached to the central edge [1386] and the another central edge [1388].

In examples [1300] of the lighting system, the edge-lit lightguide panel [1302] may include internal light-dispersing features; and the another edge-lit lightguide panel [1304] may include additional internal light-dispersing features. Further in those examples [1300] of the lighting system, the internal light-dispersing features may include positive elements such as: particles having various shapes being e.g. spheroidal or polygonal; particles having various material compositions including, e.g., phosphors, quantum dots, and pigmented dots; micro-optical features such as spherical or elliptical lenses, and reflective micro-scale particles. Additionally in those examples [1300] of the lighting system, the internal light-dispersing features may include negative elements such as: hot-pressed micro-patterns e.g. micro-grooves, lenticular patterns, prisms, fresnel s, conical arrays, pyramids, or domes. Also in those examples [1300] of the lighting system, the internal light-dispersing features may have a gradually-increasing density in a direction from the peripheral edge [1314] towards the longitudinal axis [1308]; and the additional internal light-dispersing features may have a gradually-increasing density in another direction from the another peripheral edge [1332] towards the longitudinal axis [1308].

In examples [1300] of the lighting system, the edge-lit lightguide panel [1302] may include external light-dispersing features on the one [1312] or the another one [1310] of the pair of panel surfaces; and the another edge-lit lightguide panel [1304] may include additional external light-dispersing features on the one [1330] or the another one [1328] of the another pair of panel surfaces. Further in those examples [1300] of the lighting system, the external light-dispersing features may include positive elements such as: pigmented dots; or micro-optical features such as spherical or elliptical lenses. Also in those examples [1300] of the lighting system, the external light-dispersing features may include negative elements such as: hot-pressed textured surfaces such as micro-patterns e.g. micro-grooves, lenticular patterns, prisms, fresnels, conical arrays, pyramids, domes, or laser-ablated regions. In addition in those examples [1300] of the lighting system, the external light-dispersing features may have a gradually-increasing density in a direction from the peripheral edge [1314] towards the longitudinal axis [1308]; and the additional external light-dispersing features may have a gradually-increasing density in another direction from the another peripheral edge [1332] towards the longitudinal axis [1308].

In examples [1300] of the lighting system, the another one [1310] of the pair of panel surfaces may have a light-reflective layer [1402]; and the another one [1328] of the another pair of panel surfaces may have another light-reflective layer [1404]. Further in those examples [1300] of the lighting system, the another one [1310] of the pair of panel surfaces may have a specular light-reflective layer [1402]; and the another one [1328] of the another pair of panel surfaces may have another specular light-reflective layer [1404]. Additionally in those examples [1300] of the lighting system, the another one [1310] of the pair of panel surfaces may have a metallic light-reflective layer [1402]; and the another one [1328] of the another pair of panel surfaces may have another metallic light-reflective layer [1404]. In some of those examples [1300] of the lighting system, the metallic light-reflective layers [1402], [1404] may have a composition that includes: silver, platinum, palladium, aluminum, zinc, gold, iron, copper, tin, antimony, titanium, chromium, nickel, or molybdenum. In additional examples [1300] of the lighting system, the another one [1310] of the pair of panel surfaces may have a light-reflective layer [1402]; and the another one [1328] of the another pair of panel surfaces may have another light-reflective layer [1404]; and each of the light-reflective layers [1402], [1404] may have a minimum visible-light reflection value from any incident angle being at least about ninety percent (90%) or being at least about ninety-five percent (95%).

In examples [1300] of the lighting system, the plurality of the semiconductor light-emitting devices [1320], [1322] may include an array of the semiconductor light-emitting devices [1320], [1326] being mutually spaced apart along the longitudinal axis [1308]; and the another plurality of the semiconductor light-emitting devices [1338], [1340] may include another array of the semiconductor light-emitting devices [1338], [1340] being mutually spaced apart along the longitudinal axis [1308]. Additionally in those examples [1300] of the lighting system, the further plurality of the semiconductor light-emitting devices [1356], [1358] may include a further array of the semiconductor light-emitting devices [1356], [1358] being mutually spaced apart along the longitudinal axis [1308]. Further in those examples [1300] of the lighting system, the additional plurality of the semiconductor light-emitting devices [1357], [1359] may include an additional array of the semiconductor light-emitting devices [1357], [1359] being mutually spaced apart along the longitudinal axis [1308].

In examples [1300] of the lighting system, the plurality of the semiconductor light-emitting devices [1320], [1322] may be collectively configured for generating the visible-light emissions [1324], [1326] as having a selectable perceived color point; and the another plurality of the semiconductor light-emitting devices [1338], [1340] may be collectively configured for generating the additional visible-light emissions [1342], [1344] as having another selectable perceived color point. Additionally in those examples [1300] of the lighting system, the further plurality of the semiconductor light-emitting devices [1356], [1358] may be collectively configured for generating the further visible-light emissions [1360], [1362] as having a further selectable perceived color point. Further in those examples [1300] of the lighting system, the additional plurality of the semiconductor light-emitting devices [1357], [1359] may be collectively configured for generating the other visible-light emissions [1361], [1363] as having another selectable perceived color point.

In some examples [1300] of the lighting system, the plurality of the semiconductor light-emitting devices [1320], [1322] may include a plurality of clusters of the semiconductor light-emitting devices [1320], [1322] being co-located together, each one of the plurality of clusters being collectively configured for generating the visible-light emissions [1324], [1326] as having a selectable perceived color point; and the another plurality of the semiconductor light-emitting devices [1338], [1340] may include another plurality of clusters of the semiconductor light-emitting devices [1338], [1340] being co-located together, each one of the another plurality of clusters being collectively configured for generating the additional visible-light emissions [1342],

[1344] as having another selectable perceived color point. Also in that example [1300] of the lighting system, the further plurality of the semiconductor light-emitting devices [1356], [1358] may include a further plurality of clusters of the semiconductor light-emitting devices [1356], [1358] being co-located together, each one of the further plurality of clusters being collectively configured for generating the further visible-light emissions [1360], [1362] as having a further selectable perceived color point. Additionally in that example [1300] of the lighting system, the additional plurality of the semiconductor light-emitting devices [1357], [1359] may include an additional plurality of clusters of the semiconductor light-emitting devices [1357], [1359] being co-located together, each one of the additional plurality of clusters being collectively configured for generating the other visible-light emissions [1361], [1363] as having another selectable perceived color point.

As an example [1300] of the lighting system, each of the pluralities of clusters of the semiconductor light-emitting devices [1320], [1322], [1338], [1340], [1356], [1358], [1357], [1359] may include two or three or more co-located semiconductor light-emitting devices being configured for collectively generating the visible-light emissions [1324], [1326] and the additional visible-light emissions [1342], [1344] and the further visible-light emissions [1360], [1362] and the other visible-light emissions [1361], [1363] as having the respective selectable perceived color points.

In examples [1300] of the lighting system, a plurality of semiconductor light-emitting devices [1320], [1322], or a plurality of semiconductor light-emitting devices [1338], [1340], or a plurality of semiconductor light-emitting devices [1356], [1358], or a plurality of semiconductor light-emitting devices [1357], [1359], may be arranged in a chip-on-board (not shown) array, or in a discrete (not shown) array on a printed circuit board (not shown). Semiconductor light-emitting device arrays including chip-on-board arrays and discrete arrays may be conventionally fabricated by persons of ordinary skill in the art. Further, the semiconductor light-emitting devices [1320], [1322], [1338], [1340], [1356], [1358], [1357], [1359] of the example [1300] of the lighting system may be provided with drivers (not shown) and power supplies (not shown) being conventionally fabricated and configured by persons of ordinary skill in the art.

In examples [1300], the lighting system may be configured for causing emission of a portion of the further visible-light emissions [1360], [1362] (and likewise the other visible-light emissions [1361], [1363]) as being within a field angle of the bowl reflector [1306] (or likewise of the bowl reflector [1307]) and for causing emission of another portion of the further visible-light emissions [1360], [1362] as being outside the field angle of the bowl reflector [1306]; and the emission aperture [1364] may be configured for redirecting some of the another portion of the further visible-light emissions [1360], [1362]. Further in those examples [1300] of the lighting system, the bowl reflector [1306] may, as examples, have a beam angle being within a range of between about thirty degrees (30°) and about ten degrees (10°). Additionally in those examples [1300] of the lighting system, the bowl reflector [1306] may, as examples have a field angle being within a range of between about sixty degrees (60°) and about twenty degrees (20°).

In examples [1300] of the lighting system, the emission aperture [1364] may be positioned for redirecting a part of the another portion of the further visible-light emissions [1360], [1362] (or likewise of the other visible-light emissions [1361], [1363]) being emitted at the third light output interface [1348] in directions deviating from the central light-emission axis [1346] by greater than about seventy degrees (70°). In further examples [1300] of the lighting system, the emission aperture [1364] may be positioned for redirecting a part of the another portion of the further visible-light emissions [1360], [1362] being emitted at the third light output interface [1348] in directions deviating from the central light-emission axis [1346] by greater than about sixty degrees (60°).

As an example [1300] of the lighting system, the lateral edges [1378], [1380], [1382], [1384] of the edge-lit light-guide panels [1302], [1304] may be linear; and the one [1312] of the pair of panel surfaces may be generally flat; and the one [1330] of the another pair of panel surfaces may be generally flat. Further in that example [1300] of the lighting system, as can be seen in FIG. 14, the flat panel surfaces [1312], [1330] of the emission aperture [1364] may be cooperatively positioned for mechanically shielding and thus redirecting some of the further visible-light emissions [1360], [1362] being emitted at the third light output interface [1348] in directions deviating from the central light-emission axis [1346] by greater than about sixty degrees (60°). Additionally in that example [1300] of the lighting system, redirection of the visible-light emissions [1360], [1362] being emitted at the third light output interface [1348] in high-angle directions being greater than about sixty degrees (60°) or seventy degrees (70°) may substantially reduce objectionable glare.

In examples [1300] of the lighting system, the bowl reflector [1306] (or likewise the additional bowl reflector [1307]) may have a beam angle being within a range of between about thirty degrees (30°) and about twenty degrees (20°). Further in those examples [1300] of the lighting system, the bowl reflector [1306] may have a field angle being within a range of between about sixty degrees (60°) and about forty degrees (40°). Additionally in those examples [1300], the lighting system may be configured for causing emission of a portion of the further visible-light emissions [1360], [1362] as being within the field angle of the bowl reflector [1306] and for causing emission of another portion of the further visible-light emissions [1360], [1362] as being outside the field angle of the bowl reflector [1306]; and the emission aperture [1364] may be configured for redirecting some of the another portion of the further visible-light emissions [1360], [1362]. Further in those examples [1300], the emission aperture [1364] may be positioned for redirecting a part of the another portion of the further visible-light emissions [1360], [1362] being emitted at the third light output interface [1348] in directions deviating from the central light-emission axis [1346] by greater than about sixty degrees (60°), or deviating from the central light-emission axis by greater than about seventy degrees (70°).

In other examples [1300] of the lighting system, the bowl reflector [1306] (or likewise the additional bowl reflector [1307]) may have a beam angle being within a range of between about twenty degrees (20°) and about ten degrees (10°); or within a range of between about fifteen degrees (15°) and about ten degrees (10°). Further in those examples [1300] of the lighting system, the bowl reflector [1306] may have a field angle being respectively within a range of between about forty degrees (40°) and about twenty degrees (20°), or within a range of between about thirty degrees (30°) and about twenty degrees (20°). Further in those examples [1300] of the lighting system, the third light output interface [1348] may include internal or external light-dispersing features; and the third light output interface [1348] may cause the bowl reflector [1306] to have an effective field angle being within a range of between about sixty degrees (60°) and about forty degrees (40°). Additionally in those examples [1300], the lighting system may be configured for causing emission of a portion of the further visible-light emissions [1360], [1362] as being within the effective field angle of the bowl reflector [1306] and for causing emission of another portion of the further visible-light emissions [1360], [1362] as being outside the effective field angle of the bowl reflector [1306]; and the emission aperture [1364] may be configured for redirecting some of the another portion of the further visible-light emissions [1360], [1362]. Further in those examples [1300], the emission aperture [1364] may be positioned for redirecting a part of the another portion of the further visible-light emissions [1360], [1362] being emitted at the third light output interface [1348] in directions deviating from the central light-emission axis [1346] by greater than about sixty degrees (60°), or deviating from the central light-emission axis by greater than about seventy degrees (70°).

In examples [1300], the lighting system may include a controller (not shown) for the visible-light source [1318] and for the another visible-light source [1336] and for the further visible-light source [1354] and for the additional visible-light source [1355], the controller being configured for causing the visible-light emissions [1324], [1326] to have a selectable perceived color point and for causing the additional visible-light emissions [1342], [1344] to have another selectable perceived color point and for causing the further visible-light emissions [1360], [1362] to have a further selectable perceived color point and for causing the other visible-light emissions [1361], [1363] to have an additional selectable perceived color point. Further in those examples [1300] of the lighting system, the controller may be configured for causing the visible-light emissions [1324], [1326] to have a selectable and adjustable intensity and for causing the additional visible-light emissions [1342], [1344] to have another selectable and adjustable intensity and for causing the further visible-light emissions [1360], [1362] to have a further selectable and adjustable intensity and for causing the other visible-light emissions [1361], [1363] to have an additional selectable and adjustable intensity. Additionally in those examples [1300] of the lighting system, the controller may be configured for causing the combined visible-light emissions [1366], [1368] to generate a down-lighting pattern being: wall graze, table with wall fill, wall wash left, wall wash right, double wall wash, wall wash left plus floor, wall wash right plus floor, room, or batwing. Also in those examples [1300] of the lighting system, the controller may be configured for selection among a plurality of different pre-programmed combinations of the intensities for the visible-light emissions [1324], [1326], the additional visible-light emissions [1342], [1344], the further visible-light emissions [1360], [1362] and the other visible-light emissions [1361], [1363]. Further in those examples [1300] of the lighting system, the controller may be configured for adjusting, over a selectable time period, the intensities for the visible-light emissions [1324], [1326], the additional visible-light emissions [1342], [1344], the further visible-light emissions [1360], [1362] and the other visible-light emissions [1361], [1363] from a one of the plurality of pre-programmed combinations to another one of the plurality of pre-programmed combinations. Additionally in those examples [1300], the lighting system may further include an ambient light sensor (not shown); and the controller may be configured, in response to the ambient light sensor, for adjusting the intensities for the visible-light emissions [1324], [1326], the additional visible-light emissions [1342], [1344], the further visible-light emissions [1360], [1362], and the other visible-light emissions [1361], [1363].

In other examples [1300], the lighting system may include a controller (not shown) for the visible-light source [1318] being configured for causing the visible-light emissions [1324], [1326] to have a selectable perceived color point; and may include another controller (not shown) for the another visible-light source [1336] being configured for causing the additional visible-light emissions [1342], [1344] to have another selectable perceived color point; and may include a further controller (not shown) for the further visible-light source [1354] being configured for causing the further visible-light emissions [1360], [1362] to have a further selectable perceived color point; and may include an additional controller (not shown) for the additional visible-light source [1355] being configured for causing the other visible-light emissions [1361], [1363] to have an additional selectable perceived color point. Further in those examples [1300] of the lighting system, the controller may be configured for causing the visible-light emissions [1324], [1326] to have a selectable and adjustable intensity; and the another controller may be configured for causing the additional visible-light emissions [1342], [1344] to have another selectable and adjustable intensity; and the further controller may be configured for causing the further visible-light emissions [1360], [1362] to have a further selectable and adjustable intensity; and the additional controller may be configured for causing the other visible-light emissions [1361], [1363] to have an additional selectable and adjustable intensity. In those examples [1300] of the lighting system, the controller and the another controller and the further controller and the additional controller may be collectively configured for causing the combined visible-light emissions [1366], [1368] to generate a down-lighting pattern being: wall graze, table with wall fill, wall wash left, wall wash right, double wall wash, wall wash left plus floor, wall wash right plus floor, room, or batwing. Additionally in those examples [1300] of the lighting system, the controller and the another controller and the further controller and the additional controller may be collectively configured for selection among a plurality of different pre-programmed combinations of the intensities for the visible-light emissions [1324], [1326], the additional visible-light emissions [1342], [1344], the further visible-light emissions [1360], [1362]; and the other visible-light emissions [1361], [1363]. Further in those examples [1300] of the lighting system, the controller and the another controller and the further controller and the additional controller may be collectively configured for adjusting, over a selectable time period, the intensities for the visible-light emissions [1324], [1326], the additional visible-light emissions [1342], [1344], the further visible-light emissions [1360], [1362], and the other visible-light emissions [1361], [1363], from a one of the plurality of pre-programmed combinations to another one of the plurality of pre-programmed combinations. In those examples [1300], the lighting system may also include an ambient light sensor; and the controller and the another controller and the further controller and the additional controller may be collectively configured, in response to the ambient light sensor, for adjusting the intensities for the visible-light emissions [1324], [1326], the additional visible-light emissions [1342], [1344], and the further visible-light emissions [1360], [1362], and the other visible-light emissions [1361], [1363].

In other examples [1300], the lighting system may further include an auxiliary edge-lit lightguide panel [1303] and another auxiliary edge-lit lightguide panel [1305]. In those other examples [1300] of the lighting system, the auxiliary edge-lit lightguide panel [1303] may be extended along the longitudinal axis [1308]. Further in those other examples [1300] of the lighting system, the auxiliary edge-lit lightguide panel [1303] may have an auxiliary pair of mutually-opposing panel surfaces [1309], [1311]; and the auxiliary edge-lit lightguide panel [1303] may have an auxiliary peripheral edge [1313] being extended along and spaced transversely away from the longitudinal axis [1308] Also in those other examples [1300] of the lighting system, a one [1309] of the auxiliary pair of panel surfaces may form an auxiliary light output interface [1315]. Additionally in those other examples [1300], the lighting system may have an auxiliary visible-light source [1317] including an auxiliary plurality of semiconductor light-emitting devices [1319], [1321]. In those other examples [1300] of the lighting system, the auxiliary visible-light source [1317] may be configured for generating auxiliary visible-light emissions [1323], [1325] from the auxiliary plurality of semiconductor light-emitting devices [1319], [1321]; and the auxiliary visible-light source [1317] may be located along the auxiliary peripheral edge [1313] for directing the auxiliary visible-light emissions [1323], [1325] into the auxiliary edge-lit lightguide panel [1303].

In those other examples [1300] of the lighting system, the another auxiliary edge-lit lightguide panel [1305] may be extended along the longitudinal axis [1308]. Further in those other examples [1300] of the lighting system, the another auxiliary edge-lit lightguide panel [1305] may have another auxiliary pair of mutually-opposing panel surfaces [1327], [1329]; and the another auxiliary edge-lit lightguide panel [1305] may have another auxiliary peripheral edge [1331] being extended along and spaced transversely away from the longitudinal axis [1308]. Also in those other examples [1300] of the lighting system, a one [1327] of the another auxiliary pair of panel surfaces may form another auxiliary light output interface [1333]. Additionally in those other examples [1300], the lighting system may have another auxiliary visible-light source [1335] including another auxiliary plurality of semiconductor light-emitting devices [1337], [1339]. In those other examples [1300] of the lighting system, the another auxiliary visible-light source [1335] may be configured for generating additional auxiliary visible-light emissions [1341], [1343] from the another auxiliary plurality of semiconductor light-emitting devices [1337], [1339]; and the another auxiliary visible-light source [1335] may be located along the another auxiliary peripheral edge [1331] for directing the additional auxiliary visible-light emissions [1341], [1343] into the another auxiliary edge-lit lightguide panel [1305].

Additionally in those other examples [1300], the first, second and third light output interfaces [1316], [1334], [1348] may cooperatively define the emission aperture [1364] for forming the combined visible-light emissions [1360], [1362] as being down-light emissions; and the auxiliary light output interface [1315] and the another auxiliary light output interface [1333] may cooperatively define another emission aperture [1345] for forming combined visible up-light emissions [1347], [1349] including the auxiliary visible-light emissions [1323], [1325] and the additional auxiliary visible-light emissions [1341], [1343].

Figure 17:
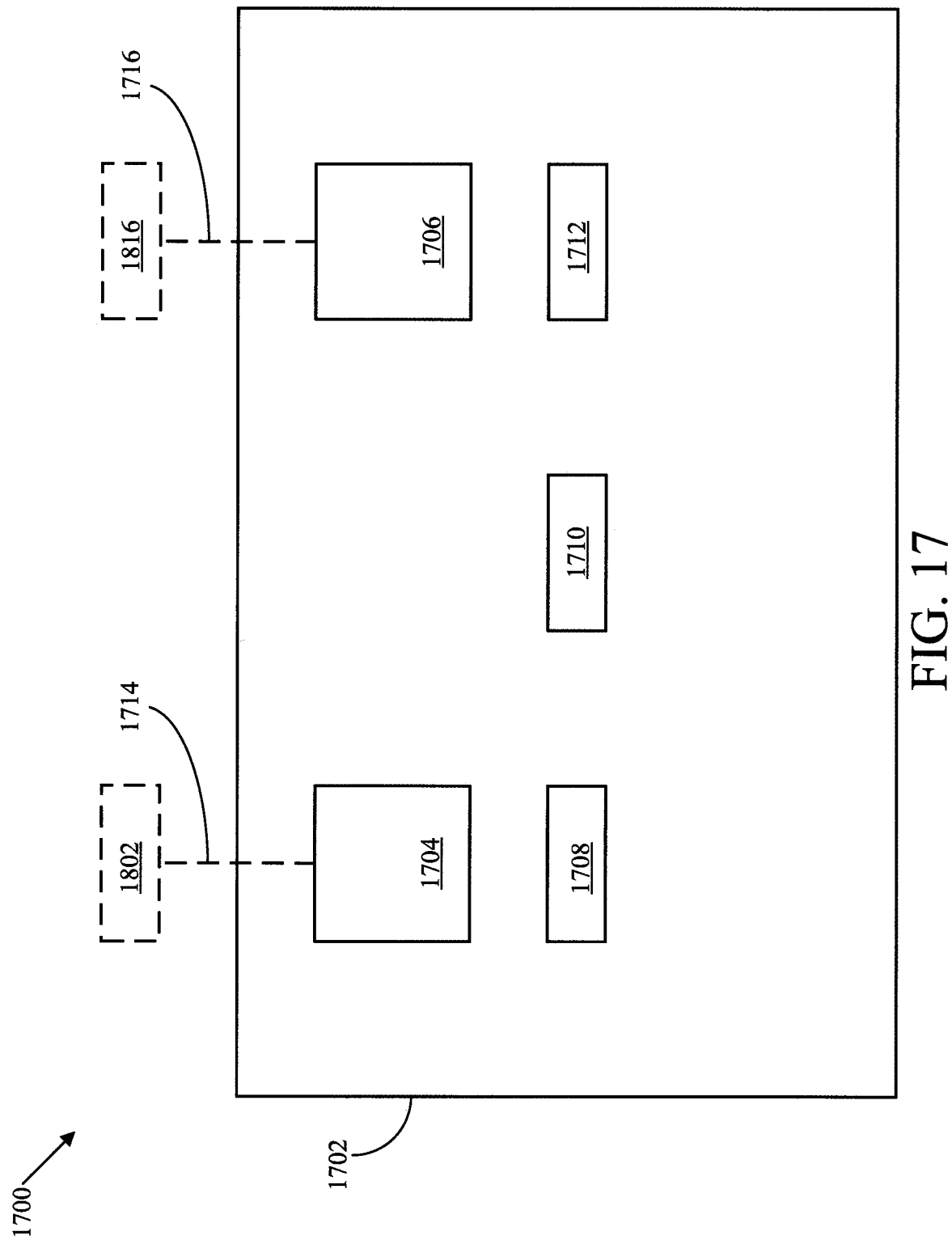
FIG. 17 is a schematic diagram of an example [1700] of a lighting controller.
Figure 18:
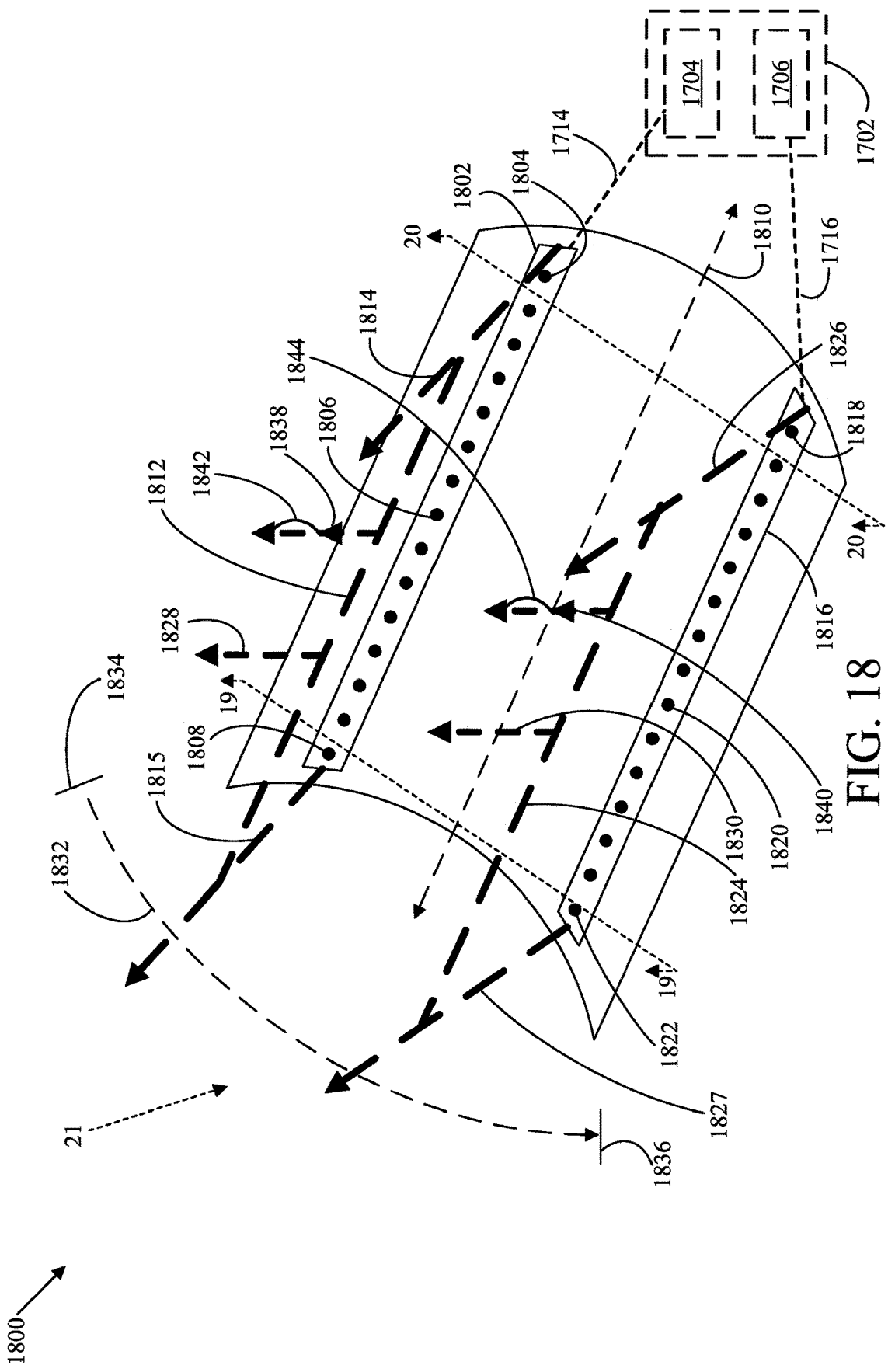
FIG. 18 is a schematic bottom perspective view showing an example [1800] of a lighting system together with which the example [1700] of the lighting controller may be utilized.
Figure 19:
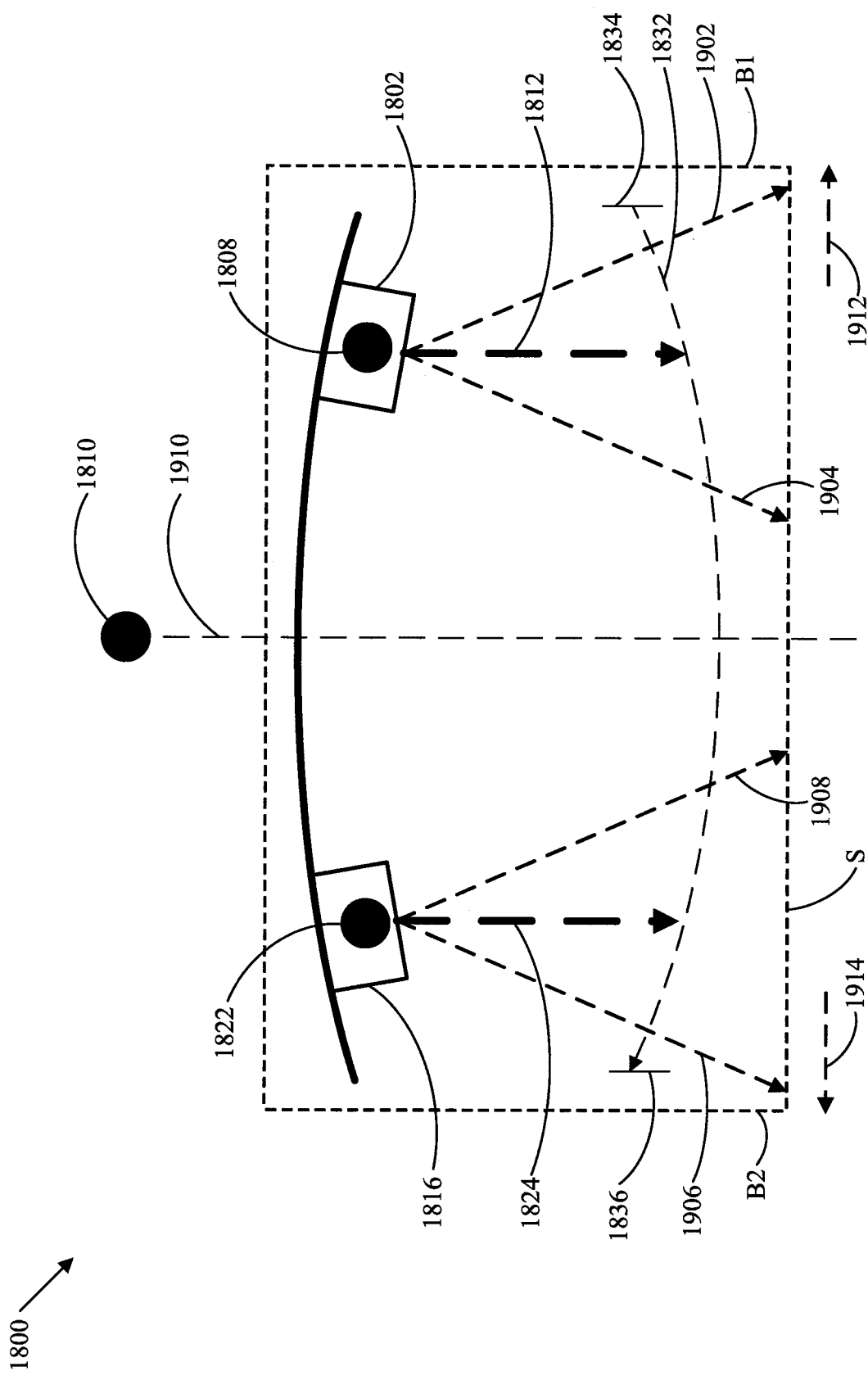
FIG. 19 is a schematic cross-sectional view taken along the line 19-19 showing the example [1800] of the lighting system together with which the example [1700] of the lighting controller may be utilized.
Figure 20:
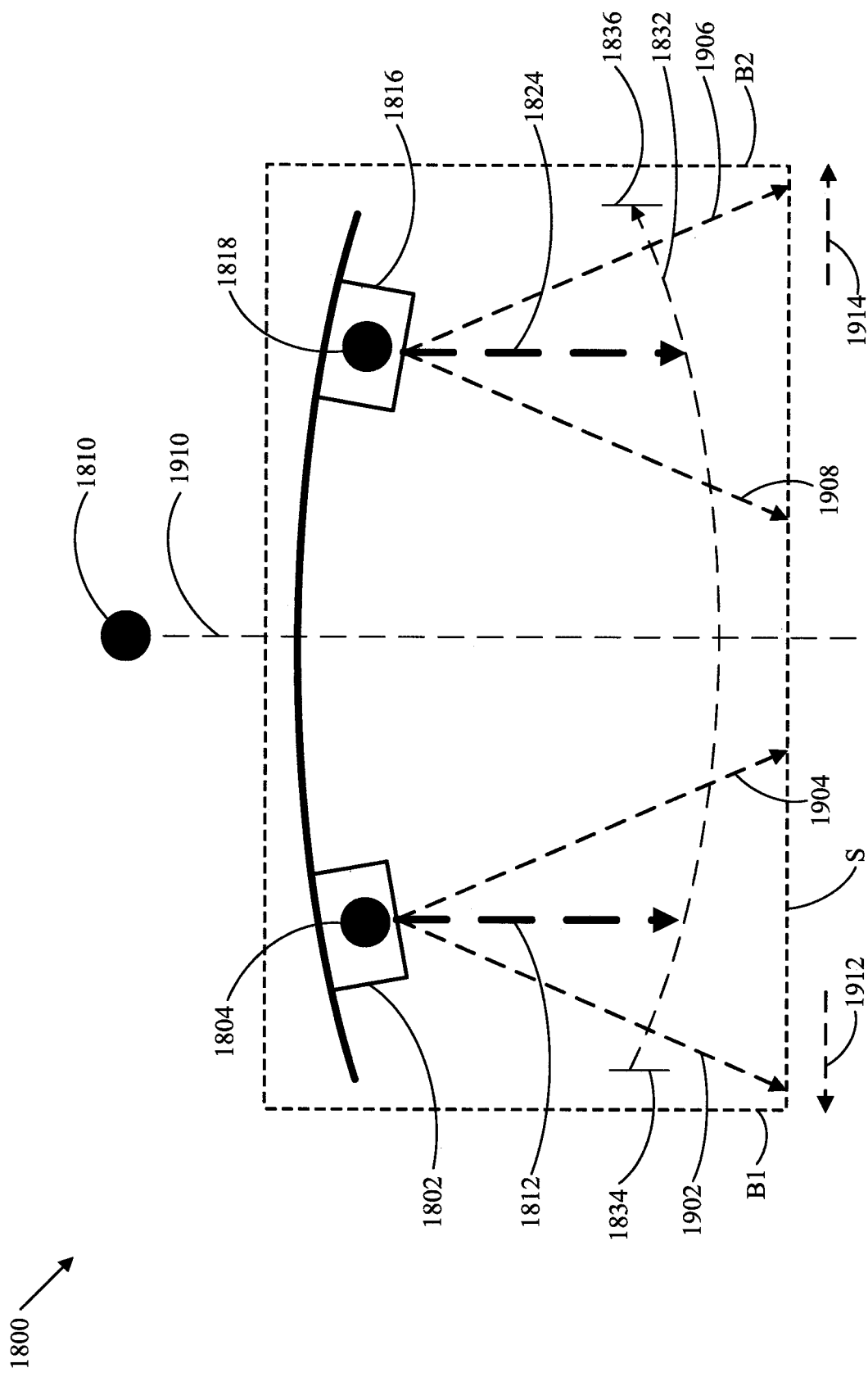
FIG. 20 is a schematic cross-sectional view taken along the line 20-20 showing the example [1800] of the lighting system together with which the example [1700] of the lighting controller may be utilized.
Figure 21:
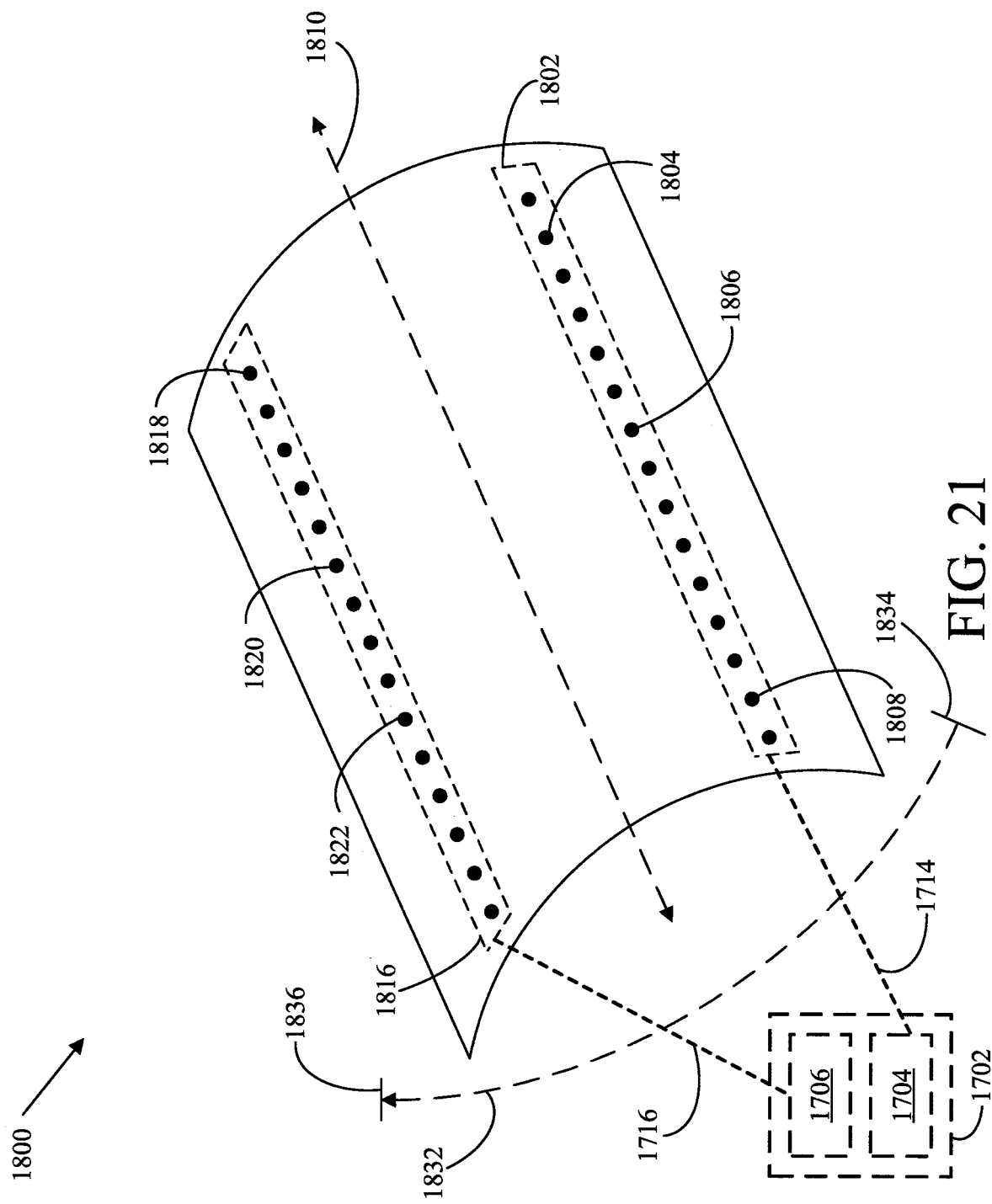
FIG. 21 is a schematic top perspective view taken along the line 21 showing the example [1800] of an implementation of a lighting system together with which the example [1700] of the lighting controller may be utilized.

FIG. 17 is a schematic diagram of an example [1700] of a lighting controller. FIG. 18 is a schematic bottom perspective view showing an example [1800] of an implementation of a lighting system together with which the example [1700] of the lighting controller may be utilized. FIG. 19 is a schematic cross-sectional view taken along the line 19-19 showing the example [1800] of the lighting system together with which the example [1700] of the lighting controller may be utilized. FIG. 20 is a schematic cross-sectional view taken along the line 20-20 showing the example [1800] of the lighting system together with which the example [1700] of the lighting controller may be utilized. FIG. 21 is a schematic top perspective view taken along the line 21 showing the example [1800] of an implementation of a lighting system together with which the example [1700] of the lighting controller may be utilized.

Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. Examples [100], [500], [900], [1300], [1800], [2300], and [2800] of lighting systems together with which the example [1700] of the lighting controller may be utilized are discussed herein, respectively, in connection with FIGS. 1-4; 5-8; 9-12; 13-16; 18-21; 22-26; and 27-31. It is understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is further understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. It is additionally understood throughout this specification that a lighting system [100], [500], [900], [1300], [1800], [2300], [2800] may include any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussions of the example [1700] of an implementation of the lighting controller and of the example [1800] of the lighting system.

As shown in FIGS. 17-21, the example [1700] of the implementation of the lighting controller includes a control system [1702] including a first control facility [1704] and a second control facility [1706]. In the example [1700] of the lighting controller, the first control facility [1704] is for controlling a first visible-light source [1802] including a first plurality of semiconductor light-emitting devices [1804], [1806], [1808] being spaced apart from and along a longitudinal axis [1810], the first visible-light source [1802] being positioned for directing a first beam [1812] of first visible-light emissions being represented by arrows [1814], [1815] from the first plurality of semiconductor light-emitting devices [1804], [1806], [1808] in a first beam direction also represented by the arrows [1814], [1815]. In the example [1700] of the lighting controller, the second control facility [1706] is for controlling a second visible-light source [1816] including a second plurality of semiconductor light-emitting devices [1818], [1820], [1822] being spaced apart from and along the longitudinal axis [1810], the second visible-light source [1816] being positioned for directing a second beam [1824] of second visible-light emissions being represented by arrows [1826], [1827] from the second plurality of semiconductor light-emitting devices [1818], [1820], [1822] in a second beam direction also being represented by the arrows [1826], [1827]. In the example [1700] of the lighting controller, the first control facility [1704] is programmed for controlling a first intensity being represented by an arrow [1828] of the first beam [1812] of the first visible-light emissions [1814], [1815], and the second control facility [1706] is programmed for controlling a second intensity being represented by an arrow [1830] of the second beam [1824] of the second visible light emissions [1826], [1827]. In the example [1700] of the lighting controller, the control system [1702] is programmed for modulating the first intensity [1828] of the first beam [1812] and the second intensity [1830] of the second beam [1824] in a manner for causing the first and second beams [1812], [1824] of the first and second visible-light emissions [1814], [1815], [1826], [1827] to collectively emulate a progression of ambient sunlight being represented by an arrow [1832].

In some examples [1700] of the lighting controller, the control system [1702] may be programmed for causing the first and second beams [1812], [1824] to collectively emulate the progression [1832] of ambient sunlight by initially modulating the first intensity [1828] of the first beam [1812] to relatively be substantially greater than the second intensity [1830] of the second beam [1824], and by then gradually modulating the second intensity [1830] of the second beam [1824] to relatively become substantially greater than the first intensity [1828] of the first beam [1812]. In further examples [1700] of the lighting controller, the control system [1702] may be programmed for facilitating an alignment being represented by arrows [1902], [1904] of the first beam [1812] towards a first boundary represented by a dashed line [B1] of an ambient space represented by a dashed box [S] and for facilitating another alignment being represented by arrows [1906], [1908] of the second beam [1824] towards a second boundary represented by a dashed line [B2] of the ambient space [S] being opposite to the first boundary [B1]. In some of those examples [1700] of the lighting controller, the control system [1702] may be programmed for facilitating the alignment [1902], [1904] of the first beam [1812] as being towards the first boundary [B1] of the ambient space [S] and for facilitating the alignment [1906], [1908] of the second beam [1824] as being towards the second boundary [B2] of the ambient space [S], with each of the first and second beams [1812], [1824] being respectively aligned toward the boundaries [B1] and [B2] as being spaced apart from and on opposite sides of a vertical dashed line [1910] intersecting the longitudinal axis [1810]. As additional examples [1700] of the lighting controller, the control system [1702] may include an indicator [1708] for facilitating an alignment being represented by the arrows [1902], [1904] of the first beam [1812] towards the first boundary [B1] of the ambient space [S] and for facilitating another alignment being represented by the arrows [1906], [1908] of the second beam [1824] towards the second boundary [B2] of the ambient space [S] being opposite to the first boundary [B1]. In some examples [1700] of the lighting controller, the control system [1702] may be programmed for facilitating an alignment being represented by arrows [1902], [1904] of the first beam [1812] towards an Eastward direction being represented by an arrow [1912] and for facilitating another alignment being represented by arrows [1906], [1908] of the second beam [1824] towards a Westward direction being represented by an arrow [1914]. In further examples [1700] of the lighting controller, the control system [1702] may provide the indicator [1708] as being for facilitating an alignment being represented by arrows [1902], [1904] of the first beam [1804] towards an Eastward direction being represented by the arrow [1912] and for facilitating another alignment being represented by the arrows [1906], [1908] of the second beam [1824] towards a Westward direction being represented by the arrow [1914].

In some examples [1700] of the lighting controller, the control system [1702] may regulate a distribution of a variable power input to: the first plurality of semiconductor light-emitting devices [1804], [1806], [1808] of the first visible-light source [1802] for controlling the intensity [1828] of the first visible-light emissions [1814], [1815]; and the second plurality of semiconductor light-emitting devices [1818], [1820], [1822] of the second visible-light source [1816] for controlling the intensity [1812] of the second visible-light emissions [1826], [1827].

In some examples [1700] of the lighting controller, the control system [1702] may be programmed for modulating the first intensity [1828] of the first beam [1812] and the second intensity [1830] of the second beam [1824] in a manner for causing the first and second beams [1812], [1824] of the first and second visible-light emissions [1814], [1815], [1826], [1827] to collectively emulate the progression of ambient sunlight [1832]: through a portion of a cycle extending from sunrise being represented by a line [1834] to sunset being represented by a line [1836]; or through a period beginning before sunrise; or through a period ending after sunset; or through a period both beginning before sunrise and ending after sunset. In some examples [1700] of the lighting controller, the control system [1702] may be programmed for modulating the first intensity [1828] of the first beam [1812] and the second intensity [1830] of the second beam [1824] in a manner for causing the first and second beams [1812], [1824] of the first and second visible-light emissions [1814], [1815], [1826], [1827] to collectively emulate the progression of ambient sunlight [1832] throughout the cycle extending from sunrise being represented by the line [1834] to sunset being represented by the line [1836]. In further examples [1700] of the lighting controller, the control system [1702] may be programmed for modulating the first intensity [1828] of the first beam [1812] and the second intensity [1830] of the second beam [1824] in a manner for causing the first and second beams [1812], [1824] of the first and second visible-light emissions [1814], [1815], [1826], [1827] to collectively initiate an emulation of the progression of ambient sunlight [1832] when a local sunrise occurs as represented by the line [1834] and to collectively conclude the emulation when a corresponding local sunset occurs as represented by the line [1836]. In some of those examples [1700] of the lighting controller, the control system [1702] may include an ambient light sensor [1710] being programmed for sensing an occurrence of the local sunrise [1834] or an occurrence of the local sunset [1836]. In other examples [1700] of the lighting controller, the control system [1702] may include a programmable user interface [1712] enabling an arbitrary selection of a simulated sunrise time [1834] and a simulated sunset time [1836]. In further examples [1700] of the lighting controller, the control system [1702] may be programmed for modulating the first intensity [1828] of the first beam [1812] and the second intensity [1830] of the second beam [1824] with a maximum ratio, of the first intensity [1828] divided by the second intensity [1830], or of the second intensity [1830] divided by the first intensity [1828], being at least about 10:1. In additional examples [1700] of the lighting controller, the control system [1702] may be programmed for modulating the first intensity [1828] of the first beam [1812] and the second intensity [1830] of the second beam [1824] with a maximum ratio, of the first intensity [1828] divided by the second intensity [1830], or of the second intensity [1830] divided by the first intensity [1828], being at least about 100:1.

In some examples [1700] of the lighting controller, the control system [1702] may be programmed for modulating the first intensity [1828] of the first beam [1812] in a first range, and for modulating the second intensity [1830] of the second beam [1824] in a second range, in a manner for causing the first and second beams [1812], [1824] of the first and second visible-light emissions [1814], [1815], [1826], [1827] to collectively emulate the progression of ambient sunlight [1832]. In further examples [1700] of the lighting controller, the control system [1702] may be programmed for controlling the first beam [1812] of the first visible-light emissions [1814], [1815] as having a first baseline intensity being represented by an arrow [1838] and for controlling the second beam [1824] of the second visible-light emissions [1826], [1827] as having a second baseline intensity being represented by an arrow [1840]; and the control system [1702] may be programmed for modulating the first intensity [1828] of the first beam [1812] in a first range [1842] being additive to the first baseline intensity [1838] and for modulating the second intensity [1830] of the second beam [1824] in a second range [1844] being additive to the second baseline intensity [1840], in the manner for causing the first and second beams [1812], [1824] of the first and second visible-light emissions [1814], [1815], [1826], [1827] to collectively emulate the progression of ambient sunlight [1832].

In some examples [1700] of the lighting controller, the control system [1702] may regulate a distribution of a variable baseline power input to: the first plurality of semiconductor light-emitting devices [1804], [1806], [1808] of the first visible-light source [1802] for controlling the baseline intensity [1838] of the first visible-light emissions [1814], [1815]; and the second plurality of semiconductor light-emitting devices [1818], [1820], [1822] of the second visible-light source [1816] for controlling the baseline intensity [1840] of the second visible-light emissions [1826], [1827]. Further in those examples [1700] of the lighting controller, the control system [1702] may regulate a distribution of a variable additive power input to: the first plurality of semiconductor light-emitting devices [1804], [1806], [1808] of the first visible-light source [1802] for controlling the additive intensity [1842] of the first visible-light emissions [1814], [1815]; and the second plurality of semiconductor light-emitting devices [1818], [1820], [1822] of the second visible-light source [1816] for controlling the additive intensity [1844] of the second visible-light emissions [1826], [1827].

In some examples [1700] of the lighting controller, the control system [1702] may include the first control facility [1704] being coupled as represented by a dashed line [1714] with the first visible-light source [1802] for controlling the first intensity [1828] of the first beam [1812] of the first visible-light emissions [1814], [1815]; and the control system [1702] may further include the second control facility [1706] being coupled as represented by a dashed line [1716] with the second visible-light source [1816] for controlling the second intensity [1830] of the second beam [1824] of the second visible-light emissions [1826], [1827].

In other examples [1700] of the lighting controller, the control system [1702] may include the first control facility [1704] as being for controlling the first visible-light source [1802] with the first plurality of semiconductor light-emitting devices [1804], [1806], [1808] being collectively configured for generating the first visible-light emissions [1814], [1815] as having a selectable first perceived color point [1812]; and the control system [1702] may include the second control facility [1706] as being for controlling the second visible-light source [1816] with the second plurality of semiconductor light-emitting devices [1818], [1820], [1822] being collectively configured for generating the second visible-light emissions [1826], [1827] as having a selectable second perceived color point [1824].

In further examples [1700] of the lighting controller, the control system [1702] may include the first control facility [1704] as being for controlling the first visible-light source [1802] with the first plurality of semiconductor light-emitting devices [1804], [1806], [1808] being collectively configured for generating the first visible-light emissions [1814], [1815] as having a selectable first perceived color point [1812], wherein a plurality of individual ones among the first plurality of semiconductor light-emitting devices [1804], [1806], [1808] may each emit visible-light having a different color point. Additionally in those examples [1700] of the lighting controller, the control system [1702] may include the second control facility [1706] as being for controlling the second visible-light source [1816] with the second plurality of semiconductor light-emitting devices [1818], [1820], [1822] being collectively configured for generating the second visible-light emissions [1826], [1827] as having a selectable second perceived color point [1824], wherein a plurality of individual ones among the second plurality of semiconductor light-emitting devices [1818], [1820], [1822] may each emit visible-light having a different color point.

FIGS. 17-21 also illustrate an example [1800] of an implementation of a lighting system. In some examples, the lighting system [1800] may include: the first visible-light source [1802]; and the second visible-light source [1816]; and the example [1700] of the lighting controller. In the example [1800] of the lighting system, the lighting controller [1700] may include the control system [1702]. Further in the example [1800] of the lighting system, the control system [1702] may include the first control facility [1704] and the second control facility [1706]. Additionally in the example [1800] of the lighting system, the first control facility [1704] may be coupled as represented by a dashed line [1714] with the first visible-light source [1802] for controlling the first intensity [1828] of the first beam [1812] of the first visible-light emissions [1814], [1815]. Further in the example [1800] of the lighting system, the second control facility [1706] may be coupled as represented by a dashed line [1716] with the second visible-light source [1816] for controlling the second intensity [1830] of the second beam [1824] of the second visible-light emissions [1826], [1827]. In the example [1800] of the lighting system, the first control facility [1704] may be for controlling the first visible-light source [1802] as including a first plurality of semiconductor light-emitting devices [1804], [1806], [1808] being spaced apart from and along a longitudinal axis [1810], the first visible-light source [1802] being positioned for directing a first beam [1812] of first visible-light emissions being represented by arrows [1814], [1815] from the first plurality of semiconductor light-emitting devices [1804], [1806], [1808] in a first beam direction also represented by the arrows [1814], [1815]. In the example [1800]

of the lighting system, the second control facility [1706] may be for controlling a second visible-light source [1816] including a second plurality of semiconductor light-emitting devices [1818], [1820], [1822] being spaced apart from and along the longitudinal axis [1810], the second visible-light source [1816] being positioned for directing a second beam [1824] of second visible-light emissions being represented by arrows [1826], [1827] from the second plurality of semiconductor light-emitting devices [1818], [1820], [1822] in a second beam direction also being represented by the arrows [1826], [1827]. In some examples [1800] of the lighting system, the first visible-light source [1802] may include the first plurality of semiconductor light-emitting devices [1804], [1806], [1808] as being arranged in a first string as shown in FIG. 18; and the second visible-light source [1816] may include the second plurality of semiconductor light-emitting devices [1818], [1820], [1822] as being arranged in a second string also shown in FIG. 18; and the first and second strings may generally be mutually parallel. In other examples [1800] of the lighting system (not shown), the first and second strings may generally oriented as not being mutually parallel.

In the example [1800] of the lighting system, the first control facility [1704] may be programmed for controlling a first intensity being represented by an arrow [1828] of the first beam [1812] of the first visible-light emissions [1814], [1815], and the second control facility [1706] may be programmed for controlling a second intensity being represented by an arrow [1830] of the second beam [1824] of the second visible light emissions [1826], [1827]. In the example [1800] of the lighting system, the control system [1702] may be programmed for modulating the first intensity [1828] of the first beam [1812] and the second intensity [1830] of the second beam [1824] in a manner for causing the first and second beams [1812], [1824] of the first and second visible-light emissions [1814], [1815], [1826], [1827] to collectively emulate a progression of ambient sunlight being represented by an arrow [1832].

Figure 22:
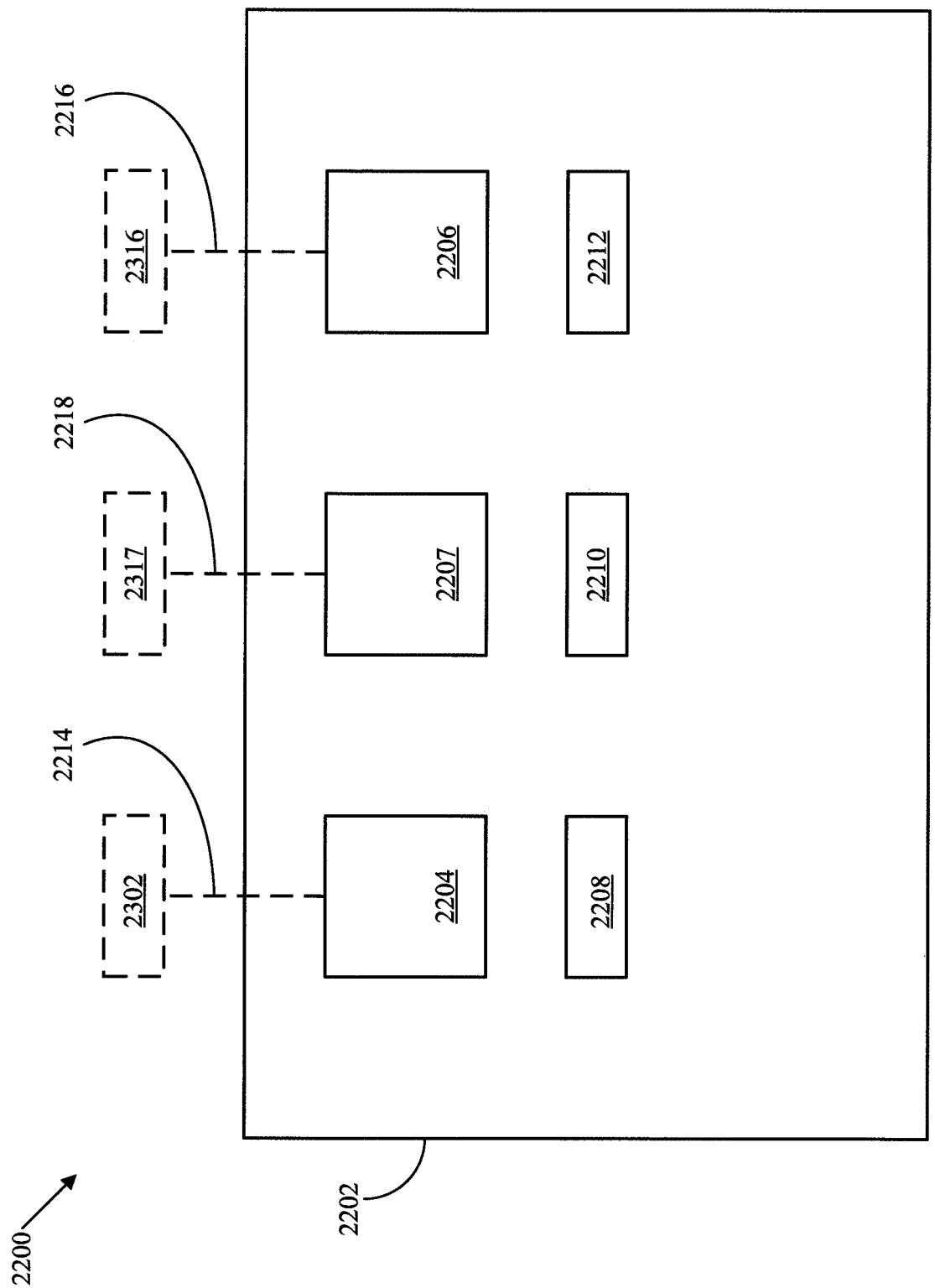
FIG. 22 is a schematic diagram of an example [2200] of a lighting controller.
Figure 23:
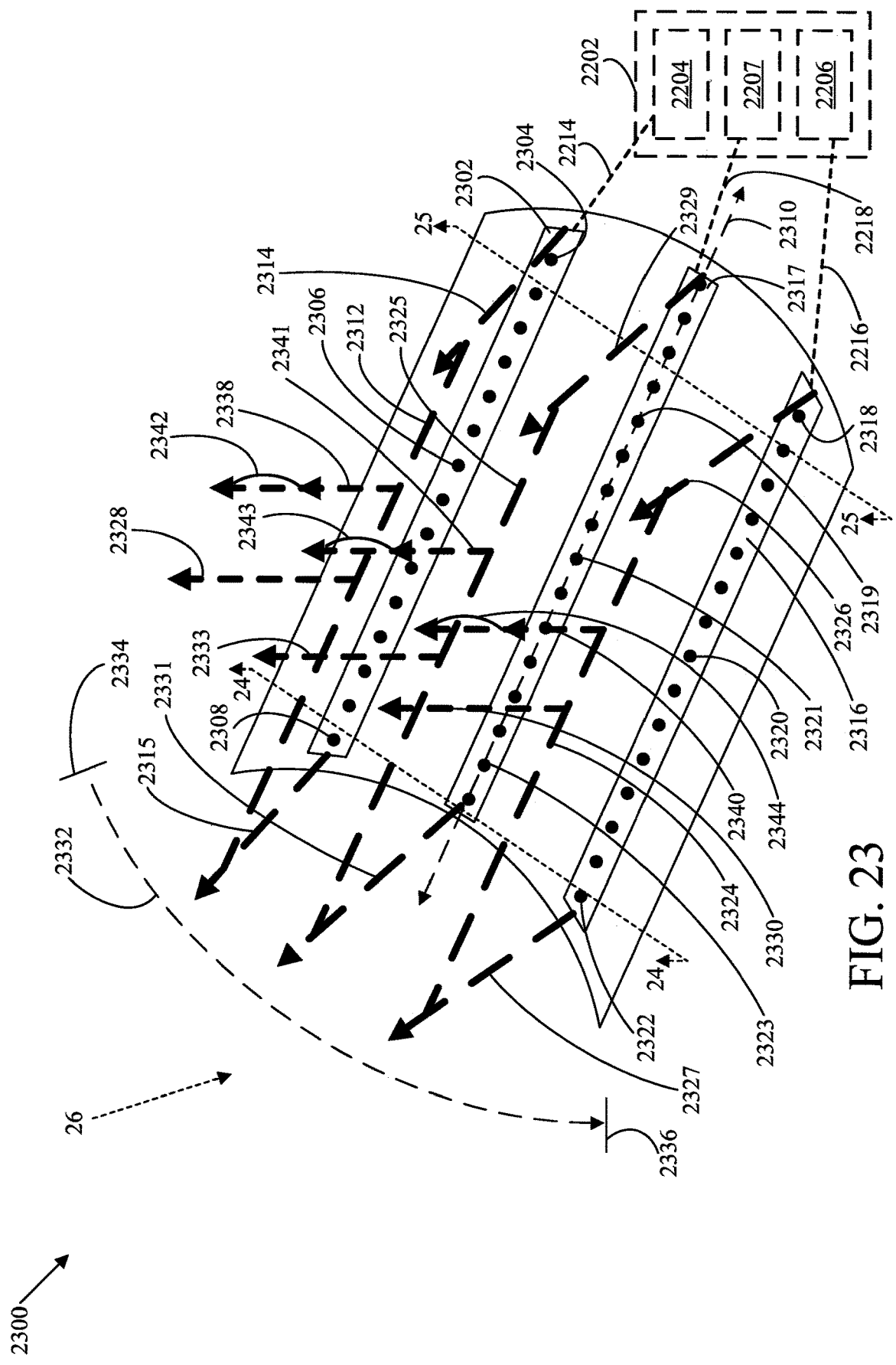
FIG. 23 is a schematic bottom perspective view showing an example [2300] of an implementation of a lighting system together with which the example [2200] of the lighting controller may be utilized.
Figure 24:
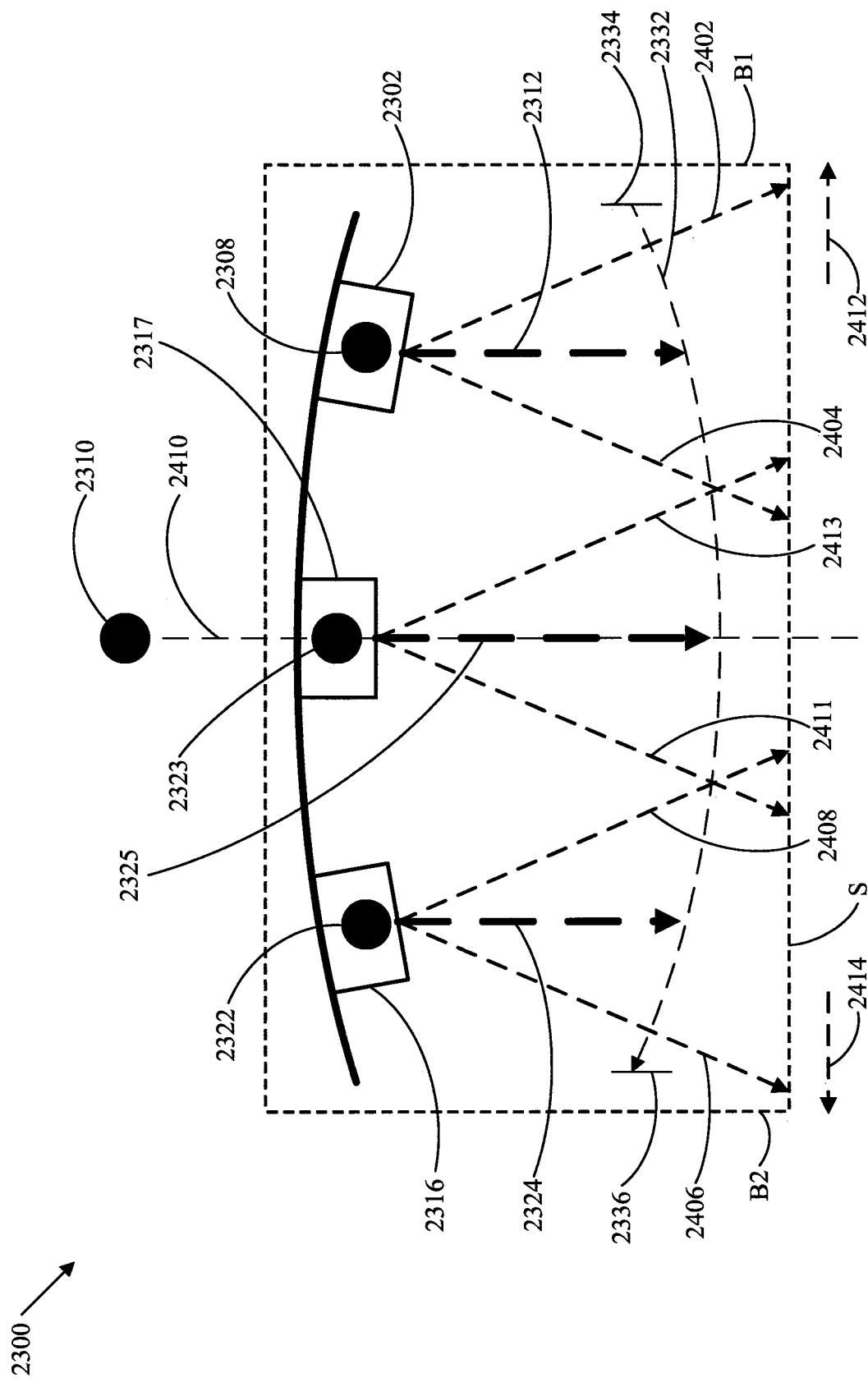
FIG. 24 is a schematic cross-sectional view taken along the line 24-24 showing the example [2300] of the lighting system together with which the example [2200] of the lighting controller may be utilized.
Figure 25:
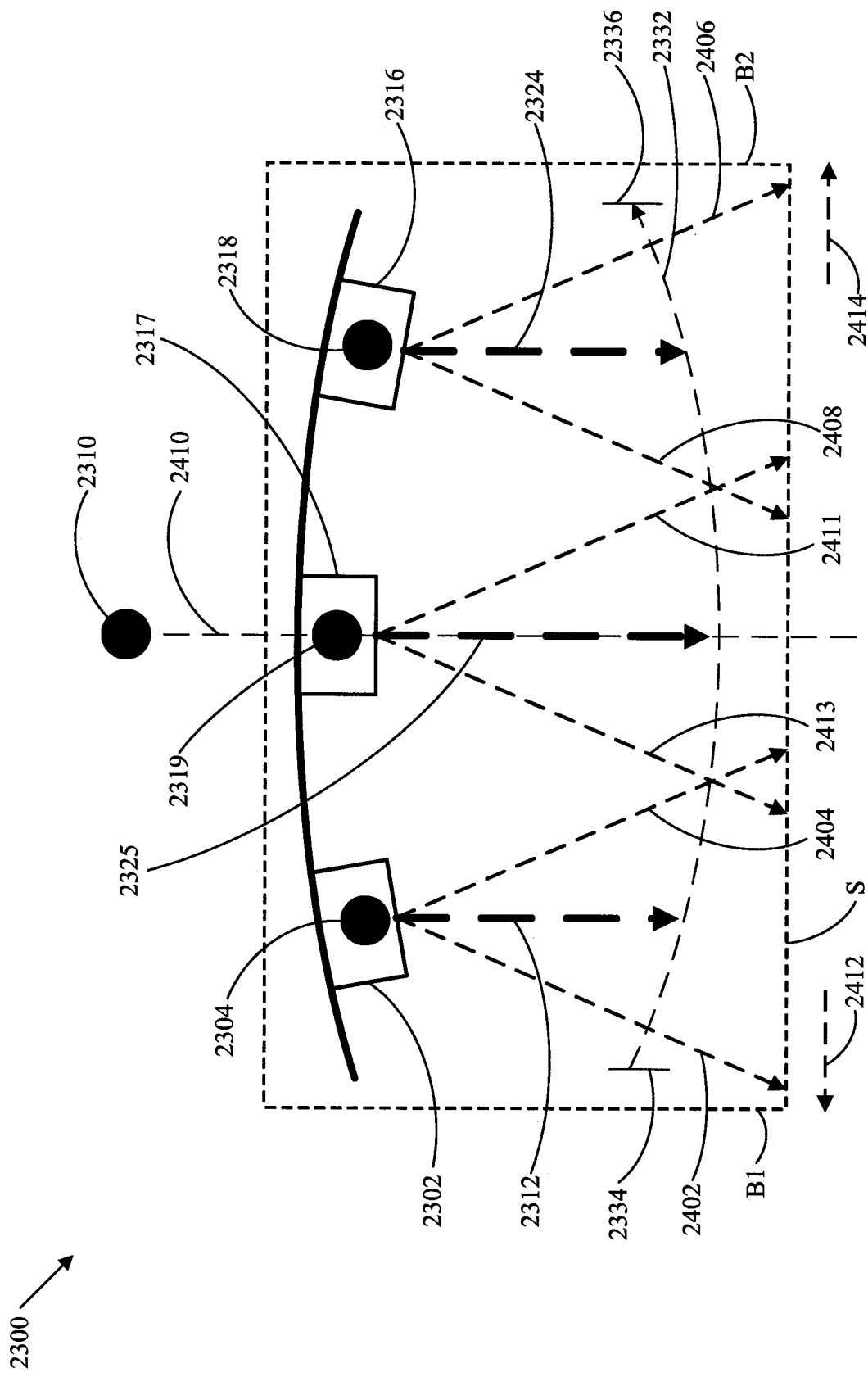
FIG. 25 is a schematic cross-sectional view taken along the line 25-25 showing the example [2300] of the lighting system together with which the example [2200] of the lighting controller may be utilized.
Figure 26:
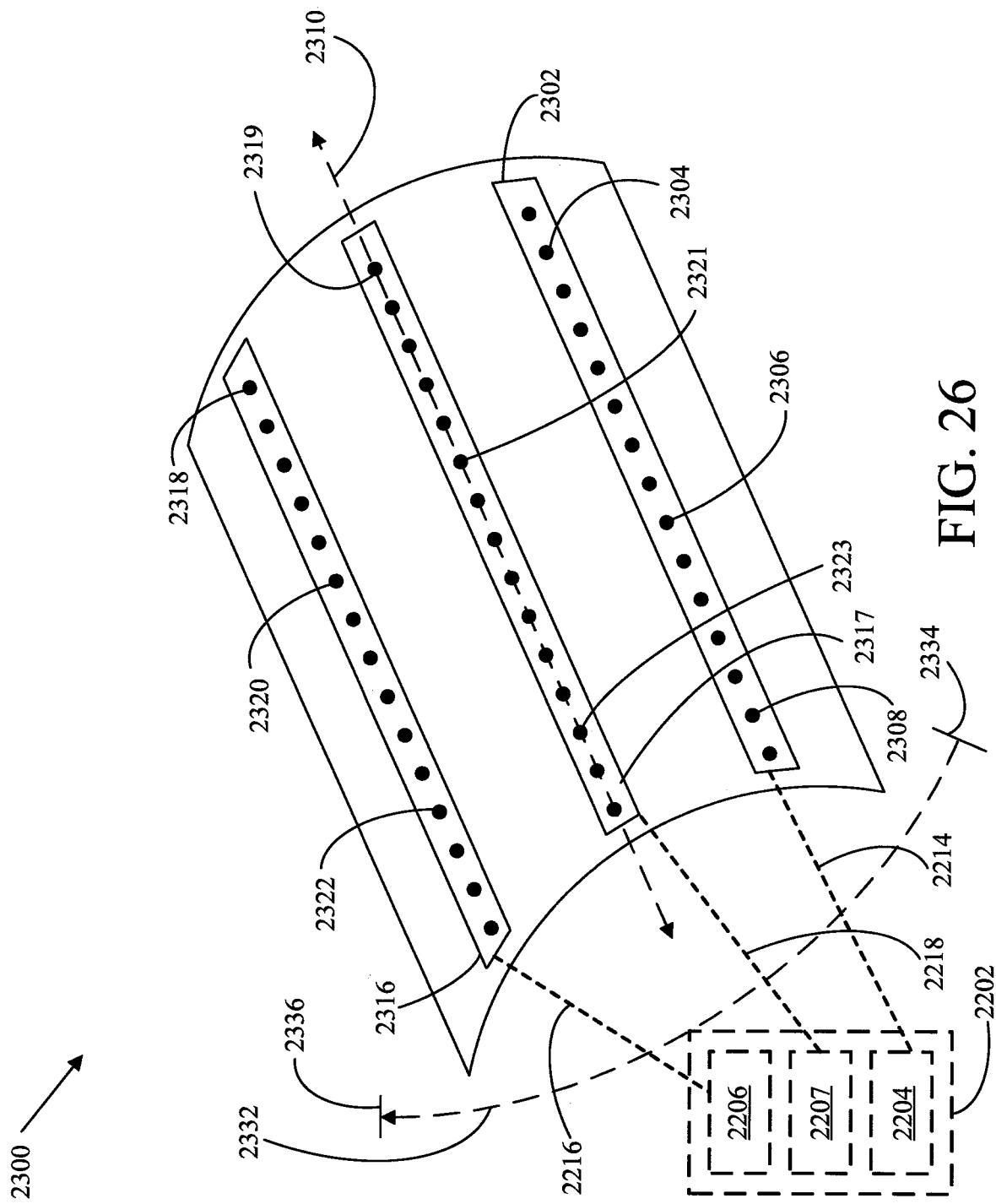
FIG. 26 is a schematic top perspective view taken along the line 26 showing the example [2300] of an implementation of a lighting system together with which the example [2200] of the lighting controller may be utilized.

FIG. 22 is a schematic diagram of an example [2200] of a lighting controller. FIG. 23 is a schematic bottom perspective view showing an example [2300] of an implementation of a lighting system together with which the example [2200] of the lighting controller may be utilized. FIG. 24 is a schematic cross-sectional view taken along the line 24-24 showing the example [2300] of the lighting system together with which the example [2200] of the lighting controller may be utilized. FIG. 25 is a schematic cross-sectional view taken along the line 25-25 showing the example [2300] of the lighting system together with which the example [2200] of the lighting controller may be utilized. FIG. 26 is a schematic top perspective view taken along the line 26 showing the example [2300] of an implementation of a lighting system together with which the example [2200] of the lighting controller may be utilized.

Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. Examples [100], [500], [900], [1300], [1800], [2300], and [2800] of lighting systems together with which the example [2200] of the lighting controller may be utilized are discussed herein, respectively, in connection with FIGS. 1-4; 5-8; 9-12; 13-16; 18-21; 22-26; and 27-31. It is understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is further understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. It is additionally understood throughout this specification that a lighting system [100], [500], [900], [1300], [1800], [2300], [2800] may include any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussions of the example [2200] of an implementation of the lighting controller and of the example [2300] of the lighting system.

As shown in FIGS. 22-26, the example [2200] of the implementation of the lighting controller includes a control system [2202] including a first control facility [2204] and a second control facility [2206] and a third control facility [2207]. In the example [2200] of the lighting controller, the first control facility [2204] is for controlling a first visible-light source [2302] including a first plurality of semiconductor light-emitting devices [2304], [2306], [2308] being spaced apart from and along a longitudinal axis [2310], the first visible-light source [2302] being positioned for directing a first beam [2312] of first visible-light emissions being represented by arrows [2314], [2315] from the first plurality of semiconductor light-emitting devices [2304], [2306], [2308] in a first beam direction also represented by the arrows [2314], [2315]. In the example [2200] of the lighting controller, the second control facility [2206] is for controlling a second visible-light source [2316] including a second plurality of semiconductor light-emitting devices [2318], [2320], [2322] being spaced apart from and along the longitudinal axis [2310], the second visible-light source [2316] being positioned for directing a second beam [2324] of second visible-light emissions being represented by arrows [2326], [2327] from the second plurality of semiconductor light-emitting devices [2318], [2320], [2322] in a second beam direction also being represented by the arrows [2326], [2327]. In the example [2200] of the lighting controller, the third control facility [2207] is for controlling a third visible-light source [2317] including a third plurality of semiconductor light-emitting devices [2319], [2321], [2323] being spaced apart from and along the longitudinal axis [2310], the third visible-light source [2317] being positioned for directing a third beam [2325] of third visible-light emissions being represented by arrows [2329], [2331] from the third plurality of semiconductor light-emitting devices [2319], [2321], [2323] in a third beam direction also being represented by the arrows [2329], [2331]. In the example [2200] of the lighting controller, the first control facility [2204] is programmed for controlling a first intensity being represented by an arrow [2328] of the first beam [2312] of the first visible-light emissions [2314], [2315], and the second control facility [2206] is programmed for controlling a second intensity being represented by an arrow [2330] of the second beam [2324] of the second visible light emissions [2326], [2327]; and the third control facility [2207] is programmed for controlling a third intensity being represented by an arrow [2333] of the third beam [2325] of the third visible light emissions [2329], [2331]. In the example [2200] of the lighting controller, the control system [2202] is programmed for modulating the first intensity [2328] of the first beam [2312] and the second intensity [2330] of the second beam [2324] and the third intensity [2333] of the third beam [2325] in a manner for causing the first and second and third beams [2312], [2324], [2325] of the first and second and third visible-light emissions [2314], [2315], [2326], [2327], [2329], [2331] to collectively emulate a progression of ambient sunlight being represented by an arrow [2332].

In some examples [2200] of the lighting controller, the control system [2202] may be programmed for causing the first and second and third beams [2312], [2324], [2325] to collectively emulate the progression [2332] of ambient sunlight by initially modulating the first intensity [2328] of the first beam [2312] to relatively be substantially greater than the third intensity [2333] of the third beam [2325] while modulating the third intensity [2333] of the third beam [2325] to relatively be substantially greater than the second intensity [2330] of the second beam [2324], and by then gradually modulating the second intensity [2330] of the second beam [2324] to relatively become substantially greater than the third intensity [2333] of the third beam [2325] while gradually modulating the third intensity [2333] of the third beam [2325] to relatively become substantially greater than the first intensity [2328] of the first beam [2312]. In other examples [2200] of the lighting controller, the control system [2202] may be programmed for causing two of the beams among the first and second and third beams [2312], [2324], [2325] to together emulate the progression [2332] of ambient sunlight by initially modulating an intensity [2328], [2330], [2333] of a one of the beams [2312], [2324], [2325] to relatively be substantially greater than another intensity[2328], [2330], [2333] of another one of the beams [2312], [2324], [2325], and by then gradually modulating the another intensity [2328], [2330], [2333] of the another one of the beams [2312], [2324], [2325] to relatively become substantially greater than the intensity [2328], [2330], [2333] of the one of the beams [2312], [2324], [2325].

In some examples [2200] of the lighting controller, the control system [2202] may regulate a distribution of a variable power input to: the first plurality of semiconductor light-emitting devices [2304], [2306], [2308] of the first visible-light source [2302] for controlling the intensity [2328] of the first visible-light emissions [2314], [2315]; and the second plurality of semiconductor light-emitting devices [2318], [2320], [2322] of the second visible-light source [2316] for controlling the intensity [2330] of the second visible-light emissions [2326], [2327]; and the third plurality of semiconductor light-emitting devices [2319], [2321], [2323] of the third visible-light source [2317] for controlling the intensity [2333] of the third visible-light emissions [2329], [2331].

In other examples [2200] of the lighting controller, a one of the control facilities [2204], [2206], [2207] may be omitted; and a corresponding one of the visible-light sources [2302], [2316], [2317] may likewise be omitted. In further examples [2200] of the lighting controller, the control system [2202] may include one or more control facilities (not shown) in addition to the first control facility [2204] and the second control facility [2206] and the third control facility [2207]; and one or more visible-light sources in addition to the first visible-light source [2302] and the second visible-light source [2316] and the third visible-light source [2317] may be provided.

In further examples [2200] of the lighting controller, the control system [2202] may be programmed for facilitating an alignment being represented by arrows [2402], [2404] of the first beam [2312] towards a first boundary represented by a dashed line [B1] of an ambient space represented by a dashed box [S] and for facilitating another alignment being represented by arrows [2406], [2408] of the second beam [2324] towards a second boundary represented by a dashed line [B2] of the ambient space [S] being opposite to the first boundary [B1]. In some of those examples [2200] of the lighting controller, the control system [2202] may be programmed for facilitating the alignment [2402], [2404] of the first beam [2312] as being towards the first boundary [B1] of the ambient space [S] and for facilitating the alignment [2406], [2408] of the second beam [2324] as being towards the second boundary [B2] of the ambient space [S], with each of the first and second beams [2312], [2324] being respectively aligned toward the boundaries [B1] and [B2] as being spaced apart from and on opposite sides of a vertical dashed line [2410] intersecting the longitudinal axis [2310]. In further examples [2200] of the lighting controller, the control system [2202] may be programmed for facilitating an alignment being represented by arrows [2411], [2413] of the third beam [2325] being along the vertical dashed line [2410] or being in another direction between the alignment [2402], [2404] and the alignment [2406], [2408]. As additional examples [2200] of the lighting controller, the control system [2202] may include an indicator [2208] for facilitating an alignment being represented by the arrows [2402], [2404] of the first beam [2312] towards the first boundary [B1] of the ambient space [S] and for facilitating another alignment being represented by the arrows [2406], [2408] of the second beam [2324] towards the second boundary [B2] of the ambient space [S] being opposite to the first boundary [B1]. In some examples [2200] of the lighting controller, the control system [2202] may be programmed for facilitating an alignment being represented by arrows [2402], [2404] of the first beam [2312] towards an Eastward direction being represented by an arrow [2412] and for facilitating another alignment being represented by arrows [2406], [2408] of the second beam [2324] towards a Westward direction being represented by an arrow [2414]. In further examples [2200] of the lighting controller, the control system [2202] may provide the indicator [2208] as being for facilitating an alignment being represented by arrows [2402], [2404] of the first beam [2312] towards an Eastward direction being represented by the arrow [2412] and for facilitating another alignment being represented by arrows [2406], [2408] of the second beam [2324] towards a Westward direction being represented by the arrow [2414].

In some examples [2200] of the lighting controller, the control system [2202] may be programmed for modulating the first intensity [2328] of the first beam [2312] and the second intensity [2330] of the second beam [2324] and the third intensity [2333] of the third beam [2325] in a manner for causing the first and second and third beams [2312], [2324], [2325] of the first and second and third visible-light emissions [2314], [2315], [2326], [2327], [2329], [2331] to collectively emulate the progression of ambient sunlight [2332] through a portion of a cycle extending from sunrise being represented by a line [2334] to sunset being represented by a line [2336]; or through a period beginning before sunrise; or through a period ending after sunset; or through a period both beginning before sunrise and ending after sunset. In some examples [2200] of the lighting controller, the control system [2202] may be programmed for modulating the first intensity [2328] of the first beam [2312] and the second intensity [2330] of the second beam [2324] and the third intensity [2333] of the third beam [2325] in a manner for causing the first and second and third beams [2312], [2324], [2325] of the first and second and third visible-light emissions [2314], [2315], [2326], [2327], [2329], [2331] to collectively emulate the progression of ambient sunlight [2332] throughout the cycle extending from sunrise being represented by the line [2334] to sunset being represented by the line [2336]. In further examples [2200] of the lighting controller, the control system [2202] may be programmed for modulating the first intensity [2328] of the first beam [2312] and the second intensity [2330] of the second beam [2324] and the third intensity [2333] of the third beam [2325] in a manner for causing the first and second and third beams [2312], [2324], [2325] of the first and second and third visible-light emissions [2314], [2315], [2326], [2327], [2329], [2331] to collectively initiate an emulation of the progression of ambient sunlight [2332] when a local sunrise occurs as represented by the line [2334] and to collectively conclude the emulation when a corresponding local sunset occurs as represented by the line [2336]. In some of those examples [2200] of the lighting controller, the control system [2202] may include an ambient light sensor [2210] being programmed for sensing an occurrence of the local sunrise [2334] or an occurrence of the local sunset [2336]. In other examples [2200] of the lighting controller, the control system [2202] may include a programmable user interface [2212] enabling an arbitrary selection of a simulated sunrise time [2334] and a simulated sunset time [2336].

In further examples [2200] of the lighting controller, the control system [2202] may be programmed for modulating the first intensity [2328] of the first beam [2312] and the second intensity [2330] of the second beam [2324] with a maximum ratio of the first intensity [2328] divided by the second intensity [2330] or of the second intensity [2330] divided by the first intensity [2328] being at least about 10:1. In additional examples [2200] of the lighting controller, the control system [2202] may be programmed for modulating the first intensity [2328] of the first beam [2312] and the second intensity [2330] of the second beam [2324] with a maximum ratio of the first intensity [2328] divided by the second intensity [2330] or of the second intensity [2330] divided by the first intensity [2328] being at least about 100:1. Also in these examples [2200] of the lighting controller, the control system [2220] may be programmed for modulating the third intensity [2333] of the third beam [2325] as being in between the first intensity [2328] and the second intensity [2330].

In some examples [2200] of the lighting controller, the control system [2202] may be programmed for modulating the first intensity [2328] of the first beam [2312] in a first range, and for modulating the second intensity [2330] of the second beam [2324] in a second range, and for modulating the third intensity [2333] of the third beam [2325] in a third range, in a manner for causing the first and second and third beams [2312], [2324], [2325] of the first and second and third visible-light emissions [2314], [2315], [2326], [2327], [2329], [2331] to collectively emulate the progression of ambient sunlight [2332]. In further examples [2200] of the lighting controller, the control system [2202] may be programmed for controlling the first beam [2312] of the first visible-light emissions [2314], [2315] as having a first baseline intensity being represented by an arrow [2338] and for controlling the second beam [2324] of the second visible-light emissions [2326], [2327] as having a second baseline intensity being represented by an arrow [2340] and for controlling the third beam [2325] of the third visible-light emissions [2329], [2331] as having a third baseline intensity being represented by an arrow [2341]; and the control system [2202] may be programmed for modulating the first intensity [2328] of the first beam [2312] in a first range [2342] being additive to the first baseline intensity [2338] and for modulating the second intensity [2330] of the second beam [2324] in a second range [2344] being additive to the second baseline intensity [2340] and for modulating the third intensity [2333] of the third beam [2325] in a third range [2343] being additive to the third baseline intensity [2341], in the manner for causing the first and second and third beams [2312], [2324], [2325] of the first and second and third visible-light emissions [2314], [2315], [2326], [2327], [2329], [2331] to collectively emulate the progression of ambient sunlight [2332]. In additional examples [2200] of the lighting controller, the control system [2202] may be programmed for controlling the first baseline intensity [2338] and the second baseline intensity [2340] and the third baseline intensity [2341] for causing the first beam [2312] and the second beam [2324] and the third beam [2325] to collectively form a pre-set baseline pattern of the first and second and third visible-light emissions [2314], [2315], [2326], [2327], [2329], [2331]. As examples [2200] of the lighting controller, the control system [2202] may be programmed for selection among a plurality of different pre-programmed combinations of the baseline intensities [2338], [2340], [2341] for the first visible-light emissions [2314], [2315], the second visible-light emissions [2326], [2327], and the third visible-light emissions [2329], [2331]. In some of those examples [2200] of the lighting controller, the control system [2202] may be programmed for controlling the first baseline intensity [2338] and the second baseline intensity [2340] and the third baseline intensity [2341] for causing the first beam [2312] and the second beam [2324] and the third beam [2325] to collectively form a pre-set baseline pattern of the first and second and third visible-light emissions [2314], [2315], [2326], [2327], [2329], [2331] being: center wall graze; table with wall-fill; wall wash right; wall wash left; double wall wash; wall wash right plus floor; wall wash left plus floor; room; or batwing. In examples [2200] of the lighting controller, the control system [2202] may cause the first beam [2312] and the second beam [2324] and the third beam [2325] to respectively have the following baseline intensities [2338]/[2340]/[2341] collectively constituting one hundred percent of a variable baseline power input of the control system [2202] in order to form the following pre-set baseline patterns of the first and second and third visible-light emissions [2314], [2315], [2326], [2327], [2329], [2331]: center wall graze [0/100/0]; table with wall-fill [17/66/17]; wall wash right [0/0/100]; wall wash left [100/0/0]; double wall wash [50/0/50]; wall wash right plus floor [0/33/67]; wall wash left plus floor [67/33/0]; low-glare room lighter [33/34/33]; or low glare quasi-batwing [40/20/40].

In some examples [2200] of the lighting controller, the control system [2202] may regulate a distribution of a variable baseline power input to: the first plurality of semiconductor light-emitting devices [2304], [2306], [2308] of the first visible-light source [2302] for controlling the baseline intensity [2338] of the first visible-light emissions [2314], [2315]; and the second plurality of semiconductor light-emitting devices [2318], [2320], [2322] of the second visible-light source [2316] for controlling the baseline intensity [2340] of the second visible-light emissions [2326], [2327]; and the third plurality of semiconductor light-emitting devices [2319], [2321], [2323] of the third visible-light source [2317] for controlling the baseline intensity [2341] of the third visible-light emissions [2329], [2331]. Further in those examples [2200] of the lighting controller, the control system [2202] may regulate a distribution of a variable additive power input to: the first plurality of semiconductor light-emitting devices [2304], [2306], [2308] of the first visible-light source [2302] for controlling the additive intensity [2342] of the first visible-light emissions [2314], [2315]; and the second plurality of semiconductor light-emitting devices [2318], [2320], [2322] of the second visible-light source [2316] for controlling the additive intensity [2344] of the second visible-light emissions [2326], [2327]; and the third plurality of semiconductor light-emitting devices [2319], [2321], [2323] of the third visible-light source [2317] for controlling the additive intensity [2343] of the third visible-light emissions [2329], [2331].

In further examples [2200] of the lighting controller, the control system [2202] may be programmed for transitioning, over a selectable time period, the baseline intensities [2338], [2340], [2341] for the first visible-light emissions [2314], [2315], the second visible-light emissions [2326], [2327], and the third visible-light emissions [2329], [2331] from a one of the plurality of pre-programmed combinations to another one of the plurality of pre-programmed combinations.

In some examples [2200] of the lighting controller, the control system [2202] may include the first control facility [2204] being coupled as represented by a dashed line [2214] with the first visible-light source [2302] for controlling the first intensity [2328] of the first beam [2312] of the first visible-light emissions [2314], [2315]; and the control system [2202] may further include the second control facility [2206] being coupled as represented by a dashed line [2216] with the second visible-light source [2316] for controlling the second intensity [2330] of the second beam [2324] of the second visible-light emissions [2326], [2327]; and the control system [2202] may further include the third control facility [2207] being coupled as represented by a dashed line [2218] with the third visible-light source [2317] for controlling the third intensity [2333] of the third beam [2325] of the third visible-light emissions [2329], [2331].

In other examples [2200] of the lighting controller, the control system [2202] may include the first control facility [2204] as being for controlling the first visible-light source [2302] with the first plurality of semiconductor light-emitting devices [2304], [2306], [2308] being collectively configured for generating the first visible-light emissions [2314], [2315] as having a selectable first perceived color point [2312]; and the control system [2202] may include the second control facility [2206] as being for controlling the second visible-light source [2316] with the second plurality of semiconductor light-emitting devices [2318], [2320], [2322] being collectively configured for generating the second visible-light emissions [2326], [2327] as having a selectable second perceived color point [2324]; and the control system [2202] may include the third control facility [2207] as being for controlling the third visible-light source [2317] with the third plurality of semiconductor light-emitting devices [2319], [2321], [2323] being collectively configured for generating the third visible-light emissions [2329], [2331] as having a selectable third perceived color point [2325].

In further examples [2200] of the lighting controller, the control system [2202] may include the first control facility [2204] as being for controlling the first visible-light source [2302] with the first plurality of semiconductor light-emitting devices [2304], [2306], [2308] being collectively configured for generating the first visible-light emissions [2314], [2315] as having a selectable first perceived color point [2312], wherein a plurality of individual ones among the first plurality of semiconductor light-emitting devices [2304], [2306], [2308] may each emit visible-light having a different color point. Additionally in those examples [2200] of the lighting controller, the control system [2202] may include the second control facility [2206] as being for controlling the second visible-light source [2316] with the second plurality of semiconductor light-emitting devices [2318], [2320], [2322] being collectively configured for generating the second visible-light emissions [2326], [2327] as having a selectable second perceived color point [2324], wherein a plurality of individual ones among the second plurality of semiconductor light-emitting devices [2318], [2320], [2322] may each emit visible-light having a different color point. Further in those examples [2200] of the lighting controller, the control system [2202] may include the third control facility [2207] as being for controlling the third visible-light source [2317] with the third plurality of semiconductor light-emitting devices [2319], [2321], [2323] being collectively configured for generating the third visible-light emissions [2329], [2331] as having a selectable third perceived color point [2325], wherein a plurality of individual ones among the third plurality of semiconductor light-emitting devices [2319], [2321], [2323] may each emit visible-light having a different color point.

FIGS. 22-26 further illustrate an example [2300] of an implementation of a lighting system. In some examples, the lighting system [2300] may include: the first visible-light source [2302]; and the second visible-light source [2316]; and the third visible-light source [2317]; and the example [2200] of the lighting controller. In the example [2300] of the lighting system, the lighting controller [2200] may include the control system [2202]. Further in the example [2300] of the lighting system, the control system [2202] may include the first control facility [2204] and the second control facility [2206] and the third control facility [2207]. Additionally in the example [2300] of the lighting system, the first control facility [2204] may be coupled as represented by a dashed line [2214] with the first visible-light source [2302] for controlling the first intensity [2328] of the first beam [2312] of the first visible-light emissions [2314], [2315]. Further in the example [2300] of the lighting system, the second control facility [2206] may be coupled as represented by a dashed line [2216] with the second visible-light source [2316] for controlling the second intensity [2330] of the second beam [2324] of the second visible-light emissions [2326], [2327]. Additionally in the example [2300] of the lighting system, the third control facility [2207] may be coupled as represented by a dashed line [2218] with the third visible-light source [2317] for controlling the third intensity [2333] of the third beam [2325] of the third visible-light emissions [2329], [2331]. In the example [2300] of the lighting system, the first control facility [2204] may be for controlling the first visible-light source [2302] as including a first plurality of semiconductor light-emitting devices [2304], [2306], [2308] being spaced apart from and along a longitudinal axis [2310], the first visible-light source [2302] being positioned for directing a first beam [2312] of first visible-light emissions being represented by arrows [2314], [2315] from the first plurality of semiconductor light-emitting devices [2304], [2306], [2308] in a first beam direction also represented by the arrows [2314], [2315]. In the example [2300] of the lighting system, the second control facility [2206] may be for controlling a second visible-light source [2316] including a second plurality of semiconductor light-emitting devices [2318], [2320], [2322] being spaced apart from and along the longitudinal axis [2310], the second visible-light source [2316] being positioned for directing a second beam [2324] of second visible-light emissions being represented by arrows [2326], [2327] from the second plurality of semiconductor light-emitting devices [2318], [2320], [2322] in a second beam direction also being represented by the arrows [2326], [2327]. In the example [2300] of the lighting system, the third control facility [2207] may be for controlling a third visible-light source [2317] including a third plurality of semiconductor light-emitting devices [2319], [2321], [2323] being spaced apart from and along the longitudinal axis [2310], the third visible-light source [2317] being positioned for directing a third beam [2325] of third visible-light emissions being represented by arrows [2329], [2331] from the third plurality of semiconductor light-emitting devices [2319], [2321], [2323] in a third beam direction also being represented by the arrows [2329], [2331]. In some examples [2300] of the lighting system, the first visible-light source [2302] may include the first plurality of semiconductor light-emitting devices [2304], [2306], [2308] as being arranged in a first string as shown in FIG. 23; and the second visible-light source [2316] may include the second plurality of semiconductor light-emitting devices [2318], [2320], [2322] as being arranged in a second string also shown in FIG. 23; and the third visible-light source [2317] may include the third plurality of semiconductor light-emitting devices [2319], [2321], [2323] as being arranged in a third string also shown in FIG. 23; and the first and second and third strings may generally be mutually parallel. In other examples [2300] of the lighting system (not shown), the first and second and third strings may generally oriented as not being mutually parallel.

In the example [2300] of the lighting system, the first control facility [2204] may be programmed for controlling a first intensity being represented by an arrow [2328] of the first beam [2312] of the first visible-light emissions [2314], [2315], and the second control facility [2206] may be programmed for controlling a second intensity being represented by an arrow [2330] of the second beam [2324] of the second visible light emissions [2326], [2327] and the third control facility [2207] may be programmed for controlling a third intensity being represented by an arrow [2333] of the third beam [2325] of the third visible light emissions [2329], [2331]. In the example [2300] of the lighting system, the control system [2202] may be programmed for modulating the first intensity [2328] of the first beam [2312] and the second intensity [2330] of the second beam [2324] and the third intensity [2333] of the third beam [2325] in a manner for causing the first and second and third beams [2312], [2324], [2325] of the first and second and third visible-light emissions [2314], [2315], [2326], [2327], [2329], [2331] to collectively emulate a progression of ambient sunlight being represented by an arrow [2332].

Figure 27:
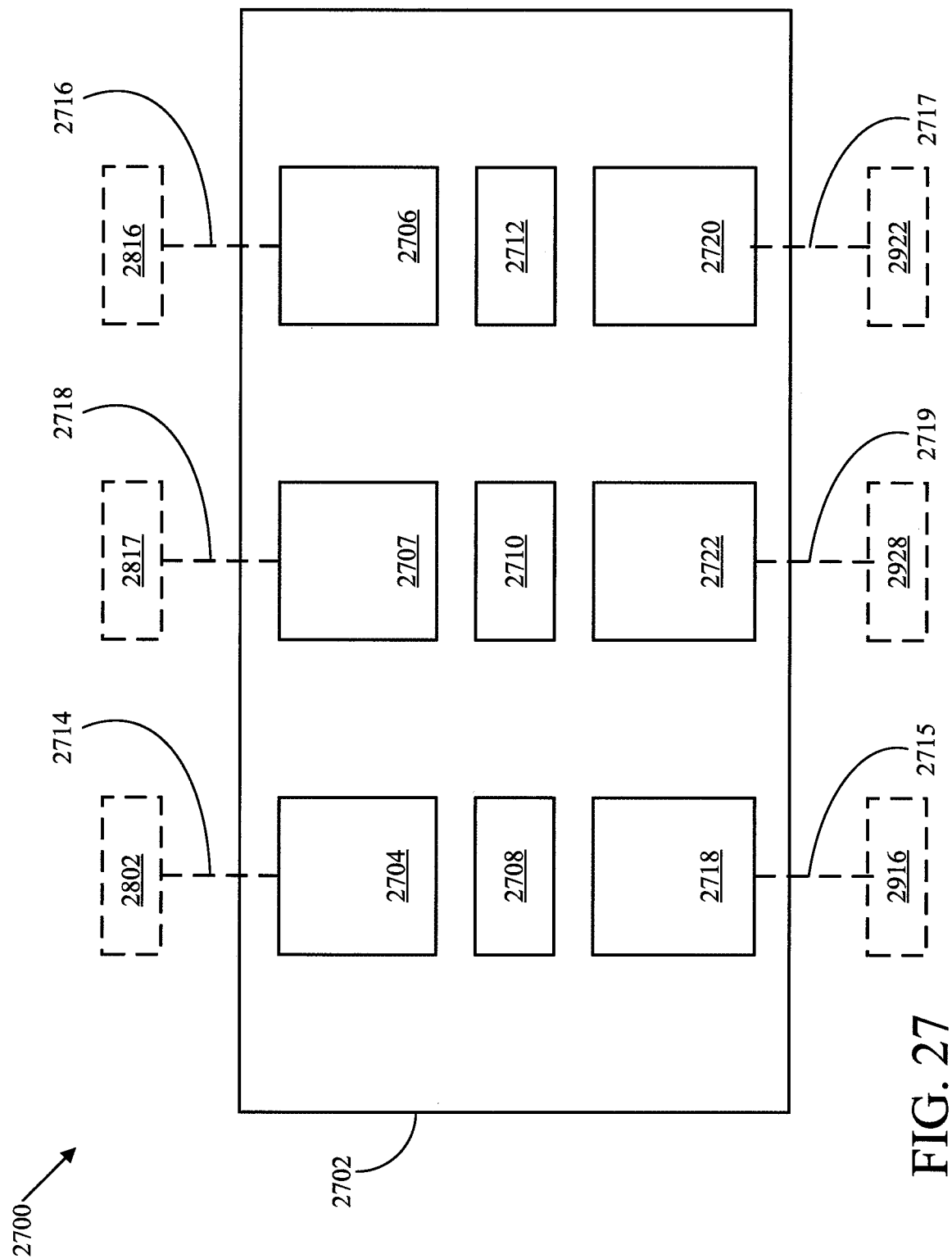
FIG. 27 is a schematic diagram of an example [2700] of a lighting controller.
Figure 28:
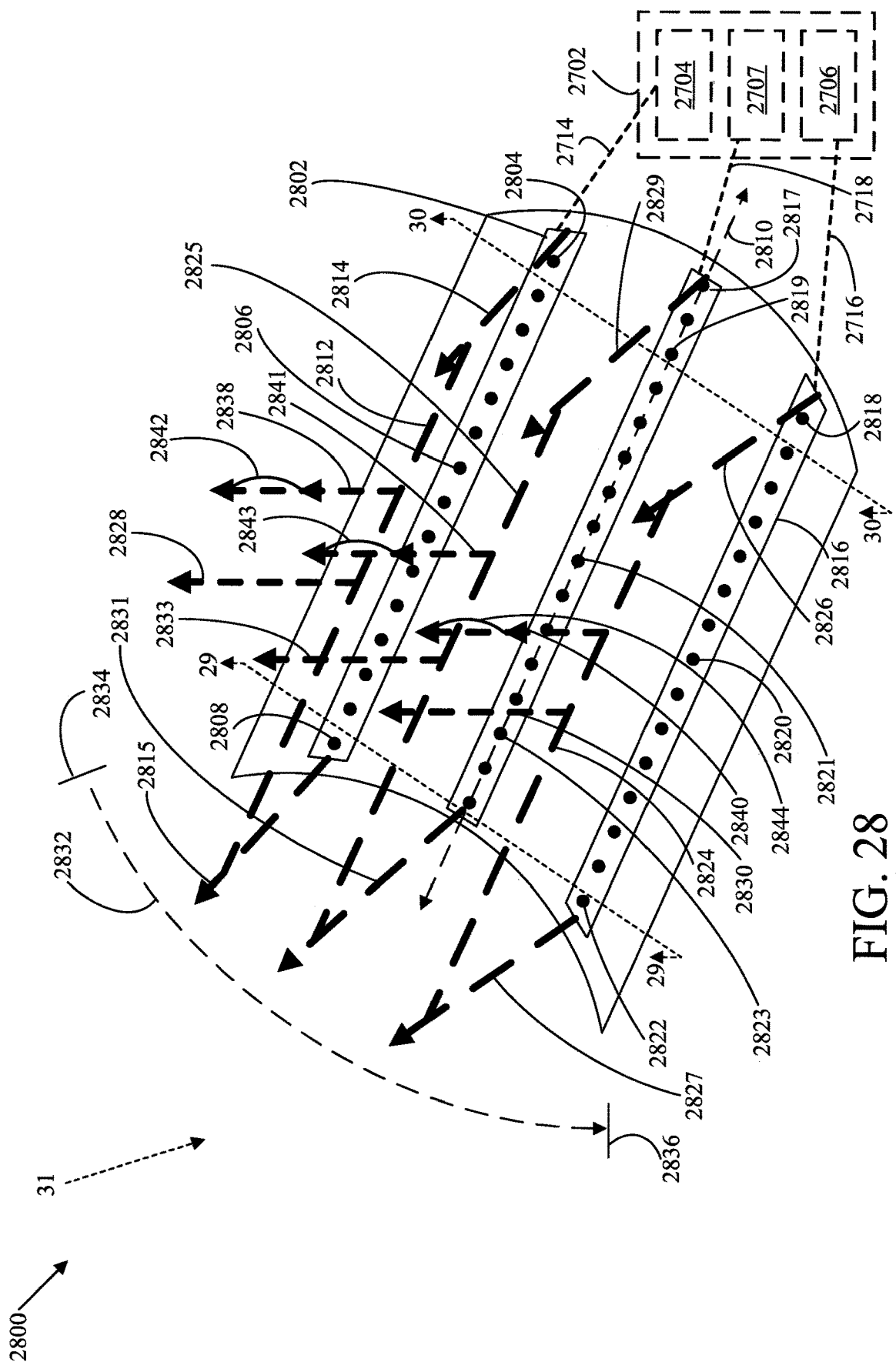
FIG. 28 is a schematic bottom perspective view showing an example [2800] of an implementation of a lighting system together with which the example [2700] of the lighting controller may be utilized.
Figure 29:
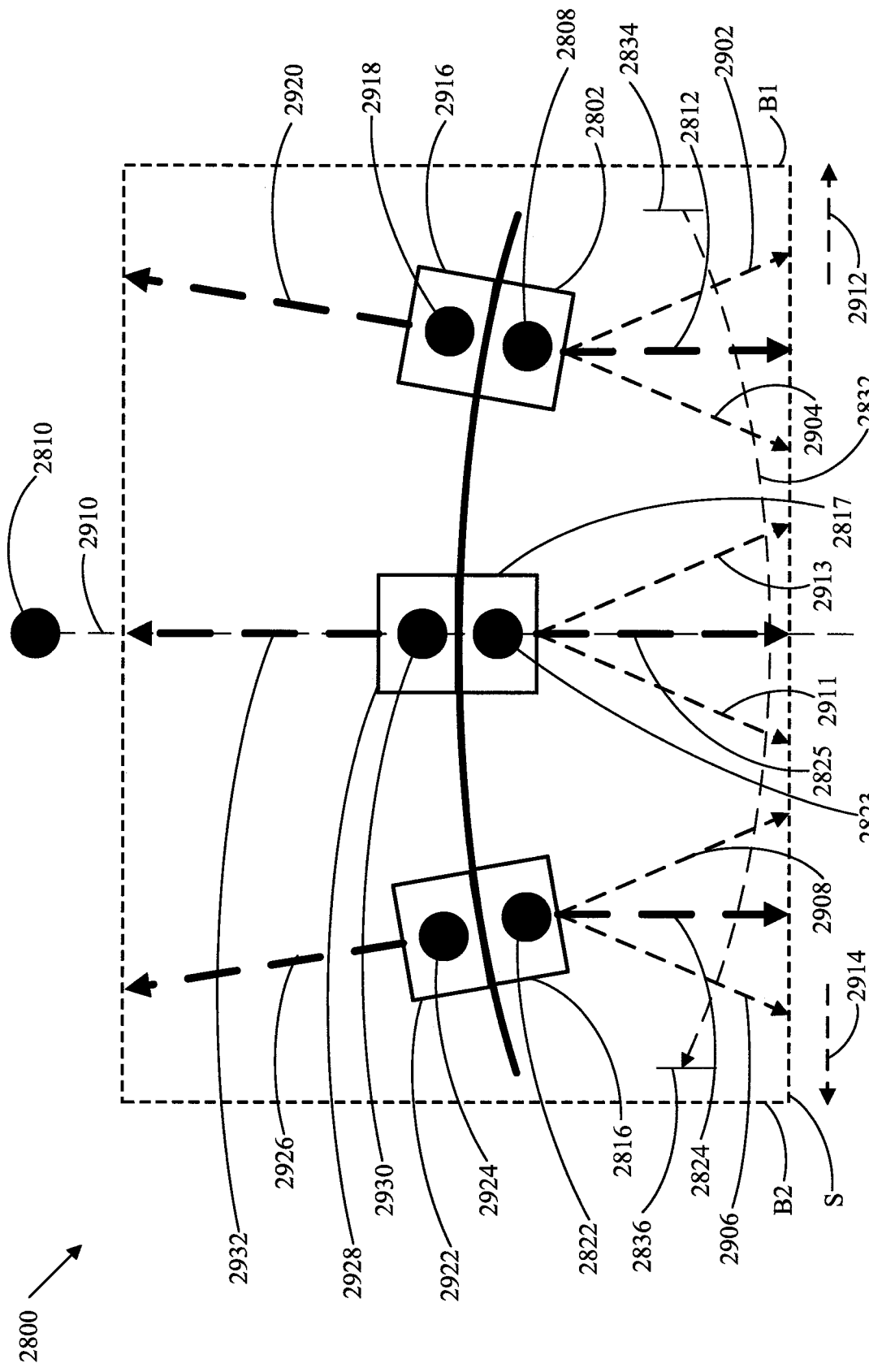
FIG. 29 is a schematic cross-sectional view taken along the line 29-29 showing the example [2800] of the lighting system together with which the example [2700] of the lighting controller may be utilized.
Figure 30:
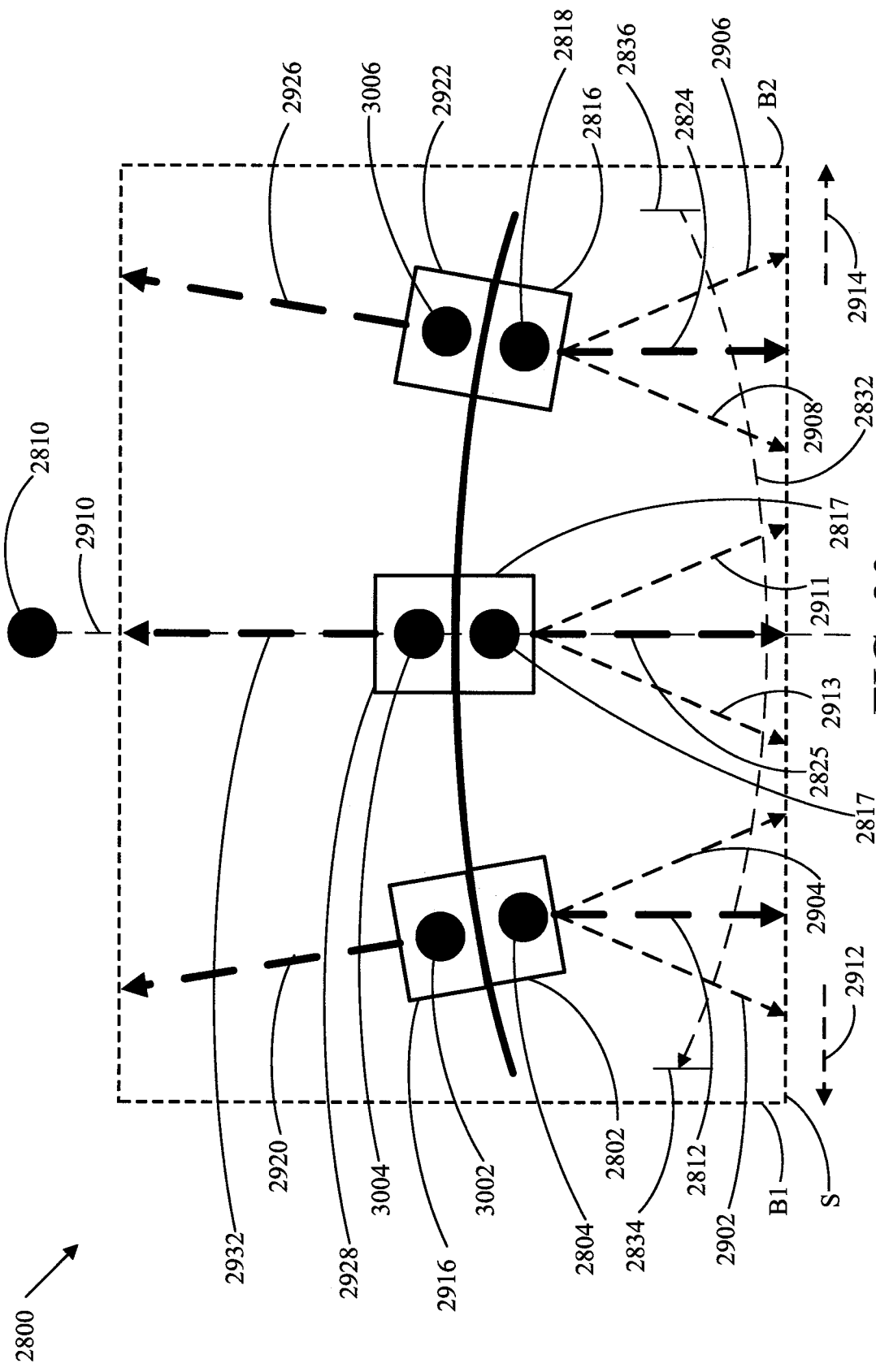
FIG. 30 is a schematic cross-sectional view taken along the line 30-30 showing the example [2800] of the lighting system together with which the example [2700] of the lighting controller may be utilized.
Figure 31:
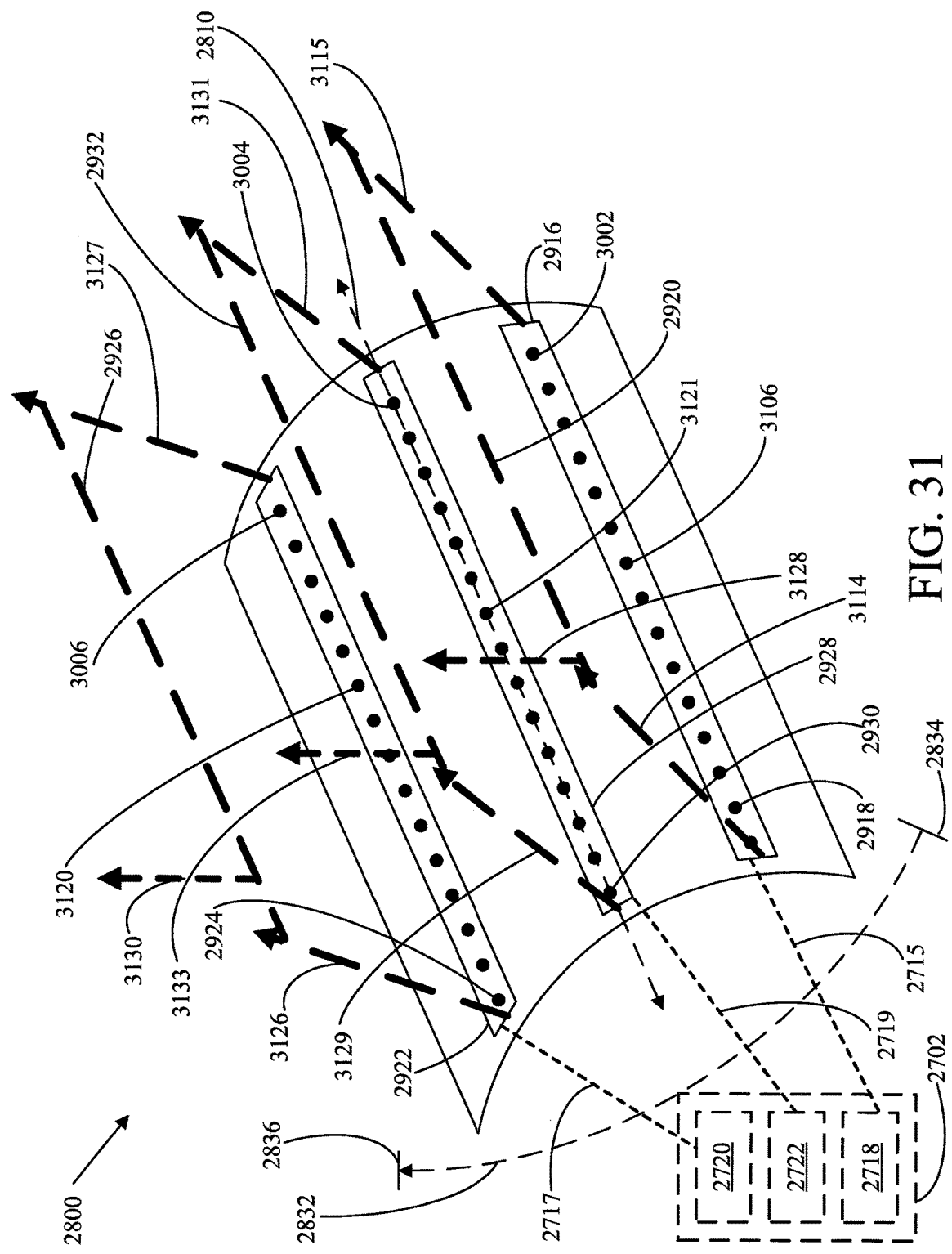
FIG. 31 is a schematic top perspective view taken along the line 31 showing the example [2800] of an implementation of a lighting system together with which the example [2700] of the lighting controller may be utilized.

FIG. 27 is a schematic diagram of an example [2700] of a lighting controller. FIG. 28 is a schematic bottom perspective view showing an example [2800] of an implementation of a lighting system together with which the example [2700] of the lighting controller may be utilized. FIG. 29 is a schematic cross-sectional view taken along the line 29-29 showing the example [2800] of the lighting system together with which the example [2700] of the lighting controller may be utilized. FIG. 30 is a schematic cross-sectional view taken along the line 30-30 showing the example [2800] of the lighting system together with which the example [2700] of the lighting controller may be utilized. FIG. 31 is a schematic top perspective view taken along the line 31 showing the example [2800] of an implementation of a lighting system together with which the example [2700] of the lighting controller may be utilized.

Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. Examples [100], [500], [900], [1300], [1800], [2300], and [2800] of lighting systems together with which the example [2700] of the lighting controller may be utilized are discussed herein, respectively, in connection with FIGS. 1-4; 5-8; 9-12; 13-16; 18-21; 22-26; and 27-31. It is understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is further understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. It is additionally understood throughout this specification that a lighting system [100], [500], [900], [1300], [1800], [2300], [2800] may include any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussions of the example [2700] of an implementation of the lighting controller and of the example [2800] of the lighting system.

As shown in FIGS. 27-31, the example [2700] of the implementation of the lighting controller includes a control system [2702] including a first control facility [2704] and a second control facility [2706] and a third control facility [2707]. In the example [2700] of the lighting controller, the first control facility [2704] is for controlling a first visible-light source [2802] including a first plurality of semiconductor light-emitting devices [2804], [2806], [2808] being spaced apart from and along a longitudinal axis [2810], the first visible-light source [2802] being positioned for directing a first beam [2812] of first visible-light emissions being represented by arrows [2814], [2815] from the first plurality of semiconductor light-emitting devices [2804], [2806], [2808] in a first beam direction also represented by the arrows [2814], [2815]. In the example [2700] of the lighting controller, the second control facility [2706] is for controlling a second visible-light source [2816] including a second plurality of semiconductor light-emitting devices [2818], [2820], [2822] being spaced apart from and along the longitudinal axis [2810], the second visible-light source [2816] being positioned for directing a second beam [2824] of second visible-light emissions being represented by arrows [2826], [2827] from the second plurality of semiconductor light-emitting devices [2818], [2820], [2822] in a second beam direction also being represented by the arrows [2826], [2827]. In the example [2700] of the lighting controller, the third control facility [2707] is for controlling a third visible-light source [2817] including a third plurality of semiconductor light-emitting devices [2819], [2821], [2823] being spaced apart from and along the longitudinal axis [2810], the third visible-light source [2817] being positioned for directing a third beam [2825] of third visible-light emissions being represented by arrows [2829], [2831] from the third plurality of semiconductor light-emitting devices [2819], [2821], [2823] in a third beam direction also being represented by the arrows [2829], [2831]. In the example [2700] of the lighting controller, the first control facility [2704] is programmed for controlling a first intensity being represented by an arrow [2828] of the first beam [2812] of the first visible-light emissions [2814], [2815], and the second control facility [2706] is programmed for controlling a second intensity being represented by an arrow [2830] of the second beam [2824] of the second visible light emissions [2826], [2827]; and the third control facility [2707] is programmed for controlling a third intensity being represented by an arrow [2833] of the third beam [2825] of the third visible light emissions [2829], [2831]. In the example [2700] of the lighting controller, the control system [2702] is programmed for modulating the first intensity [2828] of the first beam [2812] and the second intensity [2830] of the second beam [2824] and the third intensity [2833] of the third beam [2825] in a manner for causing the first and second and third beams [2812], [2824], [2825] of the first and second and third visible-light emissions [2814], [2815], [2826], [2827], [2829], [2831] to collectively emulate a progression of ambient sunlight being represented by an arrow [2832].

In some examples [2700] of the lighting controller, the control system [2702] may be programmed for causing the first and second and third beams [2812], [2824], [2825] to collectively emulate the progression [2832] of ambient sunlight by initially modulating the first intensity [2828] of the first beam [2812] to relatively be substantially greater than the third intensity [2833] of the third beam [2825] while modulating the third intensity [2833] of the third beam [2825] to relatively be substantially greater than the second intensity [2830] of the second beam [2824], and by then gradually modulating the second intensity [2830] of the second beam [2824] to relatively become substantially greater than the third intensity [2833] of the third beam [2825] while gradually modulating the third intensity [2833] of the third beam [2825] to relatively become substantially greater than the first intensity [2828] of the first beam [2812]. In other examples [2700] of the lighting controller, the control system [2702] may be programmed for causing two of the beams [2812], [2824], [2825] among the first and second and third beams [2812], [2824], [2825] to together emulate the progression [2832] of ambient sunlight by initially modulating an intensity [2828], [2830], [2833] of a one of the beams [2812], [2824], [2825] to relatively be substantially greater than another intensity [2828], [2830], [2833] of another one of the beams [2812], [2824], [2825], and by then gradually modulating the another intensity [2828], [2830], [2833] of the another one of the beams [2812], [2824], [2825] to relatively become substantially greater than the intensity [2828], [2830], [2833] of the one of the beams [2812], [2824], [2825].

In some examples [2700] of the lighting controller, the control system [2702] may regulate a distribution of a variable power input to: the first plurality of semiconductor light-emitting devices [2804], [2806], [2808] of the first visible-light source [2802] for controlling the intensity [2828] of the first visible-light emissions [2814], [2815]; and the second plurality of semiconductor light-emitting devices [2818], [2820], [2822] of the second visible-light source [2816] for controlling the intensity [2830] of the second visible-light emissions [2826], [2827]; and the third plurality of semiconductor light-emitting devices [2819], [2821], [2823] of the third visible-light source [2817] for controlling the intensity [2833] of the third visible-light emissions [2829], [2831].

In other examples [2700] of the lighting controller, a one of the control facilities [2704], [2706], [2707] may be omitted; and a corresponding one of the visible-light sources [2802], [2816], [2817] may likewise be omitted. In further examples [2700] of the lighting controller, the control system [2702] may include one or more control facilities (not shown) in addition to the first control facility [2704] and the second control facility [2706] and the third control facility [2707]; and one or more visible-light sources in addition to the first visible-light source [2802] and the second visible-light source [2816] and the third visible-light source [2817] may be provided.

In further examples [2700] of the lighting controller, the control system [2702] may be programmed for facilitating an alignment being represented by arrows [2902], [2904] of the first beam [2812] towards a first boundary represented by a dashed line [B1] of an ambient space represented by a dashed box [S] and for facilitating another alignment being represented by arrows [2906], [2908] of the second beam [2824] towards a second boundary represented by a dashed line [B2] of the ambient space [S] being opposite to the first boundary [B1]. In some of those examples [2700] of the lighting controller, the control system [2702] may be programmed for facilitating the alignment [2902], [2904] of the first beam [2812] as being towards the first boundary [B1] of the ambient space [S] and for facilitating the alignment [2906], [2908] of the second beam [2824] as being towards the second boundary [B2] of the ambient space [S], with each of the first and second beams [2812], [2824] being respectively aligned toward the boundaries [B1] and [B2] as being spaced apart from and on opposite sides of a vertical dashed line [2910] intersecting the longitudinal axis [2810]. In further examples [2700] of the lighting controller, the control system [2702] may be programmed for facilitating an alignment being represented by arrows [2911], [2913] of the third beam [2825] being along the vertical dashed line [2910] or being in another direction between the alignment [2902], [2904] and the alignment [2906], [2908]. As additional examples [2700] of the lighting controller, the control system [2702] may include an indicator [2708] for facilitating an alignment being represented by the arrows [2902], [2904] of the first beam [2812] towards the first boundary [B1] of the ambient space [S] and for facilitating another alignment being represented by the arrows [2906], [2908] of the second beam [2824] towards the second boundary [B2] of the ambient space [S] being opposite to the first boundary [B1]. In some examples [2700] of the lighting controller, the control system [2702] may be programmed for facilitating an alignment being represented by arrows [2902], [2904] of the first beam [2812] towards an Eastward direction being represented by an arrow [2912] and for facilitating another alignment being represented by arrows [2906], [2908] of the second beam [2824] towards a Westward direction being represented by an arrow [2914]. In further examples [2700] of the lighting controller, the control system [2702] may provide the indicator [2708] as being for facilitating an alignment being represented by arrows [2902], [2904] of the first beam [2812] towards an Eastward direction being represented by the arrow [2912] and for facilitating another alignment being represented by arrows [2906], [2908] of the second beam [2824] towards a Westward direction being represented by the arrow [2914].

In some examples [2700] of the lighting controller, the control system [2702] may be programmed for modulating the first intensity [2828] of the first beam [2812] and the second intensity [2830] of the second beam [2824] and the third intensity [2833] of the third beam [2825] in a manner for causing the first and second and third beams [2812], [2824], [2825] of the first and second and third visible-light emissions [2814], [2815], [2826], [2827], [2829], [2831] to collectively emulate the progression of ambient sunlight [2832] through a portion of a cycle extending from sunrise being represented by a line [2834] to sunset being represented by a line [2836]; or through a period beginning before sunrise; or through a period ending after sunset; or through a period both beginning before sunrise and ending after sunset. In some examples [2700] of the lighting controller, the control system [2702] may be programmed for modulating the first intensity [2828] of the first beam [2812] and the second intensity [2830] of the second beam [2824] and the third intensity [2833] of the third beam [2825] in a manner for causing the first and second and third beams [2812], [2824], [2825] of the first and second and third visible-light emissions [2814], [2815], [2826], [2827], [2829], [2831] to collectively emulate the progression of ambient sunlight [2832] throughout the cycle extending from sunrise being represented by the line [2834] to sunset being represented by the line [2836]. In further examples [2700] of the lighting controller, the control system [2702] may be programmed for modulating the first intensity [2828] of the first beam [2812] and the second intensity [2830] of the second beam [2824] and the third intensity [2833] of the third beam [2825] in a manner for causing the first and second and third beams [2812], [2824], [2825] of the first and second and third visible-light emissions [2814], [2815], [2826], [2827], [2829], [2831] to collectively initiate an emulation of the progression of ambient sunlight [2832] when a local sunrise occurs as represented by the line [2834] and to collectively conclude the emulation when a corresponding local sunset occurs as represented by the line [2836]. In some of those examples [2700] of the lighting controller, the control system [2702] may include an ambient light sensor [2710] being programmed for sensing an occurrence of the local sunrise [2834] or an occurrence of the local sunset [2836]. In other examples [2700] of the lighting controller, the control system [2702] may include a programmable user interface [2712] enabling an arbitrary selection of a simulated sunrise time [2834] and a simulated sunset time [2836].

In some examples [2700] of the lighting controller, the control system [2702] may be programmed for modulating the first intensity [2828] of the first beam [2812] in a first range, and for modulating the second intensity [2830] of the second beam [2824] in a second range, and for modulating the third intensity [2833] of the third beam [2825] in a third range, in a manner for causing the first and second and third beams [2812], [2824], [2825] of the first and second and third visible-light emissions [2814], [2815], [2826], [2827], [2829], [2831] to collectively emulate the progression of ambient sunlight [2832]. In further examples [2700] of the lighting controller, the control system [2702] may be programmed for controlling the first beam [2812] of the first visible-light emissions [2814], [2815] as having a first baseline intensity being represented by an arrow [2838] and for controlling the second beam [2824] of the second visible-light emissions [2826], [2827] as having a second baseline intensity being represented by an arrow [2840] and for controlling the third beam [2825] of the third visible-light emissions [2829], [2831] as having a third baseline intensity being represented by an arrow [2841]; and the control system [2702] may be programmed for modulating the first intensity [2828] of the first beam [2812] in a first range [2842] being additive to the first baseline intensity [2838] and for modulating the second intensity [2830] of the second beam [2824] in a second range [2844] being additive to the second baseline intensity [2840] and for modulating the third intensity [2833] of the third beam [2825] in a third range [2843] being additive to the third baseline intensity [2841], in the manner for causing the first and second and third beams [2812], [2824], [2825] of the first and second and third visible-light emissions [2814], [2815], [2826], [2827], [2829], [2831] to collectively emulate the progression of ambient sunlight [2832]. In additional examples [2700] of the lighting controller, the control system [2702] may be programmed for controlling the first baseline intensity [2838] and the second baseline intensity [2840] and the third baseline intensity [2841] for causing the first beam [2812] and the second beam [2824] and the third beam [2825] to collectively form a pre-set baseline pattern of the first and second and third visible-light emissions [2814], [2815], [2826], [2827], [2829], [2831]. As examples [2700] of the lighting controller, the control system [2702] may be programmed for selection among a plurality of different pre-programmed combinations of the baseline intensities [2838], [2840], [2841] for the first visible-light emissions [2814], [2815], the second visible-light emissions [2826], [2827], and the third visible-light emissions [2829], [2831]. In some of those examples [2700] of the lighting controller, the control system [2702] may be programmed for controlling the first baseline intensity [2838] and the second baseline intensity [2840] and the third baseline intensity [2841] for causing the first beam [2812] and the second beam [2824] and the third beam [2825] to collectively form a pre-set baseline pattern of the first and second and third visible-light emissions [2814], [2815], [2826], [2827], [2829], [2831] being: center wall graze; table with wall-fill; wall wash right; wall wash left; double wall wash; wall wash right plus floor; wall wash left plus floor; room; or batwing. In examples [2700] of the lighting controller, the control system [2702] may cause the first beam [2812] and the second beam [2824] and the third beam [2825] to respectively have the following baseline intensities [2838]/[2840]/ [2841] collectively constituting one hundred percent of a variable baseline power input of the control system [2702] in order to form the following pre-set baseline patterns of the first and second and third visible-light emissions [2814], [2815], [2826], [2827], [2829], [2831]: center wall graze [0/100/0]; table with wall-fill [17/66/17]; wall wash right [0/0/100]; wall wash left [100/0/0]; double wall wash [50/ 0/50]; wall wash right plus floor [0/33/67]; wall wash left plus floor [67/33/0]; low-glare room lighter [33/34/33]; or low glare quasi-batwing [40/20/40].

In some examples [2700] of the lighting controller, the control system [2702] may regulate a distribution of a variable baseline power input to: the first plurality of semiconductor light-emitting devices [2804], [2806], [2808] of the first visible-light source [2802] for controlling the baseline intensity [2838] of the first visible-light emissions [2814], [2815]; and the second plurality of semiconductor light-emitting devices [2818], [2820], [2822] of the second visible-light source [2816] for controlling the baseline intensity [2840] of the second visible-light emissions [2826], [2827]; and the third plurality of semiconductor light-emitting devices [2819], [2821], [2823] of the third visible-light source [2817] for controlling the baseline intensity [2841] of the third visible-light emissions [2829], [2831]. Further in those examples [2700] of the lighting controller, the control system [2702] may regulate a distribution of a variable additive power input to: the first plurality of semiconductor light-emitting devices [2804], [2806], [2808] of the first visible-light source [2802] for controlling the additive intensity [2842] of the first visible-light emissions [2814], [2815]; and the second plurality of semiconductor light-emitting devices [2818], [2820], [2822] of the second visible-light source [2816] for controlling the additive intensity [2844] of the second visible-light emissions [2826], [2827]; and the third plurality of semiconductor light-emitting devices [2819], [2821], [2823] of the third visible-light source [2817] for controlling the additive intensity [2843] of the third visible-light emissions [2829], [2831].

In further examples [2700] of the lighting controller, the control system [2702] may be programmed for transitioning, over a selectable time period, the baseline intensities [2838], [2840], [2841] for the first visible-light emissions [2814], [2815], the second visible-light emissions [2826], [2827], and the third visible-light emissions [2829], [2831] from a one of the plurality of pre-programmed combinations to another one of the plurality of pre-programmed combinations.

In some examples [2700] of the lighting controller, the first beam direction [2814], [2815] and the second beam direction [2826], [2827] and the third beam direction [2829], [2831] may be down-light beam directions as represented by the arrows [2828], [2830], [2833]. Further in those examples [2700], the control system [2702] may further include a fourth control facility [2718] being coupled with a fourth visible-light source [2916] including a fourth plurality of semiconductor light-emitting devices [2918], [3106], [3002] being spaced apart from and along the longitudinal axis [2810]. Further in those examples [2700] of the lighting controller, the fourth visible-light source [2916] may be positioned for directing a fourth beam [2920] of fourth visible-light emissions being represented by arrows [3114], [3115] from the fourth plurality of semiconductor light-emitting devices [2918], [3106], [3002] in a fourth beam direction also represented by the arrows [3114], [3115], being an up-light beam direction. Additionally in those examples [2700], the control system [2702] may further include a fifth control facility [2720] being coupled with a fifth visible-light source [2922] including a fifth plurality of semiconductor light-emitting devices [2924], [3120], [3006] being spaced apart from and along the longitudinal axis [2810]. Further in those examples [2700] of the lighting controller, the fifth visible-light source [2922] may be positioned for directing a fifth beam [2926] of fifth visible-light emissions being represented by arrows [3126], [3127] from the fifth plurality of semiconductor light-emitting devices [2924], [3120], [3006] in a fifth beam direction also represented by the arrows [3126], [3127], being an up-light beam direction. Further in those examples [2700], the control system [2702] may be programmed for causing the fourth and fifth beams [2920], [2926] to be collectively synchronized with the progression of ambient sunlight [2832] by initially modulating a fourth intensity [3128] of the fourth beam [2920] to relatively be substantially greater than a fifth intensity [3130] of the fifth beam [2926], and by then gradually modulating the fifth intensity [3130] of the fifth beam [2926] to relatively become substantially greater than the fourth intensity [3128] of the fourth beam [2920].

Further in those examples [2700], the control system [2702] may additionally include a sixth control facility [2722] being coupled with a sixth visible-light source [2928] including a sixth plurality of semiconductor light-emitting devices [2930], [3121], [3004] being spaced apart from and along the longitudinal axis [2810]. Further in those examples [2700] of the lighting controller, the sixth visible-light source [2928] may be positioned for directing a sixth beam [2932] of sixth visible-light emissions being represented by arrows [3129], [3131] from the sixth plurality of semiconductor light-emitting devices [2930], [3121], [3004] in a sixth beam direction also represented by the arrows [3129], [3131], being an up-light beam direction. Also in those examples [2700], the control system [2702] may be programmed for causing the fourth and fifth and sixth beams [2920], [2926], [2932] to be collectively synchronized with the progression of ambient sunlight [2832] by initially modulating the fourth intensity [3128] of the fourth beam [2920] to relatively be substantially greater than a sixth intensity [3133] of the sixth beam [2932] while modulating the sixth intensity [3133] of the sixth beam [2932] to relatively be substantially greater than the fifth intensity [3130] of the fifth beam [2926]; and by then gradually modulating the fifth intensity [3130] of the fifth beam [2926] to relatively become substantially greater than the sixth intensity [3133] of the sixth beam [2932] while gradually modulating the sixth intensity [3133] of the sixth beam [2932] to relatively become substantially greater than the fourth intensity [3128] of the fourth beam [2920]. In other examples [2700] of the lighting controller, the control system [2702] may be programmed for causing two of the beams [2920], [2926], [2932] among the fourth and fifth and sixth beams [2920], [2926], [2932] to be collectively synchronized with the progression of ambient sunlight [2832] by initially modulating an intensity [3128], [3130], [3133] of a one of the beams [2920], [2926], [2932] to relatively be substantially greater than another intensity [3128], [3130], [3133] of another one of the beams [2920], [2926], [2932], and by then gradually modulating the another intensity [3128], [3130], [3133] of the another one of the beams [2920], [2926], [2932] to relatively become substantially greater than the intensity [3128], [3130], [3133] of the one of the beams [2920], [2926], [2932].

FIGS. 27-31 further illustrate an example [2800] of an implementation of a lighting system. In some examples, the lighting system [2800] may include: the first visible-light source [2802]; and the second visible-light source [2816]; and the third visible-light source [2817]; and the example [2700] of the lighting controller. In the example [2800] of the lighting system, the lighting controller [2700] may include the control system [2702]. Further in the example [2800] of the lighting system, the control system [2702] may include the first control facility [2704] and the second control facility [2706] and the third control facility [2707]. Additionally in the example [2800] of the lighting system, the first control facility [2704] may be coupled as represented by a dashed line [2714] with the first visible-light source [2802] for controlling the first intensity [2828] of the first beam [2812] of the first visible-light emissions [2814], [2815]. Further in the example [2800] of the lighting system, the second control facility [2706] may be coupled as represented by a dashed line [2716] with the second visible-light source [2816] for controlling the second intensity [2830] of the second beam [2824] of the second visible-light emissions [2826], [2827]. Additionally in the example [2800] of the lighting system, the third control facility [2707] may be coupled as represented by a dashed line [2718] with the third visible-light source [2817] for controlling the third intensity [2833] of the third beam [2825] of the third visible-light emissions [2829], [2831]. In the example [2800] of the lighting system, the first control facility [2704] may be for controlling the first visible-light source [2802] as including a first plurality of semiconductor light-emitting devices [2804], [2806], [2808] being spaced apart from and along a longitudinal axis [2810], the first visible-light source [2802] being positioned for directing a first beam [2812] of first visible-light emissions being represented by arrows [2814], [2815] from the first plurality of semiconductor light-emitting devices [2804], [2806], [2808] in a first beam direction also represented by the arrows [2814], [2815]. In the example [2800] of the lighting system, the second control facility [2706] may be for controlling a second visible-light source [2816] including a second plurality of semiconductor light-emitting devices [2818], [2820], [2822] being spaced apart from and along the longitudinal axis [2810], the second visible-light source [2816] being positioned for directing a second beam [2824] of second visible-light emissions being represented by arrows [2826], [2827] from the second plurality of semiconductor light-emitting devices [2818], [2820], [2822] in a second beam direction also being represented by the arrows [2826], [2827]. In the example [2800] of the lighting system, the third control facility [2707] may be for controlling a third visible-light source [2817] including a third plurality of semiconductor light-emitting devices [2819], [2821], [2823] being spaced apart from and along the longitudinal axis [2810], the third visible-light source [2817] being positioned for directing a third beam [2825] of third visible-light emissions being represented by arrows [2829], [2831] from the third plurality of semiconductor light-emitting devices [2819], [2821], [2823] in a third beam direction also being represented by the arrows [2829], [2831]. In some examples [2800] of the lighting system, the first visible-light source [2802] may include the first plurality of semiconductor light-emitting devices [2804], [2806], [2808] as being arranged in a first string as shown in FIG. 28; and the second visible-light source [2816] may include the second plurality of semiconductor light-emitting devices [2818], [2820], [2822] as being arranged in a second string also shown in FIG. 28; and the third visible-light source [2817] may include the third plurality of semiconductor light-emitting devices [2819], [2821], [2823] as being arranged in a third string also shown in FIG. 28; and the first and second and third strings may generally be mutually parallel. In other examples [2800] of the lighting system (not shown), the first and second and third strings may generally oriented as not being mutually parallel.

In the example [2800] of the lighting system, the first control facility [2704] may be programmed for controlling a first intensity being represented by an arrow [2828] of the first beam [2812] of the first visible-light emissions [2814], [2815], and the second control facility [2706] may be programmed for controlling a second intensity being represented by an arrow [2830] of the second beam [2824] of the second visible light emissions [2826], [2827] and the third control facility [2707] may be programmed for controlling a third intensity being represented by an arrow [2833] of the third beam [2825] of the third visible light emissions [2829], [2831]. In the example [2800] of the lighting system, the control system [2702] may be programmed for modulating the first intensity [2828] of the first beam [2812] and the second intensity [2830] of the second beam [2824] and the third intensity [2833] of the third beam [2825] in a manner for causing the first and second and third beams [2812], [2824], [2825] of the first and second and third visible-light emissions [2814], [2815], [2826], [2827], [2829], [2831] to collectively emulate a progression of ambient sunlight being represented by an arrow [2832].

In some examples [2800] of the lighting system, the first beam direction [2814], [2815] and the second beam direction [2826], [2827] and the third beam direction [2829], [2831] may be down-light beam directions as represented by the arrows [2828], [2830], [2832]. Further in those examples [2800] of the lighting system, the control system [2702] may further include a fourth control facility [2718] being coupled as represented by a dashed line [2715] with a fourth visible-light source [2916] including a fourth plurality of semiconductor light-emitting devices [2918], [3106], [3002] being spaced apart from and along the longitudinal axis [2810]. Further in those examples [2800] of the lighting system, the fourth visible-light source [2916] may be positioned for directing a fourth beam [2920] of fourth visible-light emissions being represented by arrows [3114], [3115] from the fourth plurality of semiconductor light-emitting devices [2918], [3106], [3002] in a fourth beam direction also represented by the arrows [3114], [3115], being an up-light beam direction.

Additionally in those examples [2800] of the lighting system, the control system [2702] may additionally include a fifth control facility [2720] being coupled as represented by a dashed line [2717] with a fifth visible-light source [2922] including a fifth plurality of semiconductor light-emitting devices [2924], [3120], [3006] being spaced apart from and along the longitudinal axis [2810] Further in those examples [2800] of the lighting system, the fifth visible-light source [2922] may be positioned for directing a fifth beam [2926] of fifth visible-light emissions being represented by arrows [3126], [3127] from the fifth plurality of semiconductor light-emitting devices [2924], [3120], [3006] in a fifth beam direction also represented by the arrows [3126], [3127], being an up-light beam direction. Further in those examples [2800] of the lighting system, the control system [2702] may be programmed for causing the fourth and fifth beams [2920], [2926] to be collectively synchronized with the progression of ambient sunlight [2832] by initially modulating a fourth intensity [3128] of the fourth beam [2920] to relatively be substantially greater than a fifth intensity [3130] of the fifth beam [2926], and by then gradually modulating the fifth intensity [3130] of the fifth beam [2926] to relatively become substantially greater than the fourth intensity [3128] of the fourth beam [2920].

Also in those examples [2800] of the lighting system, the control system [2702] may additionally include a sixth control facility [2722] being coupled as represented by a dashed line [2719] with a sixth visible-light source [2928] including a sixth plurality of semiconductor light-emitting devices [2930], [3121], [3004] being spaced apart from and along the longitudinal axis [2810]. Further in those examples [2800] of the lighting system, the sixth visible-light source [2928] may be positioned for directing a sixth beam [2932] of sixth visible-light emissions being represented by arrows [3129], [3131] from the sixth plurality of semiconductor light-emitting devices [2930], [3121], [3004] in a sixth beam direction also represented by the arrows

[3129], [3131], being an up-light beam direction. Also in those examples [2800] of the lighting system, the control system [2702] may be programmed for causing the fourth and fifth and sixth beams [2920], [2926], [2932] to be collectively synchronized with the progression of ambient sunlight [2832] by initially modulating the fourth intensity [3128] of the fourth beam [2920] to relatively be substantially greater than a sixth intensity [3133] of the sixth beam [2932] while modulating the sixth intensity [3133] of the sixth beam [2932] to relatively be substantially greater than the fifth intensity [3130] of the fifth beam [2926]; and by then gradually modulating the fifth intensity [3130] of the fifth beam [2926] to relatively become substantially greater than the sixth intensity [3133] of the sixth beam [2932] while gradually modulating the sixth intensity [3133] of the sixth beam [2932] to relatively become substantially greater than the fourth intensity [3128] of the fourth beam [2920].

Figure 32:
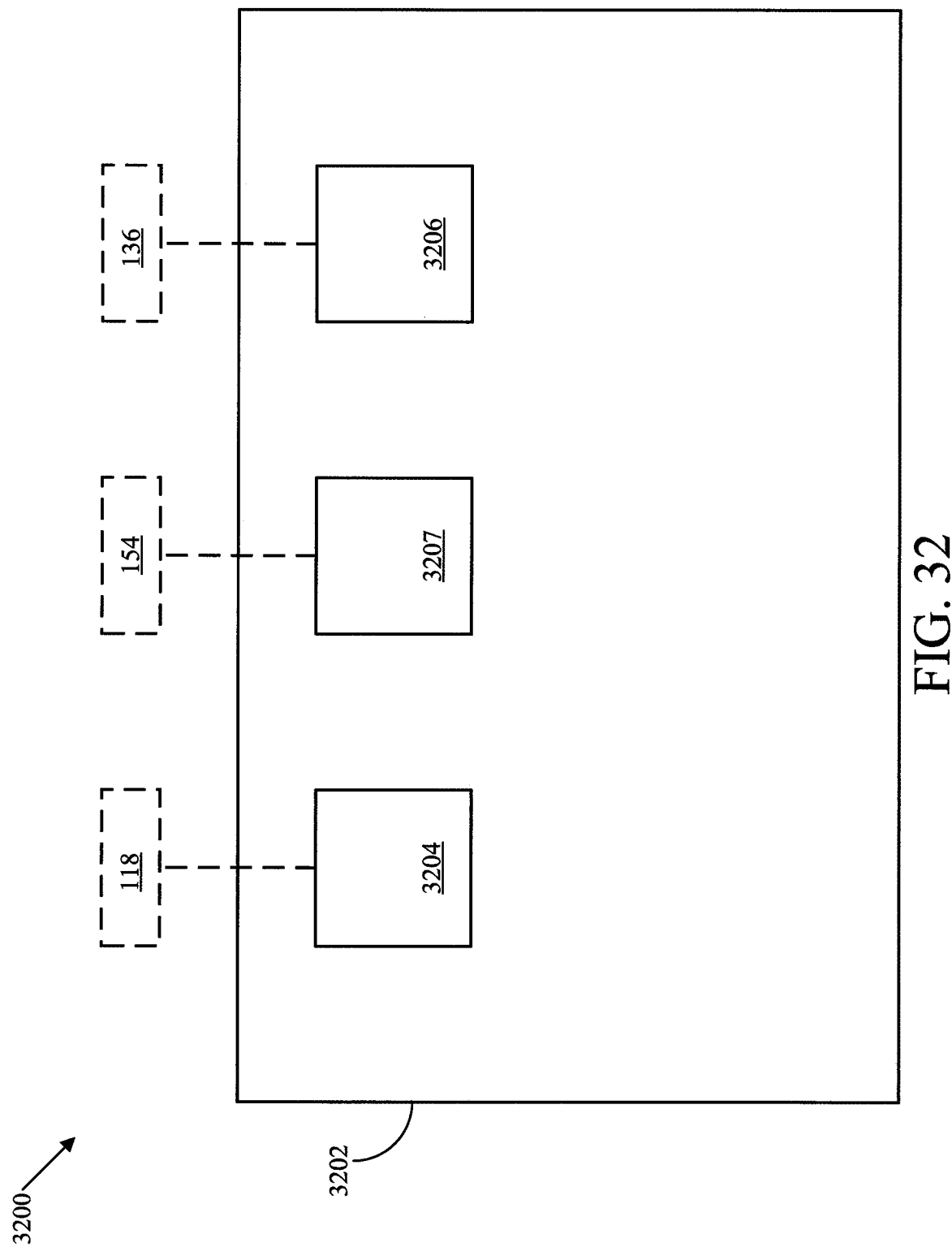
FIG. 32 is a schematic diagram of an example [3200] of a lighting controller, being utilized together with the lighting system [100] discussed earlier in connection with FIGS. 1-4.

FIG. 32 is a schematic diagram of an example [3200] of a lighting controller, being utilized together with the lighting system [100] discussed earlier in connection with FIGS. 1-4. Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. Examples [100], [500], [900], [1300], [1800], [2300], and [2800] of lighting systems together with which the example [3200] of the lighting controller may be utilized are discussed herein, respectively, in connection with FIGS. 1-4; 5-8; 9-12; 13-16; 18-21; 22-26; and 27-31. It is understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is further understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. It is additionally understood throughout this specification that a lighting system [100], [500], [900], [1300], [1800], [2300], [2800] may include any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussion of the example [3200] of an implementation of the lighting controller.

As shown in FIG. 32, the example [3200] of the implementation of the lighting controller includes a control system [3202] including a first control facility [3204] and a second control facility [3206] and a third control facility [3207]. In the example [3200] of the lighting controller, the first control facility [3204] is for controlling a first visible-light source [118] including a first plurality of semiconductor light-emitting devices [120], [122] being spaced apart from and along a longitudinal axis [108], the first visible-light source [118] being positioned for directing a first beam of first visible-light emissions being represented by arrows [124], [126] from the first plurality of semiconductor light-emitting devices [120], [122] into an edge-lit lightguide panel [102] in a first beam direction being represented by the arrows [124], [126]. In the example [3200] of the lighting controller, the second control facility [3206] is for controlling a second visible-light source [136] including a second plurality of semiconductor light-emitting devices [138], [140] being spaced apart from and along the longitudinal axis [108], the second visible-light source [136] being positioned for directing a second beam of second visible-light emissions being represented by arrows [142], [144] from the second plurality of semiconductor light-emitting devices [138], [140] into another edge-lit lightguide panel [104] in a second beam direction being represented by the arrows [142], [144]. In the example [3200] of the lighting controller, the first control facility [3204] is programmed for controlling a first intensity of the first beam [124], [126] of the first visible-light emissions [124], [126], and the second control facility [3206] is programmed for controlling a second intensity of the second beam [142], [144] of the second visible light emissions [142], [144]. In the example [3200] of the lighting controller, the control system [3202] is programmed for modulating the first intensity of the first beam [124], [126] and the second intensity of the second beam [142], [144] in a manner for causing the first and second beams [124], [126], [142], [144] of the first and second visible-light emissions [124], [126], [142], [144] to collectively emulate a progression of ambient sunlight being represented by an arrow [190]. In some examples [3200] of the lighting controller, the third control facility [3207] may be for controlling a third visible-light source [154] including a third plurality of semiconductor light-emitting devices [156], [158] being spaced apart from and along the longitudinal axis [108], the third visible-light source [154] being positioned for directing a third beam of third visible-light emissions being represented by arrows [160], [162] from the third plurality of semiconductor light-emitting devices [156], [158] in a beam direction being represented by the arrows [160], [162] through a total internal reflection lens [106] generally towards an output interface [148]. In those examples [3200] of the lighting controller, the control system [3202] may be programmed for modulating the first intensity of the first beam [124], [126] and the second intensity of the second beam [142], [144] and the third intensity of the third beam [160], [162] in a manner for causing the first and second and third beams [124], [126], [142], [144], [160], [162] of the first and second and third visible-light emissions [124], [126], [142], [144], [160], [162] to collectively emulate a progression of ambient sunlight being represented by the arrow [190].

Figure 33:
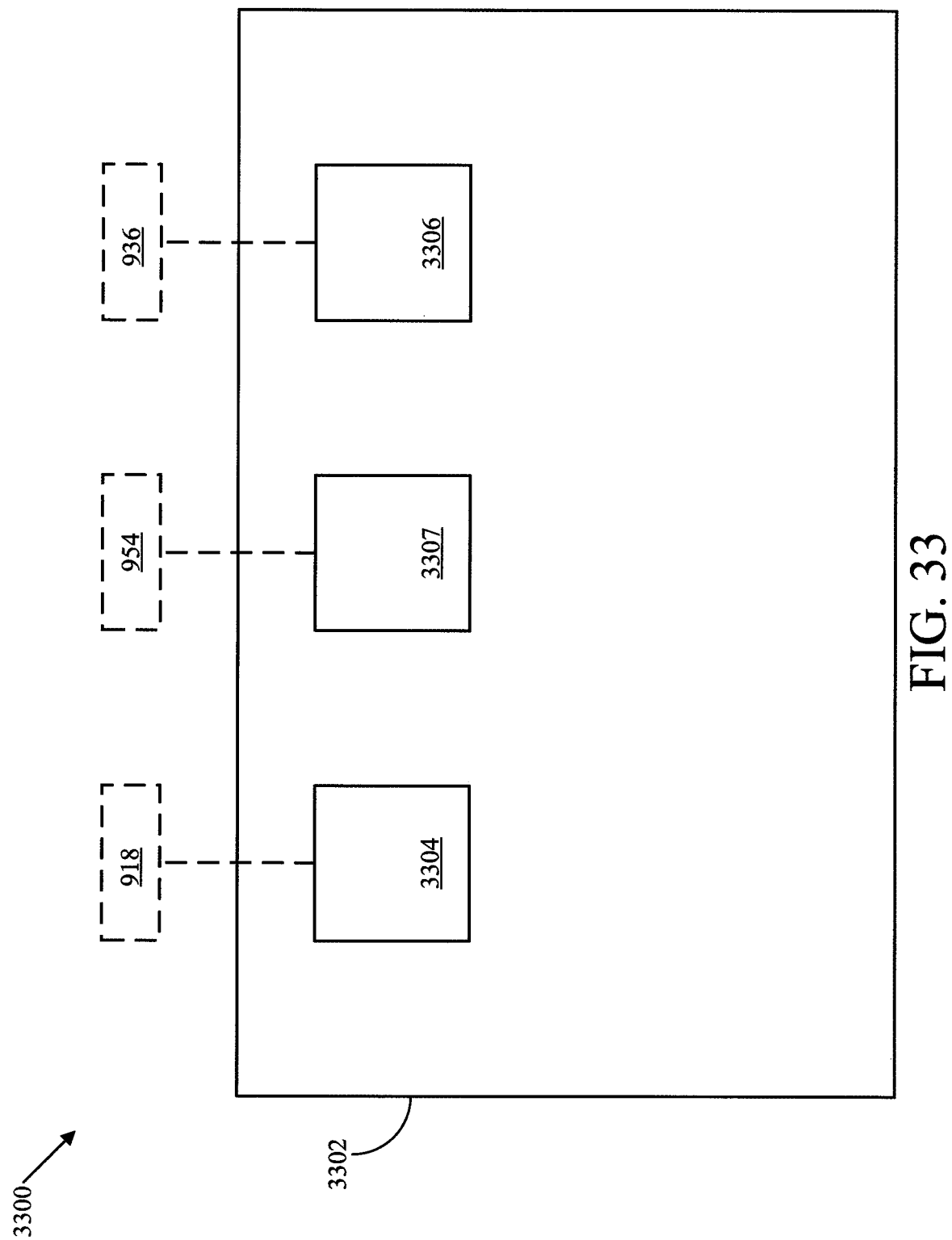
FIG. 33 is a schematic diagram of an example [3300] of a lighting controller, being utilized together with the lighting system [900] discussed earlier in connection with FIGS. 9-12.

FIG. 33 is a schematic diagram of an example [3300] of a lighting controller, being utilized together with the lighting system [900] discussed earlier in connection with FIGS. 9-12. Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. Examples [100], [500], [900], [1300], [1800], [2300], and [2800] of lighting systems together with which the example [3300] of the lighting controller may be utilized are discussed herein, respectively, in connection with FIGS. 1-4; 5-8; 9-12; 13-16; 18-21; 22-26; and 27-31. It is understood throughout this specification that each one of the examples [1700], [2200],

[2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is further understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. It is additionally understood throughout this specification that a lighting system [100], [500], [900], [1300], [1800], [2300], [2800] may include any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussion of the example [3300] of an implementation of the lighting controller.

As shown in FIG. 33, the example [3300] of the implementation of the lighting controller includes a control system [3302] including a first control facility [3304] and a second control facility [3306] and a third control facility [3307]. In the example [3300] of the lighting controller, the first control facility [3304] is for controlling a first visible-light source [918] including a first plurality of semiconductor light-emitting devices [920], [922] being spaced apart from and along a longitudinal axis [908], the first visible-light source [918] being positioned for directing a first beam of first visible-light emissions being represented by arrows [924], [926] from the first plurality of semiconductor light-emitting devices [920], [922] into an edge-lit lightguide panel [902] in a first beam direction being represented by the arrows [924], [926]. In the example [3300] of the lighting controller, the second control facility [3306] is for controlling a second visible-light source [936] including a second plurality of semiconductor light-emitting devices [938], [940] being spaced apart from and along the longitudinal axis [908], the second visible-light source [936] being positioned for directing a second beam of second visible-light emissions being represented by arrows [942], [944] from the second plurality of semiconductor light-emitting devices [938], [940] into another edge-lit lightguide panel [904] in a second beam direction being represented by the arrows [942], [944]. In the example [3300] of the lighting controller, the first control facility [3304] is programmed for controlling a first intensity of the first beam [924], [926] of the first visible-light emissions [924], [926], and the second control facility [3306] is programmed for controlling a second intensity of the second beam [942], [944] of the second visible light emissions [942], [944]. In the example [3300] of the lighting controller, the control system [3302] is programmed for modulating the first intensity of the first beam [924], [926] and the second intensity of the second beam [942], [944] in a manner for causing the first and second beams [924], [926], [942], [944] of the first and second visible-light emissions [924], [926], [942], [944] to collectively emulate a progression of ambient sunlight being represented by an arrow [990]. In some examples [3300] of the lighting controller, the third control facility [3307] may be for controlling a third visible-light source [954] including a third plurality of semiconductor light-emitting devices [956], [958] being spaced apart from and along the longitudinal axis [908], the third visible-light source [954] being positioned for directing a third beam of third visible-light emissions being represented by arrows [960], [962] from the third plurality of semiconductor light-emitting devices [956], [958] in a beam direction being represented by the arrows [960], [962] through a bowl reflector [906] generally towards an output interface [948]. In those examples [3300] of the lighting controller, the control system [3302] may be programmed for modulating the first intensity of the first beam [924], [926] and the second intensity of the second beam [942], [944] and the third intensity of the third beam [960], [962] in a manner for causing the first and second and third beams [924], [926], [942], [944], [960], [962] of the first and second and third visible-light emissions [924], [926], [942], [944], [960], [962] to collectively emulate a progression of ambient sunlight being represented by the arrow [990].

Figure 34:
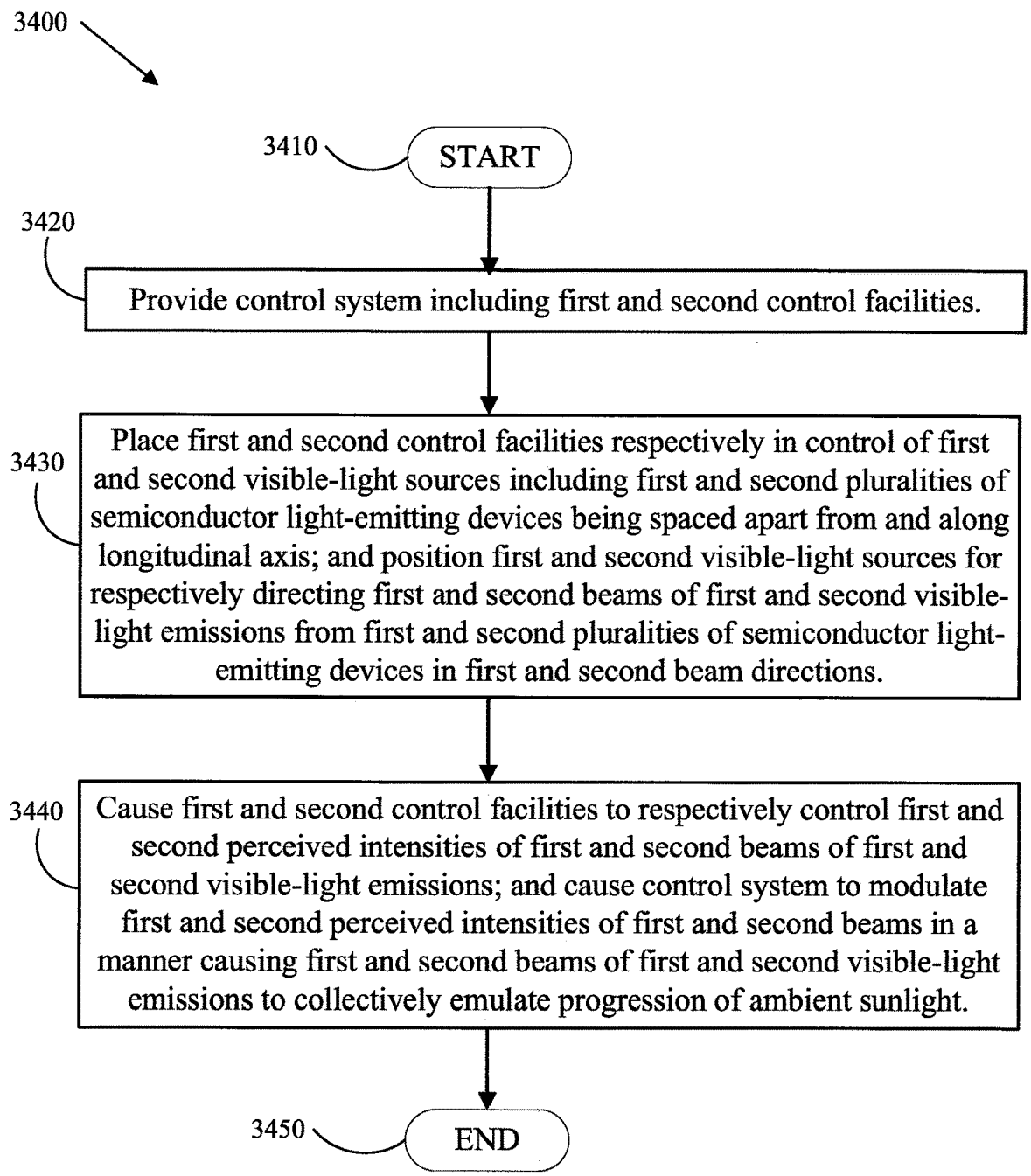
FIG. 34 is a flow chart of an example [3400] of a lighting control method that may be carried out, as an example, utilizing the lighting controller [1700] discussed earlier in connection with FIGS. 17-21.

FIG. 34 is a flow chart of an example [3400] of a lighting control method that may be carried out, as an example, utilizing the lighting controller [1700] discussed earlier in connection with FIGS. 17-21. Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. Examples [100], [500], [900], [1300], [1800], [2300], and [2800] of lighting systems together with which the example [3400] of the lighting control method may be utilized are discussed herein, respectively, in connection with FIGS. 1-4; 5-8; 9-12; 13-16; 18-21; 22-26; and 27-31. It is understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is further understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. It is additionally understood throughout this specification that a lighting system [100], [500], [900], [1300], [1800], [2300], [2800] may include any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussion of the example [3400] of an implementation of the lighting control method.

As shown in FIG. 34 and FIGS. 17-21, the example [3400] of the implementation of the lighting control method starts at step [3410]. At step [3420], the example [3400] of the lighting control method includes providing a control system [1702] including a first control facility [1704] and a second control facility [1706]. Step [3430] of the example [3400] of the lighting control method includes placing the first control facility [1704] in control of a first visible-light source [1802] including a first plurality of semiconductor light-emitting devices [1804], [1806], [1808] being spaced apart from and along a longitudinal axis [1810]; and includes positioning the first visible-light source [1802] for directing a first beam [1812] of first visible-light emissions being represented by arrows [1814], [1815] from the first plurality of semiconductor light-emitting devices [1804], [1806], [1808] in a first beam direction also represented by the arrows [1814], [1815]. Additionally, step [3430] of the example [3400] of the lighting control method includes placing the second control facility [1706] in control of a second visible-light source [1816] including a second plurality of semiconductor light-emitting devices [1818], [1820], [1822] being spaced apart from and along the longitudinal axis [1810]; and includes positioning the second visible-light source [1816] for directing a second beam [1824] of second visible-light emissions being represented by arrows [1826], [1827] from the second plurality of semiconductor light-emitting devices [1818], [1820], [1822] in a second beam direction also being represented by the arrows [1826], [1827]. At step [3440] of the example [3400] of the lighting control method, the first control facility [1704] is caused to control a first intensity being represented by an arrow [1828] of the first beam [1812] of the first visible-light emissions [1814], [1815]; and the second control facility [1706] is caused to control a second intensity being represented by an arrow [1830] of the second beam [1824] of the second visible light emissions [1826], [1827]. Also at step [3440] of the example [3400] of the lighting control method, the control system [1702] is caused to modulate the first intensity [1828] of the first beam [1812] and the second intensity [1830] of the second beam [1824] in a manner causing the first and second beams [1812], [1824] of the first and second visible-light emissions [1814], [1815], [1826], [1827] to collectively emulate a progression of ambient sunlight being represented by an arrow [1832]. In some examples [3400], the lighting control method may then end at step [3450].

In some examples [3400] of the lighting control method, step [3440] may include the control system [1702] as causing the first and second beams [1812], [1824] to collectively emulate the progression [1832] of ambient sunlight by initially modulating the first intensity [1828] of the first beam [1812] to relatively be substantially greater than the second intensity [1830] of the second beam [1824], and by then gradually modulating the second intensity [1830] of the second beam [1824] to relatively become substantially greater than the first intensity [1828] of the first beam [1812]. In further examples [3400] of the lighting control method, step [3440] may include causing the control system [1702] to facilitate an alignment being represented by arrows [1902], [1904] of the first beam [1812] towards a first boundary represented by a dashed line [B1] of an ambient space represented by a dashed box [S] and to facilitate another alignment being represented by arrows [1906], [1908] of the second beam [1824] towards a second boundary represented by a dashed line [B2] of the ambient space [S] being opposite to the first boundary [B1]. In some of those examples [3400] of the lighting control method, step [3440] may include causing the control system [1702] to facilitate the alignment [1902], [1904] of the first beam [1812] as being towards the first boundary [B1] of the ambient space [S] and to facilitate the alignment [1906], [1908] of the second beam [1824] as being towards the second boundary [B2] of the ambient space [S], with each of the first and second beams [1812], [1824] being aligned toward the boundaries [B1] and [B2] as being spaced apart from and on opposite sides of a vertical dashed line [1910] intersecting the longitudinal axis [1810]. As additional examples [3400] of the lighting control method, step [3420] may include providing the control system [1702] as having an indicator [1708] for facilitating an alignment being represented by the arrows [1902], [1904] of the first beam [1812] towards the first boundary [B1] of the ambient space [S] and for facilitating another alignment being represented by the arrows [1906], [1908] of the second beam [1824] towards the second boundary [B2] of the ambient space [S] being opposite to the first boundary [B1]. In some examples [3400] of the lighting control method, step [3440] may include causing the control system [1702] to facilitate an alignment being represented by arrows [1902], [1904] of the first beam [1812] towards an Eastward direction being represented by the dashed line [B1] of the ambient space [S] and to facilitate another alignment being represented by arrows [1906], [1908] of the second beam [1824] towards a Westward direction being represented by the dashed line [B2] of the ambient space [S] being opposite to the Eastward direction [B1]. In further examples [3400] of the lighting control method, step [3420] may include providing the control system [1702] with the indicator [1708] as being for facilitating an alignment being represented by arrows [1902], [1904] of the first beam [1812] towards an Eastward direction being represented by the dashed line [B1] of the ambient space [S] and as being for facilitating another alignment being represented by arrows [1906], [1908] of the second beam [1824] towards a Westward direction being represented by the dashed line [B2] of the ambient space [S] being opposite to the Eastward direction [B1].

In some examples [3400] of the lighting control method, step [3440] may include causing the control system [1702] to modulate the first intensity [1828] of the first beam [1812] and the second intensity [1830] of the second beam [1824] in a manner for causing the first and second beams [1812], [1824] of the first and second visible-light emissions [1814], [1815], [1826], [1827] to collectively emulate the progression of ambient sunlight [1832] through a portion of a cycle extending from sunrise being represented by a line [1834] to sunset being represented by a line [1836]; or through a period beginning before sunrise; or through a period ending after sunset; or through a period both beginning before sunrise and ending after sunset. In some examples [3400] of the lighting control method, step [3400] may include causing the control system [1702] to modulate the first intensity [1828] of the first beam [1812] and the second intensity [1830] of the second beam [1824] in a manner causing the first and second beams [1812], [1824] of the first and second visible-light emissions [1814], [1815], [1826], [1827] to collectively emulate the progression of ambient sunlight [1832] throughout the cycle extending from sunrise being represented by the line [1834] to sunset being represented by the line [1836]. In further examples [3400] of the lighting control method, step [3440] may include causing the control system [1702] to modulate the first intensity [1828] of the first beam [1812] and the second intensity [1830] of the second beam [1824] in a manner for causing the first and second beams [1812], [1824] of the first and second visible-light emissions [1814], [1815], [1826], [1827] to collectively initiate an emulation of the progression of ambient sunlight [1832] when a local sunrise occurs as represented by the line [1834] and to collectively conclude the emulation when a corresponding local sunset occurs as represented by the line [1836]. In some of those examples [3400] of the lighting control method, step [3420] may include providing the control system [1702] as including an ambient light sensor [1710] being programmed for sensing an occurrence of the local sunrise [1834] or an occurrence of the local sunset [1836]. In other examples [3400] of the lighting control method, step [3420] may include providing the control system [1702] as including a programmable user interface [1712]; and step [3440] may include utilizing the programmable user interface [1712] to enter into the control system [1702] an arbitrary selection of a simulated sunrise time [1834] and a simulated sunset time [1836]. In further examples [3400] of the lighting control method, step [3440] may include causing the control system [1702] to modulate the first intensity [1828] of the first beam [1812] and the second intensity [1830] of the second beam [1824] as having a maximum ratio of the first intensity [1828] divided by the second intensity [1830], or as having a maximum ratio of the second intensity [1830] divided by the first intensity [1828], being at least about 10:1. In additional examples [3400] of the lighting control method, step [3440] may include causing the control system [1702] to modulate the first intensity [1828] of the first beam [1812] and the second intensity [1830] of the second beam [1824] as having a maximum ratio of the first intensity [1828] divided by the second intensity [1830], or of the second intensity [1830] divided by the first intensity [1828], being at least about 100:1. In some examples [3400] of the lighting control method, step [3440] may include causing the control system [1702] to modulate the first intensity [1828] of the first beam [1812] in a first range, and to modulate the second intensity [1830] of the second beam [1824] in a second range, in a manner causing the first and second beams [1812], [1824] of the first and second visible-light emissions [1814], [1815], [1826], [1827] to collectively emulate the progression of ambient sunlight [1832].

In further examples [3400] of the lighting control method, step [3440] may include causing the control system [1702] to control the first beam [1812] of the first visible-light emissions [1814], [1815] as having a first baseline intensity being represented by an arrow [1838] and to control the second beam [1824] of the second visible-light emissions [1826], [1827] as having a second baseline intensity being represented by an arrow [1840]. Further in those examples [3400] of the lighting control method, step [3440] may include causing the control system [1702] to modulate the first intensity [1828] of the first beam [1812] in a first range [1842] being additive to the first baseline intensity [1838] and to modulate the second intensity [1830] of the second beam [1824] in a second range [1844] being additive to the second baseline intensity [1840], in a manner causing the first and second beams [1812], [1824] of the first and second visible-light emissions [1814], [1815], [1826], [1827] to collectively emulate the progression of ambient sunlight [1832].

In some examples [3400] of the lighting control method, step [3430] may include causing the control system [1702] to have the first control facility [1704] as being coupled as represented by a dashed line [1714] with the first visible-light source [1802] for controlling the first intensity [1828] of the first beam [1812] of the first visible-light emissions [1814], [1815]; and step [3430] may further include causing the control system [1702] to have the second control facility [1706] as being coupled as represented by a dashed line [1716] with the second visible-light source [1816] for controlling the second intensity [1830] of the second beam [1824] of the second visible-light emissions [1826], [1827].

In other examples [3400] of the lighting control method, step [3440] may include causing the control system [1702] to cause the first control facility [1704] to control the first visible-light source [1802] with the first plurality of semiconductor light-emitting devices [1804], [1806], [1808] being collectively configured for generating the first visible-light emissions [1814], [1815] as having a selectable first perceived color point [1812]. In those examples [3400] of the lighting control method, step [3440] may further include causing the control system [1702] to cause the second control facility [1706] to control the second visible-light source [1816] with the second plurality of semiconductor light-emitting devices [1818], [1820], [1822] being collectively configured for generating the second visible-light emissions [1826], [1827] as having a selectable second perceived color point [1824].

Figure 35:
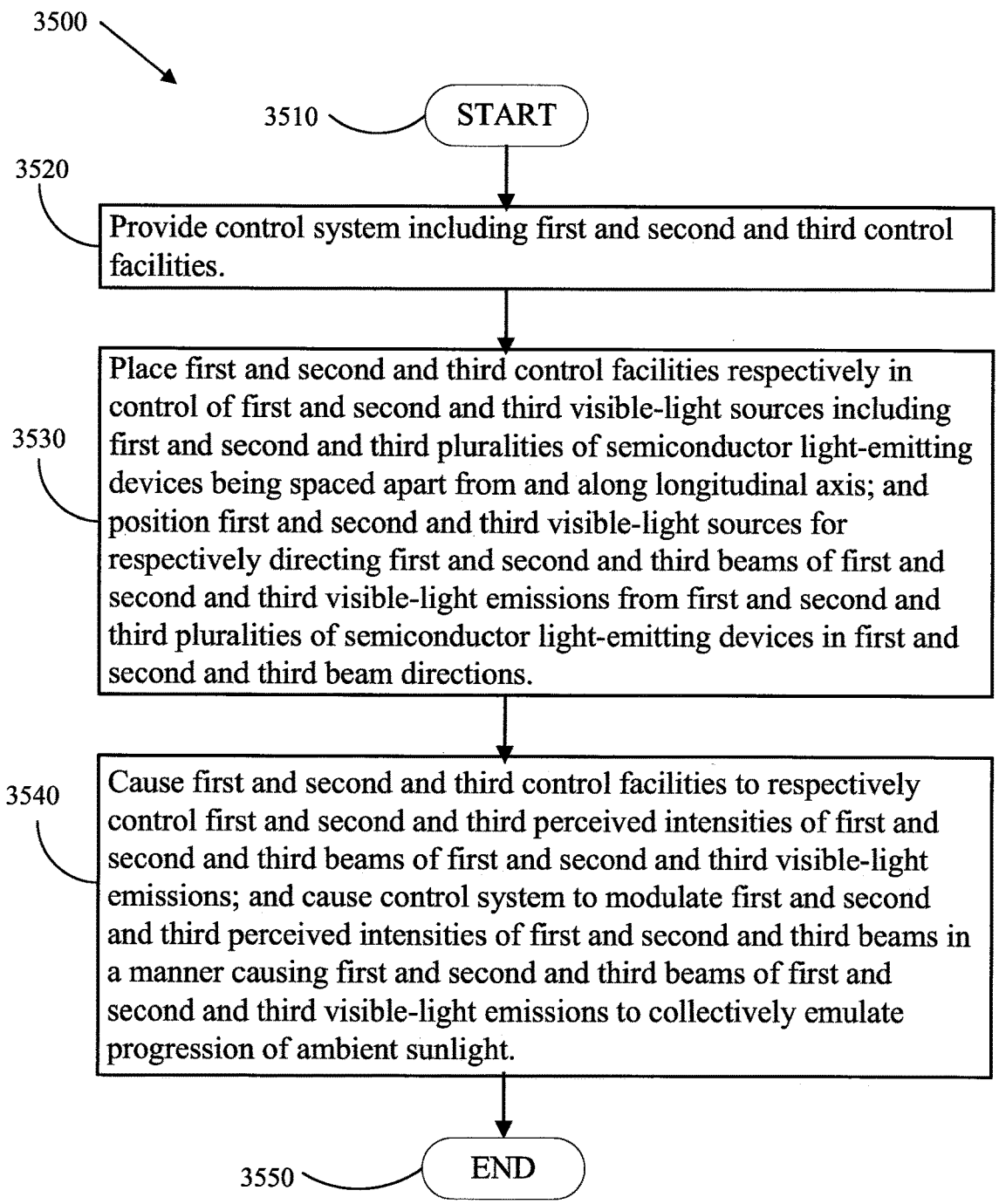
FIG. 35 is a flow chart of an example [3500] of a lighting control method that may be carried out, as an example, utilizing the lighting controller [2200] discussed earlier in connection with FIGS. 22-26.

FIG. 35 is a flow chart of an example [3500] of a lighting control method that may be carried out, as an example, utilizing the lighting controller [2200] discussed earlier in connection with FIGS. 22-26. Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. Examples [100], [500], [900], [1300], [1800], [2300], and [2800] of lighting systems together with which the example [3500] of the lighting control method may be utilized are discussed herein, respectively, in connection with FIGS. 1-4; 5-8; 9-12; 13-16; 18-21; 22-26; and 27-31. It is understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is further understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. It is additionally understood throughout this specification that a lighting system [100], [500], [900], [1300], [1800], [2300], [2800] may include any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussion of the example [3500] of an implementation of the lighting control method.

As shown in FIG. 35 and in FIGS. 22-26, the example [3500] of the implementation of the lighting control method starts at step [3510]. At step [3520], the example [3500] of the lighting control method includes providing a control system [2202] including a first control facility [2204] and a second control facility [2206] and a third control facility [2207]. Further, step [3530] of the example [3500] of the lighting control method includes placing the first control facility [2204] in control of a first visible-light source [2302]

including a first plurality of semiconductor light-emitting devices [2304], [2306], [2308] being spaced apart from and along a longitudinal axis [2310]; and includes positioning the first visible-light source [2302] for directing a first beam [2312] of first visible-light emissions being represented by arrows [2314], [2315] from the first plurality of semiconductor light-emitting devices [2304], [2306], [2308] in a first beam direction also represented by the arrows [2314], [2315]. Additionally, step [3530] of the example [3500] of the lighting control method includes placing the second control facility [2206] in control of a second visible-light source [2316] including a second plurality of semiconductor light-emitting devices [2318], [2320], [2322] being spaced apart from and along the longitudinal axis [2310]; and includes positioning the second visible-light source [2316] for directing a second beam [2324] of second visible-light emissions being represented by arrows [2326], [2327] from the second plurality of semiconductor light-emitting devices [2318], [2320], [2322] in a second beam direction also being represented by the arrows [2326], [2327]. Further, step [3530] of the example [3500] of the lighting control method includes placing the third control facility [2207] in control of a third visible-light source [2317] including a third plurality of semiconductor light-emitting devices [2319], [2321], [2323] being spaced apart from and along the longitudinal axis [2310]; and includes positioning the third visible-light source [2317] for directing a third beam [2325] of third visible-light emissions being represented by arrows [2329], [2331] from the third plurality of semiconductor light-emitting devices [2319], [2321], [2323] in a third beam direction also being represented by the arrows [2329], [2331]. At step [3540] of the example [3500] of the lighting control method, the first control facility [2204] is caused to control a first intensity being represented by an arrow [2328] of the first beam [2312] of the first visible-light emissions [2314], [2315]; and the second control facility [2206] is caused to control a second intensity being represented by an arrow [2330] of the second beam [2324] of the second visible light emissions [2326], [2327]; and the third control facility [2207] is caused to control a third intensity being represented by an arrow [2333] of the third beam [2325] of the third visible light emissions [2329], [2331]. Also at step [3540] of the example [3500] of the lighting control method, the control system [2202] is caused to modulate the first intensity [2328] of the first beam [2312] and the second intensity [2330] of the second beam [2324] and the third intensity [2333] of the third beam [2325] in a manner causing the first and second and third beams [2312], [2324], [2325] of the first and second and third visible-light emissions [2314], [2315], [2326], [2327], [2329], [2331] to collectively emulate a progression of ambient sunlight being represented by an arrow [2332]. In some examples [3500], the lighting control method may then end at step [3550].

In some examples [3500] of the lighting control method, step [3540] may include the control system [2202] as causing the first and second and third beams [2312], [2324], [2325] to collectively emulate the progression [2332] of ambient sunlight by initially modulating the first intensity [2328] of the first beam [2312] to relatively be substantially greater than the third intensity [2333] of the third beam [2325] while modulating the third intensity [2333] of the third beam [2325] to relatively be substantially greater than the second intensity [2330] of the second beam [2324], and by then gradually modulating the second intensity [2330] of the second beam [2324] to relatively become substantially greater than the third intensity [2333] of the third beam [2325] while gradually modulating the third intensity [2333] of the third beam [2325] to relatively become substantially greater than the first intensity [2328] of the first beam [2312]. In other examples [3500] of the lighting control method, step [3540] may include the control system [2202] as causing two of the beams [2312], [2324], [2325] among the first and second and third beams [2312], [2324], [2325] to together emulate the progression [2332] of ambient sunlight by initially modulating an intensity [2328], [2330], [2333] of a one of the beams [2312], [2324], [2325] to relatively be substantially greater than another intensity [2328], [2330], [2333] of another one of the beams [2312], [2324], [2325], and by then gradually modulating the another intensity [2328], [2330], [2333] of the another one of the beams [2312], [2324], [2325] to relatively become substantially greater than the intensity [2328], [2330], [2333] of the one of the beams [2312], [2324], [2325].

In further examples [3500] of the lighting control method, step [3540] may include causing the control system [2202] to facilitate an alignment being represented by arrows [2402], [2404] of the first beam [2312] towards a first boundary represented by a dashed line [B1] of an ambient space represented by a dashed box [S] and to facilitate another alignment being represented by arrows [2406], [2408] of the second beam [2324] towards a second boundary represented by a dashed line [B2] of the ambient space [S] being opposite to the first boundary [B1]. In some of those examples [3500] of the lighting control method, step [3540] may include causing the control system [2202] to facilitate the alignment [2402], [2404] of the first beam [2312] as being towards the first boundary [B1] of the ambient space [S] and to facilitate the alignment [2406], [2408] of the second beam [2324] as being towards the second boundary [B2] of the ambient space [S], with each of the first and second beams [2312], [2324] being aligned toward the boundaries [B1] and [B2] as being spaced apart from and on opposite sides of a vertical dashed line [2410] intersecting the longitudinal axis [2310]. As additional examples [3500] of the lighting control method, step [3520] may include providing the control system [2202] as having an indicator [2208] for facilitating an alignment being represented by the arrows [2402], [2404] of the first beam [2312] towards the first boundary [B1] of the ambient space [S] and for facilitating another alignment being represented by the arrows [2406], [2408] of the second beam [2324] towards the second boundary [B2] of the ambient space [S] being opposite to the first boundary [B1]. In some examples [3500] of the lighting control method, step [3540] may include causing the control system [2202] to facilitate an alignment being represented by arrows [2402], [24004] of the first beam [2312] towards an Eastward direction being represented by the dashed line [B1] of the ambient space [S] and to facilitate another alignment being represented by arrows [2406], [2408] of the second beam [2324] towards a Westward direction being represented by the dashed line [B2] of the ambient space [S] being opposite to the Eastward direction [B1]. In further examples [3500] of the lighting control method, step [3520] may include providing the control system [2202] with the indicator [2208] as being for facilitating an alignment being represented by arrows [2402], [2404] of the first beam [2312] towards an Eastward direction being represented by the dashed line [B1] of the ambient space [S] and as being for facilitating another alignment being represented by arrows [2406], [2408] of the second beam [2324] towards a Westward direction being represented by the dashed line [B2] of the ambient space [S] being opposite to the Eastward direction [B1].

In some examples [3500] of the lighting control method, step [3540] may include causing the control system [2202] to modulate the first intensity [2328] of the first beam [2312] and the second intensity [2330] of the second beam [2324] and the third intensity [2333] of the third beam [2325] in a manner for causing the first and second and third beams [2312], [2324], [2325] of the first and second and third visible-light emissions [2314], [2315], [2326], [2327], [2329], [2331] to collectively emulate the progression of ambient sunlight [2332] through a portion of a cycle extending from sunrise being represented by a line [2334] to sunset being represented by a line [2336]; or through a period beginning before sunrise; or through a period ending after sunset; or through a period both beginning before sunrise and ending after sunset. In some examples [3500] of the lighting control method, step [3540] may include causing the control system [2202] to modulate the first intensity [2328] of the first beam [2312] and the second intensity [2330] of the second beam [2324] and the third intensity [2333] of the third beam [2325] in a manner causing the first and second and third beams [2312], [2324], [2325] of the first and second and third visible-light emissions [2314], [2315], [2326], [2327], [2329], [2331] to collectively emulate the progression of ambient sunlight [2332] throughout the cycle extending from sunrise being represented by the line [2334] to sunset being represented by the line [2336]. In further examples [3500] of the lighting control method, step [3540] may include causing the control system [2202] to modulate the first intensity [2328] of the first beam [2312] and the second intensity [2330] of the second beam [2324] and the third intensity [2333] of the third beam [2325] in a manner causing the first and second and third beams [2312], [2324], [2325] of the first and second and third visible-light emissions [2314], [2315], [2326], [2327], [2329], [2331] to collectively initiate an emulation of the progression of ambient sunlight [2332] when a local sunrise occurs as represented by the line [2334] and to collectively conclude the emulation when a corresponding local sunset occurs as represented by the line [2336]. In some of those examples [3500] of the lighting control method, step [3520] may include providing the control system [2202] as including an ambient light sensor [2210] being programmed for sensing an occurrence of the local sunrise [2334] or an occurrence of the local sunset [2336]. In other examples [3500] of the lighting control method, step [3520] may include providing the control system [2202] as including a programmable user interface [2212]; and step [3540] may include utilizing the programmable user interface [2212] to enter into the control system [2202] an arbitrary selection of a simulated sunrise time [2334] and a simulated sunset time [2336]. In further examples [3500] of the lighting control method, step [3540] may include causing the control system [2202] to modulate the first intensity [2328] of the first beam [2312] and the second intensity [2330] of the second beam [2324] as having a maximum ratio of the first intensity [2328] divided by the second intensity [2330], or as having a maximum ratio of the second intensity [2330] divided by the first intensity [2328], being at least about 10:1. In additional examples [3500] of the lighting control method, step [3540] may include causing the control system [2202] to modulate the first intensity [2328] of the first beam [2312] and the second intensity [2330] of the second beam [2324] as having a maximum ratio of the first intensity [2328] divided by the second intensity [2330], or as having a maximum ratio of the second intensity [2330] divided by the first intensity [2328], being at least about 100:1. In some examples [3500] of the lighting control method, step [3540] may include causing the control system [2202] to modulate the first intensity [2328] of the first beam [2312] in a first range, and to modulate the second intensity [2330] of the second beam [2324] in a second range, and to modulate the third intensity [2333] in a third range, in a manner causing the first and second and third beams [2312], [2324], [2325] of the first and second and third visible-light emissions [2314], [2315], [2326], [2327], [2329], [2331] to collectively emulate the progression of ambient sunlight [2332].

In further examples [3500] of the lighting control method, step [3540] may include causing the control system [2202] to control the first beam [2312] of the first visible-light emissions [2314], [2341] as having a first baseline intensity being represented by an arrow [2338] and to control the second beam [2324] of the second visible-light emissions [2326], [2327] as having a second baseline intensity being represented by an arrow [2340] and to control the third beam [2325] of the third visible-light emissions [2329], [2331] as having a third baseline intensity being represented by an arrow [2341]. Further in those examples [3500] of the lighting control method, step [3540] may include causing control system [2202] to modulate the first intensity [2328] of the first beam [2312] in a first range [2342] being additive to the first baseline intensity [2338] and to modulate the second intensity [2330] of the second beam [2324] in a second range [2344] being additive to the second baseline intensity [2340] and to modulate the third intensity [2333] of the third beam [2325] in a third range [2343] being additive to the third baseline intensity [2341], in a manner causing the first and second and third beams [2312], [2324], [2325] of the first and second and third visible-light emissions [2314], [2315], [2326], [2327], [2329], [2331] to collectively emulate the progression of ambient sunlight [2332].

In additional examples [3500] of the lighting control method, step [3540] may include causing the control system [2202] to control the first baseline intensity [2338] and the second baseline intensity [2340] and the third baseline intensity [2341] for causing the first beam [2312] and the second beam [2324] and the third beam [2325] to collectively form a pre-set baseline pattern of the first and second and third visible-light emissions [2314], [2315], [2326], [2327], [2329], [2331]. As examples [3500] of the lighting control method, step [3540] may include selecting by the control system [2202] among a plurality of different pre-programmed combinations of the baseline intensities [2338], [2340], [2341] for the first visible-light emissions [2314], [2315], the second visible-light emissions [2326], [2327], and the third visible-light emissions [2329], [2331]. In some of those examples [3500] of the lighting control method, step [3540] may include causing the control system [2202] to control the first baseline intensity [2338] and the second baseline intensity [2340] and the third baseline intensity [2341], causing the first beam [2312] and the second beam [2324] and the third beam [2325] to collectively form a pre-set baseline pattern of the first and second and third visible-light emissions [2314], [2315], [2326], [2327], [2329], [2331] being: center wall graze; table with wall-fill; wall wash right; wall wash left; double wall wash; wall wash right plus floor; wall wash left plus floor; room; or batwing.

In further examples [3500] of the lighting control method, step [3540] may include causing the control system [2202] to effectuate a transition, over a selectable time period, of the baseline intensities [2338], [2340], [2341] for the first visible-light emissions [2314], [2315], the second visible-light emissions [2326], [2327], and the third visible-light emissions [2329], [2331] from a one of the plurality of pre-programmed combinations to another one of the plurality of pre-programmed combinations.

In some examples [3500] of the lighting control method, step [3530] may include causing the control system [2202] to have the first control facility [2204] as being coupled as represented by a dashed line [2214] with the first visible-light source [2302] for controlling the first intensity [2328] of the first beam [2312] of the first visible-light emissions [2314], [2315]. In those examples [3500] of the lighting control method, step [3530] may further include causing the control system [2202] to have the second control facility [2206] as being coupled as represented by a dashed line [2216] with the second visible-light source [2316] for controlling the second intensity [2330] of the second beam [2324] of the second visible-light emissions [2326], [2327]. In those examples [3500] of the lighting control method, step [3530] may additionally include causing the control system [2202] to have the third control facility [2207] as being coupled as represented by a dashed line [2218] with the third visible-light source [2317] for controlling the third intensity [2333] of the third beam [2325] of the third visible-light emissions [2329], [2331].

In other examples [3500] of the lighting control method, step [3540] may include causing the control system [2202] to cause the first control facility [2204] to control the first visible-light source [2302] with the first plurality of semiconductor light-emitting devices [2304], [2306], [2308] being collectively configured for generating the first visible-light emissions [2314], [2315] as having a selectable first perceived color point [2312]. In those examples [3500] of the lighting control method, step [3540] may further include causing the control system [2202] to cause the second control facility [2206] to control the second visible-light source [2316] with the second plurality of semiconductor light-emitting devices [2318], [2320], [2322] being collectively configured for generating the second visible-light emissions [2326], [2327] as having a selectable second perceived color point [2324]. In those examples [3500] of the lighting control method, step [3540] may additionally include causing control system [2202] to cause the third control facility [2207] to control the third visible-light source [2317] with the third plurality of semiconductor light-emitting devices [2319], [2321], [2323] being collectively configured for generating the third visible-light emissions [2329], [2331] as having a selectable third perceived color point [2325].

Figure 36:
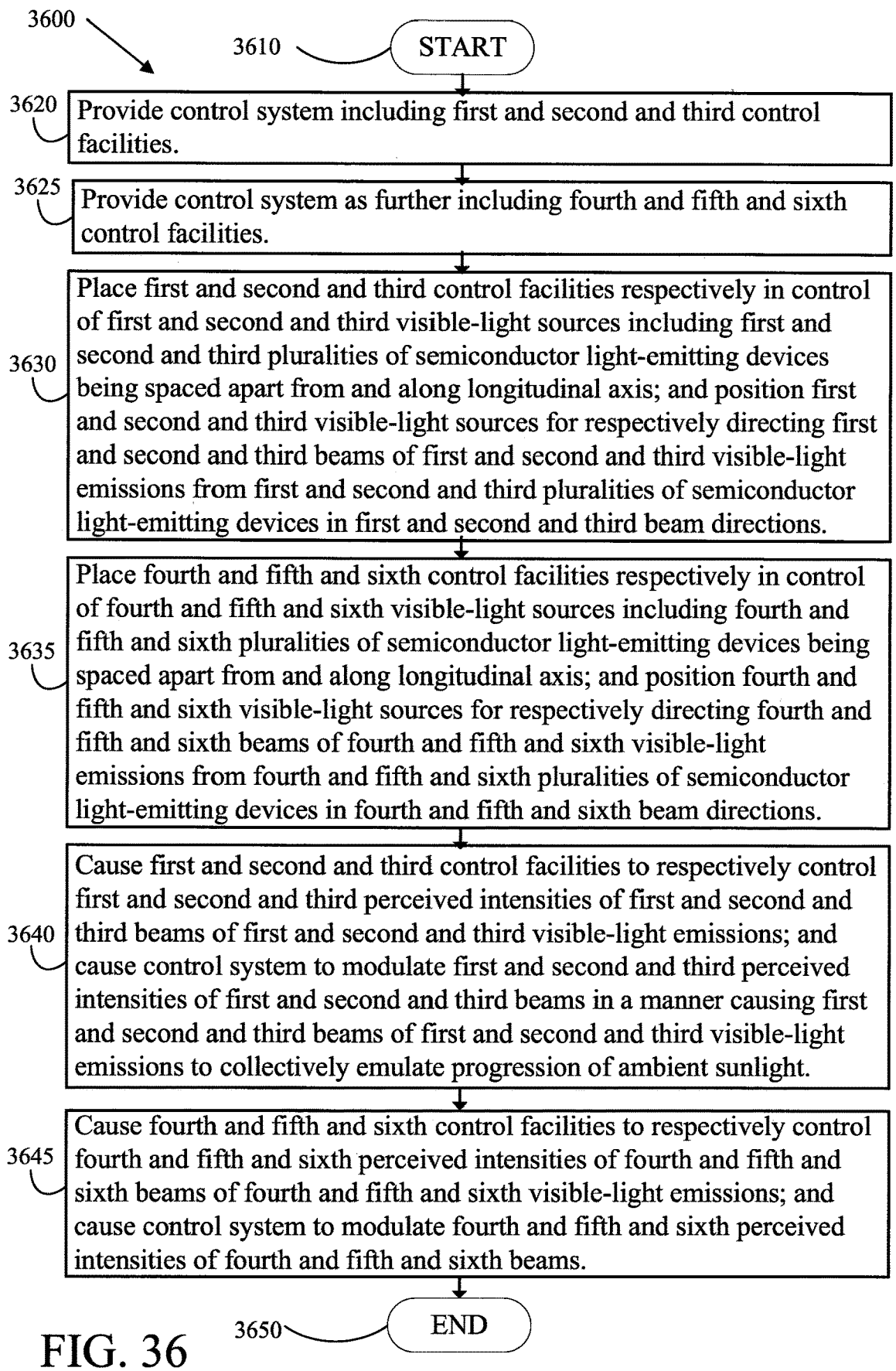
FIG. 36 is a flow chart of an example [3600] of a lighting control method that may be carried out, as an example, utilizing the lighting controller [2700] discussed earlier in connection with FIGS. 27-31.

FIG. 36 is a flow chart of an example [3600] of a lighting control method that may be carried out, as an example, utilizing the lighting controller [2700] discussed earlier in connection with FIGS. 27-31. Examples [1700], [2200], [2700], [3200], and [3300] of lighting controllers are discussed herein, respectively, in connection with FIGS. 17-21; 22-26; 27-31; 32, 1-4; and 33, 9-12. Examples [3400], [3500], [3600] of lighting control methods are discussed herein, respectively, in connection with FIGS. 34, 17-21; 35, 22-26; and 36, 27-31. Examples [100], [500], [900], [1300], [1800], [2300], and [2800] of lighting systems together with which the example [3600] of the lighting control method may be utilized are discussed herein, respectively, in connection with FIGS. 1-4; 5-8; 9-12; 13-16; 18-21; 22-26; and 27-31. It is understood throughout this specification that each one of the examples [1700], [2200], [2700], [3200], [3300] of the lighting controller may be utilized together with a lighting system [100], [500], [900], [1300], [1800], [2300], [2800] including any of the features or combinations of features that are disclosed in connection with any one or more of such lighting systems. It is further understood throughout this specification that each one of the examples [3400], [3500], [3600] of the lighting control method may be utilized together with any of the examples [1700], [2200], [2700], [3200], [3300] of the lighting controller, for controlling a lighting system [100], [500], [900], [1300], [1800], [2300], [2800] including any of the features or combinations of features that are disclosed in connection with any one or more of such lighting systems. It is additionally understood throughout this specification that a lighting system [100], [500], [900], [1300], [1800], [2300], [2800] may include any of the features or combinations of features that are disclosed in connection with any one or more of such lighting systems. Accordingly, FIGS. 1-36 and the entireties of the discussions of the examples [100], [500], [900], [1300], [1800], [2300], [2800] of lighting systems and the entireties of the discussions of the examples [1700], [2200], [2700], [3200], [3300] of the lighting controller and the entireties of the discussions of the examples [3400], [3500], [3600] of lighting control methods are hereby incorporated into the following discussion of the example [3600] of an implementation of the lighting control method.

As shown in FIG. 36 and in FIGS. 27-31, the example [3600] of the implementation of the lighting control method starts at step [3610]. In some examples [3600], the lighting control method may include steps [3620], [3630], and [3640], and may then end at step [3650]. In other examples [3600], the lighting control method may include steps [3620], [3625], [3630], [3635], [3640], and [3645], and may then end at step [3650].

At step [3620], the example [3600] of the lighting control method includes providing a control system [2702] including a first control facility [2704] and a second control facility [2706] and a third control facility [2707].

Step [3630] of the example [3600] of the lighting control method includes placing the first control facility [2704] in control of a first visible-light source [2802] including a first plurality of semiconductor light-emitting devices [2804], [2806], [2808] being spaced apart from and along a longitudinal axis [2810]; and includes positioning the first visible-light source [2802] for directing a first beam [2812] of first visible-light emissions being represented by arrows [2814], [2815] from the first plurality of semiconductor light-emitting devices [2804], [2806], [2808] in a first beam direction also represented by the arrows [2814], [2815]. Additionally, step [3630] of the example [3600] of the lighting control method includes placing the second control facility [2706] in control of a second visible-light source [2816] including a second plurality of semiconductor light-emitting devices [2818], [2820], [2822] being spaced apart from and along the longitudinal axis [2810]; and includes positioning the second visible-light source [2816] for directing a second beam [2824] of second visible-light emissions being represented by arrows [2826], [2827] from the second plurality of semiconductor light-emitting devices [2818], [2820], [2822] in a second beam direction also being represented by the arrows [2826], [2827]. Additionally, step [3630] of the example [3600] of the lighting control method includes placing the third control facility [2707] in control of a third visible-light source [2817] including a third plurality of semiconductor light-emitting devices [2819], [2821], [2328] being spaced apart from and along the longitudinal axis [2810]; and includes positioning the third visible-light source [2817] for directing a third beam [2825] of third visible-light emissions being represented by arrows [2829], [2831] from the third plurality of semiconductor light-emitting devices [2819], [2821], [2823] in a third beam direction also being represented by the arrows [2829], [2831].

At step [3640] of the example [3600] of the lighting control method, the first control facility [2704] is caused to control a first intensity being represented by an arrow [2828] of the first beam [2812] of the first visible-light emissions [2814], [2815]; and the second control facility [2706] is caused to control a second intensity being represented by an arrow [2830] of the second beam [2824] of the second visible light emissions [2826], [2827]; and the third control facility [2707] is caused to control a third intensity being represented by an arrow [2833] of the third beam [2825] of the third visible light emissions [2829], [2831]. Also at step [3640] of the example [3600] of the lighting control method, the control system [2702] may be caused to modulate the first intensity [2828] of the first beam [2812] and the second intensity [2830] of the second beam [2824] and the third intensity [2833] of the third beam [2825] in a manner causing the first and second and third beams [2812], [2824], [2825] of the first and second and third visible-light emissions [2814], [2815], [2826], [2827], [2829], [2831] to collectively emulate a progression of ambient sunlight being represented by an arrow [2832]. In some examples [3600], the lighting control method may then end at step [3650]. In other examples [3600] of the lighting control method, step [3640] may include the control system [2702] as being caused to modulate an intensity [2828], [2830], [2833] of a one among the beams [2812], [2824], [2825], and to modulate another intensity [2828], [2830], [2833] of another one among the beams [2812], [2824], [2825], in a manner causing the two among the beams [2812], [2824], [2825] of the first and second and third visible-light emissions [2814], [2815], [2826], [2827], [2829], [2831] to collectively emulate the progression of ambient sunlight being represented by the arrow [2832].

In some examples, step [3630] of the lighting control method [3600] may include causing the control system [2702] to have the first control facility [2704] as being coupled as represented by a dashed line [2714] with the first visible-light source [2802] for controlling the first intensity [2828] of the first beam [2812] of the first visible-light emissions [2814], [2815]. In those examples [3600] of the lighting control method, step [3630] may further include causing the control system [2702] to have the second control facility [2706] as being coupled as represented by a dashed line [2716] with the second visible-light source [2816] for controlling the second intensity [2830] of the second beam [2824] of the second visible-light emissions [2826], [2827]. In those examples [3600] of the lighting control method, step [3630] may additionally include causing the control system [2702] to have the third control facility [2707] as being coupled as represented by a dashed line [2718] with the third visible-light source [2817] for controlling the third intensity [2833] of the third beam [2825] of the third visible-light emissions [2829], [2831].

In some examples, the lighting control method [3600] may further include step [3625], step [3635], and step [3645]. In some examples [3600] of the lighting control method, step [3625] may include positioning the first beam direction [2814], [2815] and the second beam direction [2826], [2827] and the third beam direction [2829], [2831] as being down-light beam directions as represented by the arrows [2828], [2830], [2833]. Further in those examples [3600], step [3625] of the lighting control method may include providing the control system [2702] as including a fourth control facility [2718] being coupled with a fourth visible-light source [2916] including a fourth plurality of semiconductor light-emitting devices [2918], [3106], [3002] being spaced apart from and along the longitudinal axis [2810]. Additionally in those examples [3600], step [3635] of the lighting control method may include positioning the fourth visible-light source [2916] for directing a fourth beam [2920] of fourth visible-light emissions being represented by arrows [3114], [3115] from the fourth plurality of semiconductor light-emitting devices [2918], [3106], [3002] in a fourth beam direction also represented by the arrows [3114], [3115], being an up-light beam direction. Further in those examples [3600], step [3625] of the lighting control method may include providing the control system [2702] as including a fifth control facility [2720] being coupled with a fifth visible-light source [2922] including a fifth plurality of semiconductor light-emitting devices [2924], [3120], [3006] being spaced apart from and along the longitudinal axis [2810]. Also in those examples [3600], step [3635] of the lighting control method may include positioning the fifth visible-light source [2922] for directing a fifth beam [2926] of fifth visible-light emissions being represented by arrows [3126], [3127] from the fifth plurality of semiconductor light-emitting devices [2924], [3120], [3006] in a fifth beam direction also represented by the arrows [3126], [3127], being an up-light beam direction. Further in those examples [3600], step [3645] of the lighting control method may include: causing the control system [2702] to cause the fourth control facility [2718] and the fifth control facility [2720] to respectively control a fourth intensity [3128] of the fourth beam [2920] of the fourth visible-light emissions [3114], [3115] and a fifth intensity [3130] of the fifth beam [2926] of the fifth visible-light emissions [3126], [3127]; and causing the control system [2702] to modulate the fourth intensity [3128] of the fourth beam [2920] and the fifth intensity [3130] of the fifth beam [2926]. Additionally in those examples [3600], step [3645] of the lighting control method may include causing the control system [2702] to cause the fourth and fifth beams [2920], [2926] to be collectively synchronized with the progression of ambient sunlight [2832] by initially modulating a fourth intensity [3128] of the fourth beam [2920] to relatively be substantially greater than a fifth intensity [3130] of the fifth beam [2926], and by then gradually modulating the fifth intensity [3130] of the fifth beam [2926] to relatively become substantially greater than the fourth intensity [3128] of the fourth beam [2920].

Further in those examples [3600], step [3625] of the lighting control method may include providing the control system [2702] as including a sixth control facility [2722] being coupled with a sixth visible-light source [2928] including a sixth plurality of semiconductor light-emitting devices [2930], [3121], [3004] being spaced apart from and along the longitudinal axis [2810]. Also in those examples [3600], step [3635] of the lighting control method may include positioning the sixth visible-light source [2928] for directing a sixth beam [2932] of sixth visible-light emissions being represented by arrows [3129], [3131] from the sixth plurality of semiconductor light-emitting devices [2930], [3121], [3004] in a sixth beam direction also represented by the arrows [3129], [3131], being an up-light beam direction. Further in those examples [3600], step [3645] of the lighting control method may include: causing the control system [2702] to cause the fourth control facility [2718] and the fifth control facility [2720] and the sixth control facility [2722] to respectively control a fourth intensity [3128] of the fourth beam [2920] of the fourth visible-light emissions [3114], [3115] and a fifth intensity [3130] of the fifth beam [2926]

of the fifth visible-light emissions [3126], [3127] and a sixth intensity [3133] of the sixth beam [2932] of the sixth visible-light emissions [3129], [3131]; and causing the control system [2702] to modulate the fourth intensity [3128] of the fourth beam [2920] and the fifth intensity [3130] of the fifth beam [2926] and the sixth intensity [3133] of the sixth beam [2932]. Additionally in those examples [3600], step [3645] of the lighting control method may include causing the control system [2702] to cause the fourth and fifth and sixth beams [2920], [2926], [2932] to be collectively synchronized with the progression of ambient sunlight [2832] by initially modulating the fourth intensity [3128] of the fourth beam [2920] to relatively be substantially greater than a sixth intensity [3133] of the sixth beam [2932] while modulating the sixth intensity [3133] of the sixth beam [2932] to relatively be substantially greater than the fifth intensity [3130] of the fifth beam [2926]; and by then gradually modulating the fifth intensity [3130] of the fifth beam [2926] to relatively become substantially greater than the sixth intensity [3133] of the sixth beam [2932] while gradually modulating the sixth intensity [3133] of the sixth beam [2932] to relatively become substantially greater than the fourth intensity [3128] of the fourth beam [2920].

The examples [1700], [2200], [2700], [3200], and [3300] of lighting controllers and the examples [3400], [3500], [3600] of lighting control methods may be utilized in controlling a lighting system [100], [500], [900], [1300], [1800], [2300], [2800] in order to effectively emulate a progression of ambient sunlight, while: providing appropriate illumination for defined areas; taking into account the purpose for the illumination; being adaptable for a wide variety of area types and purposes; and providing light emissions having an appropriate and controllable brightness and perceived color point(s) and propagating with a controllable beam angle range and a controllable field angle range. The examples [1700], [2200], [2700], [3200], and [3300] of lighting controllers and the examples [3400], [3500], [3600] of lighting control methods may also be utilized to: emulate the progression of ambient sunlight through a cycle, or a portion of a cycle, extending from sunrise to sunset; or to facilitate the initiation of an emulation of the progression of ambient sunlight when a local sunrise occurs and to collectively conclude the emulation when a corresponding local sunset occurs; or to enable an arbitrary selection of a simulated sunrise time and a simulated sunset time. The examples [1700], [2200], [2700], [3200], and [3300] of lighting controllers and the examples [3400], [3500], [3600] of lighting control methods may further be utilized to permit a lighting system [100], [500], [900], [1300], [1800], [2300], [2800] to illuminate an ambient space with a pre-programmed or pre-set baseline pattern, such as center wall graze, table with wall-fill, wall wash right, wall wash left, double wall wash, wall wash right plus floor, wall wash left plus floor, room, or batwing, while also emulating a progression of ambient sunlight. Further lighting systems and lighting methods with which the lighting controllers [1700], [2200], [2700], [3200], and [3300], the lighting systems [100], [500], [900], [1300], [1800], [2300], [2800] and the lighting control methods [3400], [3500], [3600] may be utilized are disclosed in commonly-owned PCT international patent application serial number PCT/US2018/029380 filed on Apr. 25, 2018, and in commonly-owned U.S. provisional patent application Ser. No. 62/491,137 filed on Apr. 27, 2017, and in commonly-owned U.S. provisional patent application Ser. No. 62/562,714 filed on Sep. 25, 2017, and in commonly-owned U.S. provisional patent application Ser. No. 62/665,980 filed on May 2, 2018, the entirety of each one of which hereby is incorporated herein by reference.

While the present invention has been disclosed in a presently defined context, it will be recognized that the present teachings may be adapted to a variety of contexts consistent with this disclosure and the claims that follow. For example, the lighting systems and processes shown in the figures and discussed above can be adapted in the spirit of the many optional parameters described.

I claim:

1. A lighting controller, comprising:
   a control system including a microprocessor, a first driver for semiconductor light-emitting devices, and a second driver for semiconductor light-emitting devices;
   the first driver controlling a first visible-light source including a first plurality of semiconductor light-emitting devices being spaced apart from and along a longitudinal axis, the first visible-light source being positioned for directing a first beam of first visible-light emissions from the first plurality of semiconductor light-emitting devices in a first beam direction;
   the second driver controlling a second visible-light source including a second plurality of semiconductor light-emitting devices being spaced apart from and along the longitudinal axis, the second visible-light source being positioned for directing a second beam of second visible-light emissions from the second plurality of semiconductor light-emitting devices in a second beam direction being spaced apart from the first beam direction;
   wherein the control system is programmed for controlling an overall intensity of the first beam of the first visible-light emissions as including a first baseline intensity combined with a first variable intensity, and for controlling another overall intensity of the second beam of the second visible-light emissions as including a second baseline intensity combined with a second variable intensity, and for causing the first baseline intensity and the second baseline intensity to collectively form a one of a plurality of pre-programmed combined baseline light emission patterns; and
   wherein the control system is programmed for causing the first and second visible-light sources to emulate a progression of ambient sunlight by initially modulating the first variable intensity of the first beam to be substantially greater than the second variable intensity of the second beam and by then progressively modulating the second variable intensity of the second beam to become substantially greater than the first variable intensity of the first beam.

2. The lighting controller of claim 1, wherein the control system is programmed for facilitating an alignment of the first beam towards a first boundary of an ambient space and for facilitating another alignment of the second beam towards a second boundary of the ambient space being opposite to the first boundary.

3. The lighting controller of claim 1, wherein the control system is programmed for modulating the first variable intensity of the first beam and the second variable intensity of the second beam for emulating the progression of ambient sunlight throughout a cycle extending from sunrise to sunset.

4. The lighting controller of claim 1, wherein the control system includes a programmable user interface enabling the progression of ambient sunlight to include an arbitrary selection of a simulated sunrise time and a simulated sunset time.

5. The lighting controller of claim 1, wherein the control system is programmed for transitioning, over a selectable time period, the first baseline intensity of the first beam of the first visible-light emissions and the second baseline intensity of the second beam of the second visible-light emissions to another one of the plurality of the pre-programmed combined baseline light emission patterns.

6. The lighting controller of claim 1, wherein the control system is programmed for controlling the first baseline intensity and the second baseline intensity for causing the first beam and the second beam to collectively form a one of the plurality of the pre-programmed combined baseline light emission patterns of the first and second visible-light emissions being: center wall graze; table with wall-fill; wall wash right; wall wash left; double wall wash; wall wash right plus floor; wall wash left plus floor; room; or batwing.

7. The lighting controller of claim 1,
wherein the control system is coupled with the first visible-light source for controlling the overall intensity of the first beam of the first visible-light emissions; and
wherein the control system is coupled with the second visible-light source for controlling the another overall intensity of the second beam of the second visible-light emissions.

8. The lighting controller of claim 1, wherein the control system is programmed for controlling the first visible-light source with the first plurality of semiconductor light-emitting devices being collectively configured for generating the first visible-light emissions as having a selectable first perceived color point; and wherein the control system is programmed for controlling the second visible-light source with the second plurality of semiconductor light-emitting devices being collectively configured for generating the second visible-light emissions as having a selectable second perceived color point.

9. A lighting system including: the lighting controller of claim 1; the first visible-light source; and the second visible-light source;
wherein the control system is coupled with the first visible-light source for controlling the overall intensity of the first beam of the first visible-light emissions; and
wherein the control system is coupled with the second visible-light source for controlling the another overall intensity of the second beam of the second visible-light emissions.

10. The lighting controller of claim 1, wherein the control system is programmed for modulating the first variable intensity of the first beam and for modulating the second variable intensity of the second beam in a manner for causing the first and second beams of the first and second visible-light emissions to emulate the progression of ambient sunlight as being through a continuous portion of a cycle extending from sunrise to sunset.

11. The lighting controller of claim 1, wherein the first beam direction and the second beam direction are downlight beam directions.

12. The lighting controller of claim 11, including a third driver for semiconductor light-emitting devices, the third driver controlling a third visible-light source including a third plurality of semiconductor light-emitting devices being spaced apart from and along the longitudinal axis, the third visible-light source being positioned for directing a third beam of third visible-light emissions from the third plurality of semiconductor light-emitting devices in a third beam direction being an up-light beam direction.

13. A lighting controller, comprising:
a control system including a first control facility for controlling a first visible-light source including a first plurality of semiconductor light-emitting devices being spaced apart from and along a longitudinal axis, the first visible-light source being positioned for directing a first beam of first visible-light emissions from the first plurality of semiconductor light-emitting devices in a first beam direction;
the control system including a second control facility for controlling a second visible-light source including a second plurality of semiconductor light-emitting devices being spaced apart from and along the longitudinal axis, the second visible-light source being positioned for directing a second beam of second visible-light emissions from the second plurality of semiconductor light-emitting devices in a second beam direction;
the control system including a third control facility for controlling a third visible-light source including a third plurality of semiconductor light-emitting devices being spaced apart from and along the longitudinal axis, the third visible-light source being positioned for directing a third beam of third visible-light emissions from the third plurality of semiconductor light-emitting devices in a third beam direction;
wherein the first control facility is programmed for controlling an overall intensity of the first beam of the first visible-light emissions as including a first baseline intensity combined with a first variable intensity, and wherein the second control facility is programmed for controlling another overall intensity of the second beam of the second visible light emissions as including a second baseline intensity combined with a second variable intensity,
and wherein the third control facility is programmed for controlling a further overall intensity of the third beam of the third visible light emissions as including a third baseline intensity combined with a third variable intensity, and wherein the control system is programmed for causing the first baseline intensity and the second baseline intensity and the third baseline intensity to collectively form a one of a plurality of pre-programmed combined baseline light emission patterns;
and wherein the control system is programmed for modulating the first variable intensity of the first beam and the second variable intensity of the second beam and the third variable intensity of the third beam in a manner for causing the first and second and third beams of the first and second and third visible-light emissions to collectively emulate a progression of ambient sunlight.

14. The lighting controller of claim 13, wherein the control system is programmed for causing the first and second and third beams to collectively emulate the progression of ambient sunlight by initially modulating the first variable intensity of the first beam to relatively be substantially greater than the third variable intensity of the third beam while modulating the third variable intensity of the third beam to relatively be substantially less than the second variable intensity of the second beam, and by then gradually modulating the second variable intensity of the second beam to relatively become substantially less than the third variable intensity of the third beam while gradually modulating the first variable intensity of the first beam to relatively become substantially less than the second variable intensity of the second beam.

15. The lighting controller of claim 13, wherein the control system is programmed for facilitating an alignment of the first beam towards a first boundary of an ambient space and for facilitating another alignment of the third beam towards a second boundary of the ambient space being opposite to the first boundary.

16. The lighting controller of claim 13, wherein the control system is programmed for modulating the first variable intensity of the first beam and the second variable intensity of the second beam and the third variable intensity of the third beam in a manner for causing the first and second and third beams of the first and second and third visible-light emissions to collectively emulate the progression of ambient sunlight throughout a cycle extending from sunrise to sunset.

17. The lighting controller of claim 13, wherein the control system includes a programmable user interface enabling an arbitrary selection of a simulated sunrise time and a simulated sunset time.

18. The lighting controller of claim 13, wherein the control system is programmed for controlling the first baseline intensity and the second baseline intensity and the third baseline intensity for causing the first beam and the second beam and the third beam to collectively form a one of the plurality of the pre-programmed combined baseline patterns of the first and second and third visible-light emissions being: center wall graze; table with wall-fill; wall wash right; wall wash left; double wall wash; wall wash right plus floor; wall wash left plus floor; room; or batwing.

19. The lighting controller of claim 13, wherein the control system is programmed for transitioning, over a selectable time period, the first, second and third baseline intensities for the first visible-light emissions, the second visible-light emissions, and the third visible-light emissions from a one of the plurality of pre-programmed combined baseline light emission patterns to another one of the plurality of pre-programmed combined baseline light emission patterns.

20. The lighting controller of claim 13,
wherein the first control facility is coupled with the first visible-light source for controlling the overall intensity of the first beam of the first visible-light emissions;
wherein the second control facility is coupled with the second visible-light source for controlling the another overall intensity of the second beam of the second visible-light emissions; and
wherein the third control facility is coupled with the third visible-light source for controlling the further overall intensity of the third beam of the third visible-light emissions.

21. The lighting controller of claim 20, wherein the first beam direction and the second beam direction and the third beam direction are down-light beam directions.

22. The lighting controller of claim 21, wherein the control system further includes a fourth control facility being coupled with a fourth visible-light source including a fourth plurality of semiconductor light-emitting devices being spaced apart from and along the longitudinal axis, the fourth visible-light source being positioned for directing a fourth beam of fourth visible-light emissions from the fourth plurality of semiconductor light-emitting devices in a fourth beam direction being an up-light beam direction.

23. The lighting controller of claim 22, wherein the control system further includes a fifth control facility being coupled with a fifth visible-light source including a fifth plurality of semiconductor light-emitting devices being spaced apart from and along the longitudinal axis, the fifth visible-light source being positioned for directing a fifth beam of fifth visible-light emissions from the fifth plurality of semiconductor light-emitting devices in a fifth beam direction being an up-light beam direction.

24. The lighting controller of claim 23, wherein the control system is programmed for causing the fourth and fifth beams to be collectively synchronized with the progression of ambient sunlight by initially modulating a fourth intensity of the fourth beam to relatively be substantially greater than a fifth intensity of the fifth beam, and by then gradually modulating the fifth intensity of the fifth beam to relatively become substantially greater than the fourth intensity of the fourth beam.

25. The lighting controller of claim 24, wherein the control system further includes a sixth control facility being coupled with a sixth visible-light source including a sixth plurality of semiconductor light-emitting devices being spaced apart from and along the longitudinal axis, the sixth visible-light source being positioned for directing a sixth beam of sixth visible-light emissions from the sixth plurality of semiconductor light-emitting devices in a sixth beam direction being an up-light beam direction.

26. The lighting controller of claim 25, wherein the control system is programmed for causing the fourth and fifth and sixth beams to be collectively synchronized with the progression of ambient sunlight by initially modulating the fourth intensity of the fourth beam to relatively be substantially greater than a sixth intensity of the sixth beam while modulating the sixth intensity of the sixth beam to relatively be substantially less than the fifth intensity of the fifth beam, and by then gradually modulating the sixth intensity of the sixth beam to relatively become substantially greater than the fifth intensity of the fifth beam while gradually modulating the fourth intensity of the fourth beam to relatively become substantially less than the fifth intensity of the fifth beam.

27. The lighting controller of claim 13, wherein the first control facility is for controlling the first visible-light source with the first plurality of semiconductor light-emitting devices being collectively configured for generating the first visible-light emissions as having a selectable first perceived color point; and wherein the second control facility is for controlling the second visible-light source with the second plurality of semiconductor light-emitting devices being collectively configured for generating the second visible-light emissions as having a selectable second perceived color point; and wherein the third control facility is for controlling the third visible-light source with the third plurality of semiconductor light-emitting devices being collectively configured for generating the third visible-light emissions as having a selectable third perceived color point.

28. A lighting system including: the lighting controller of claim 13; the first visible-light source; the second visible-light source; and the third visible-light source;
wherein the first control facility is coupled with the first visible-light source for controlling the overall intensity of the first beam of the first visible-light emissions;
wherein the second control facility is coupled with the second visible-light source for controlling the another overall intensity of the second beam of the second visible-light emissions; and wherein the third control facility is coupled with the third visible-light source for controlling the further overall intensity of the third beam of the third visible-light emissions.

29. The lighting system of claim 28, including a fourth visible-light source including a fourth plurality of semiconductor light-emitting devices being spaced apart from and along the longitudinal axis, the fourth visible-light source being positioned for directing a fourth beam of fourth visible-light emissions from the fourth plurality of semiconductor light-emitting devices in a fourth beam direction being an up-light beam direction, and including a fourth control facility, wherein the fourth control facility is coupled with the fourth visible-light source for controlling a fourth intensity of the fourth beam of the fourth visible-light emissions.

30. A lighting system including:
the lighting controller of claim 18;
an edge-lit lightguide panel being extended along the longitudinal axis, the edge-lit lightguide panel having a pair of mutually-opposing panel surfaces and having a peripheral edge being extended along and spaced transversely away from the longitudinal axis, wherein one of the pair of panel surfaces includes a first light output interface;
a first visible-light source including a first plurality of semiconductor light-emitting devices, the first visible-light source being configured for generating first visible-light emissions from the first plurality of semiconductor light-emitting devices and being located along the peripheral edge for directing the first visible-light emissions into the edge-lit lightguide panel;
another edge-lit lightguide panel being extended along the longitudinal axis, the another edge-lit lightguide panel having another pair of mutually-opposing panel surfaces and having another peripheral edge being extended along and spaced transversely away from the longitudinal axis, wherein one of the another pair of panel surfaces includes a second light output interface;
a third visible-light source including a third plurality of semiconductor light-emitting devices, the third visible-light source being configured for generating third visible-light emissions from the third plurality of semiconductor light-emitting devices and being located along the another peripheral edge for directing the third visible-light emissions into the another edge-lit lightguide panel;
a total internal reflection lens, having a central light-emission axis being transverse to the longitudinal axis, the total internal reflection lens including a third light output interface being located between the first and second light output interfaces, the third light output interface being spaced apart from a central light input interface by a total internal reflection side surface, the total internal reflection side surface being extended along the central light-emission axis, the total internal reflection lens having a second visible-light source including a second plurality of semiconductor light-emitting devices, the second visible-light source being configured for generating second visible-light emissions from the second plurality of semiconductor light-emitting devices and being located at the central light input interface for directing the second visible-light emissions through the total internal reflection lens to the third light output interface;
wherein the first, second and third light output interfaces cooperatively define an emission aperture for forming combined visible-light emissions including the first visible-light emissions, the second visible-light emissions, and the third visible-light emissions; and
wherein the emission aperture forms a shielding zone for redirecting some of the combined visible-light emissions.

31. A lighting system including:
the lighting controller of claim 13;
an edge-lit lightguide panel being extended along the longitudinal axis, the edge-lit lightguide panel having a pair of mutually-opposing panel surfaces and having a peripheral edge being extended along and spaced transversely away from the longitudinal axis, wherein one of the pair of panel surfaces includes a first light output interface;
a first visible-light source including a first plurality of semiconductor light-emitting devices, the first visible-light source being configured for generating first visible-light emissions from the first plurality of semiconductor light-emitting devices and being located along the peripheral edge for directing the first visible-light emissions into the edge-lit lightguide panel;
another edge-lit lightguide panel being extended along the longitudinal axis, the another edge-lit lightguide panel having another pair of mutually-opposing panel surfaces and having another peripheral edge being extended along and spaced transversely away from the longitudinal axis, wherein one of the another pair of panel surfaces includes a second light output interface;
a third visible-light source including a third plurality of semiconductor light-emitting devices, the third visible-light source being configured for generating third visible-light emissions from the third plurality of semiconductor light-emitting devices and being located along the another peripheral edge for directing the third visible-light emissions into the another edge-lit lightguide panel;
a bowl reflector having a central light-emission axis being transverse to the longitudinal axis, the bowl reflector including a third light output interface being located between the first and second light output interfaces, the third light output interface being spaced apart from a central light input interface by a visible-light - reflective side surface, the visible-light-reflective side surface being extended along the central light-emission axis and defining a portion of a cavity, the bowl reflector having a second visible-light source including a second plurality of semiconductor light-emitting devices, the second visible-light source being configured for generating second visible-light emissions from the second plurality of semiconductor light-emitting devices and being located at the central light input interface for directing the second visible-light emissions through the cavity to the third light output interface;
wherein the first, second and third light output interfaces cooperatively define an emission aperture for forming combined visible-light emissions including the first visible-light emissions, the second visible-light emissions, and the third visible-light emissions; and
wherein the emission aperture forms a shielding zone for redirecting some of the combined visible-light emissions.

32. A lighting control method, comprising:
providing a first visible-light source including a first plurality of semiconductor light-emitting devices being spaced apart from and along a longitudinal axis, the first visible-light source being positioned for directing a first beam of first visible-light emissions from the first plurality of semiconductor light-emitting devices in a first beam direction;

providing a second visible-light source including a second plurality of semiconductor light-emitting devices being spaced apart from and along the longitudinal axis, the second visible-light source being positioned for directing a second beam of second visible-light emissions from the second plurality of semiconductor light-emitting devices in a second beam direction being spaced apart from the first beam direction;

controlling an overall intensity of the first beam of the first visible-light emissions as including a first baseline intensity combined with a first variable intensity, and controlling another overall intensity of the second beam of the second visible-light emissions as including a second baseline intensity combined with a second variable intensity, and causing the first baseline intensity and the second baseline intensity to collectively form a one of a plurality of pre-programmed combined baseline light emission patterns; and emulating a progression of ambient sunlight by initially modulating the first variable intensity of the first beam to be substantially greater than the second variable intensity of the second beam and by then progressively modulating the second variable intensity of the second beam to become substantially greater than the first variable intensity of the first beam.

33. The lighting control method of claim 32, wherein the emulating the progression of ambient sunlight includes modulating the first variable intensity of the first beam and the second variable intensity of the second beam for emulating the progression of ambient sunlight throughout a cycle extending from sunrise to sunset.

34. The lighting control method of claim 32, wherein the emulating the progression of ambient sunlight includes initiating an emulation of the progression of ambient sunlight at an arbitrary user-selected time of a simulated sunrise and concluding the emulation at an arbitrary user-selected time of a simulated sunset.

35. The lighting control method of claim 32, including generating the first visible-light emissions as having a selectable first perceived color point; and including generating the second visible-light emissions as having a selectable second perceived color point.

36. The lighting control method of claim 32, wherein the method includes transitioning the first baseline intensity of the first beam of the first visible-light emissions and the second baseline intensity of the second beam of the second visible-light emissions to another one of the plurality of the pre-programmed combined baseline light emission patterns over a selectable time period.

37. The lighting control method of claim 32, wherein the method includes controlling the first baseline intensity and the second baseline intensity for causing the first beam and the second beam to collectively form a one of the plurality of the pre-programmed combined baseline light emission patterns of the first and second visible-light emissions being: center wall graze; table with wall-fill; wall wash right; wall wash left; double wall wash; wall wash right plus floor; wall wash left plus floor; room; or batwing.

38. The lighting control method of claim 32, wherein providing the first and second visible-light sources includes directing the first and second beams of the first and second visible-light emissions with the first and second beam directions being down-light beam directions.

39. A lighting control method, comprising:

providing a first visible-light source including a first plurality of semiconductor light-emitting devices being spaced apart from and along a longitudinal axis, the first visible-light source being positioned for directing a first beam of first visible-light emissions from the first plurality of semiconductor light-emitting devices in a first beam direction;

providing a second visible-light source including a second plurality of semiconductor light-emitting devices being spaced apart from and along the longitudinal axis, the second visible-light source being positioned for directing a second beam of second visible-light emissions from the second plurality of semiconductor light-emitting devices in a second beam direction; and providing a third visible-light source including a third plurality of semiconductor light-emitting devices being spaced apart from and along the longitudinal axis, the third visible-light source being positioned for directing a third beam of third visible-light emissions from the third plurality of semiconductor light-emitting devices in a third beam direction;

controlling an overall intensity of the first beam of the first visible-light emissions as including a first baseline intensity combined with a first variable intensity, and controlling another overall intensity of the second beam of the second visible-light emissions as including a second baseline intensity combined with a second variable intensity, and controlling a further overall intensity of the third beam of the third visible-light emissions as including a third baseline intensity combined with a third variable intensity, and causing the first baseline intensity and the second baseline intensity and the third baseline intensity to collectively form a one of a plurality of pre-programmed combined baseline light emission patterns; and modulating the first variable intensity of the first beam and the second variable intensity of the second beam and the third variable intensity of the third beam in a manner causing the first and second and third beams of the first and second and third visible-light emissions to collectively emulate a progression of ambient sunlight.

40. The lighting control method of claim 39, wherein the causing the first and second and third beams to collectively emulate the progression of ambient sunlight includes initially modulating the first variable intensity of the first beam to relatively be substantially greater than the third variable intensity of the third beam while modulating the third variable intensity of the third beam to relatively be substantially less than the second variable intensity of the second beam, and then gradually modulating the second variable intensity of the second beam to relatively become substantially less than the third variable intensity of the third beam while gradually modulating the first variable intensity of the first beam to relatively become substantially less than the second variable intensity of the second beam.

41. The lighting control method of claim 39, wherein the causing the first and second and third beams to collectively emulate the progression of ambient sunlight includes modulating the first variable intensity of the first beam and the second variable intensity of the second beam and the third variable intensity of the third beam in a manner for causing the first and second and third beams of the first and second and third visible-light emissions to collectively emulate the progression of ambient sunlight throughout a cycle extending from sunrise to sunset.

42. The lighting control method of claim 39, wherein the causing the first and second and third beams to collectively emulate the progression of ambient sunlight includes initiating an emulation of the progression of ambient sunlight at an arbitrary user-selected time of a simulated sunrise and concluding the emulation at an arbitrary user-selected time of a simulated sunset.

43. The lighting control method of claim 39, wherein the causing the first and second and third beams to collectively emulate the progression of ambient sunlight includes controlling the first baseline intensity and the second baseline intensity and the third baseline intensity for causing the first beam and the second beam and the third beam to collectively form a one of the plurality of the pre-programmed combined baseline patterns of the first and second and third visible-light emissions being: center wall graze; table with wall-fill; wall wash right; wall wash left; double wall wash; wall wash right plus floor; wall wash left plus floor; room; or batwing.

44. The lighting control method of claim 39, wherein the causing the first and second and third beams to collectively emulate the progression of ambient sunlight includes transitioning, over a selectable time period, the first, second and third baseline intensities for the first visible-light emissions, the second visible-light emissions, and the third visible-light emissions from a one of the plurality of pre-programmed combined baseline light emission patterns to another one of the plurality of pre-programmed combined baseline light emission patterns.

45. The lighting control method of claim 44, wherein the causing the first and second and third beams to collectively emulate the progression of ambient sunlight includes the first beam direction and the second beam direction and the third beam directions as being down-light beam directions.

46. The lighting control method of claim 45, wherein the method includes providing a fourth visible-light source including a fourth plurality of semiconductor light-emitting devices being spaced apart from and along the longitudinal axis, the fourth visible-light source being positioned for directing a fourth beam of fourth visible-light emissions from the fourth plurality of semiconductor light-emitting devices in a fourth beam direction being an up-light beam direction.

47. The lighting control method of claim 46, wherein the method includes providing a fifth visible-light source including a fifth plurality of semiconductor light-emitting devices being spaced apart from and along the longitudinal axis, the fifth visible-light source being positioned for directing a fifth beam of fifth visible-light emissions from the fifth plurality of semiconductor light-emitting devices in a fifth beam direction being an up-light beam direction.

48. The lighting control method of claim 47, wherein the method includes causing the fourth and fifth beams to be collectively synchronized with the progression of ambient sunlight by initially modulating a fourth intensity of the fourth beam to relatively be substantially greater than a fifth intensity of the fifth beam, and then gradually modulating the fifth intensity of the fifth beam to relatively become substantially greater than the fourth intensity of the fourth beam.

49. The lighting control method of claim 47, wherein the method includes providing a sixth visible-light source including a sixth plurality of semiconductor light-emitting devices being spaced apart from and along the longitudinal axis, the sixth visible-light source being positioned for directing a sixth beam of sixth visible-light emissions from the sixth plurality of semiconductor light-emitting devices in a sixth beam direction being an up-light beam direction.

50. The lighting control method of claim 49, wherein the method includes causing the fourth and fifth and sixth beams to be collectively synchronized with the progression of ambient sunlight by initially modulating the fourth variable intensity of the fourth beam to relatively be substantially greater than a sixth variable intensity of the sixth beam while modulating the sixth variable intensity of the sixth beam to relatively be substantially less than the fifth variable intensity of the fifth beam, and then gradually modulating the fifth variable intensity of the fifth beam to relatively become substantially less than the sixth variable intensity of the sixth beam while gradually modulating the fourth variable intensity of the fourth beam to relatively become substantially less than the fifth variable intensity of the fifth beam.

51. The lighting control method of claim 39, wherein the method includes controlling the first visible-light source with the first plurality of semiconductor light-emitting devices being collectively configured for generating the first visible-light emissions as having a selectable first perceived color point; and controlling the second visible-light source with the second plurality of semiconductor light-emitting devices being collectively configured for generating the second visible-light emissions as having a selectable second perceived color point; and controlling the third visible-light source with the third plurality of semiconductor light-emitting devices being collectively configured for generating the third visible-light emissions as having a selectable third perceived color point.

52. A lighting controller, comprising:
a control system including a microprocessor and a driver for semiconductor light-emitting devices;
wherein the driver controls a first visible-light source including a first plurality of semiconductor light-emitting devices being spaced apart from and along a longitudinal axis, the first visible-light source being positioned for directing a first beam of first visible-light emissions from the first plurality of semiconductor light-emitting devices in a first beam direction;
wherein the driver further controls a second visible-light source including a second plurality of semiconductor light-emitting devices being spaced apart from and along the longitudinal axis, the second visible-light source being positioned for directing a second beam of second visible-light emissions from the second plurality of semiconductor light-emitting devices in a second beam direction being spaced apart from the first beam direction;
wherein the control system is programmed for controlling an overall intensity of the first beam of the first visible-light emissions as including a first baseline intensity combined with a first variable intensity, and for controlling another overall intensity of the second beam of the second visible light emissions as including a second baseline intensity combined with a second variable intensity, and for causing the first baseline intensity and the second baseline intensity to collectively form a one of a plurality of pre-programmed combined baseline light emission patterns; and
wherein the control system is programmed for causing the first and second and third visible-light sources to emulate a progression of ambient sunlight by initially modulating the first variable intensity of the first beam to be substantially greater than the second variable intensity of the second beam and by then progressively modulating the second variable intensity of the second beam to become substantially greater than the first variable intensity of the first beam.

53. The lighting controller of claim 52, wherein the control system is programmed for transitioning, over a selectable time period, the first baseline intensity of the first beam of the first visible-light emissions and the second baseline intensity of the second beam of the second visible-light emissions to another one of the plurality of the pre-programmed combined baseline light emission patterns.

54. The lighting controller of claim 52, wherein the control system is programmed for controlling the first baseline intensity and the second baseline intensity for causing the first beam and the second beam to collectively form a one of the plurality of the pre-programmed combined baseline light emission patterns of the first and second visible-light emissions being: center wall graze; table with wall-fill; wall wash right; wall wash left; double wall wash; wall wash right plus floor; wall wash left plus floor; room; or batwing.

55. The lighting controller of claim 52, wherein the control system is programmed for controlling the first visible-light source with the first plurality of semiconductor light-emitting devices being collectively configured for generating the first visible-light emissions as having a selectable first perceived color point; and wherein the control system is programmed for controlling the second visible-light source with the second plurality of semiconductor light-emitting devices being collectively configured for generating the second visible-light emissions as having a selectable second perceived color point.

56. The lighting controller of claim 52, wherein the first beam direction and the second beam direction are downlight beam directions.

* * * * *